United States Patent [19]
Ohashi

[11] Patent Number: 5,576,891
[45] Date of Patent: Nov. 19, 1996

[54] ZOOM LENS USING A FIRST LENS GROUP HAVING A POSITIVE FOCAL LENGTH AND A SECOND LENS GROUP HAVING A NEGATIVE FOCAL LENGTH

[75] Inventor: Kazuyasu Ohashi, Funabashi, Japan

[73] Assignee: Ricoh Company, Ltd., Tokyo, Japan

[21] Appl. No.: 230,920

[22] Filed: Apr. 21, 1994

[30] Foreign Application Priority Data

Apr. 22, 1993 [JP] Japan .................................... 5-096235
Apr. 30, 1993 [JP] Japan .................................... 5-104426
Dec. 3, 1993 [JP] Japan .................................... 5-304420

[51] Int. Cl.$^6$ ................................................. G02B 15/14
[52] U.S. Cl. ......................... 359/692; 359/676; 359/713
[58] Field of Search ............................ 359/692, 676, 359/713

[56] References Cited

U.S. PATENT DOCUMENTS 5,398,135  3/1995  Ohashi .................... 359/692

Primary Examiner—David C. Nelms
Assistant Examiner—Andrew Q. Tran
Attorney, Agent, or Firm—Oblon, Spivak, McClelland, Maier & Neustadt, P.C.

[57] ABSTRACT

In a zoom lens in which a variable power is obtained by changing the distance between a first lens group having a positive focal length and a second lens group having a negative focal length, the first lens group includes a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, the second lens group includes a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $0.27 < f_1/f_T < 0.31$                                                           (1)

$(d_8+d_{9T})/f_T < 0.035$                                   (2)

$-1.1 < f_2/f_1 < -0.9$                                       (3).

62 Claims, 76 Drawing Sheets

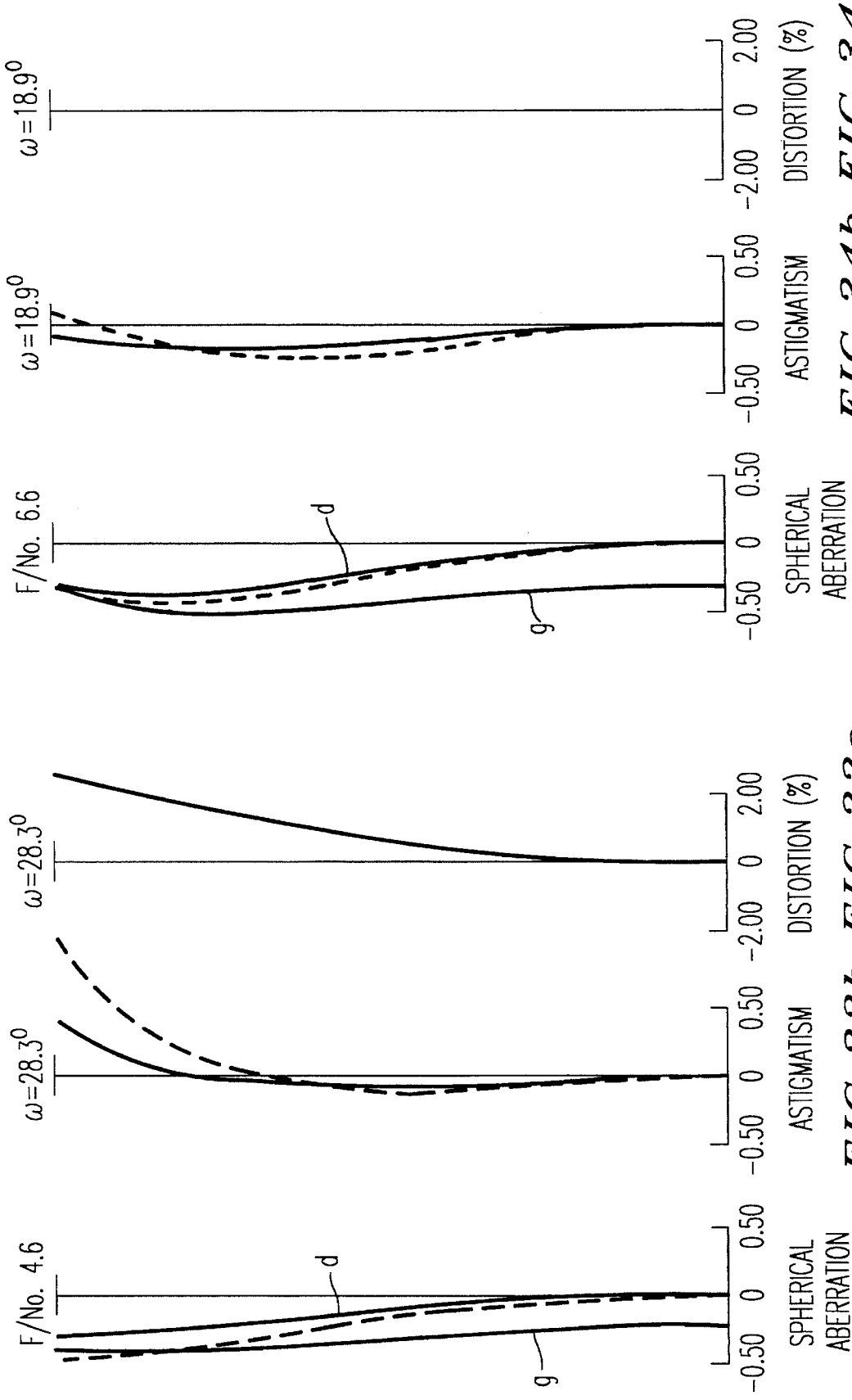

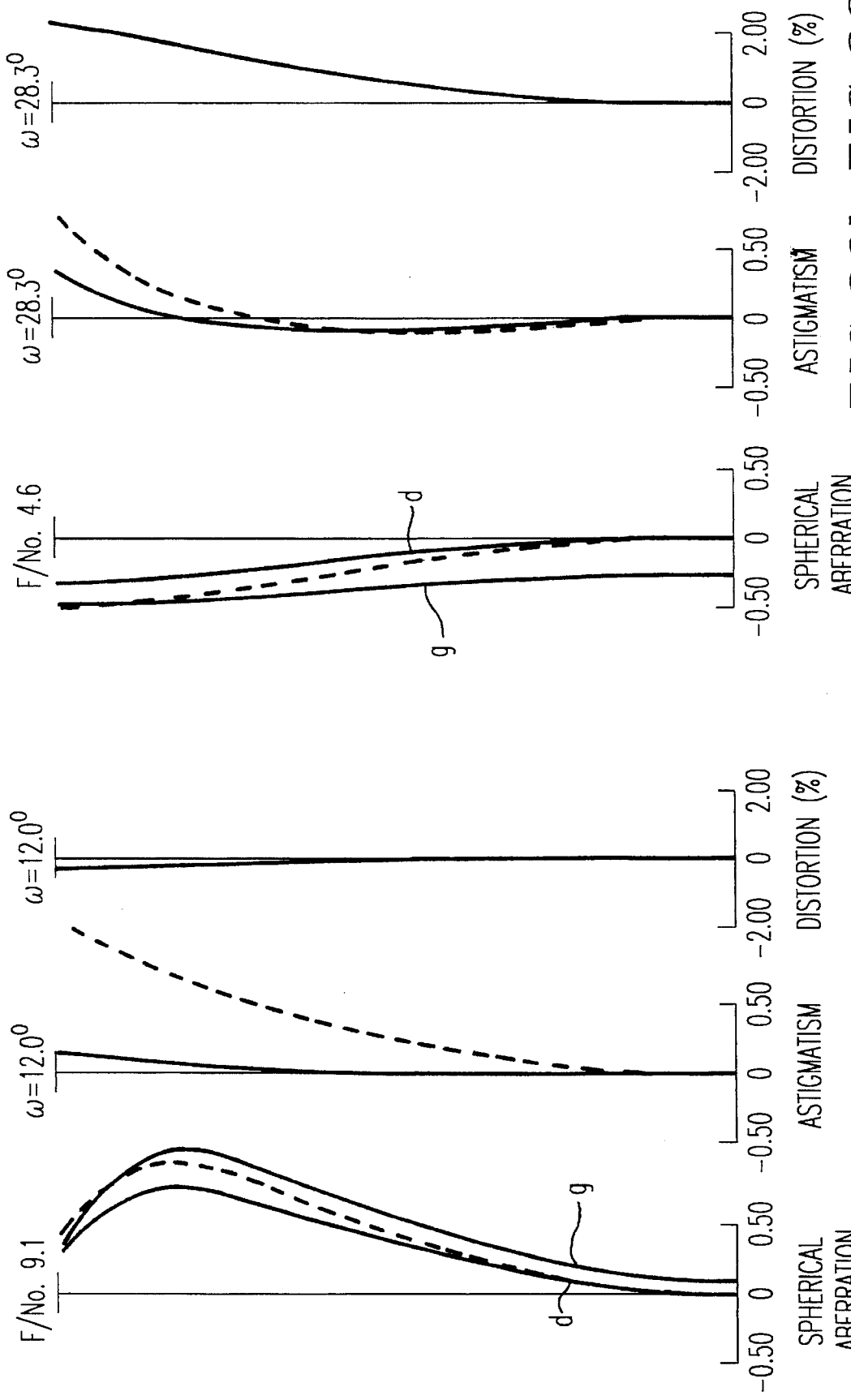

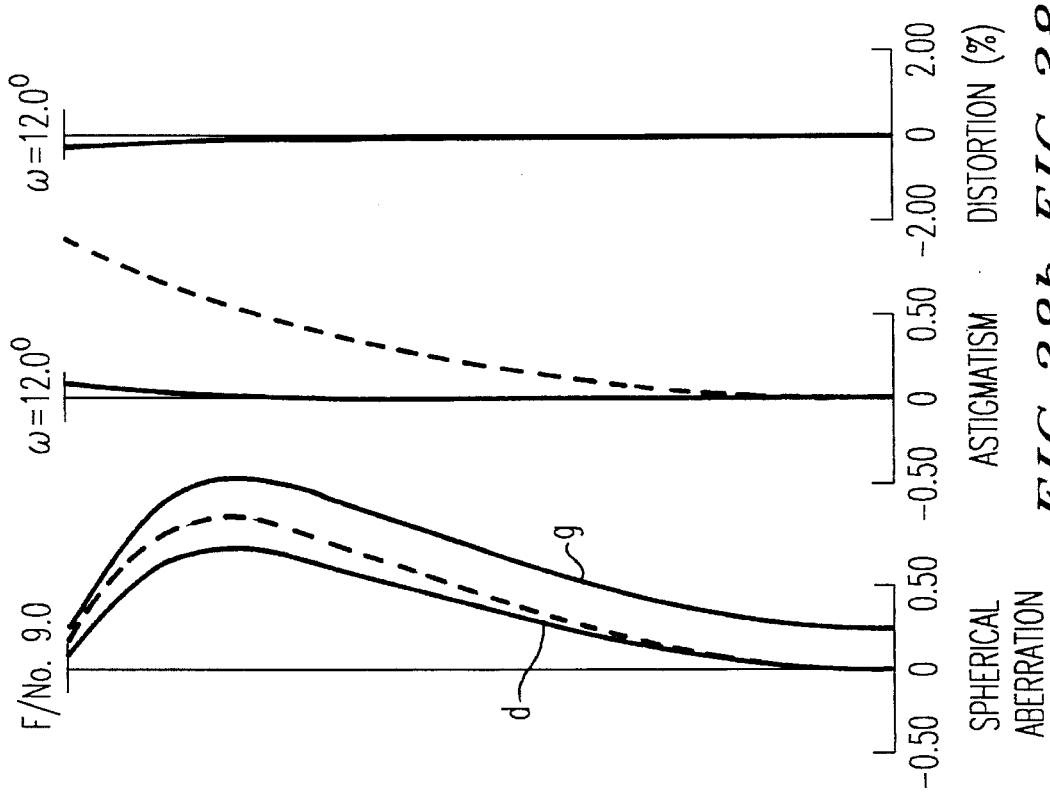
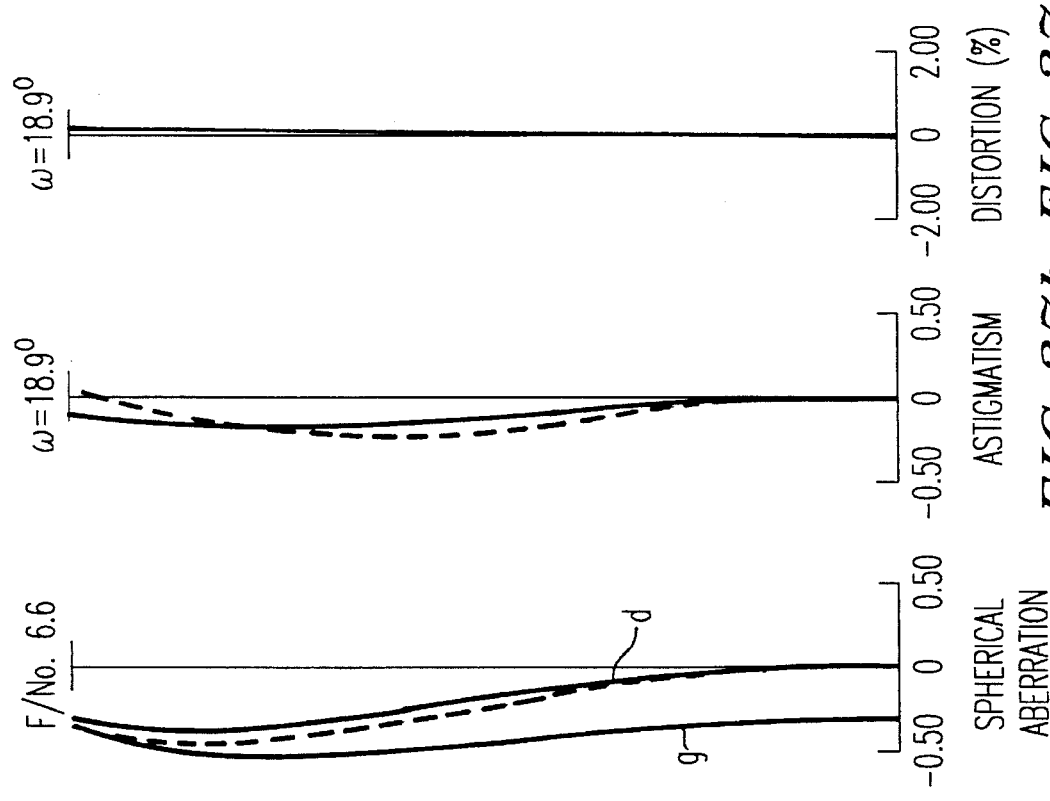

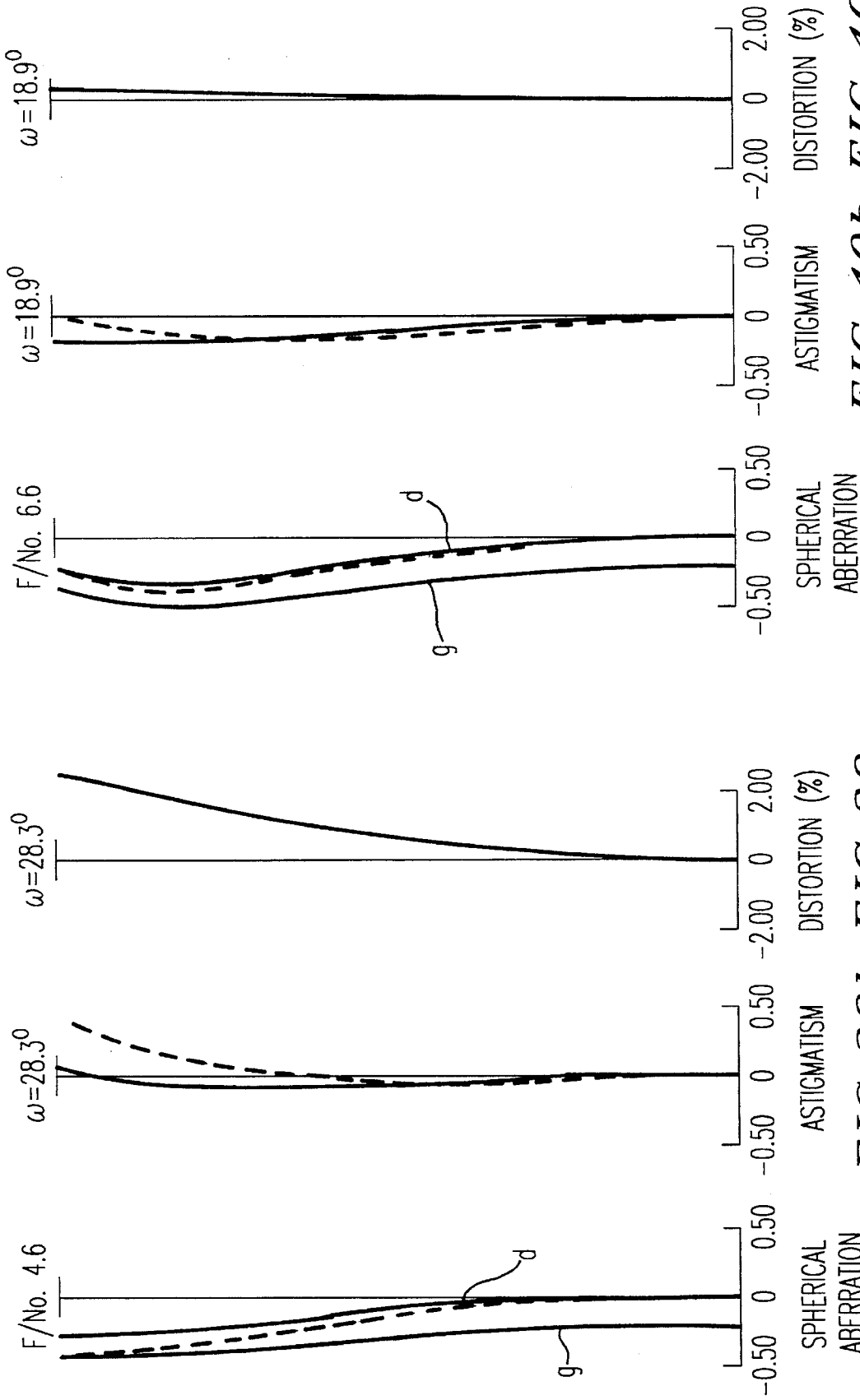

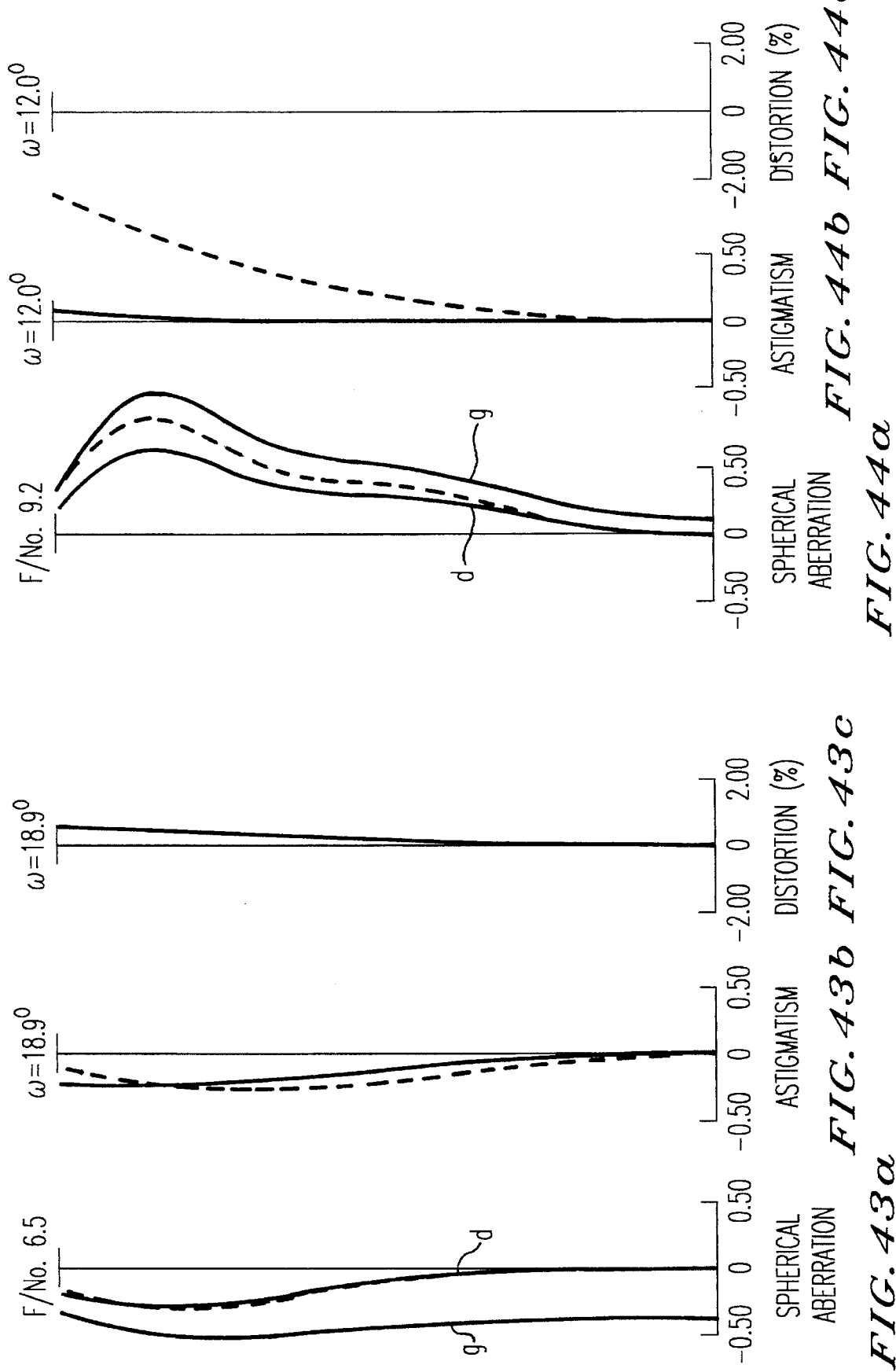

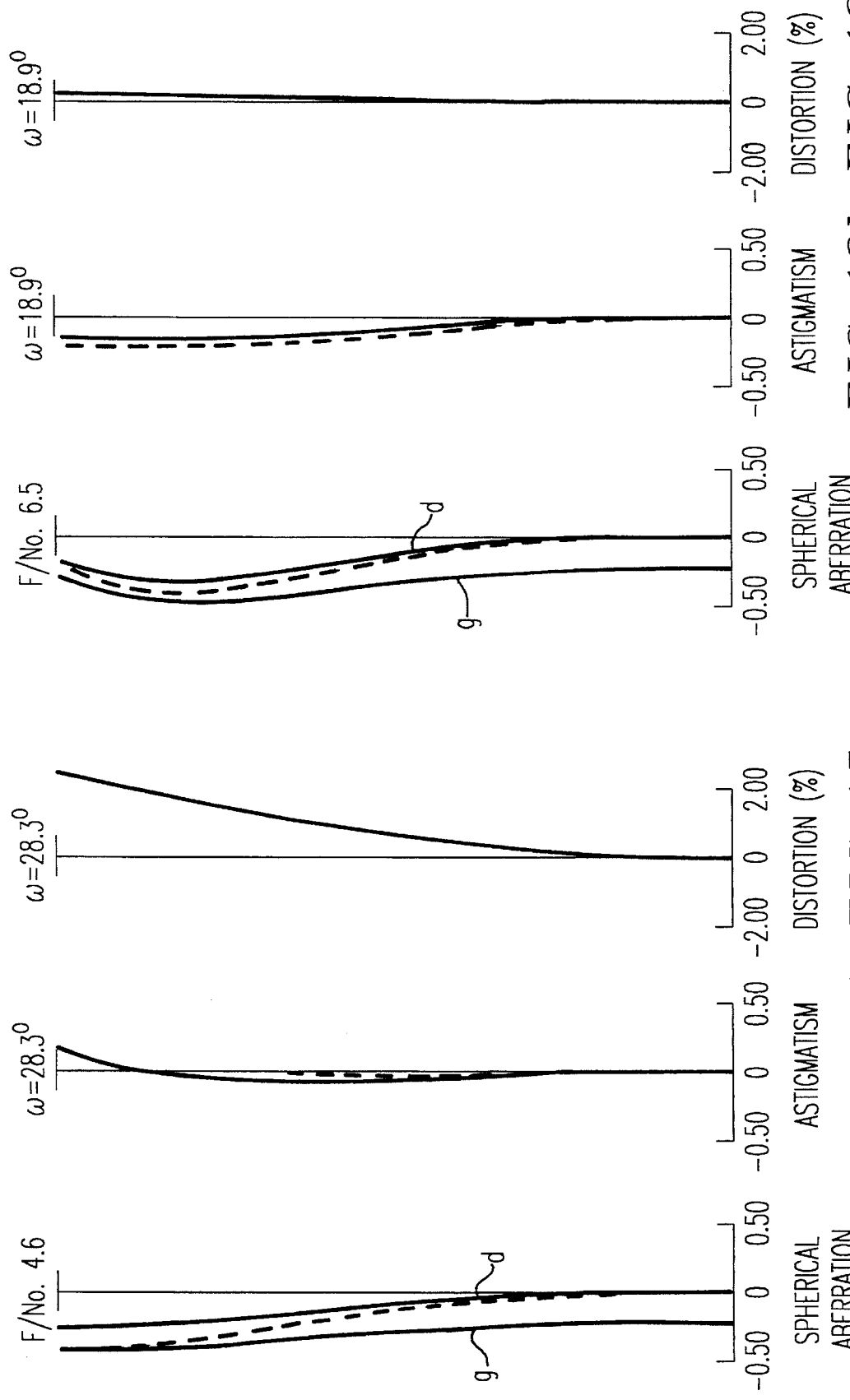

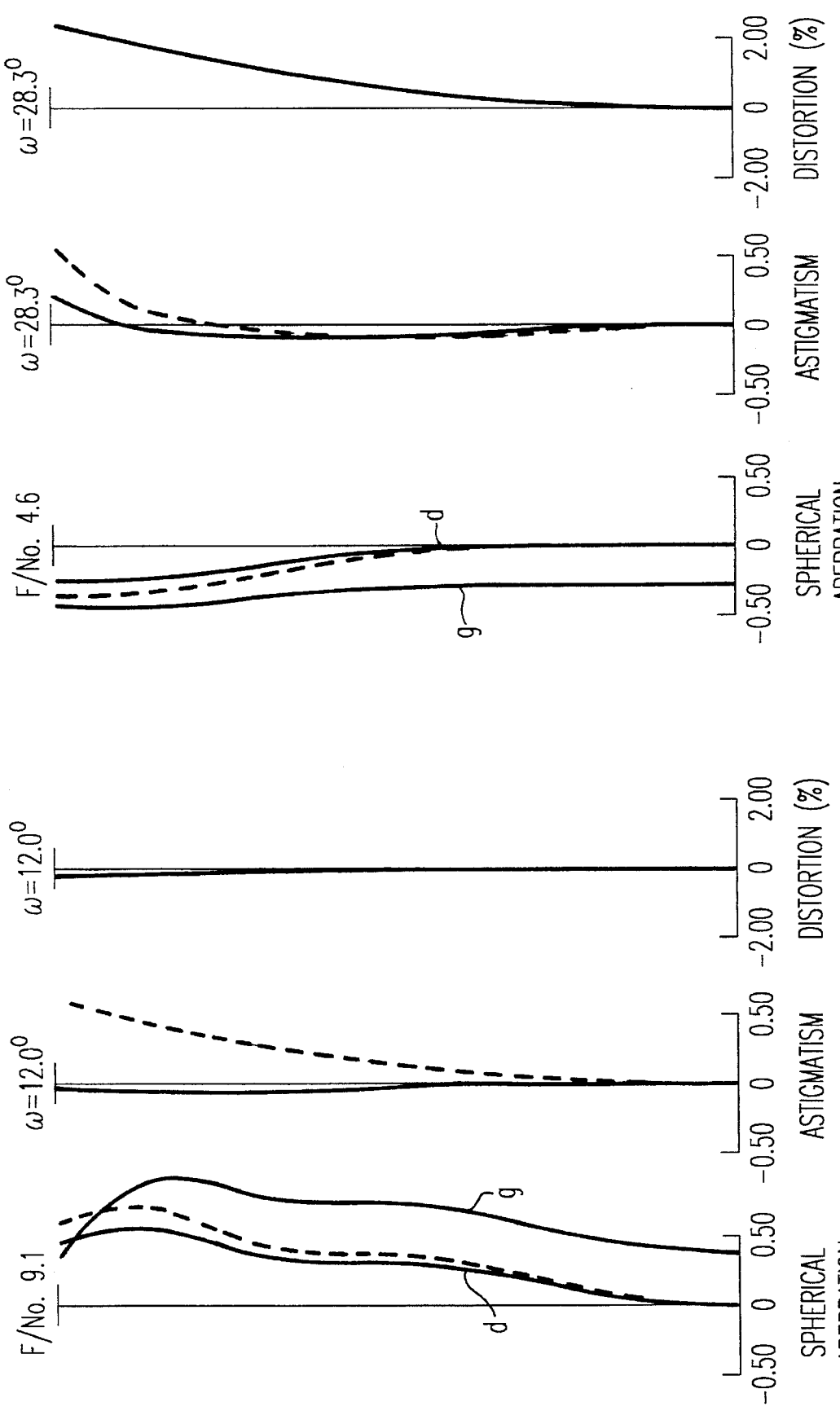

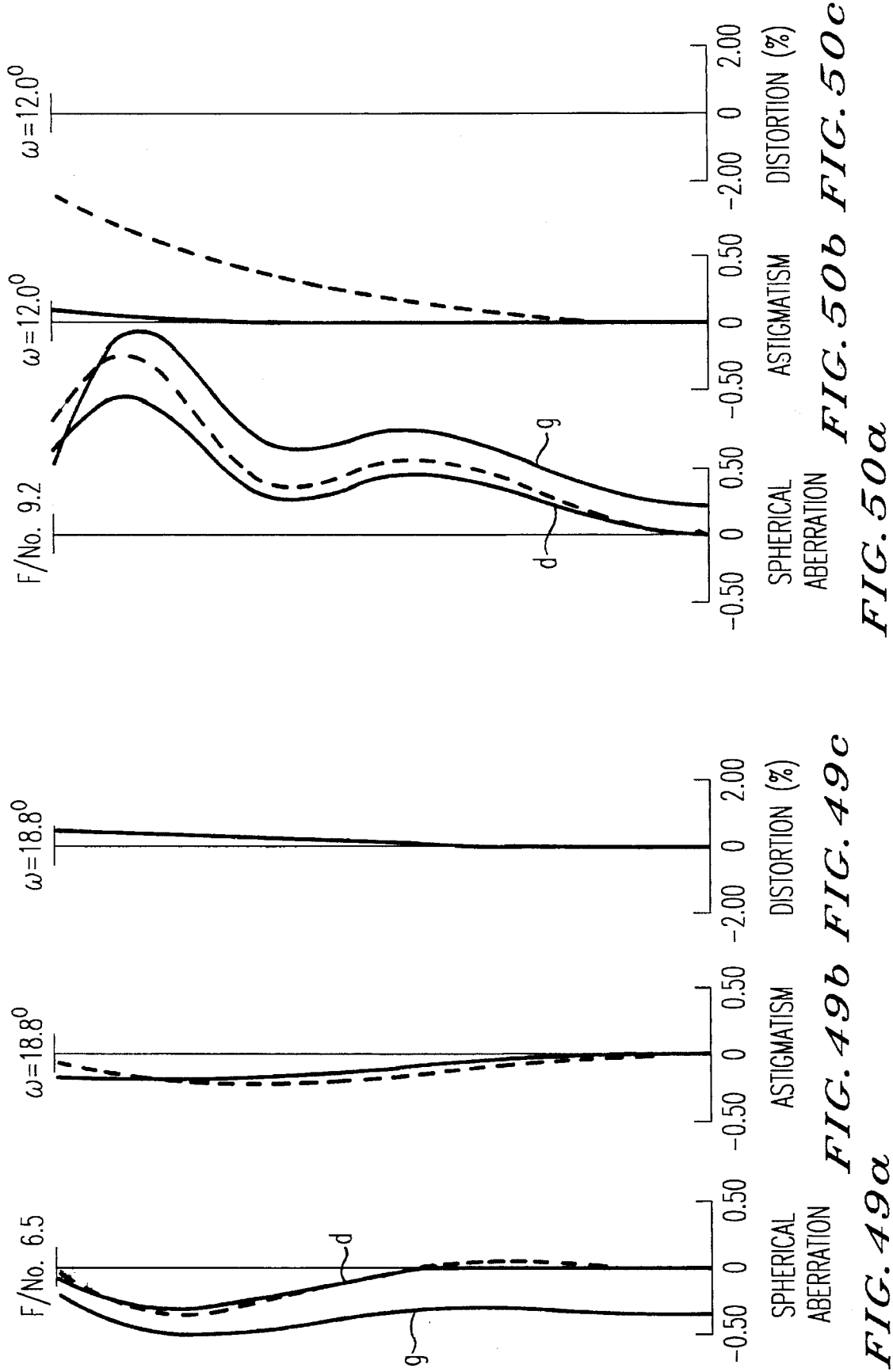

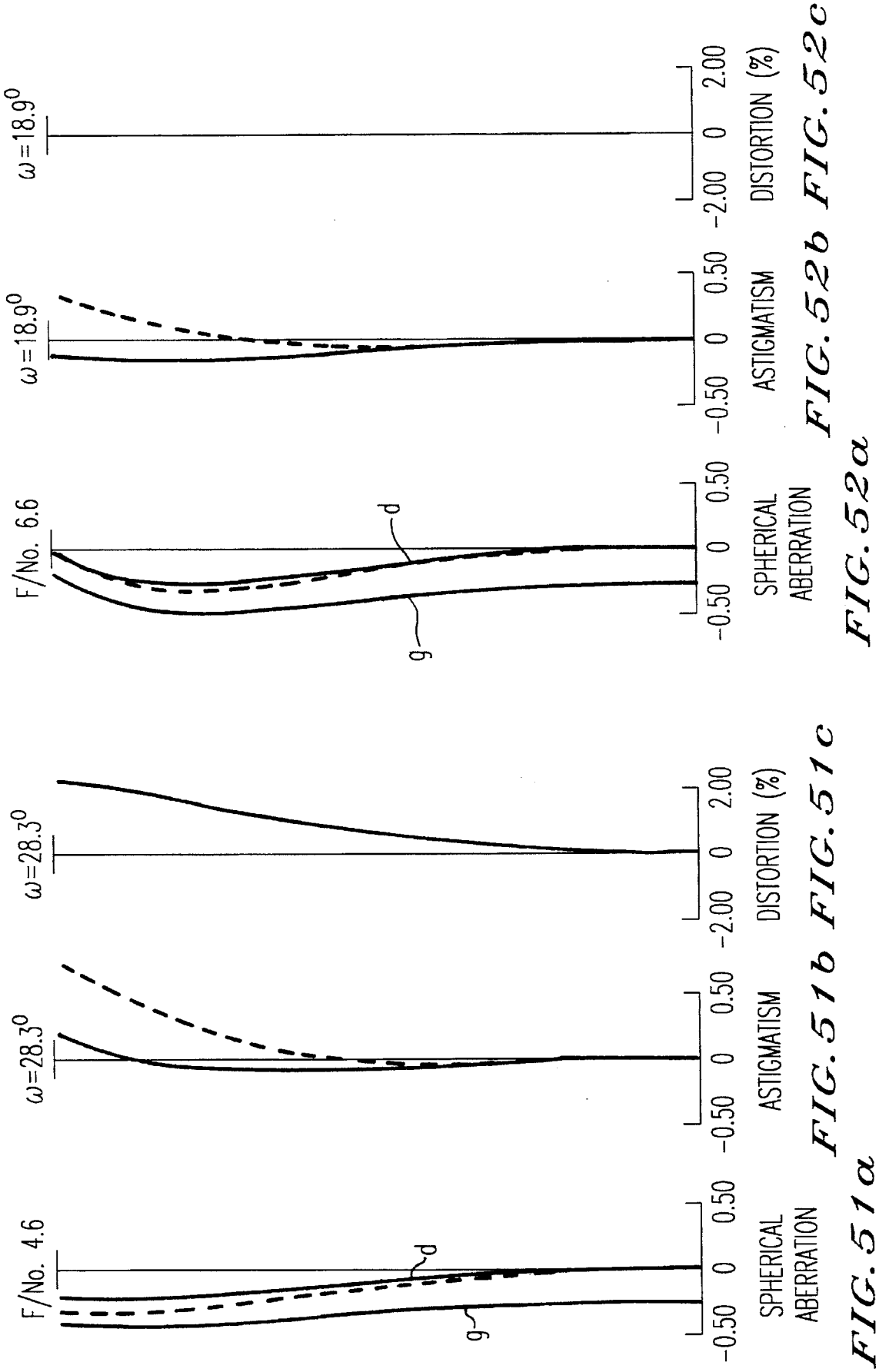

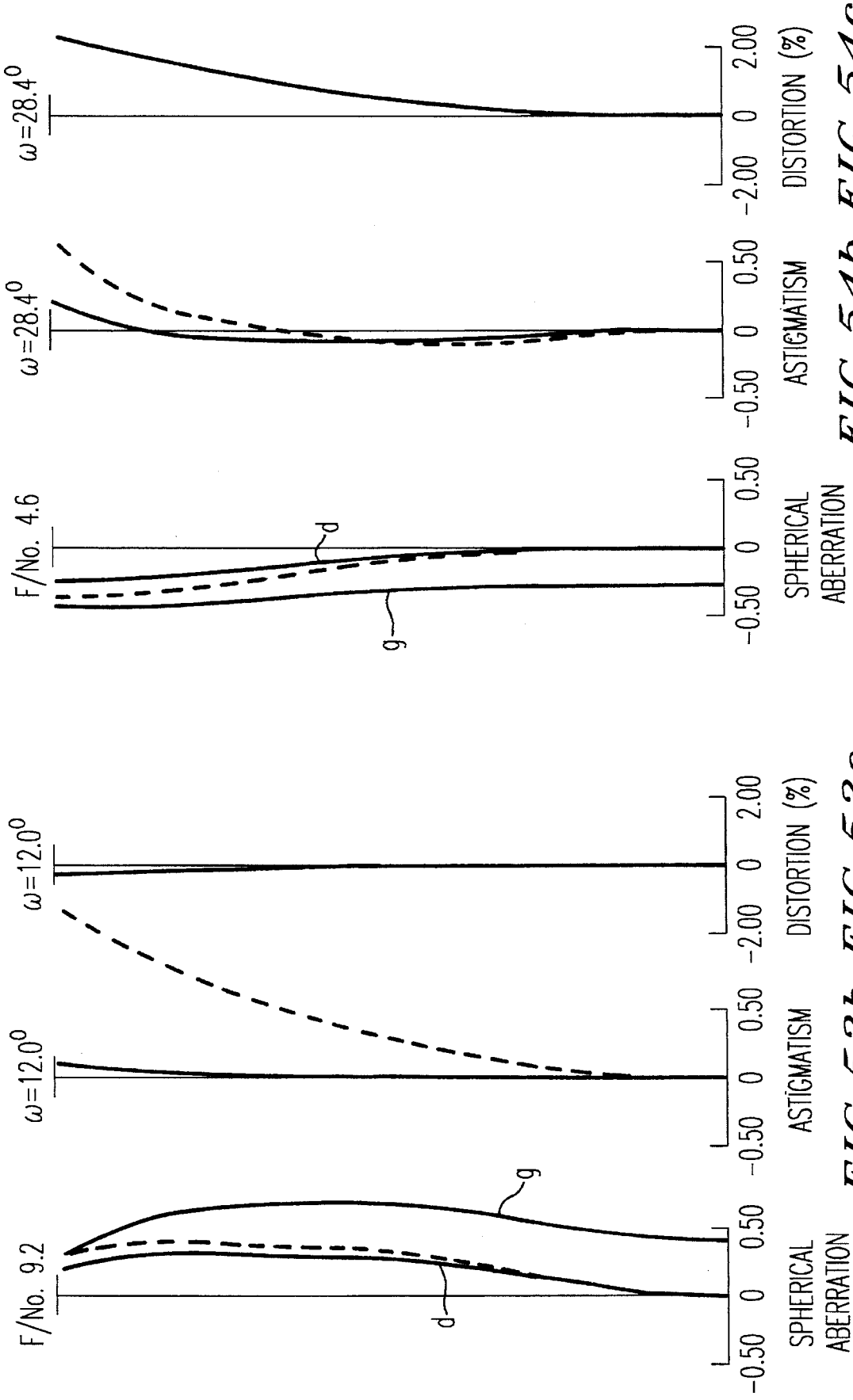

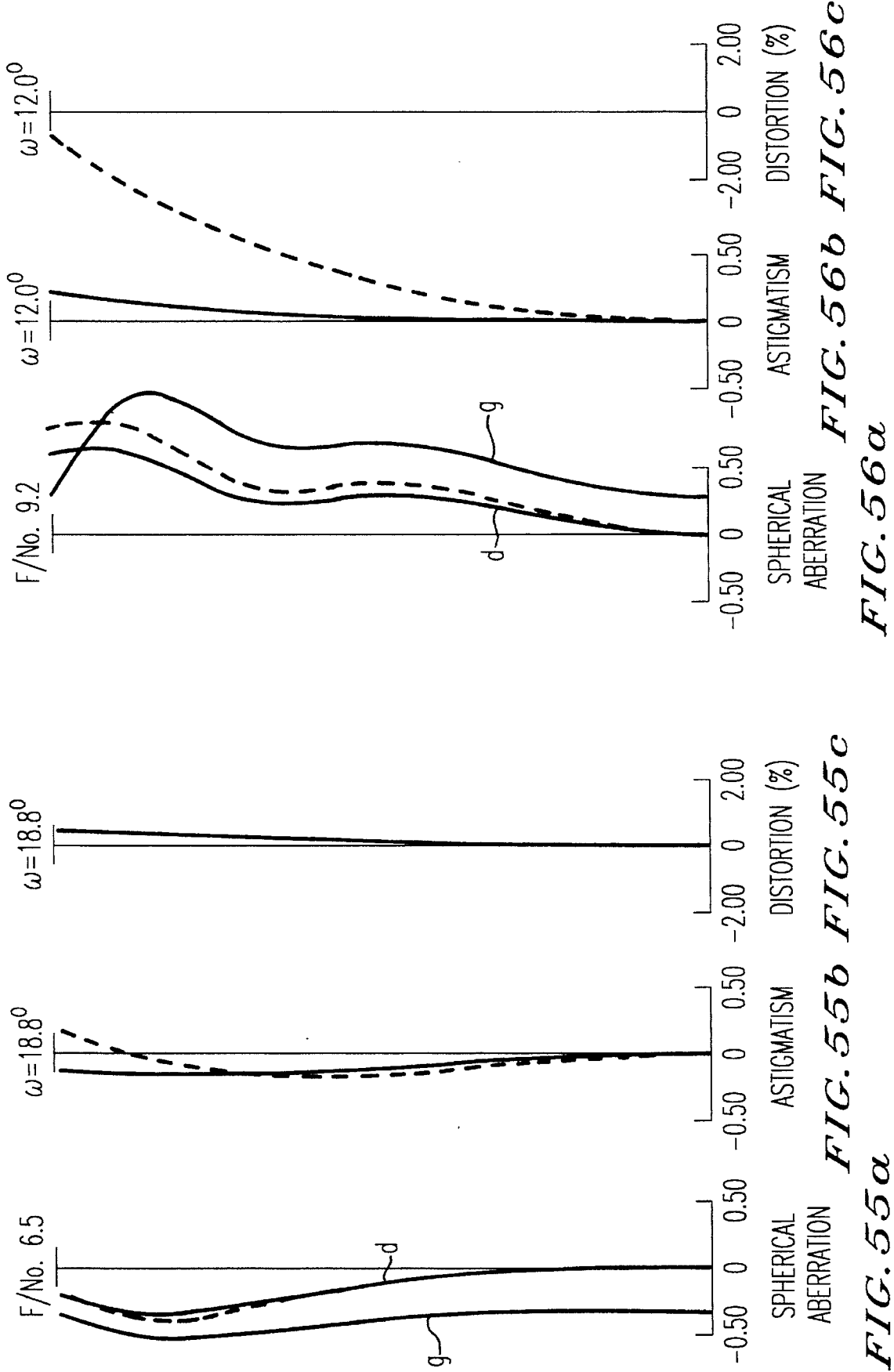

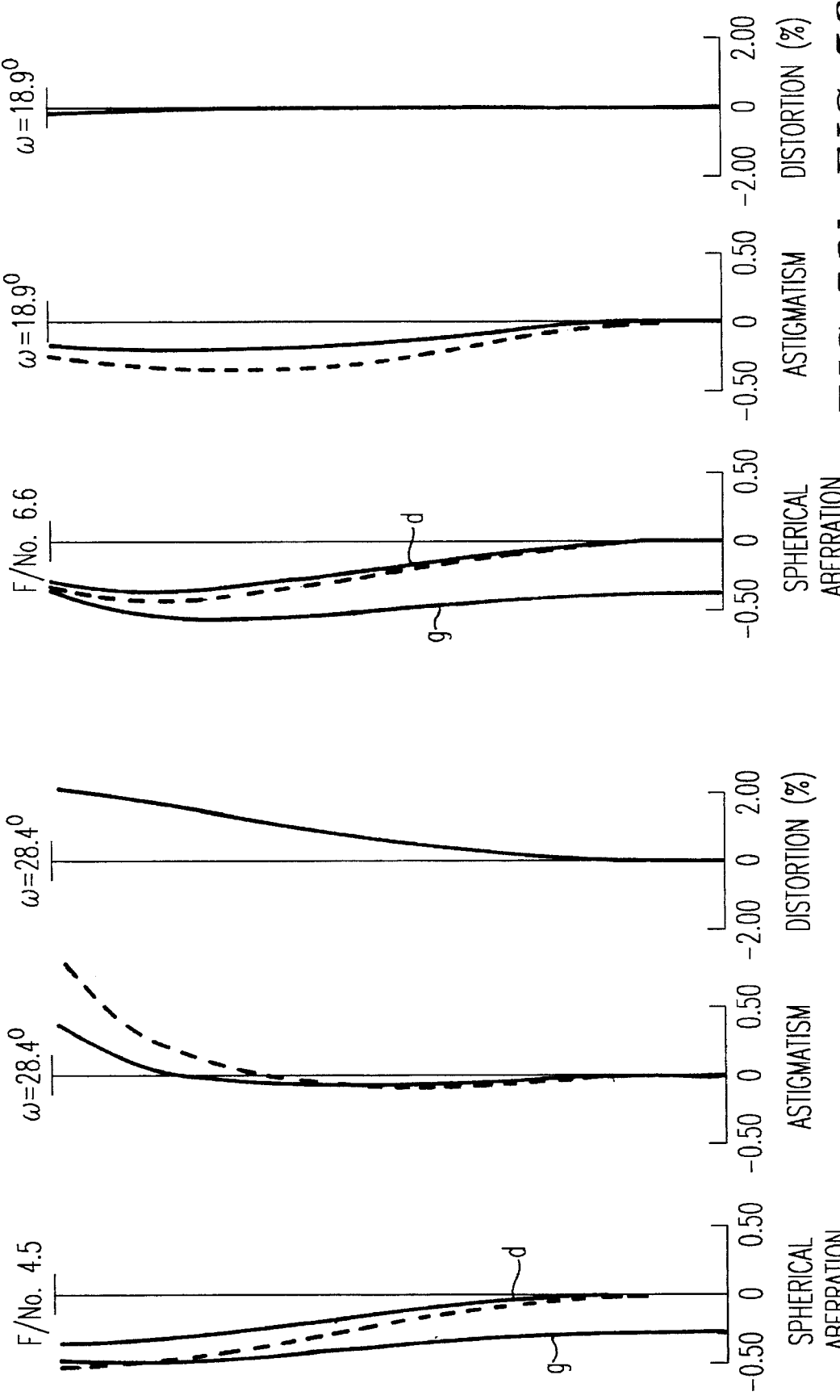

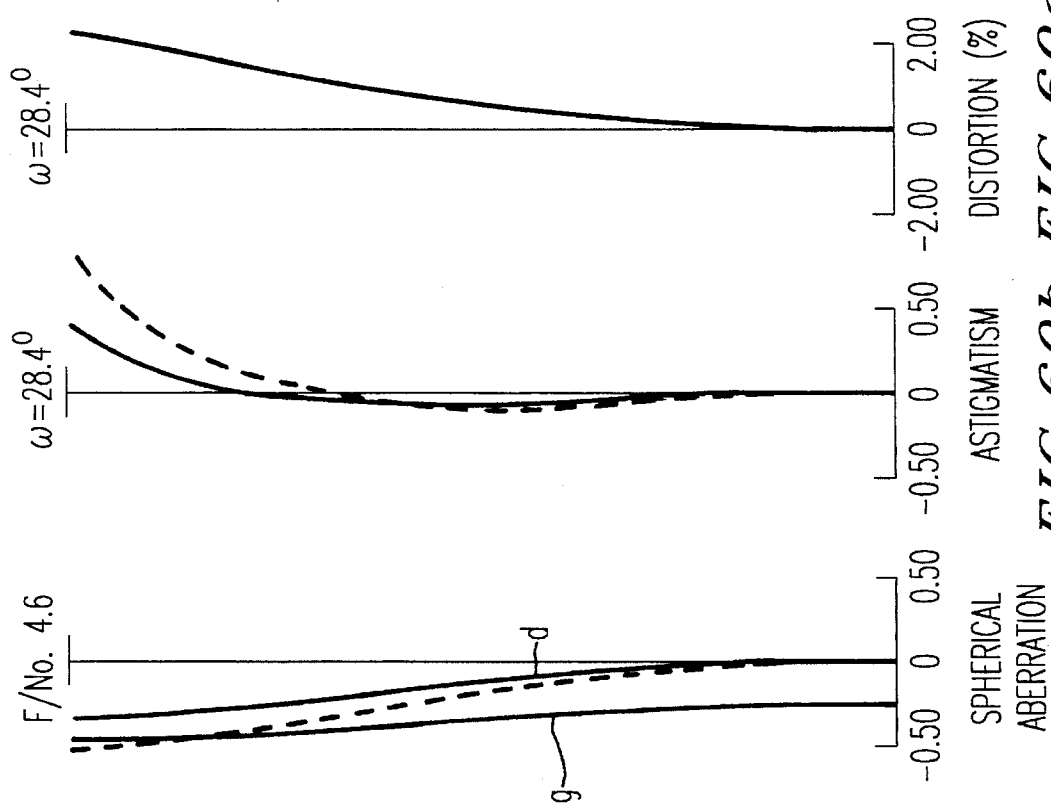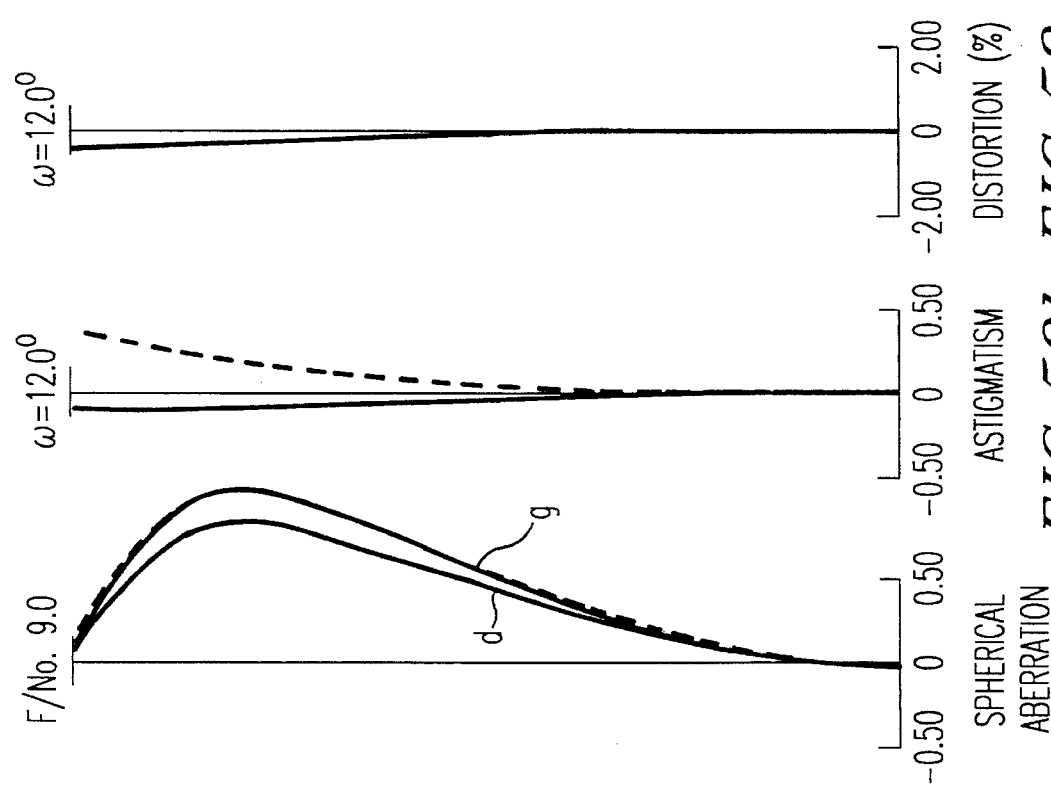

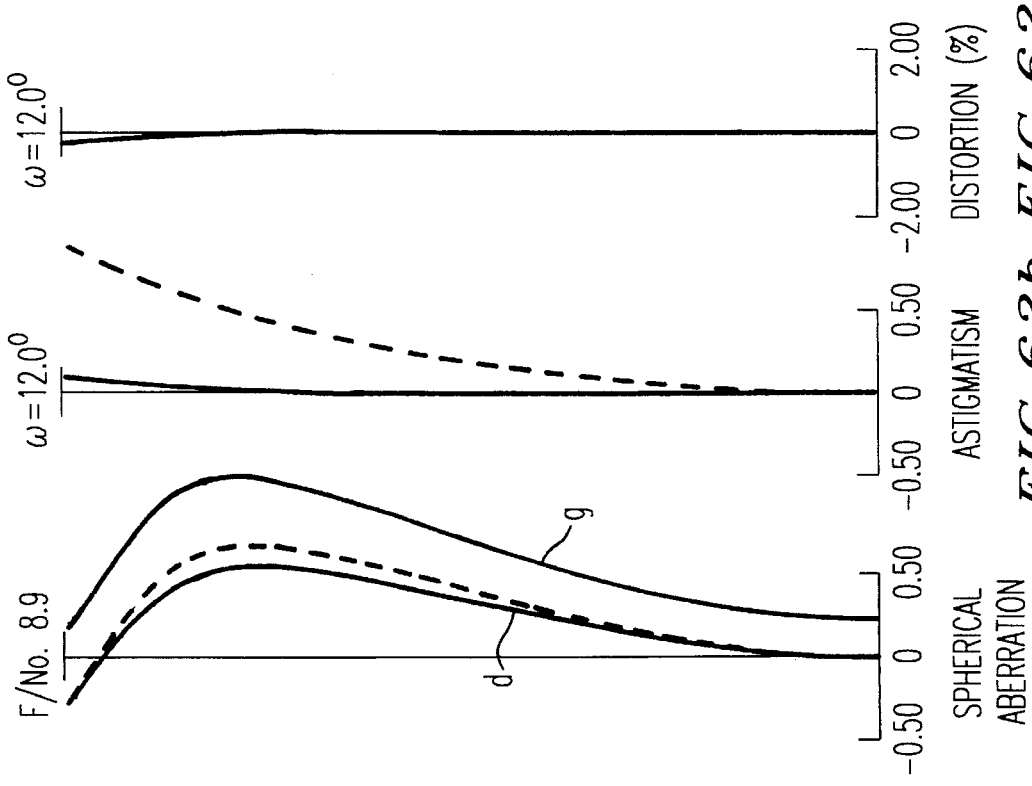
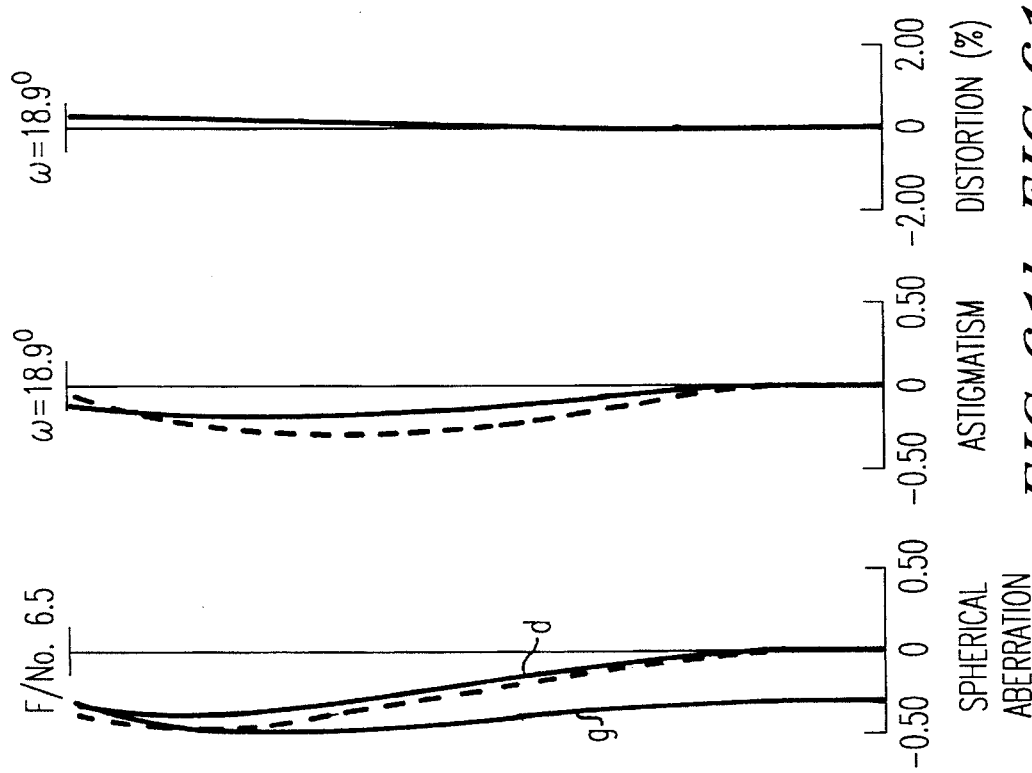

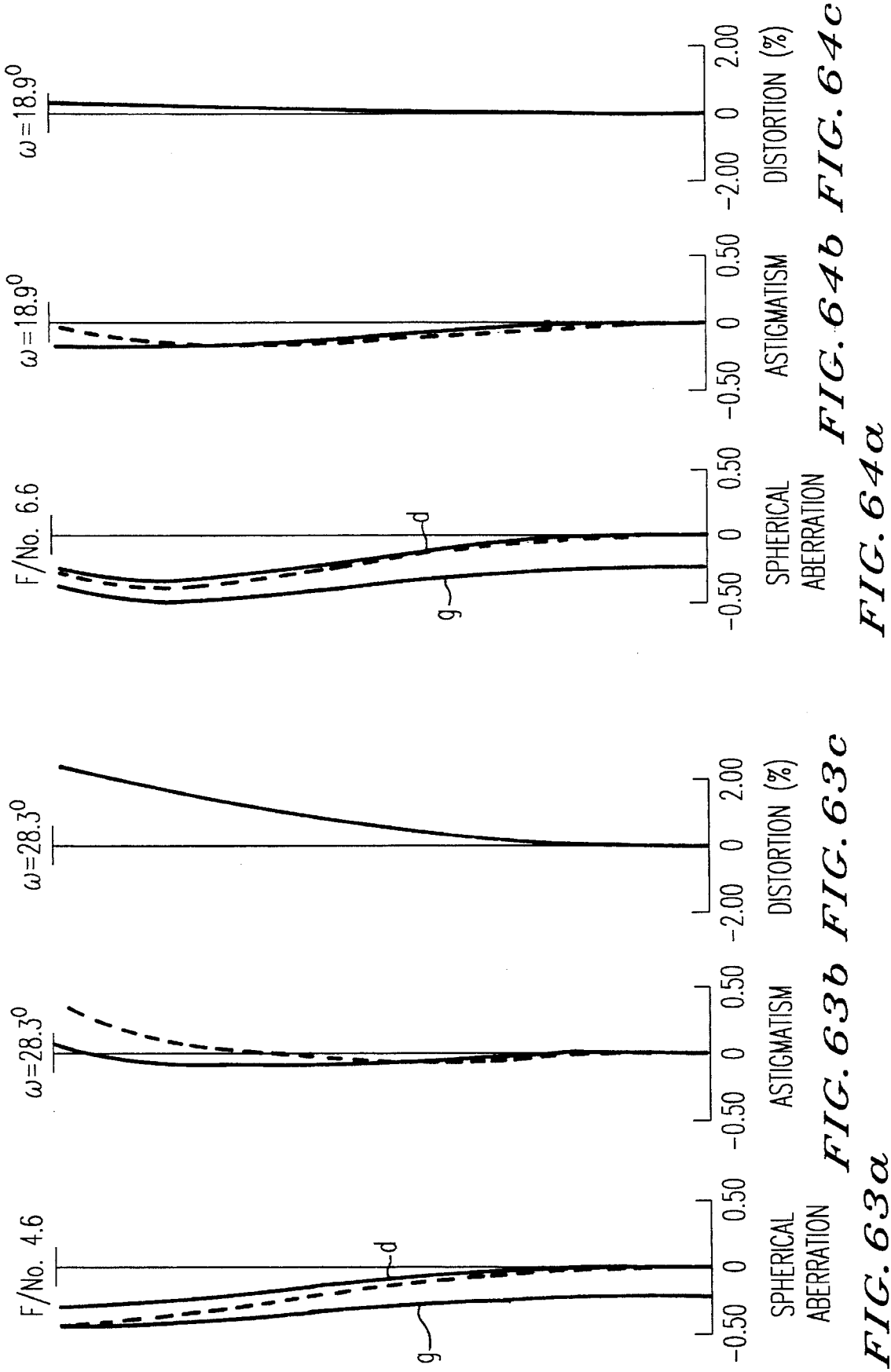

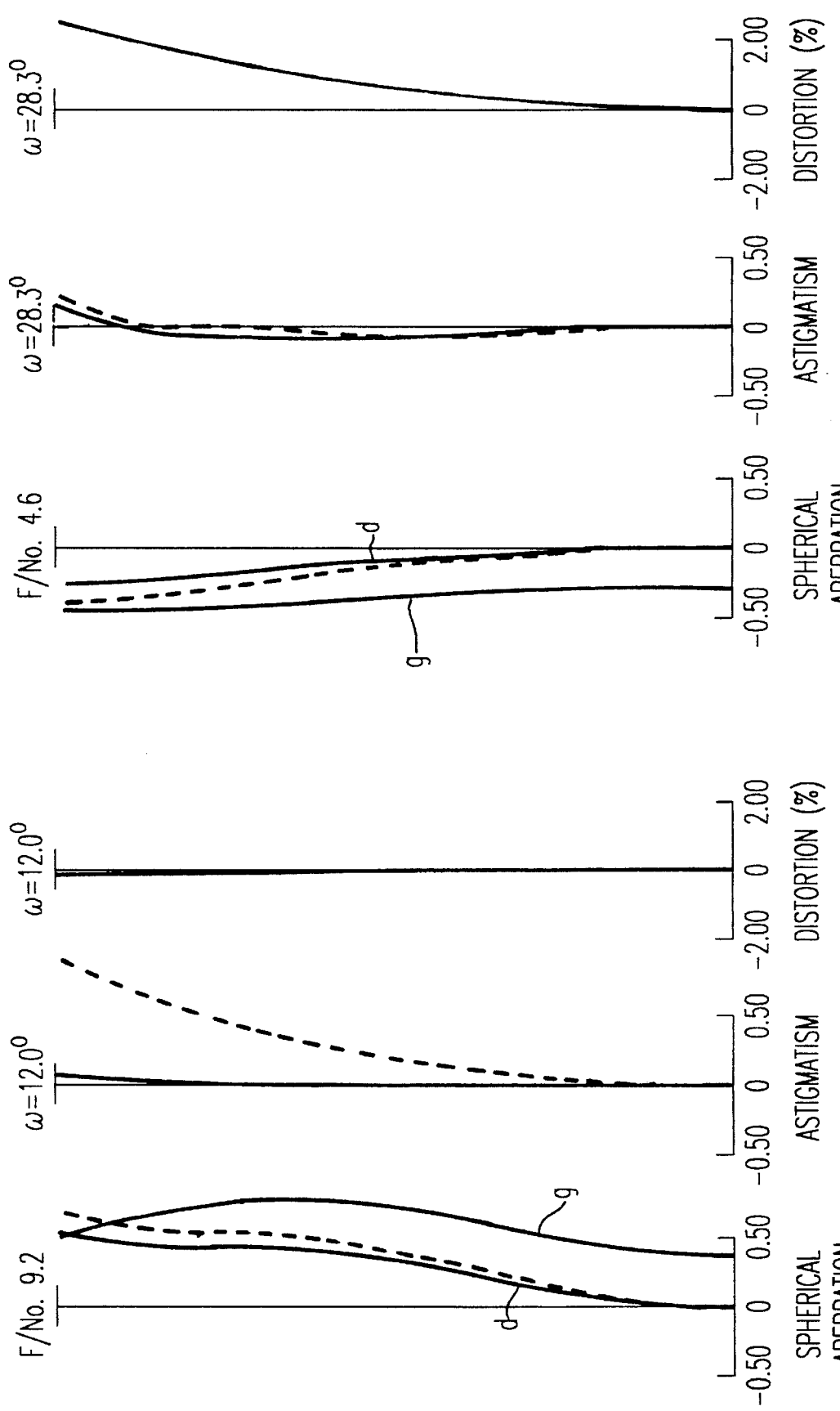

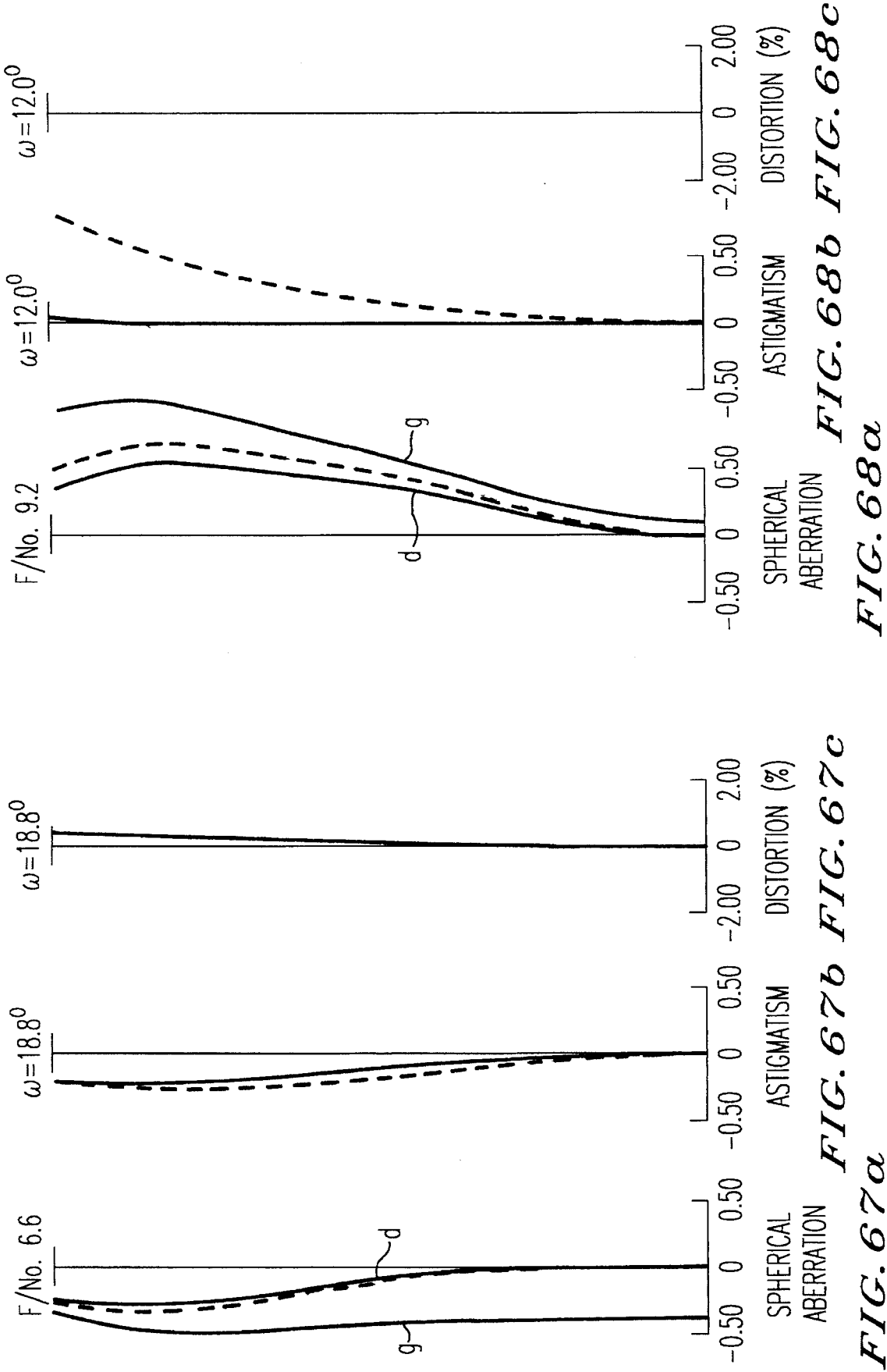

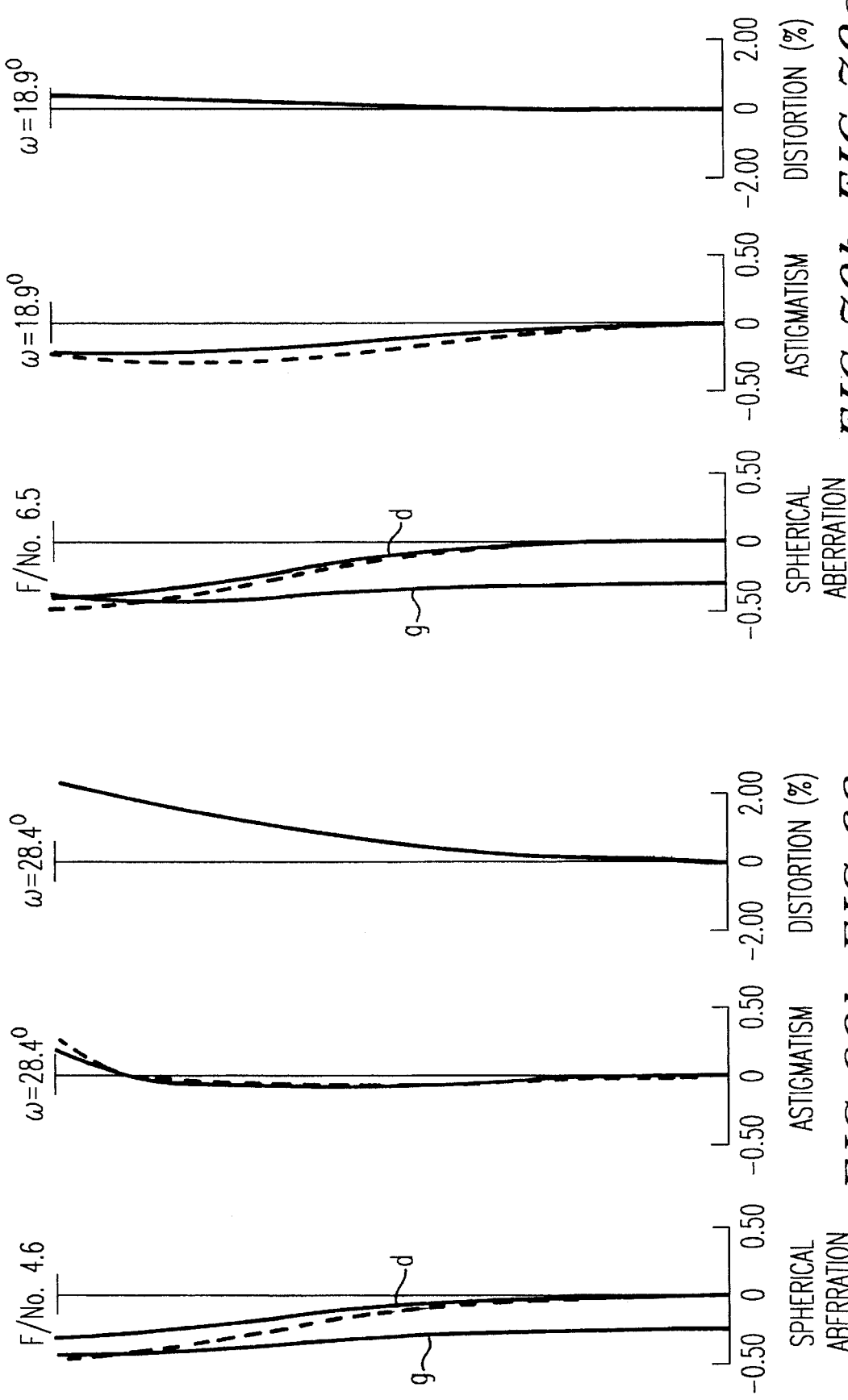

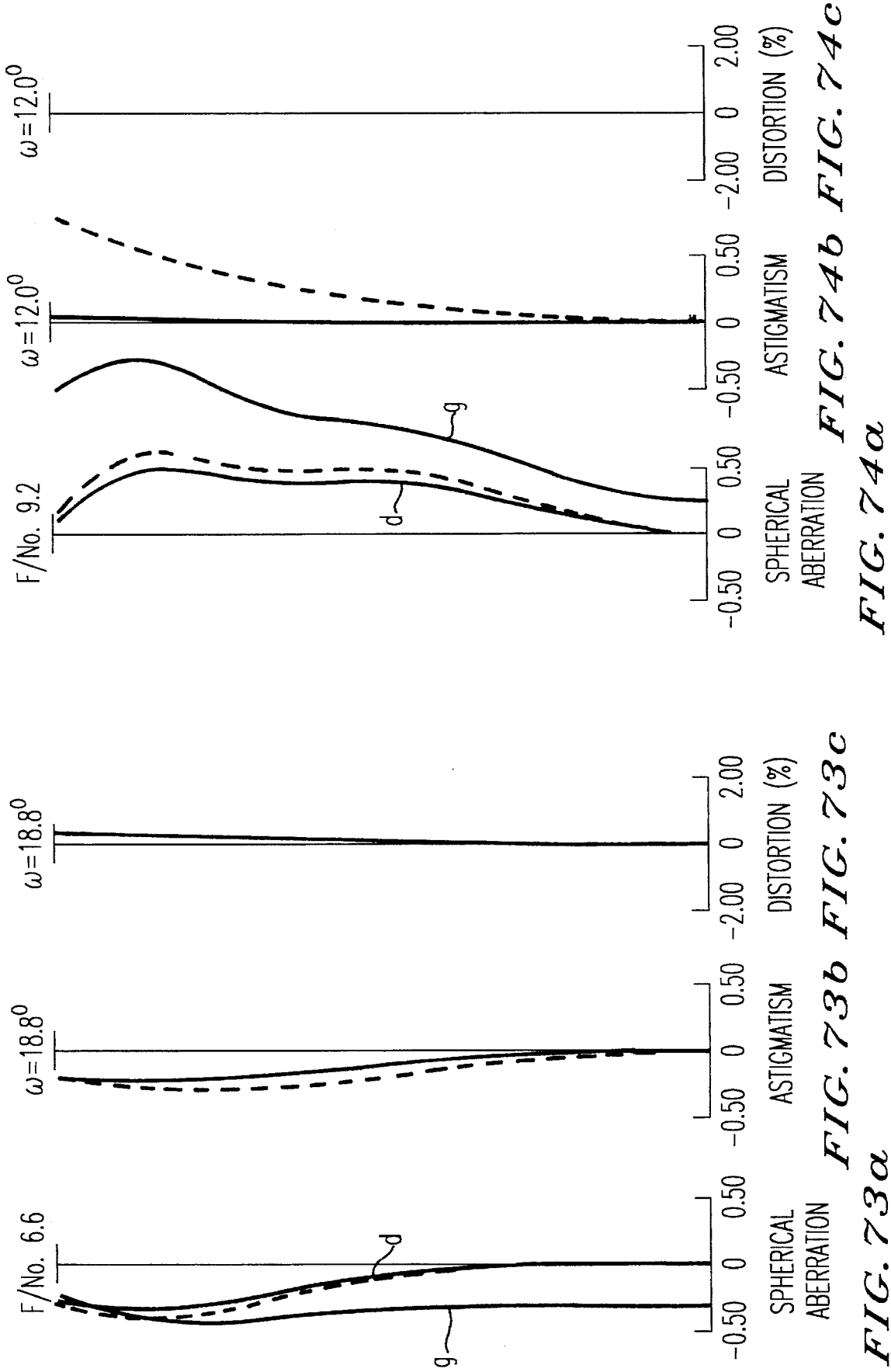

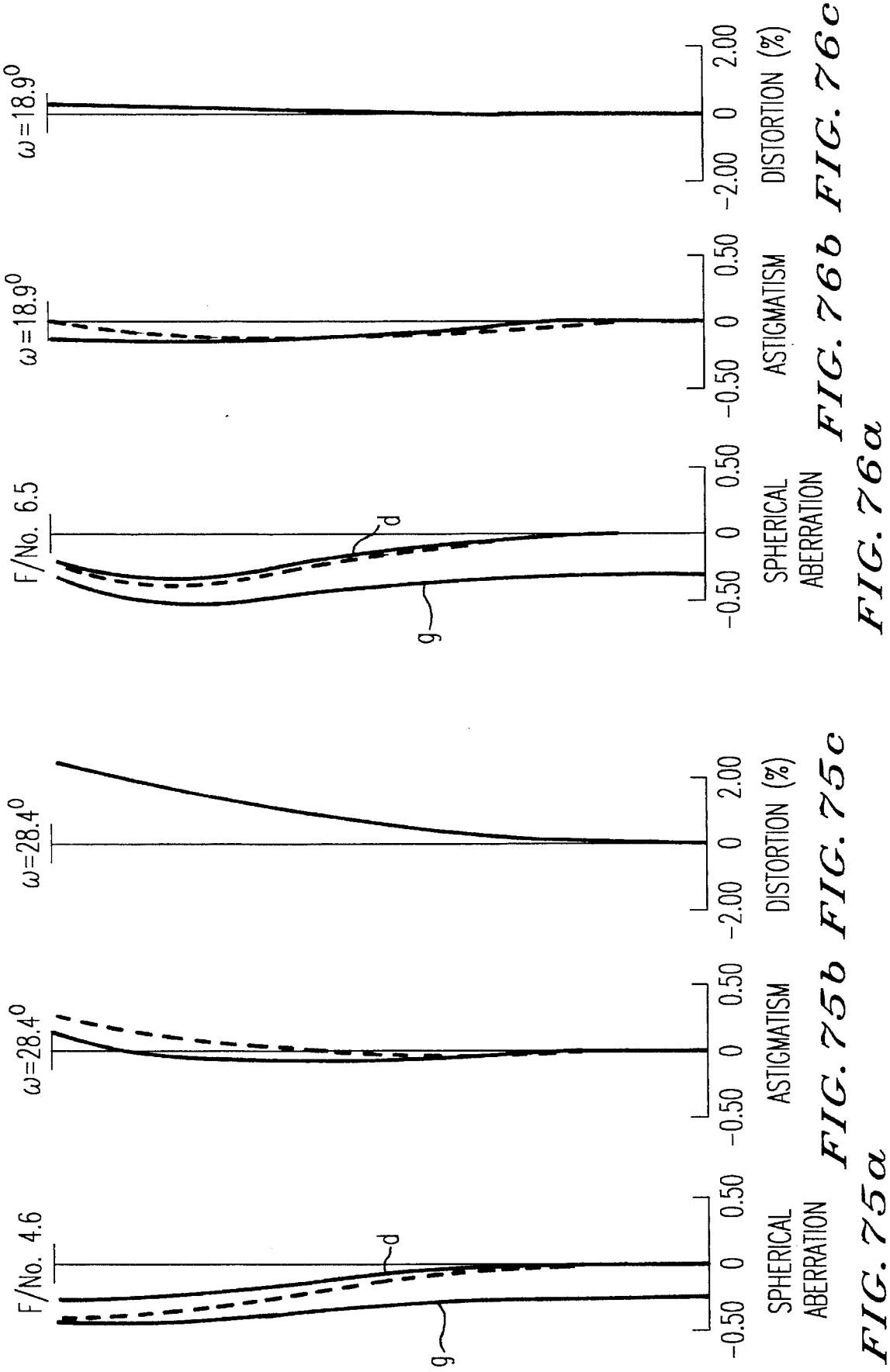

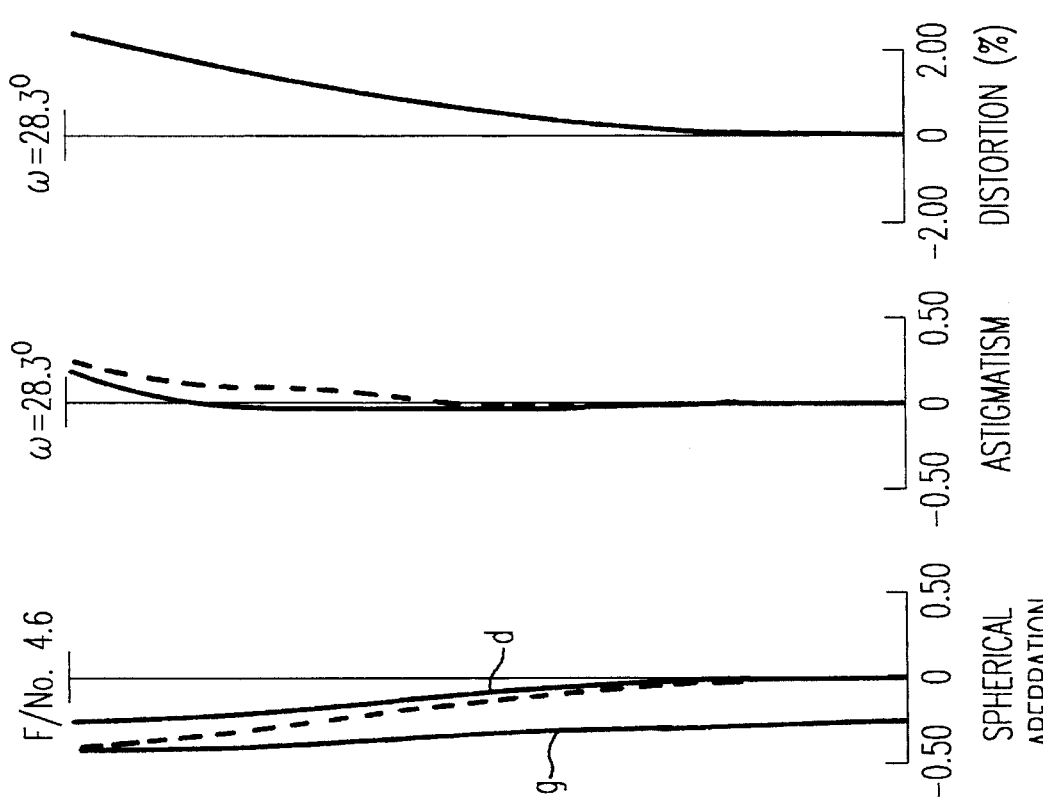
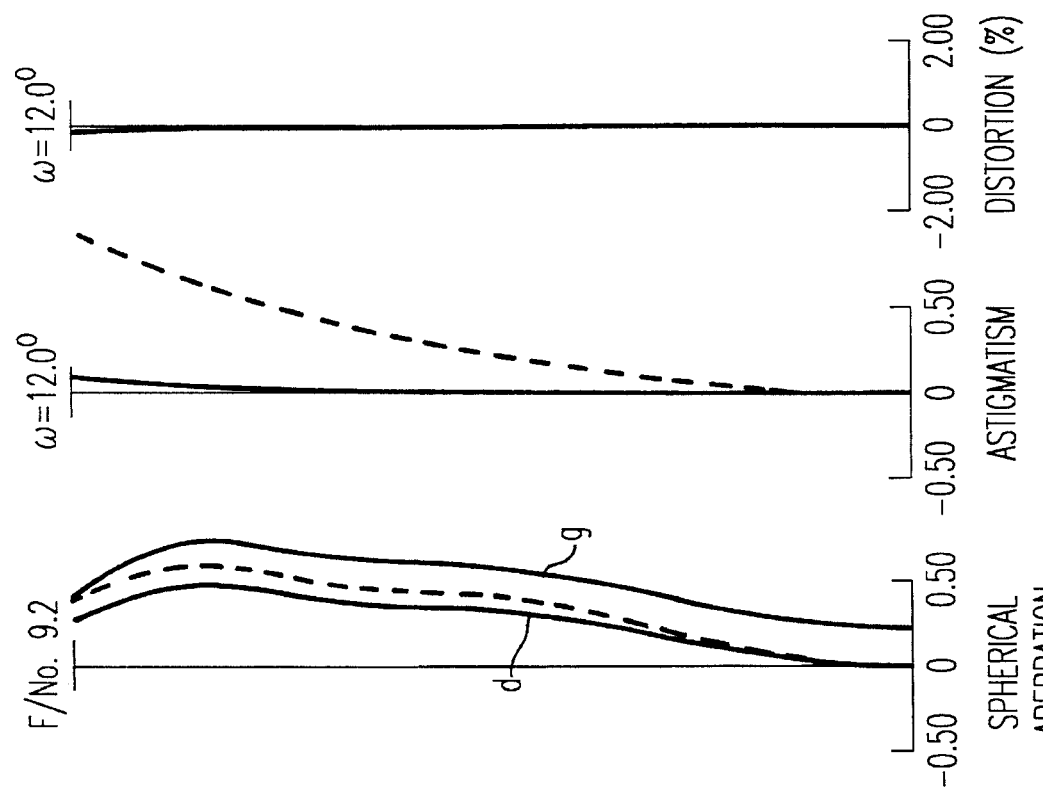

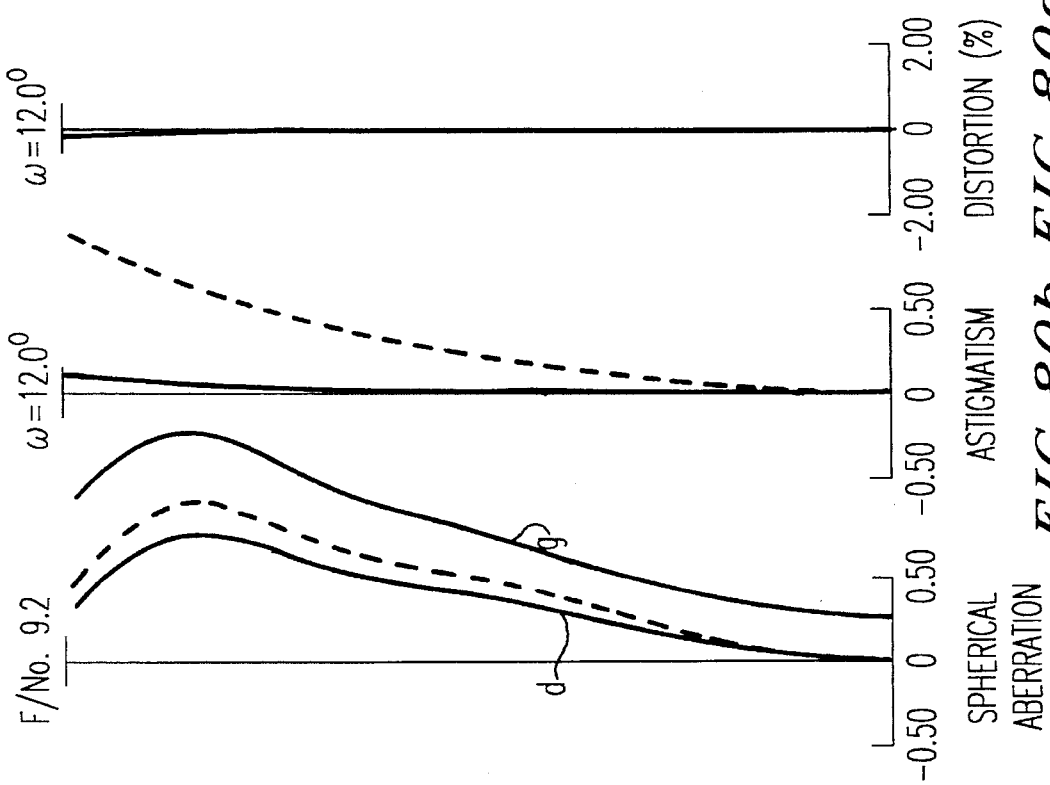
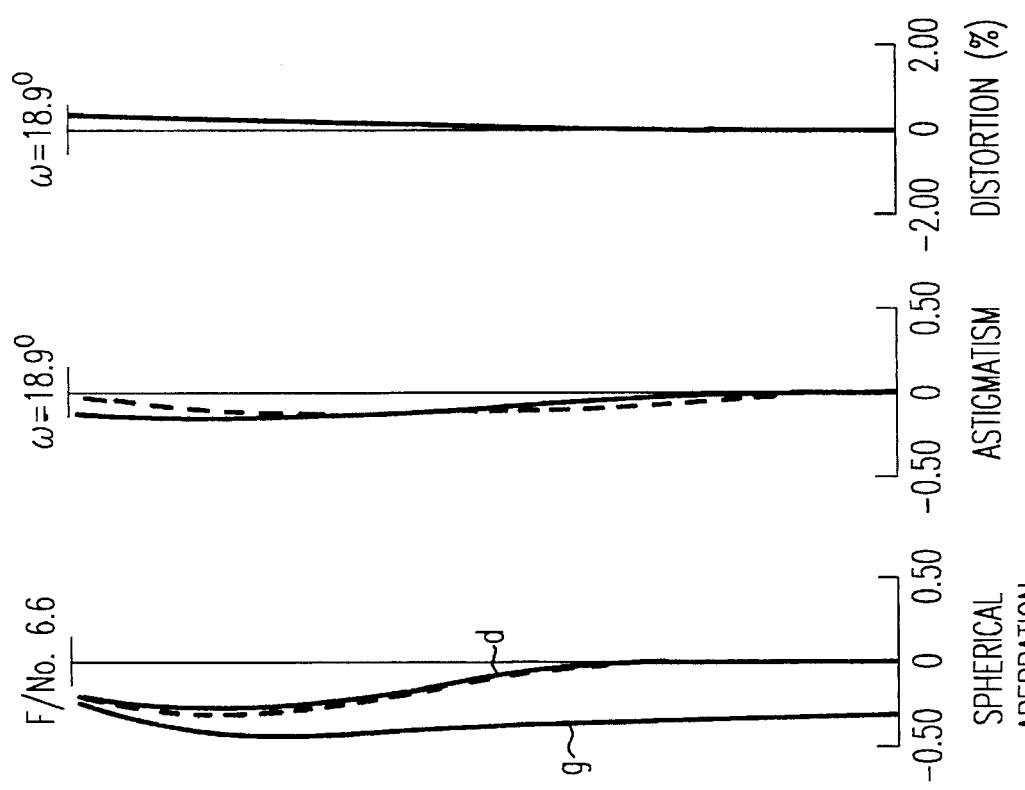

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

SPHERICAL ABERRATION

ASTIGMATISM

DISTORTION (%)

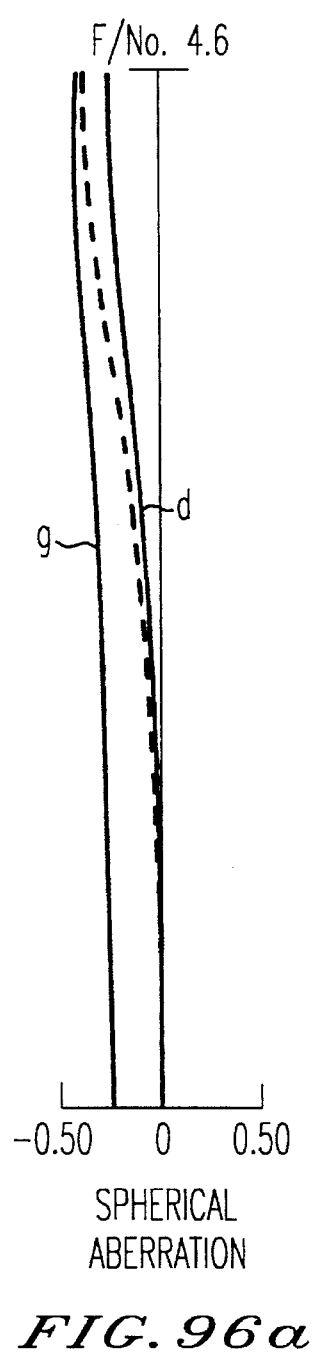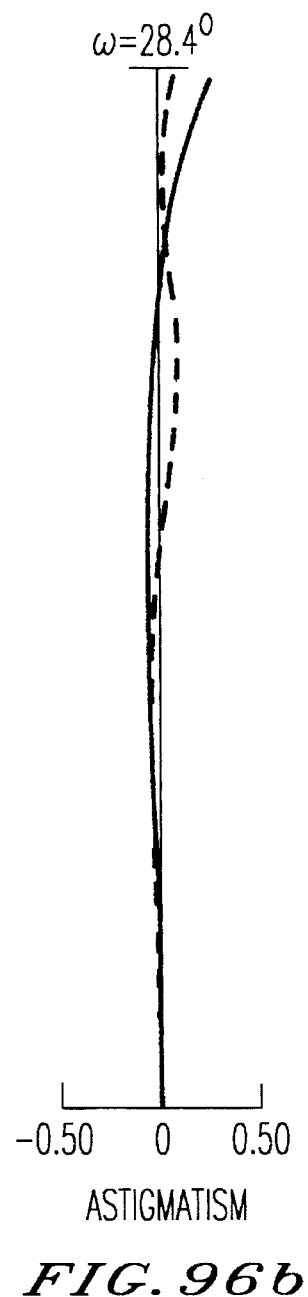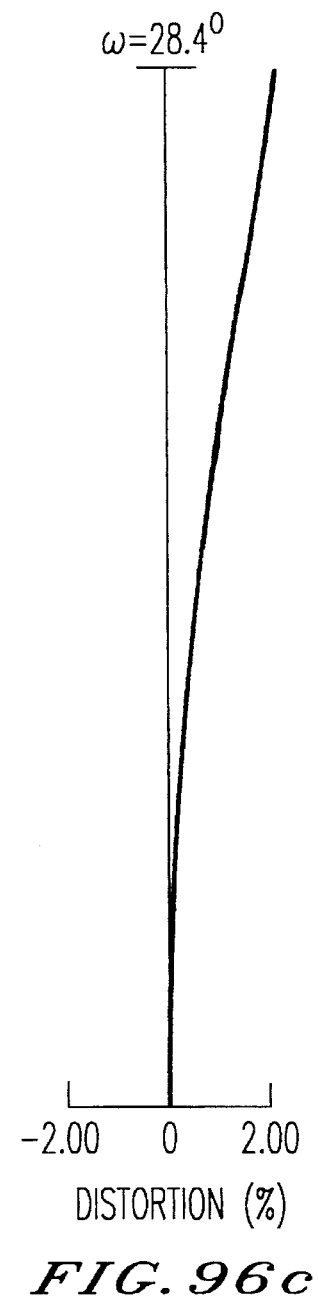
FIG. 96a SPHERICAL ABERRATION
FIG. 96b ASTIGMATISM
FIG. 96c DISTORTION (%)

SPHERICAL ABERRATION

ASTIGMATISM

DISTORTION (%)

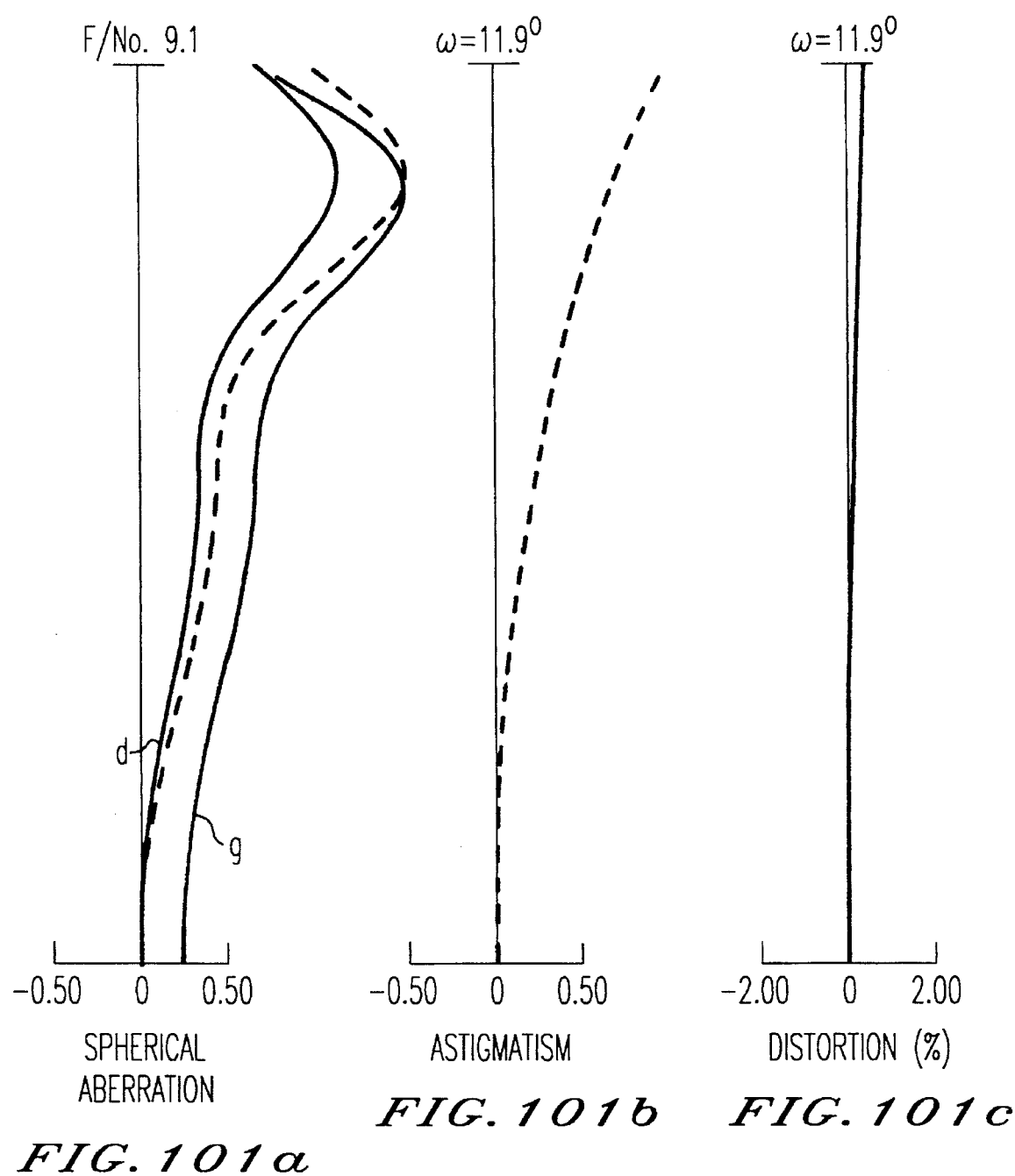

SPHERICAL ABERRATION

ASTIGMATISM

DISTORTION (%)

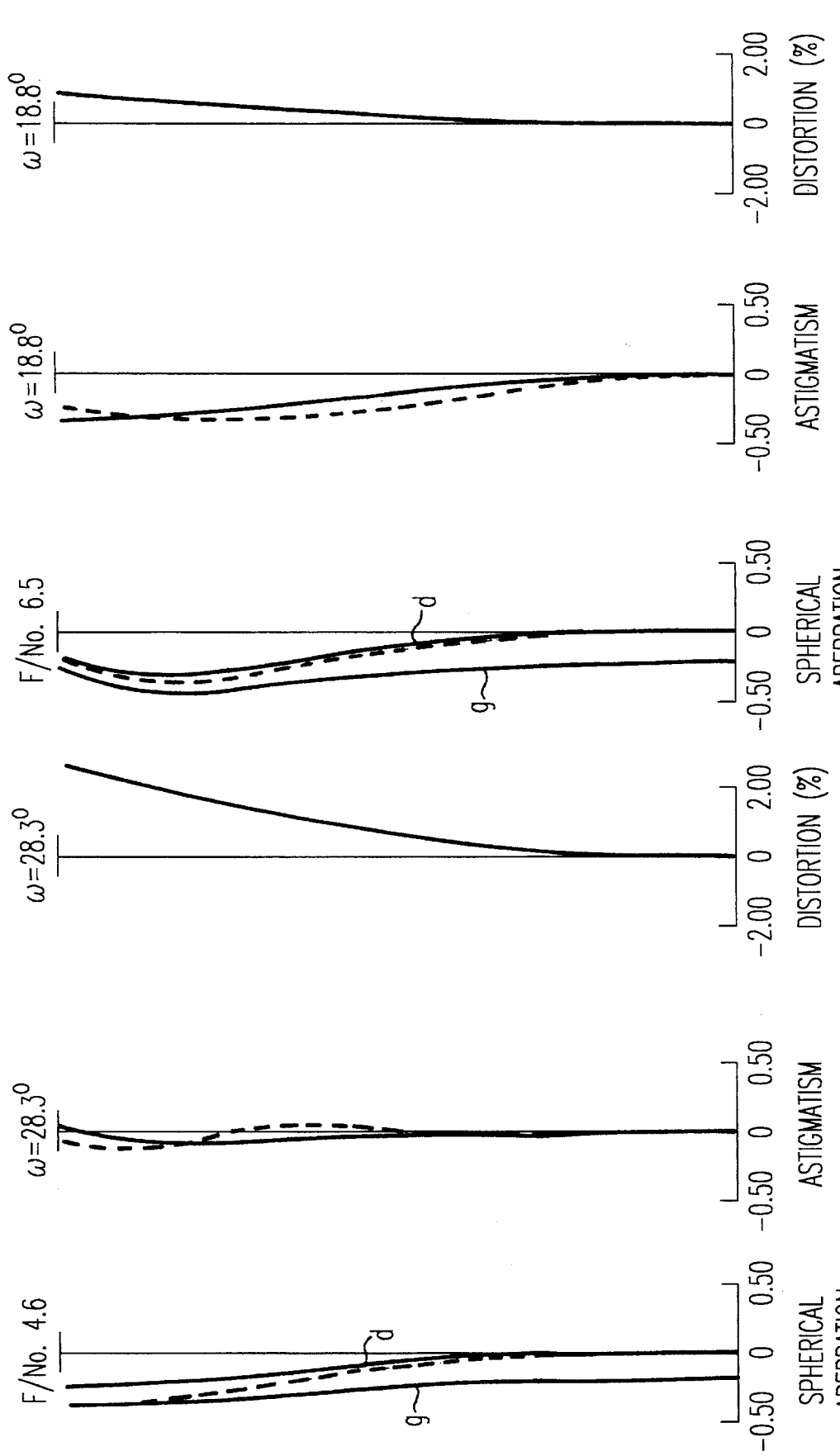

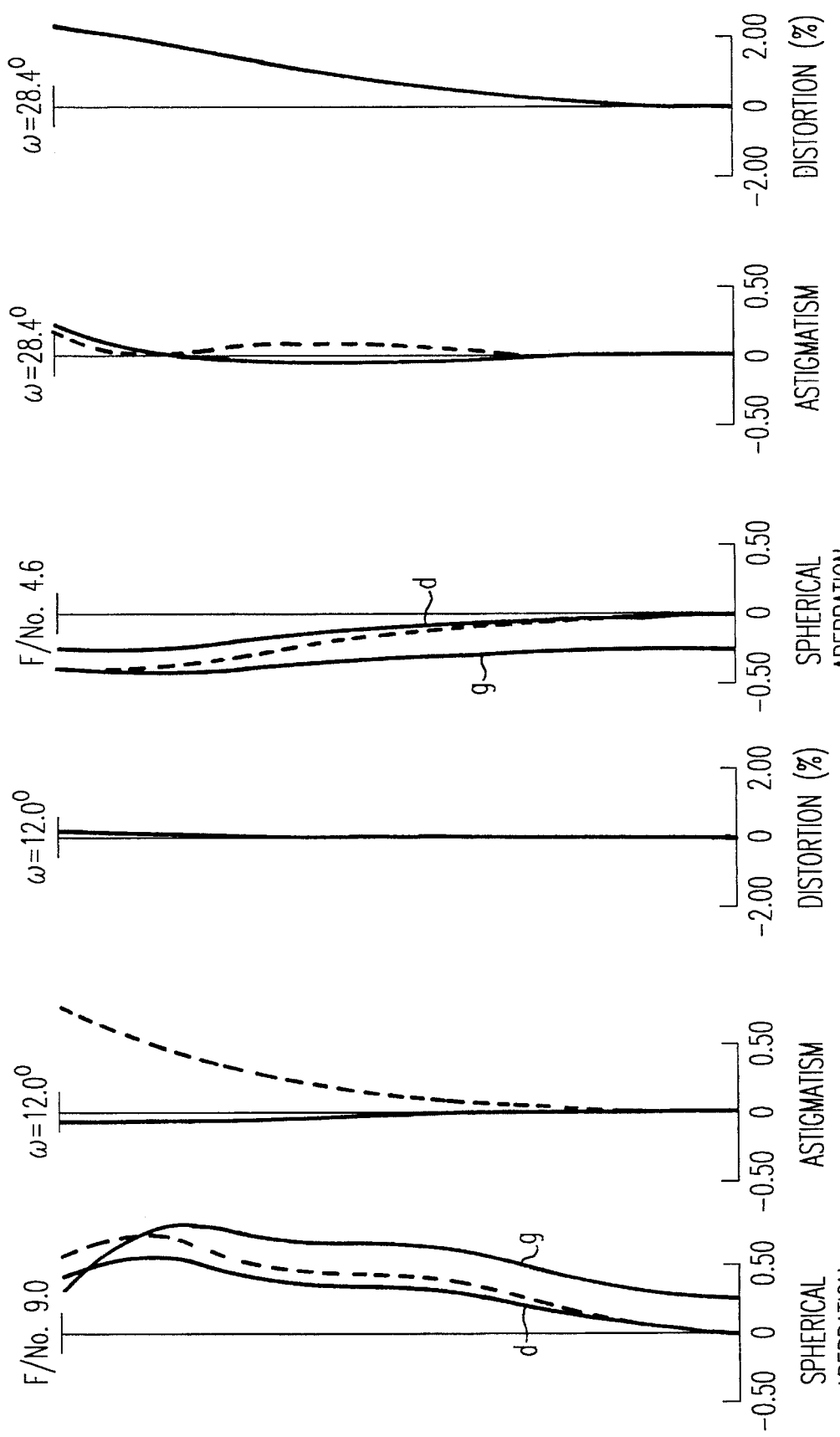

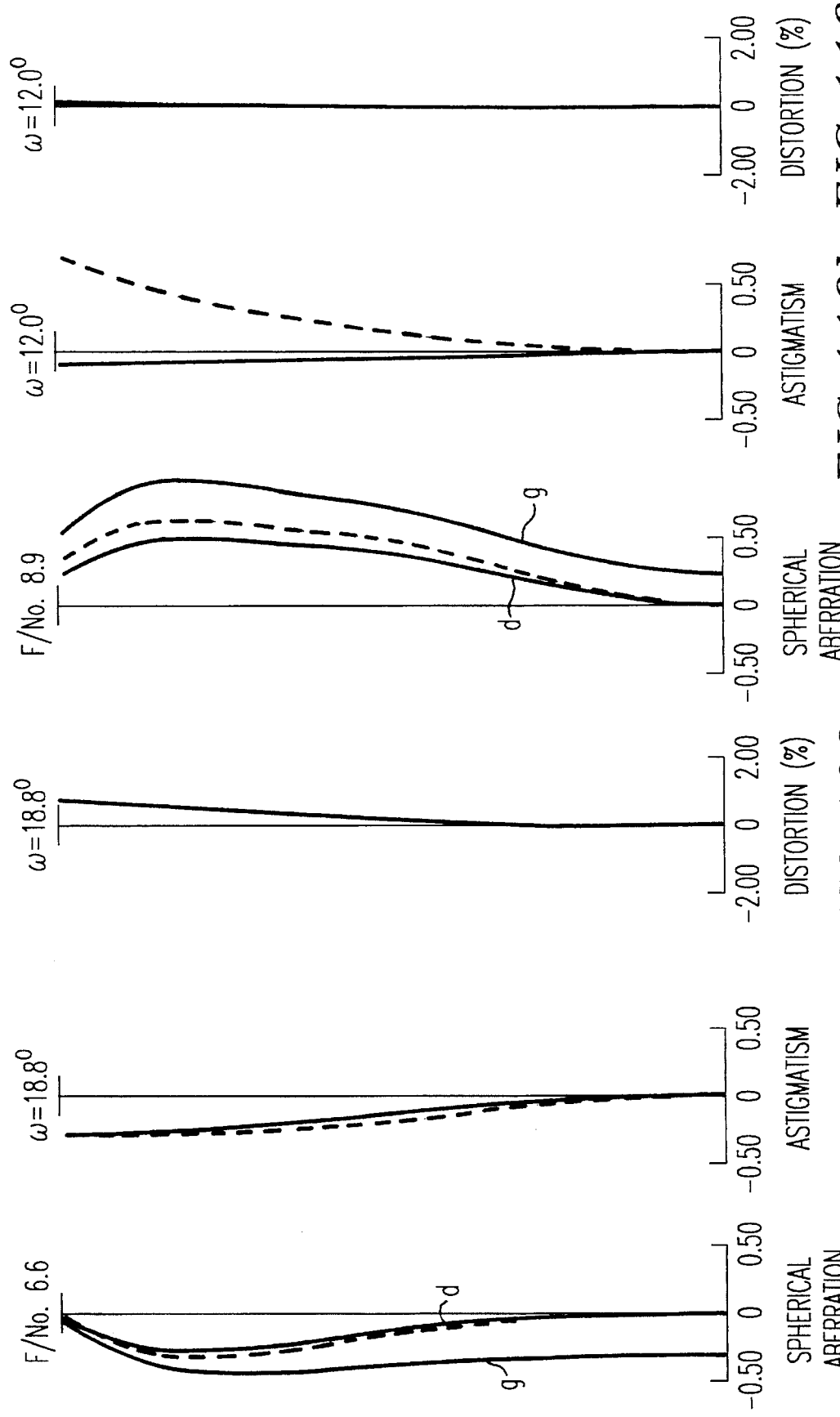

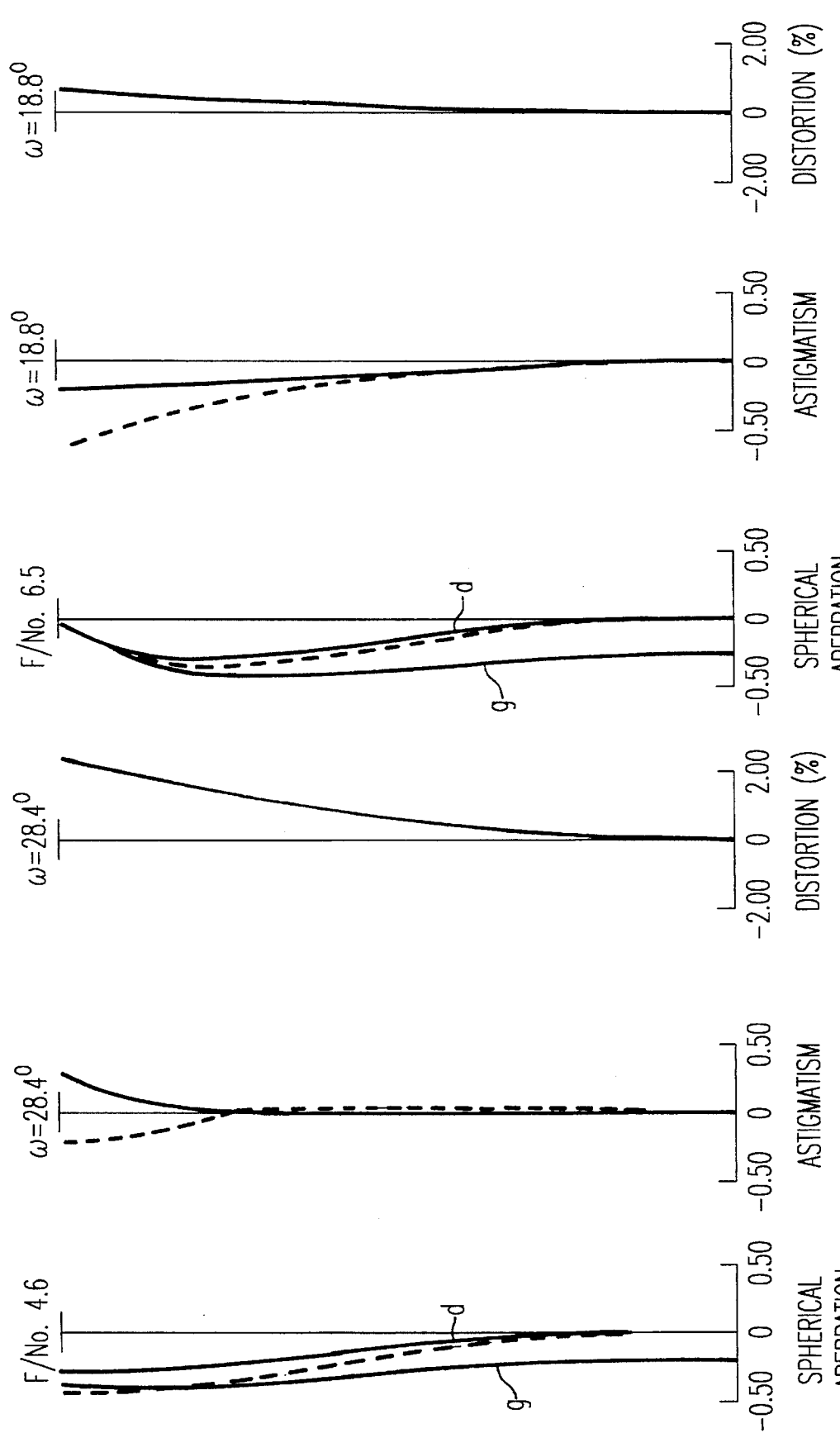

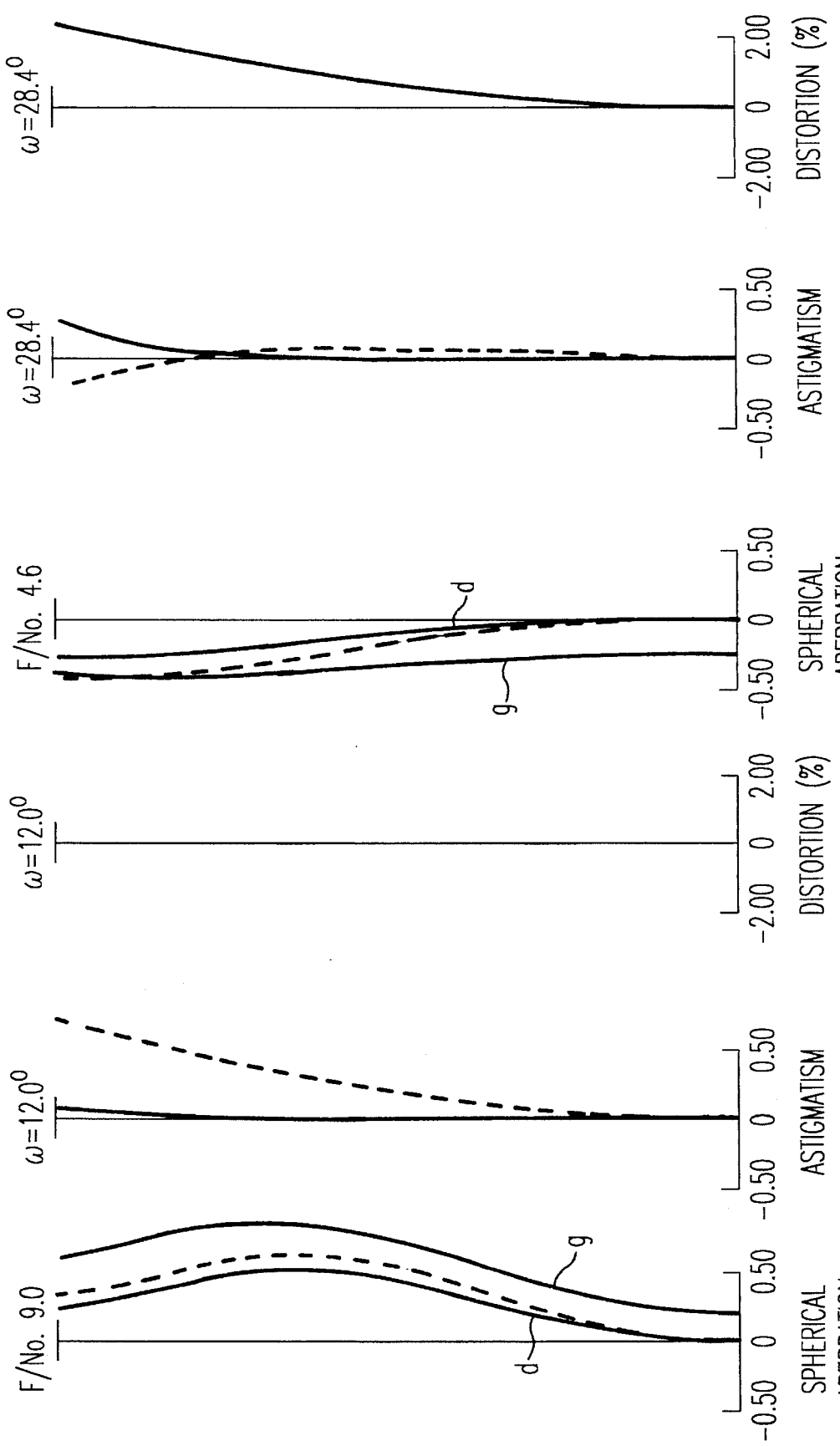

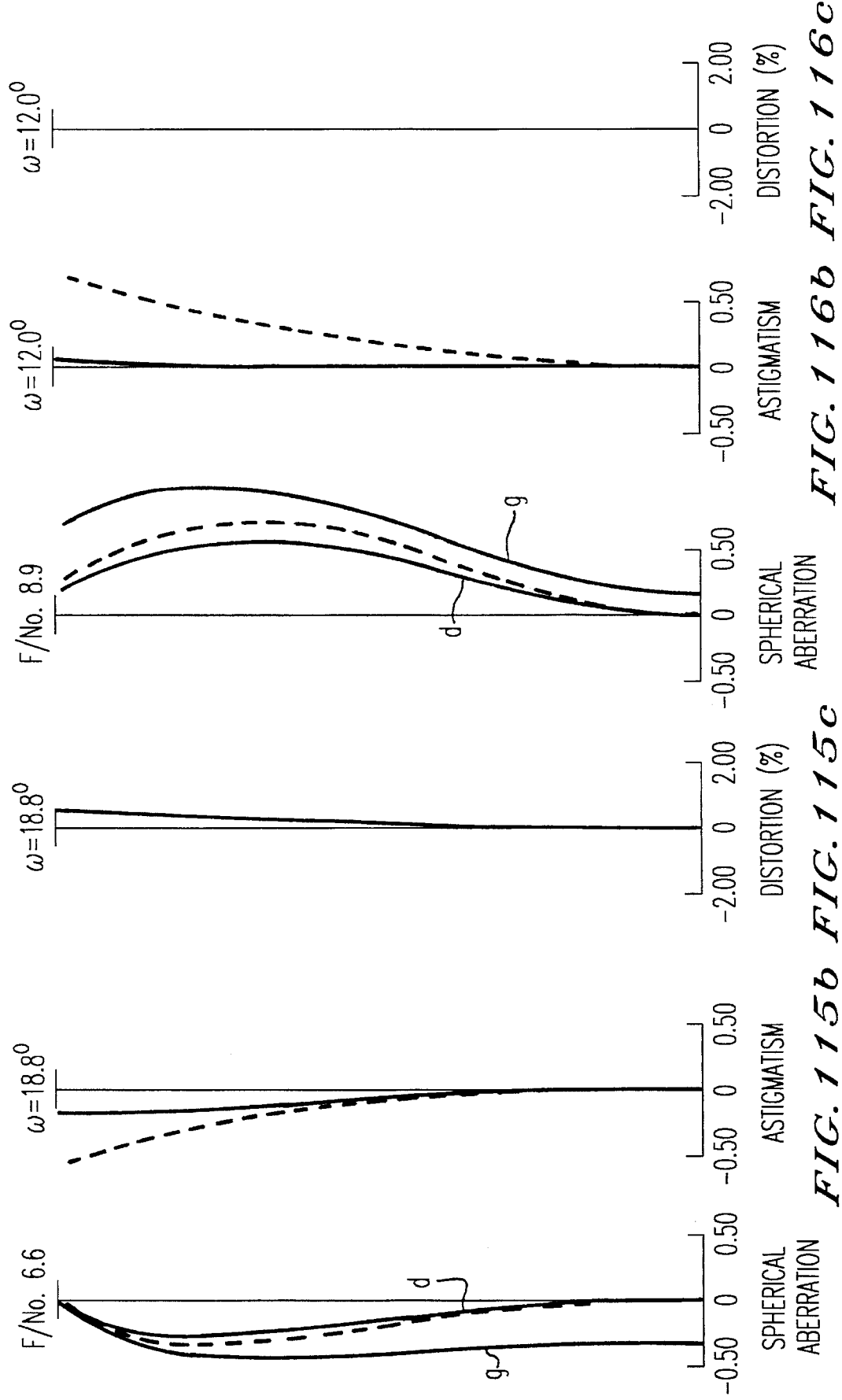

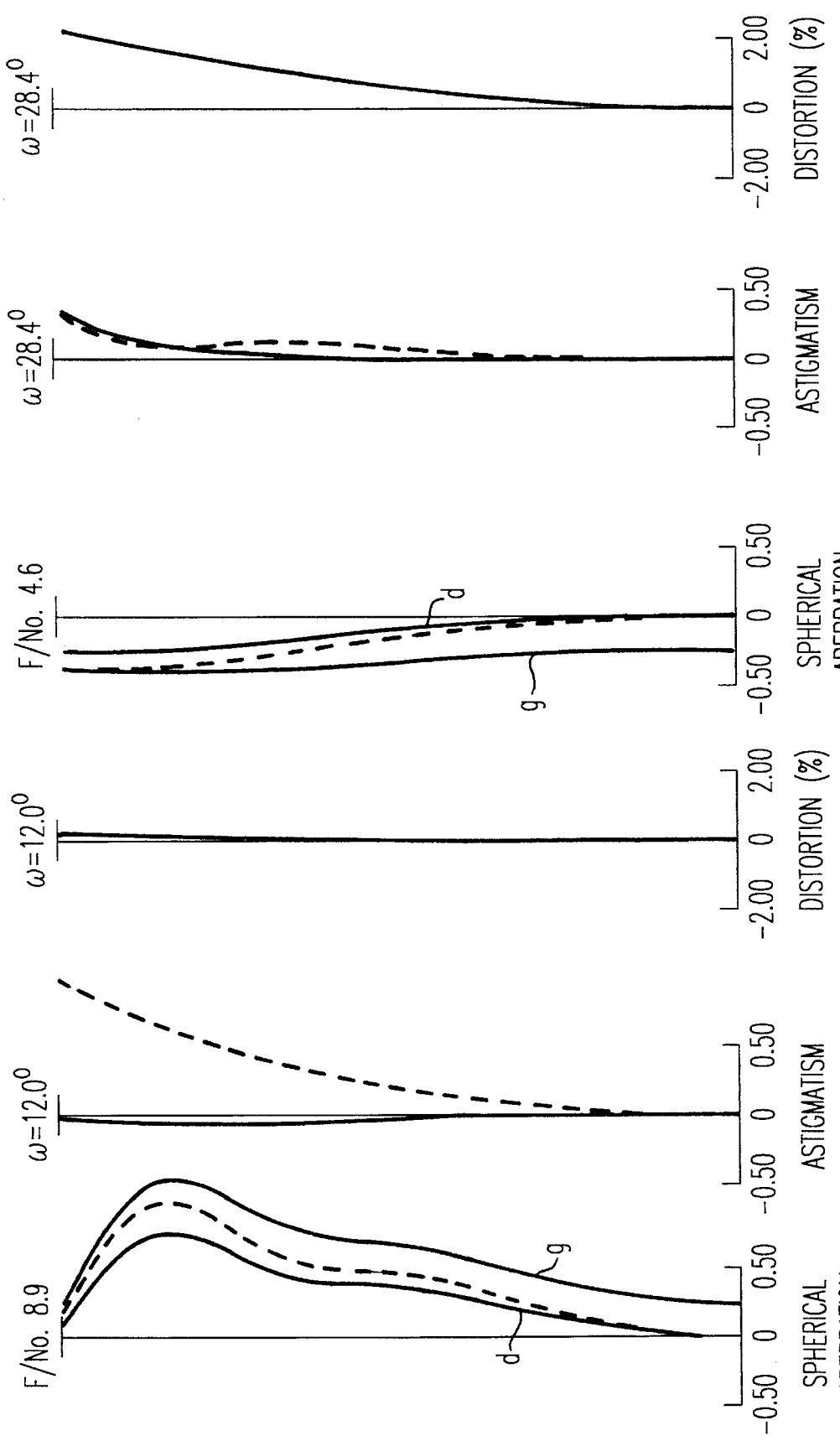

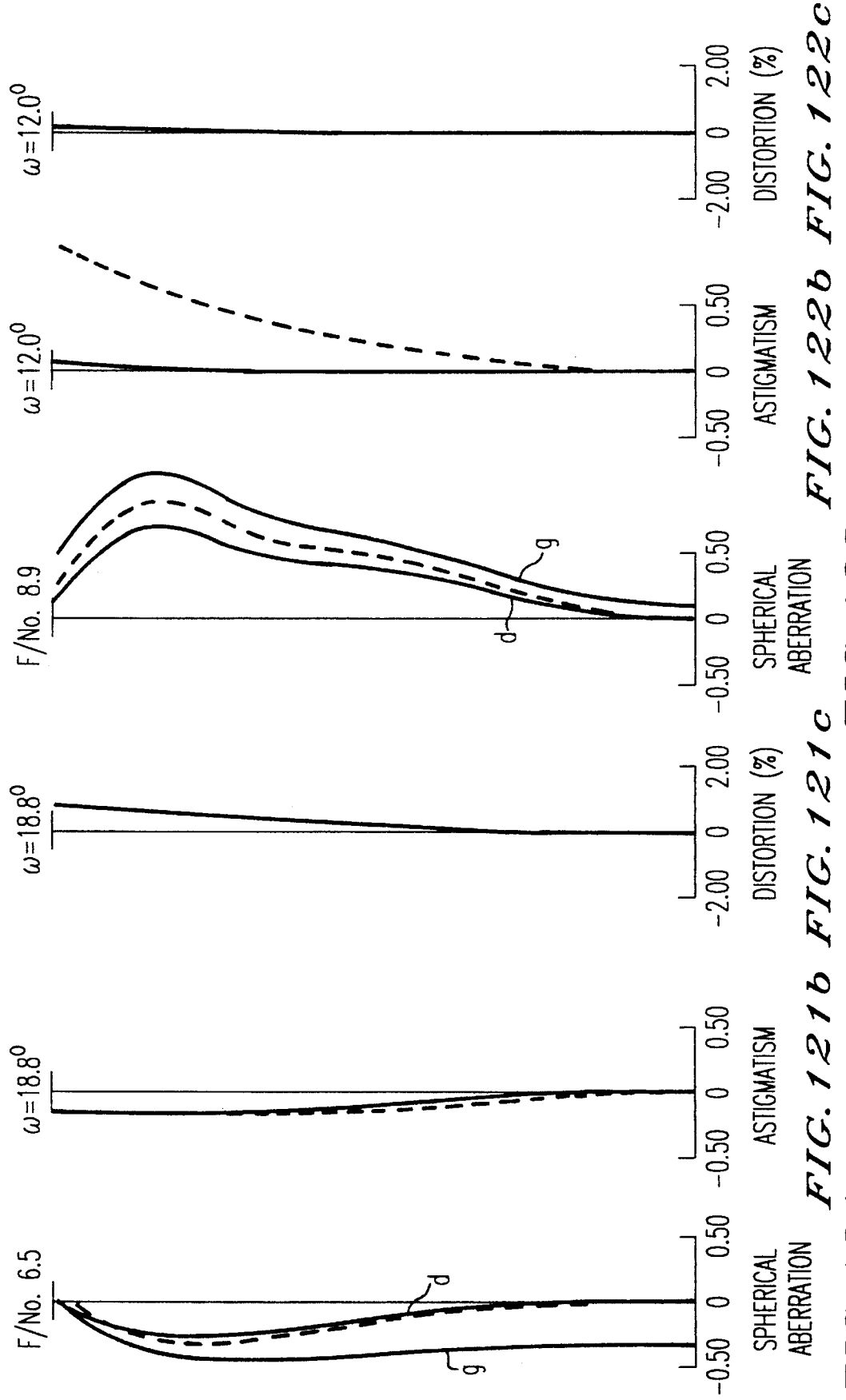

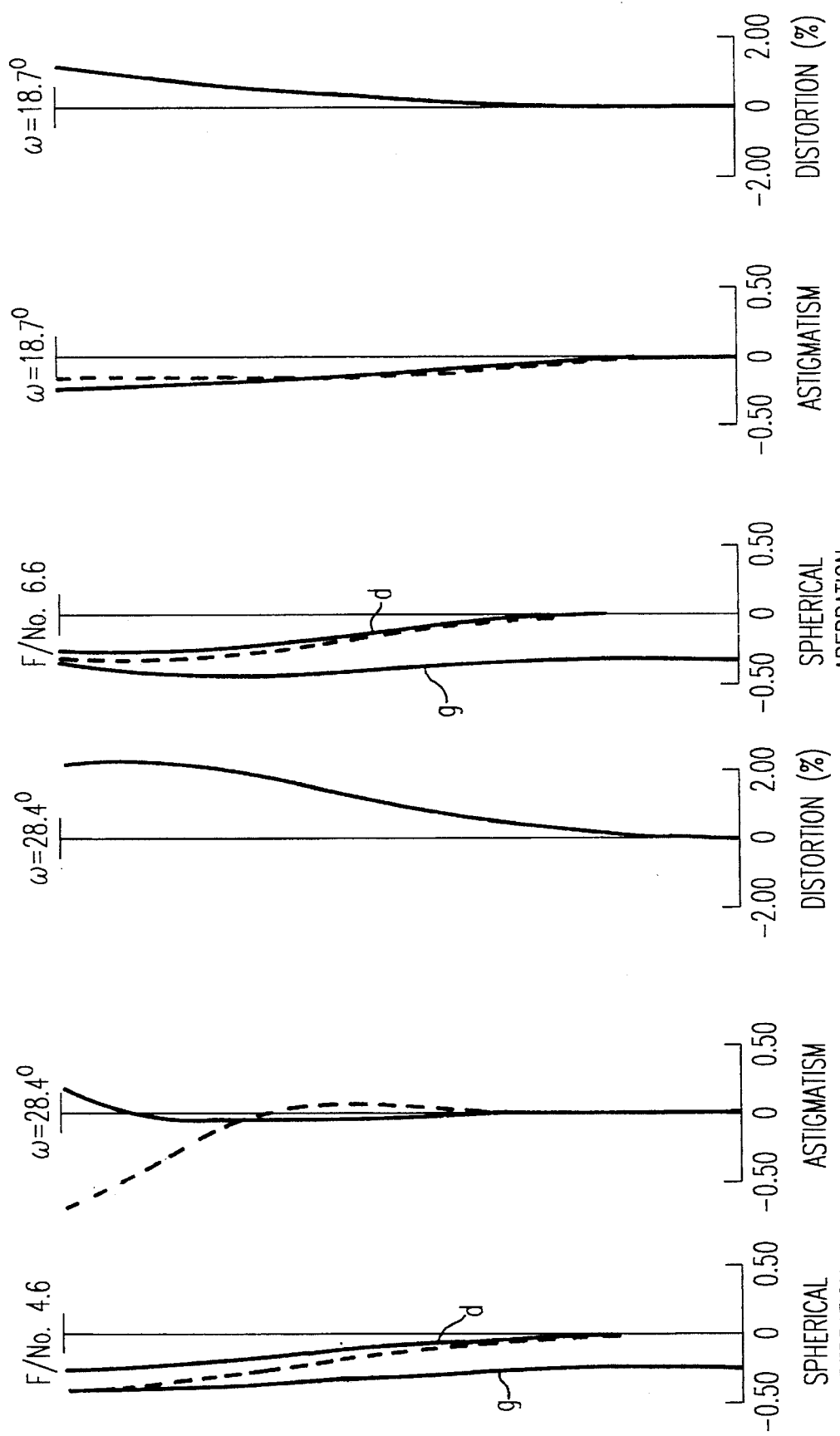

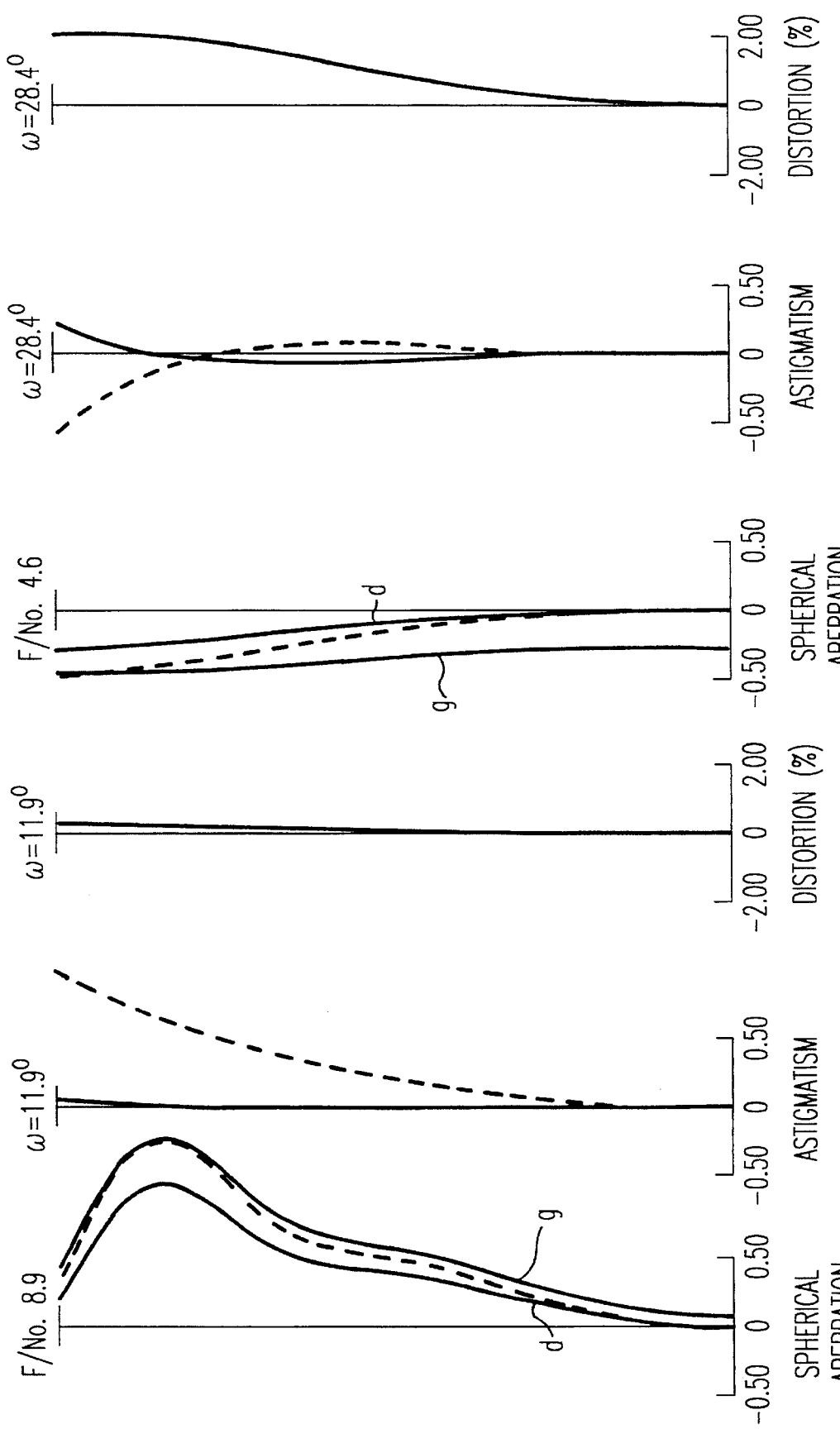

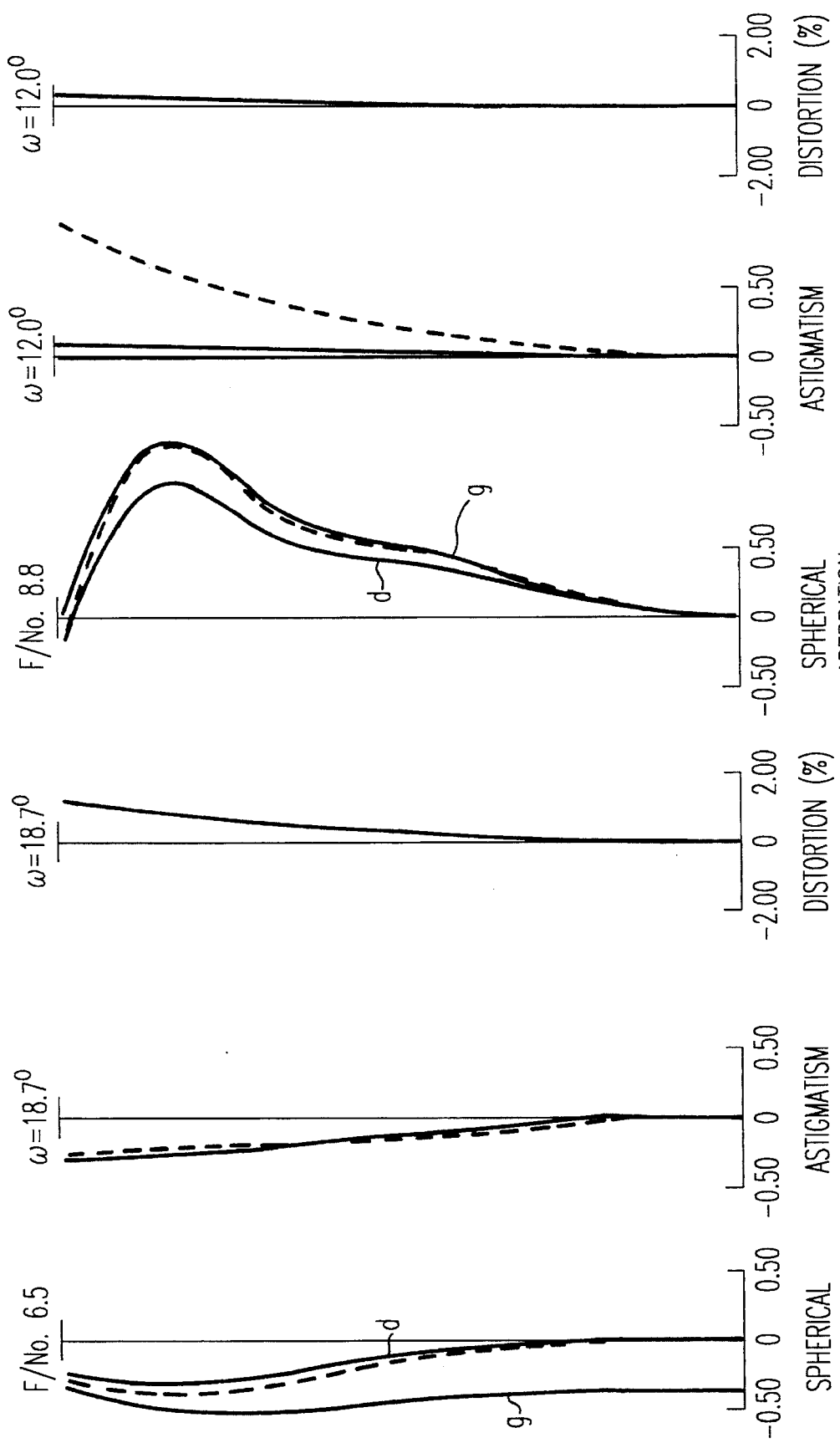

ZOOM LENS USING A FIRST LENS GROUP HAVING A POSITIVE FOCAL LENGTH AND A SECOND LENS GROUP HAVING A NEGATIVE FOCAL LENGTH

BACKGROUND OF THE INVENTION

The present invention generally relates to zoom lenses, and more particularly to a zoom lens which can be used as a photographic lens of a camera with a diaphragm shutter or as a lens in a video camera.

In general, there is a demand for a high-power zoom lens in a camera with a diaphragm shutter. Recently, a variable power ratio of greater than 2.5 is demanded. As cameras having a compact size are produced, a zoom lens with a compact size is demanded.

The fewer the movable lens groups, the better a zoom lens is from the view points of compactness of the zoom lens and simplification of a zoom mechanism. The Japanese Laid-Open Patent Application 2-50118 discloses a construction in which there are only two movable lens groups, and by which the variable power ratio of greater than 2.5 is achieved. However, this construction is far from being ideal in that there are as many as 10–11 lenses. Another problem is that the lenses near the image surface are large because the back focus is extremely short. Hence, such a conventional construction does not fulfil the demand of making the zoom lens more compact.

SUMMARY OF THE INVENTION

Accordingly, it is an object of the present invention to provide a compact zoom lens which includes only two lens groups, includes a wide field angle having a half field angle of about 30 degrees, and includes as small as seven lenses while having the variable power ratio of greater than 2.5.

In order to achieve the above object, the present invention as claimed in claims 1 through 15 provides zoom lenses which have a first lens group having a positive focal length disposed at the front (toward an object) and has a second lens group disposed at the back (toward an image), and in which a variable power is obtained by changing the distance between the first lens group and the second lens group, wherein the first lens group comprises a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, and the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side. This lens construction constitutes a "basic lens construction" for all the zoom lenses as claimed in claims 1 through 62.

The invention as claimed in claim 1 provides a zoom lens which has the basic lens construction, and which is constructed such that, providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $$0.27 < f_1/f_T < 0.31 \qquad (1)$$

$$(d_8+d_{9T})/f_T < 0.035 \qquad (2)$$

$$-1.1 < f_2/f_1 < -0.9 \qquad (3).$$

The invention as claimed in claim 2 provides a zoom lens which has the construction of the invention of claim 1, and which is also constructed such that, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \qquad (4).$$

The invention as claimed in claim 3 provides a zoom lens which has the construction of the invention of claim 1 or claim 2, and which is also constructed such that, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2 > 1.75 \qquad (5)$$

$$v_4 > 55.0 \qquad (6)$$

$$v_7 > 60.0 \qquad (7).$$

The invention as claimed in claim 4 provides a zoom lens which has the construction of the invention of claim 1, and which is constructed such that the third lens has an aspherical surface facing the image.

The invention as claimed in claim 5 provides a zoom lens which has the construction of the invention of claim 4, and which is constructed such that, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \qquad (4).$$

The present invention also provides zoom lenses in which one or more lens surfaces have an aspherical outline. In such a case, an X-axis is drawn, toward the image, from an origin at the intersection of the third lens surface facing the image and an optical axis, the X-coordinate being larger toward the image, a height measured perpendicularly from the optical axis is designated by H, and the reciprocal of the radius of curvature along the optical axis is designated by C (=1/r). Of course, r denotes the radius of curvature along the optical axis. Serial numbers associated with the lens surfaces (lense surfaces numbered starting from the one nearest the object) are attached as suffixes to X(H) and C so as to denote the lens surface in which an aspherical outline is employed.

The invention as claimed in claim 6 provides a zoom lens which has the construction of the invention of claim 1, and which is also constructed such that, $X_6(H)$ and $C_6$ of the surface, facing the image, of the third lens, in which lens an aspherical outline is employed, satisfy the following condition, $$X_6(H) > C_6H^2/(1+\sqrt{(1-C_6^2H^2)}) \qquad (8)$$

The invention as claimed in claim 7 provides a zoom lens which has the construction of claim 4 or claim 5, and which is also constructed such that, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \tag{5}$$

$$v_4 > 55.0 \tag{6}$$

$$v_7 > 60.0 \tag{7}$$

The invention as claimed in claim 8 provides a zoom lens which has the construction of claim 1, and which is constructed such that the fourth lens has an aspherical surface facing the image.

The invention as claimed in claim 9 provides a zoom lens which has the construction of claim 8, and which is also constructed such that, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \tag{4}$$

The invention as claimed in claim 10 provides a zoom lens which has the construction of claim or claim 9, and which is constructed such that $X_7(H)$ and $C_7$ of the surface, facing the object, of the fourth lens, in which lens an aspherical outline is employed, satisfy the following condition, $$X_7(H) > C_7 H^2/(1 + \sqrt{(1 - C_7^2 H^2)}) \tag{9}$$

The invention as claimed in claim 11 provides a zoom lens which has the construction of claim 8 or claim 9, and which is also constructed such that, providing that the refractive index of the substance forming the second lens is $n_2$, that the Abbe number of the substance forming the fourth lens is $v_4$ and that the Abbe number of the seventh lens is $v_7$, the following conditions are satisfied, $$n_2 > 1.75 \tag{5}$$

$$v_4 > 55.0 \tag{6}$$

$$v_7 > 60.0 \tag{7}$$

The invention as claimed in claim 12 provides a zoom lens which has the construction of claim 2, and which is constructed such that the fourth lens has an aspherical surface facing the image.

The invention as claimed in claim 13 provides a zoom lens which has the construction of claim 12, and which is constructed such that, providing that the sixth lens has the radius $r_{12}$ of curvature at the surface facing the object and the radius $r_{13}$ of curvature at the surface facing the image, the aforementioned condition (4) is satisfied.

The invention as claimed in claim 14 provides a zoom lens which has the construction of claim 12 or claim 13, and which is also constructed such that, $X_8(H)$ and $C_8$ of the surface, facing the image, of the fourth lens, in which lens an aspherical outline is employed, satisfy the following condition, $$X_8(H) > C_8 H^2/(1 + \sqrt{(1 - C_8^2 H^2)}) \tag{10}$$

The invention as claimed in claim 15 provides a zoom lens which has the construction of claim 12 or claim 13, and which is also constructed such that, providing that the refractive index of the substance forming the second lens is $n_2$, that the Abbe number of the substance forming the fourth lens is $v_4$, and that the Abbe number of the seventh lens is $v_7$, the aforementioned conditions (5)–(7) are satisfied.

The invention as claimed in claims 16 through 30 provides zoom lenses which correspond to the zoom lenses of claims 1 through 15, respectively. That is, the zoom lenses of claims 16 through 30 have the construction of the zoom lenses of claims 1 through 15, and are also constructed such that the second lens (biconcave lens) and the third lens (biconvex lens) of the first lens group are cemented together.

The invention as claimed in claim 16 provides a zoom lens which has the basic lens construction of the zoom lens of claim 1 but which is different from the zoom lens of claim 1 in that, as described above, the second lens and the third lens are cemented together. Therefore, the distance between the first lens group and the second lens group when the first and second lens groups are in an arrangement characterized by the longest focal length is designated by $d_7+d_{8T}$. Providing also that the focal length of the whole system is $f_T$, that the focal length of the first lens group is $f_1$, and that the focal length of the second lens group is $f_2$, the following conditions are satisfied, $$0.27 < f_1/f_T < 0.31 \tag{1}$$

$$(d_7+d_{8T})/f_T < 0.035 \tag{2'}$$

$$-1.1 < f_2/f_1 < -0.9 \tag{3}$$

The invention as claimed in claim 17 provides a zoom lens which has the construction of claim 16, and which is also constructed such that, providing that the sixth lens has the radius $r_{11}$ of curvature at the surface facing the object and the radius $r_{12}$ of curvature at the surface facing the image, the following condition is satisfied, $$-1.4 < (r_{11}+r_{12})/(r_{11}-r_{12}) < -0.9 \tag{4'}$$

The invention as claimed in claim 18 provides a zoom lens which has the construction of claim 16 or claim 17, and which is also constructed such that, providing that the refractive index of the substance forming the second lens is $n_2$, that the Abbe number of the substance forming the fourth lens is $v_4$, and that the Abbe number of the seventh lens is $v_7$, the aforementioned conditions (5)–(7) are satisfied.

The invention as claimed in claim 19 provides a zoom lens which has the construction of claim 16, and which is constructed such that the third lens has an aspherical surface facing the image.

The invention as claimed in claim 20 provides a zoom lens which has the construction of claim 19, and which is also constructed such that, providing that the sixth lens has the radius $r_{11}$ of curvature at the surface facing the object and the radius $r_{12}$ of curvature at the surface facing the image, the aforementioned condition (4') is satisfied.

The invention as claimed in claim 21 provides a zoom lens which has the construction of claim 19 or claim 20, and which is also constructed such that $X_5(H)$ and $C_5$ of the surface, facing the image, of the third lens, in which lens an aspherical outline is employed, satisfy the following condition, $$X_5(H) > C_5H^2/(1 + \sqrt{(1 - C_5^2H^2)}\ )\qquad(8')$$

The invention as claimed in claim 22 provides a zoom lens which has the construction of claim 19 or claim 20, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 23 provides a zoom lens which has the construction of claim 16, and which is also constructed such that the fourth lens has an aspherical surface facing the object.

The invention as claimed in claim 24 provides a zoom lens which has the construction of claim 16, and which is constructed such that, providing that the sixth lens has the radius $r_{11}$ of curvature at the surface facing the object and the radius $r_{12}$ of curvature at the surface facing the image, the aforementioned condition (4') is satisfied.

The invention as claimed in claim 25 provides a zoom lens which has the construction of claim 23 or claim 24, and which is also constructed such that $X_6(H)$ and $C_6$ of the surface, facing the object, of the fourth lens, in which lens an aspherical outline is employed, satisfy the following condition, $$X_6(H) > C_6H^2/(1 + \sqrt{(1 - C_6^2H^2)}\ )\qquad(9')$$

The invention as claimed in claim 26 provides a zoom lens which has the construction of claim 23 or claim 24, and which is constructed such that, providing that the refractive index of the substance forming the second lens is $n_2$, that the Abbe number of the substance forming the fourth lens is $\nu_4$, and that the Abbe number of the seventh lens is $\nu_7$, the aforementioned conditions (5)–(7) are satisfied.

The invention as claimed in claim 27 provides a zoom lens which has the construction of claim 16, and which is also constructed such that the fourth lens has an aspherical surface facing the image.

The invention as claimed in claim 28 provides a zoom lens which has the construction of claim 27, and which is also constructed such that, providing that the sixth lens has the radius $r_{11}$ of curvature at the surface facing the object and the radius $r_{12}$ of curvature at the surface facing the image, the aforementioned condition (4') is satisfied.

The invention as claimed in claim 29 which has the construction of claim 27 or 28, and which is also constructed such that, $X_7(H)$ and $C_7$ of the surface, facing the image, of the fourth lens, in which lens an aspherical outline is employed, satisfy the following condition, $$X_7(H) > C_7H^2/(1 + \sqrt{(1 - C_7^2H^2)}\ )\qquad(10')$$

The invention as claimed in claim 30 which has the construction of claim 27 or 28, and which is also constructed such that, providing that the refractive index of the substance forming the second lens is $n_2$, that the Abbe number of the substance forming the fourth lens is $\nu_4$, and that the Abbe number of the seventh lens is $\nu_7$, the aforementioned conditions (5)–(7) are satisfied.

The invention as claimed in claim 31 provides a zoom lens which has the basic lens construction of the zoom lens of claim 1, and which is constructed such that the third lens has an aspherical surface facing the image, and the fifth lens has an aspherical surface facing the image. Providing that, when the first and second lens groups are in an arrangement characterized by the longest focal length, the focal length of the whole system is $f_T$, that the focal length of the first lens group is $f_1$, that the focal length of the second lens group is $f_2$, and that the distance between the first lens group and the second lens group is $d_8+d_{9T}$, the aforementioned conditions (1)–(3) are satisfied as in the case of the zoom lens of claim 1.

The invention as claimed in claim 32 provides a zoom lens which has the construction of claim 31, and which is also constructed such that, providing that the sixth lens has the radius $r_{12}$ of curvature at the surface facing the object and the radius $r_{13}$ of curvature at the surface facing the image, the aforementioned condition (4) is satisfied.

The invention as claimed in claim 33 provides a zoom lens which has the construction of claim 31 or claim 32, and which is also constructed such that $X_6(H)$ and $C_6$ of the third lens surface facing the image, and $X_{11}(H)$ and $C_{11}$ of the fifth lens surface facing the image satisfy the aforementioned condition (8) and the following condition, $$X_{11}(H) < C_{11}H^2/(1 + \sqrt{(1 - C_{11}^2H^2)}\ )\qquad(11)$$

The invention as claimed in claim 34 provides a zoom lens which has the construction of claim 31 or claim 32, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 35 provides a zoom lens which has the aforementioned basic lens construction, and which is also constructed such that the fourth lens has an aspherical surface facing the object, and such that the fifth lens has an aspherical surface facing the image.

The invention as claimed in claim 36 provides a zoom lens which has the construction of claim 35, and which is also constructed such that, providing that the sixth lens has the radius $r_{12}$ of curvature at the surface facing the object and the radius $r_{13}$ of curvature at the surface facing the image, the aforementioned condition (4) is satisfied.

The invention as claimed in claim 37 provides a zoom lens which has the construction of claim 35 or claim 36, and is also constructed such that $X_7(H)$ and $C_7$ of the fourth lens surface facing the object, and $X_{11}(H)$ and $C_{11}$ of the fifth lens surface facing the image satisfy the aforementioned conditions (9) and (11).

The invention as claimed in claim 38 provides a zoom lens which has the construction of claim 35 or claim 36, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 39 provides a zoom lens which has the aforementioned basic lens construction, and which is also constructed such that the fourth and fifth lenses have aspherical surfaces facing the image, and The invention as claimed in claim 40 which has the construction of claim 39, and which is also constructed such that, providing that the sixth lens has the radius $r_{12}$ of curvature at the surface facing the object and the radius $r_{13}$ of curvature at the surface facing the image, the aforementioned condition (4) is satisfied.

The invention as claimed in claim 41 provides a zoom lens which has the construction of claim 40, and which is also constructed such that $X_8(H)$ and $C_8$ of the fourth lens surface facing the image, and $X_{11}(H)$ and $C_{11}$ of the fifth lens surface facing the image satisfy the aforementioned conditions (10) and (11).

The invention as claimed in claim 42 provides a zoom lens which has the construction of claim 39 or claim 40, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 43 which has the aforementioned basic lens construction, and is also constructed such that the fourth lens has an aspherical surface facing the image, the fifth lens has aspherical surfaces facing the object and the image.

The invention as claimed in claim 44 which has the construction of claim 44, and which is also constructed such that, providing that the sixth lens has the radius $r_{12}$ of curvature at the surface facing the object and the radius $r_{13}$ of curvature at the surface facing the image, the aforementioned condition (4) is satisfied.

The invention as claimed in claim 45 which has the construction of claim 43 or claim 44, and which is also constructed such that $X_8(H)$ and $C_8$ of the fourth lens surface facing the image, $X_{10}(H)$ and $C_{10}$ of the fifth lens surface facing the object, and $X_{11}(H)$ and $C_{11}$ of the fifth lens surface facing the image satisfy the aforementioned condition (10) and the following condition $$X_{11}(H) - X_{10}(H) < [C_{11}H^2/(1 + \sqrt{(1 - C_{11}^2 H^2)}\ ) - (C_{10}H^2/1 + \sqrt{(1 - C_{10}^2 H^2)}\ )]$$ (12)

The invention as claimed in claim 46 which has the construction of claim 43 or claim 44, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claims 47 through 62 provides a zoom lens which has the aforementioned basic construction and which is also constructed such that the second lens (biconcave lens) and the third lens (biconvex lens) of the first lens group are cemented together.

The invention as claimed in claim 47 provides a zoom lens which has the basic construction, and which is constructed such that the third lens has an aspherical surface facing the image, the fifth lens has an aspherical surface facing the image.

Providing that, when the first and second lens groups are in an arrangement characterized by the longest focal length, the focal length of the whole system is $f_T$, that the focal length of the first lens group is $f_1$, that the focal length of the second lens group is $f_2$, and that the distance between the first lens group and the second lens group is $d_7+d_{8T}$, the aforementioned conditions (1), (2') and (3) are satisfied, as in the case of the zoom lens of claim 16.

The invention as claimed in claim 48 provides a zoom lens which has the construction of claim 47, and which is also constructed such that, providing that the sixth lens has the radius $r_{11}$ of curvature at the surface facing the object and the radius $r_{12}$ of curvature at the surface facing the image, the aforementioned condition (4) is satisfied.

The invention as claimed in claim 49 provides a zoom lens which has the construction of claim 47 or claim 48, and which is also constructed such that $X_5(H)$ and $C_5$ of the third lens surface facing the image satisfy the aforementioned condition (8'), and $X_{10}(H)$ and $C_{10}$ of the fifth lens surface facing the image satisfy the following condition, $$X_{10}(H) < C_{10}H^2/(1 + \sqrt{(1 - C_{10}^2 H^2)}\ )$$ (11')

The invention as claimed in claim 50 provides a zoom lens which has the construction of claim 47 or claim 48, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 51 provides a zoom lens which has the aforementioned basic lens construction, and which is also constructed such that the fourth lens has an aspherical surface facing the object, the fifth lens has an aspherical surface facing the image.

The invention as claimed in claim 52 provides a zoom lens which has the construction of claim 51, and which is also constructed such that, providing that the sixth lens has the radius $r_{11}$ of curvature at the surface facing the object and the radius $r_{12}$ of curvature at the surface facing the image, the aforementioned condition (4') is satisfied.

The invention as claimed in claim 53 provides a zoom lens which has the construction of claim 51 or claim 52, and which is constructed such that $X_6(H)$ and $C_6$ of the fourth lens surface facing the object, $X_{10}(H)$ and $C_{10}$ of the fifth lens surface facing the image satisfy the aforementioned conditions (9') and (11').

The invention as claimed in claim 54 provides a zoom lens which has the construction of claim 51 or claim 52, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 55 provides a zoom lens which has the aforementioned basic construction and which is also constructed such that the fourth lens has an aspherical surface facing the image, and the fifth lens has an aspherical surface facing the image.

The invention as claimed in claim 56 provides a zoom lens which has the construction of claim 55, and which is also constructed such that, providing that the sixth lens has the radius $r_{11}$ of curvature at the surface facing the object and the radius $r_{12}$ of curvature at the surface facing the image, the aforementioned condition (4') is satisfied.

The invention as claimed in claim 57 provides a zoom lens which has the construction of claim 55 or claim 56, and which is also constructed such that $X_7(H)$ and $C_7$ of the fourth lens surface facing the image, $X_{10}(H)$ and $C_{10}$ of the fifth lens surface facing the image satisfy the aforementioned conditions (10') and (11').

The invention as claimed in claim 58 provides a zoom lens which has the construction of claim 55 or claim 56, and which is also constructed such that, providing that the refractive index of the substance forming the second lens is $n_2$, that the Abbe number of the substance forming the fourth lens is $\nu_4$, and that the Abbe number of the substance forming the seventh lens is $\nu_7$, the aforementioned conditions (5)–(7) are satisfied.

The invention as claimed in claim 59 provides a zoom lens which has the aforementioned basic construction, and which is also constructed such that the fourth lens has an aspherical surface facing the image, and the fifth lens has aspherical surfaces facing the image and the object.

The invention as claimed in claim 60 provides a zoom lens which has the construction of claim 59, and which is also constructed such that, providing that the sixth lens has the radius $r_{11}$ of curvature at the surface facing the object and the radius $r_{12}$ of curvature at the surface facing the image, the aforementioned condition (4') is satisfied.

The invention as claimed in claim 61 provides a zoom lens which has the construction of claim 59 or claim 60, and which is also constructed such that $X_7(H)$ and $C_7$ of the fourth lens surface facing the image, $X_9(H)$ and $C_9$ of the fifth lens surface facing the object satisfy the aforementioned condition (10'), and $X_{10}(H)$ and $C_{10}$ of the fifth lens surface facing the image satisfy the following condition, $$X_{10}(H) - X_9(H) < [C_{10}H^2/(1 + \sqrt{(1-C_{10}^2H^2)}) - (C_9H^2/1 + \sqrt{(1-C_9^2H^2)})] \quad (12')$$

The invention as claimed in claim 62 which has the construction of claim 59 or claim 60, and which is also constructed such that, providing that the refractive index of the substance forming the second lens is $n_2$, that the Abbe number of the substance forming the fourth lens is $v_4$, and that the Abbe number of the substance forming the seventh lens is $v_7$, the aforementioned conditions (5)–(7) are satisfied.

To summarize the above, the lens construction of claim 1 is the "basic lens construction" on which the zoom lenses of the present invention is based. In the zoom lenses of the claims 16–30 and claims 47–62, the second and third lenses of the first lens group are cemented together.

Comparing the case where the second and third lenses are not cemented (claims 1–15 and claims 31–46) with the case where they are, there is observed a shift of one in the serial numbers attached to the third lens surface facing the object and the lens surfaces that are behind that surface. In the case where the above-mentioned two lenses are cemented together, dashes are attached to the numerals (2), (4), (8), (9), (10), (11) and (12) which indicate the conditions required in the case where the two lenses are not cemented, so that the conditions (2'), (4'), (8'), (9'), (10'), (11') and (12') are obtained. The condition designated by a numeral having a dash attached thereto and the condition designated by a numeral not having a dash attached thereto are the same conditions. The difference in their representation derives from the fact that the same lens surface is denoted by a different numeral because of the aforementioned shift in the lens arrangement.

As has been described above, the present invention has a construction of a telephoto-type two-group zoom lens, by disposing the first lens group having a positive focal length at the front (toward the object) and disposing the second lens group having a negative focal length at the back (toward the image). By employing such a construction, the back focus is made short, and it is possible to realize a compact zoom lens of a simple construction adapted to a camera, such as a diaphragm shutter camera, which does not have a back focus limitation.

In the zoom lens of this type, the first and second lens groups are closest to each other when the lenses are in an arrangement characterized by the longest focal length, and the back focus is at the minimum when the lenses are in an arrangement characterized by the shortest focal length. In the present invention, the first lens group is configured such that a positive lens, a negative lens, a positive lens and a positive lens are provided in the stated order starting from the object side, and the back principal point of the first lens group is disposed as near the image as possible. By effectively reducing the distance created between the back principal point of the first lens group and the front principal point of the second lens group when the lenses are in an arrangement characterized by the longest focal length, a large variable power ratio is achieved.

In the zoom lenses as described in claim 4 and subsequent claims, the total length of the zoom lens is reduced, and aberrations that occur as a consequence of this reduction is effectively corrected by employing an aspherical outline in one or more of the lens surfaces in the first and second lens groups.

In the case of a telephoto-type zoom lens consisting of two groups such as the zoom lens of the present invention, it is necessary to intensify the power of both the first and second lens groups in order to prevent the total length of the zoom lens from becoming. However, uninhibited intensification of the power of the lens groups may cause the amount of shift of the image surface to be significantly large with respect to the amount of movement of the lens group, thereby deteriorating the positional precision of the lens group with respect to the image surface (film surface).

The condition (1) defines the power of the first group. When the parameter $f_1/f_T$ exceeds the upper limit, the total length of the lens becomes too great, thus making it impossible to achieve the compactness. When the parameter is below the lower limit, the precision of the lens group with respect to the image surface becomes deteriorated, thereby requiring a high-precision control. Hence, the moving mechanism becomes complicated and the cost becomes high.

In order to obtain a large variable power ratio in the zoom lens of type realized by the present invention, it is necessary to prevent the distance between the back principal point of the first lens group and the front principal point of the second lens group from becoming great when the lenses are in an arrangement characterized by the longest focal length. In the zoom lens of the present invention, the power of the first lens group is restricted by a certain degree by the condition (1). Hence, there is an added need to reduce the above-mentioned distance.

The conditions (2) and (2') specify the distance between the first and second lens groups when the lenses are in an arrangement characterized by the longest focal length. When the parameter $(d_8+d_{9T})/f_T$ or $(d_7+d_{8T})/f_T$ exceeds the upper limit, it is difficult to achieve a variable power ratio of greater than 2.5.

In order to ensure that a great variable power ratio is achieved while preventing the total length of the zoom lens from becoming too great, and that the back focus does not become too short when the lenses are in an arrangement characterized by the shortest focal length, it is important that the amount of the movement of the lens groups is small when the power is adjusted. In order to restrict the amount of relative movement of the second lens group with respect to the first lens group at the time of adjusting the power, it is necessary that the negative power of the second lens group be equal or greater than the positive power of the first group.

The condition (3) specifies the ratio between the power of the first lens group and that of the second group. It is undesirable that the parameter $f_2/f_1$ is below the lower limit because the amount of relative movement of the second lens group with respect to the first lens group becomes large, the total length of the zoom lens becomes large, and the back focus becomes too short when the lenses are in an arrangement characterized by the shortest focal length. When the parameter exceeds the upper limit, the Petzval's sum becomes too small, and the image surface is displaced in the positive direction, thus causing the off-axis performance to be deteriorated.

The conditions (4) and (4') specify the outline of the sixth lens. When the parameter $(r_{12}+r_{13})/(r_{12}-r_{13})$ or $(r_{11}+r_{12})/(r_{11}-r_{12})$ exceeds the upper limit, correction of curvature of field cannot be properly performed. When the parameter is below the lower limit, the back principal point of the second lens group is shifted toward the object, resulting in a large-sized lens in which the back focus is too short and near the image surface when the lenses are in an arrangement characterized by the shortest focal length.

The condition (5) specifies the refractive index of the substance forming the second lens. The conditions (6) and (7) specify the Abbe number of the substance forming the fourth lens and the seventh lens, respectively. By satisfying the conditions (5), (6) and (7), an well-balanced correction of the chromatic aberration and curvature of field can be performed, and a high performance can be achieved.

As has been described, in the zoom lenses as described in claim 4 and the subsequent claims, the total length of the zoom lens is reduced by adjusting the power of the first and second lens group to be great, and aberrations that occur as a consequence of this reduction is effectively corrected by employing an aspherical outline in one or more of the lens surfaces in the first and second lens groups.

The conditions (8)–(12) and (8')–(12') specify the aspherical outlines thus employed.

The conditions (8) and (8') indicate that the aspherical outline employed in the third lens surface facing the image is such that the intensity of positive refractive power decreases toward the periphery of the lens.

The conditions (9) and (9') indicate that the aspherical outline employed in the fourth lens surface facing the object is such that the intensity of positive refractive power decreases toward the periphery of the lens.

The conditions (10) and (10') indicate that the aspherical outline employed in the fourth lens surface facing the image is such that the intensity of positive refractive power decreases toward the periphery of the lens.

The conditions (11) and (11') indicate that the aspherical outline employed in the fifth lens surface facing the image is such that the intensity of positive refractive power decreases toward the periphery of the lens.

In the zoom lenses as described in claims 43–46 and 59–62, an aspherical surface is employed in the fifth lens surfaces facing the image and the object. The conditions (12) and (12') specify the outline of the fifth lens which has both surfaces thereof formed to be aspherical.

The fifth lens is a positive meniscus lens whose convex lens faces the image. The conditions (12) and (12') indicate that the aspherical surfaces of the fifth lens are formed such that the intensity of positive refractive power increases toward the periphery of the lens.

By satisfying the conditions (8)–(12) or the conditions (8')–(12'), aberration created as a result of the reduction of the total length of the zoom lens can be effectively corrected, whether the conditions (8)–(12) or the conditions (8')–(12') is to be satisfied depending on the position of the lens surfaces in which an aspherical outline is employed.

Specifically, by satisfying the conditions (8)–(10) or the conditions (8')–(10'), spherical aberration created by the reduction of the total length of the zoom lens can be effectively removed, and by satisfying the conditions (11) and (12), or the conditions (11') and (12'), the curvature of field and astigmatic difference created as a result of the reduction of the total length of the zoom lens can be effectively removed.

BRIEF DESCRIPTION OF THE DRAWINGS

Other object and further features of the present invention will be apparent from the following detailed description when read in conjunction with the accompanying drawings, in which:

FIGS. 33a–c explain aberrations which occur when the zoom lens of the first embodiment is in a lens arrangement characterized by the shortest focal length;

FIGS. 34a–c explain aberrations which occur when the zoom lens of the first embodiment is in a lens arrangement characterized by the intermediate focal length;

FIGS. 35a–c explain aberrations which occur when the zoom lens of the first embodiment is in a lens arrangement characterized by the longest focal length;

FIGS. 36a–c explain aberrations which occur when the zoom lens of the second embodiment is in a lens arrangement characterized by the shortest focal length;

FIGS. 37a–c explain aberrations which occur when the zoom lens of the second embodiment is in a lens arrangement characterized by the intermediate focal length;

FIGS. 38a–c explain aberrations which occur when the zoom lens of the second embodiment is in a lens arrangement characterized by the longest focal length;

FIGS. 39a–c explain aberrations which occur when the zoom lens of the third embodiment is in a lens arrangement characterized by the shortest focal length;

FIGS. 40a–c explain aberrations which occur when the zoom lens of the third embodiment is in a lens arrangement characterized by the intermediate focal length;

FIGS. 43a–c explain aberrations which occur when the zoom lens of the fourth embodiment is in a lens arrangement characterized by the intermediate focal length;

FIGS. 44a–c explain aberrations which occur when the zoom lens of the fourth embodiment is in a lens arrangement characterized by the longest focal length;

FIGS. 45a–c explain aberrations which occur when the zoom lens of the fifth embodiment is in a lens arrangement characterized by the shortest focal length;

FIGS. 46a–c explain aberrations which occur when the zoom lens of the fifth embodiment is in a lens arrangement characterized by the intermediate focal length;

FIGS. 47a–c explain aberrations which occur when the zoom lens of the fifth embodiment is in a lens arrangement characterized by the longest focal length;

FIGS. 48a–c explain aberrations which occur when the zoom lens of the sixth embodiment is in a lens arrangement characterized by the shortest focal length;

FIGS. 49a–c explain aberrations which occur when the zoom lens of the sixth embodiment is in a lens arrangement characterized by the intermediate focal length;

FIGS. 50a–c explain aberrations which occur when the zoom lens of the sixth embodiment is in a lens arrangement characterized by the longest focal length;

FIGS. 51a–c explain aberrations which occur when the zoom lens of the seventh embodiment is in a lens arrangement characterized by the shortest focal length;

FIGS. 52a–c explain aberrations which occur when the zoom lens of the seventh embodiment is in a lens arrangement characterized by the intermediate focal length;

FIGS. 53a–c explain aberrations which occur when the zoom lens of the seventh embodiment is in a lens arrangement characterized by the longest focal length;

FIGS. 54a–c explain aberrations which occur when the zoom lens of the eighth embodiment is in a lens arrangement characterized by the shortest focal length;

FIGS. 55a–c explain aberrations which occur when the zoom lens of the eighth embodiment is in a lens arrangement characterized by the intermediate focal length;

FIGS. 56a–c explain aberrations which occur when the zoom lens of the eighth embodiment is in a lens arrangement characterized by the longest focal length;

FIGS. 57a–c explain aberrations which occur when the zoom lens of the ninth embodiment is in a lens arrangement characterized by the shortest focal length;

FIGS. 58a–c explain aberrations which occur when the zoom lens of the ninth embodiment is in a lens arrangement characterized by the intermediate focal length;

FIGS. 59a–c explain aberrations which occur when the zoom lens of the ninth embodiment is in a lens arrangement characterized by the longest focal length;

FIGS. 60a–c explain aberrations which occur when the zoom lens of the tenth embodiment is in a lens arrangement characterized by the shortest focal length;

FIGS. 61a–c explain aberrations which occur when the zoom lens of the tenth embodiment is in a lens arrangement characterized by the intermediate focal length;

FIGS. 62a–c explain aberrations which occur when the zoom lens of the tenth embodiment is in a lens arrangement characterized by the longest focal length;

FIGS. 63a–c explain aberrations which occur when the zoom lens of the eleventh embodiment is in a lens arrangement characterized by the shortest focal length;

FIGS. 64a–c explain aberrations which occur when the zoom lens of the eleventh embodiment is in a lens arrangement characterized by the intermediate focal length;

FIGS. 65a–c explain aberrations which occur when the zoom lens of the eleventh embodiment is in a lens arrangement characterized by the longest focal length;

FIGS. 66a–c explain aberrations which occur when the zoom lens of the twelfth embodiment is in a lens arrangement characterized by the shortest focal length;

FIGS. 67a–c explain aberrations which occur when the zoom lens of the twelfth embodiment is in a lens arrangement characterized by the intermediate focal length;

FIGS. 68a–c explain aberrations which occur when the zoom lens of the twelfth embodiment is in a lens arrangement characterized by the longest focal length;

FIGS. 69a–c explain aberrations which occur when the zoom lens of the thirteenth embodiment is in a lens arrangement characterized by the shortest focal length;

FIGS. 70a–c explain aberrations which occur when the zoom lens of the thirteenth embodiment is in lens arrangement characterized by the intermediate focal length;

FIGS. 73a–c explain aberrations which occur when the zoom lens of the fourteenth embodiment is in a lens arrangement characterized by the intermediate focal length;

FIGS. 74a–c explain aberrations which occur when the zoom lens of the fourteenth embodiment is in a lens arrangement characterized by the longest focal length;

FIGS. 75a–c explain aberrations which occur when the zoom lens of the fifteenth embodiment is in a lens arrangement characterized by the shortest focal length;

FIGS. 76a–c explain aberrations which occur when the zoom lens of the fifteenth embodiment is in a lens arrangement characterized by the intermediate focal length;

FIGS. 77a–c explain aberrations which occur when the zoom lens of the fifteenth embodiment is in a lens arrangement characterized by the longest focal length;

FIGS. 78a–c explain aberrations which occur when the zoom lens of the sixteenth embodiment is in a lens arrangement characterized by the shortest focal length;

FIGS. 79a–c explain aberrations which occur when the zoom lens of the sixteenth embodiment is in a lens arrangement characterized by the intermediate focal length;

FIGS. 80a–c explain aberrations which occur when the zoom lens of the sixteenth embodiment is in a lens arrangement characterized by the longest focal length;

FIGS. 96a–c explain aberrations which occur when the zoom lens of the twenty-second embodiment is in a lens arrangement characterized by the shortest focal length;

FIGS. 101a–c explain aberrations which occur when the zoom lens of the twenty-third embodiment is in a lens arrangement characterized by the longest focal length;

FIGS. 105a–c explain aberrations which occur when the zoom lens of the twenty-fifth embodiment is in a lens arrangement characterized by the shortest focal length;

FIGS. 106a–c explain aberrations which occur when the zoom lens of the twenty-fifth embodiment is in a lens arrangement characterized by the intermediate focal length;

FIGS. 107a–c explain aberrations which occur when the zoom lens of the twenty-fifth embodiment is in a lens arrangement characterized by the longest focal length;

FIGS. 108a–c explain aberrations which occur when the zoom lens of the twenty-sixth embodiment is in a lens arrangement characterized by the shortest focal length;

FIGS. 109a–c explain aberrations which occur when the zoom lens of the twenty-sixth embodiment is in a lens arrangement characterized by the intermediate focal length;

FIGS. 110a–c explain aberrations which occur when the zoom lens of the twenty-sixth embodiment is in a lens arrangement characterized by the longest focal length;

FIGS. 111a–c explain aberrations which occur when the zoom lens of the twenty-seventh embodiment is in a lens arrangement characterized by the shortest focal length;

FIGS. 112a–c explain aberrations which occur when the zoom lens of the twenty-seventh embodiment is in a lens arrangement characterized by the intermediate focal length;

FIGS. 113a–c explain aberrations which occur when the zoom lens of the twenty-seventh embodiment is in a lens arrangement characterized by the longest focal length;

FIGS. 114a–c explain aberrations which occur when the zoom lens of the twenty-eighth embodiment is in a lens arrangement characterized by the shortest focal length;

FIGS. 115a–c explain aberrations which occur when the zoom lens of the twenty-eighth embodiment is in a lens arrangement characterized by the intermediate focal length;

FIGS. 116a–c explain aberrations which occur when the zoom lens of the twenty-eighth embodiment is in a lens arrangement characterized by the longest focal length;

FIGS. 119a–c explain aberrations which occur when the zoom lens of the twenty-ninth embodiment is in a lens arrangement characterized by the longest focal length;

FIGS. 120a–c explain aberrations which occur when the zoom lens of the thirtieth embodiment is in a lens arrangement characterized by the shortest focal length;

FIGS. 121a–c explain aberrations which occur when the zoom lens of the thirtieth embodiment is in a lens arrangement characterized by the intermediate focal length;

FIGS. 122a–c explain aberrations which occur when the zoom lens of the thirtieth embodiment is in a lens arrangement characterized by the longest focal length;

FIGS. 123a–c explain aberrations which occur when the zoom lens of the thirty-first embodiment is in a lens arrangement characterized by the shortest focal length;

FIGS. 124a–c explain aberrations which occur when the zoom lens of the thirty-first embodiment is in a lens arrangement characterized by the intermediate focal length;

FIGS 125a–c explain aberrations which occur when the zoom lens of the thirty-first embodiment is in a lens arrangement characterized by the longest focal length;

FIGS. 126a–c explain aberrations which occur when the zoom lens of the thirty-second embodiment is in a lens arrangement characterized by the shortest focal length;

FIGS. 127a–c explain aberrations which occur when the zoom lens of the thirty-second embodiment is in a lens arrangement characterized by the intermediate focal length; and FIGS. 122a–c explain aberrations which occur when the zoom lens of the thirty-second embodiment is in a lens arrangement characterized by the longest focal length.

DESCRIPTION OF THE PREFERRED EMBODIMENTS

Descriptions will now be given of thirty-two embodiments.

Figure 1:
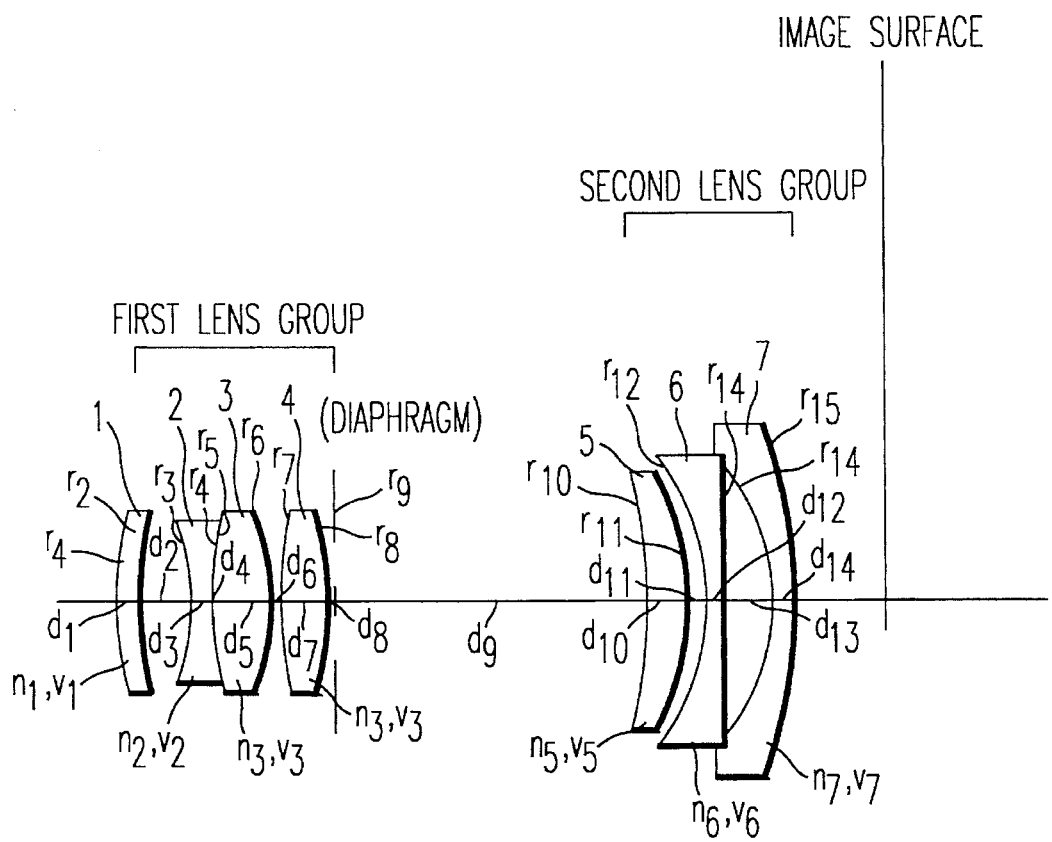
FIG. 1 shows the construction of the zoom lens of a first embodiment.

As shown in FIG. 1, the radius of curvature of an ith surface (the numbering includes the diaphragm surface) is designated by $r_i$ (i=1–15), the distance, along the optical axis, between the ith surface and the i+1th surface is designated by $d_i$ (i=1–14), and the refractive index and the Abbe number of the substance forming a jth lens are designated by $n_j$ and $v_j$, respectively (j=1–7), the numbering of the lens surfaces being started from the ones nearest the object.

f indicates the focal length of the whole system, F/No indicates the speed, and $\omega$ indicates the half field angle.

Establishing the optical axis as an X-axis and establishing an H-axis at right angles to the optical axis, and providing that the radius of curvature along the optical axis is r (the reciprocal of the aforementioned C), that the conic constant is K, and that higher order aspherical coefficients are A, B, C and D, an aspherical surface is a curved surface obtained by turning a curve given by the equation below around the optical axis.

$$X = (1/r)H^2/(1 + \sqrt{[1 - (1 + K)(H/r)^2]}) + A \cdot H^4 + B \cdot H^6 + C \cdot H^8 + D \cdot H^{10}$$

where X denotes the X coordinate and H denotes the H coordinates. The configuration of the aspherical surface is specified by specifying the radius of curvature along the optical axis, the conic constant and the higher order aspherical coefficients. In the representation of the aspherical coefficient, E and the number following it denote the raising to a higher power For example, E-9 indicate $\frac{1}{10^9}$, which is multiplied by the preceding value.

The values in the conditions (5), (6) and (7) are provided as "original values" with respect to the embodiments. In the description below, the parameter values related to the conditions (1), (2), (2'), (3), (4) and (4') will be specified since the conditions (8)–(12) and (8')–(12') are satisfied in the embodiments.

The first and second embodiments correspond to the zoom lens as described in claims 1, 2 and 3. The third and fourth embodiments correspond to the zoom lens as described in claims 4, 5, 6 and 7. The fifth and sixth embodiments correspond to the zoom lens as described in claims 8, 9, 10 and 11. The seventh and eighth embodiments correspond to the zoom lens as described in claims 12, 13, 14 and 15.

| First embodiment | | | | | |
|---|---|---|---|---|---|
| f = 39.2–102.0, F/No = 4.6–9.1, $\omega$ = 28.3–12.0 (degrees) | | | | | |
| i | $r_i$ | $d_i$ | j | $n_j$ | $v_j$ |
| 1 | 20.783 | 2.08 | 1 | 1.73011 | 39.01 |
| 2 | 39.742 | 3.20 | | | |
| 3 | –14.985 | 1.50 | 2 | 1.88300 | 40.80 |
| 4 | 21.145 | 0.11 | | | |
| 5 | 21.804 | 5.00 | 3 | 1.60053 | 57.12 |
| 6 | –14.639 | 0.14 | | | |
| 7 | 34.234 | 3.47 | 4 | 1.48749 | 70.44 |
| 8 | –23.199 | 0.50 | | | |
| 9 | (diaphragm) | variable | | | |
| 10 | –43.387 | 3.07 | 5 | 1.83310 | 34.44 |
| 11 | –18.838 | 2.10 | | | |
| 12 | –16.695 | 1.50 | 6 | 1.82123 | 44.23 |
| 13 | –160.834 | 3.59 | | | |
| 14 | –16.807 | 1.50 | 7 | 1.48749 | 70.44 |
| 15 | –35.368 | | | | |

| | variable amount | | |
|---|---|---|---|
| f | 39.176 | 63.214 | 102.043 |
| $d_9$ | 17.00 | 8.05 | 2.50 | parameter values of the conditions $f_1/f_T = 0.288$, $(d_8 + d_{9T})/f_T = 0.0294$,
$f_2/f_1 = -1.066$, $(r_{12} + r_{13})/(r_{12} - r_{13}) = -1.232$ FIG. 1 shows the construction of the zoom lens of the first embodiment.

Second embodiment f = 39.2–102.0, F/No = 4.6–9.0, ω = 28.3–12.0 (degrees)

| i | $r_i$ | $d_i$ | j | $n_j$ | $v_j$ |
|---|---|---|---|---|---|
| 1 | 20.431 | 2.05 | 1 | 1.80610 | 40.73 |
| 2 | 38.579 | 2.43 | | | |
| 3 | –16.314 | 1.50 | 2 | 1.88300 | 40.80 |
| 4 | 21.365 | 0.12 | | | |
| 5 | 22.259 | 5.00 | 3 | 1.56883 | 56.04 |
| 6 | –14.896 | 0.98 | | | |
| 7 | 35.352 | 3.42 | 4 | 1.48749 | 70.44 |
| 8 | –23.437 | 0.50 | | | |
| 9 | (diaphragm) | variable | | | |
| 10 | –59.076 | 3.26 | 5 | 1.83400 | 37.34 |
| 11 | –18.910 | 1.67 | | | |
| 12 | –17.007 | 1.50 | 6 | 1.83500 | 42.98 |
| 13 | –297.004 | 3.72 | | | |
| 14 | –16.040 | 1.50 | 7 | 1.48749 | 70.44 |
| 15 | –42.194 | | | | | variable amount

Figure 2:
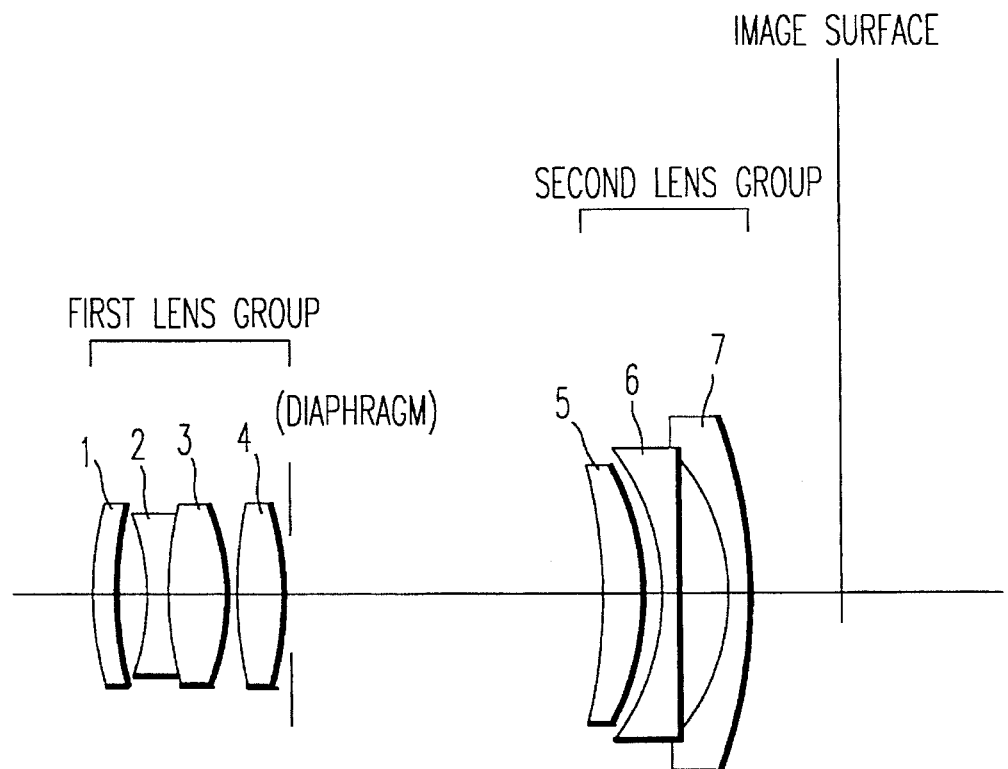
FIG. 2 shows the construction of the zoom lens of a second embodiment.

| f | 39.165 | 63.222 | 102.049 |
|---|---|---|---|
| $d_9$ | 16.54 | 7.87 | 2.50 | parameter values of the conditions $f_1/f_T = 0.288$, $(d_8 + d_{9T})/f_T = 0.0294$,
$f_2/f_1 = -1.032$, $(r_{12} + r_{13})/(r_{12} - r_{13}) = -1.121$ FIG. 2 shows the construction of the zoom lens of the second embodiment.

Third embodiment f = 39.2–101.9, F/No = 4.6–9.2, ω = 28.3–12.0 (degrees)

| i | $r_i$ | $d_i$ | j | $n_j$ | $v_j$ |
|---|---|---|---|---|---|
| 1 | 18.487 | 2.00 | 1 | 1.62004 | 36.30 |
| 2 | 34.505 | 1.86 | | | |
| 3 | –16.948 | 1.50 | 2 | 1.88300 | 40.80 |
| 4 | 29.671 | 0.10 | | | |
| 5 | 29.521 | 4.72 | 3 | 1.58913 | 61.25 |
| 6 | –20.948 | 0.10 | | | |
| 7 | 44.524 | 3.95 | 4 | 1.48749 | 70.44 |
| 8 | –15.815 | 0.50 | | | |
| 9 | (diaphragm) | variable | | | |
| 10 | –42.670 | 2.85 | 5 | 1.78590 | 43.93 |
| 11 | –19.485 | 2.33 | | | |
| 12 | –18.058 | 1.50 | 6 | 1.71300 | 53.94 |
| 13 | –337.171 | 3.82 | | | |
| 14 | –15.598 | 1.50 | 7 | 1.48749 | 70.44 |
| 15 | –42.133 | | | | | variable amount

| f | 39.151 | 63.159 | 101.901 |
|---|---|---|---|
| $d_9$ | 16.27 | 7.77 | 2.50 |

Aspherical surface (sixth lens surface)

Figure 3:
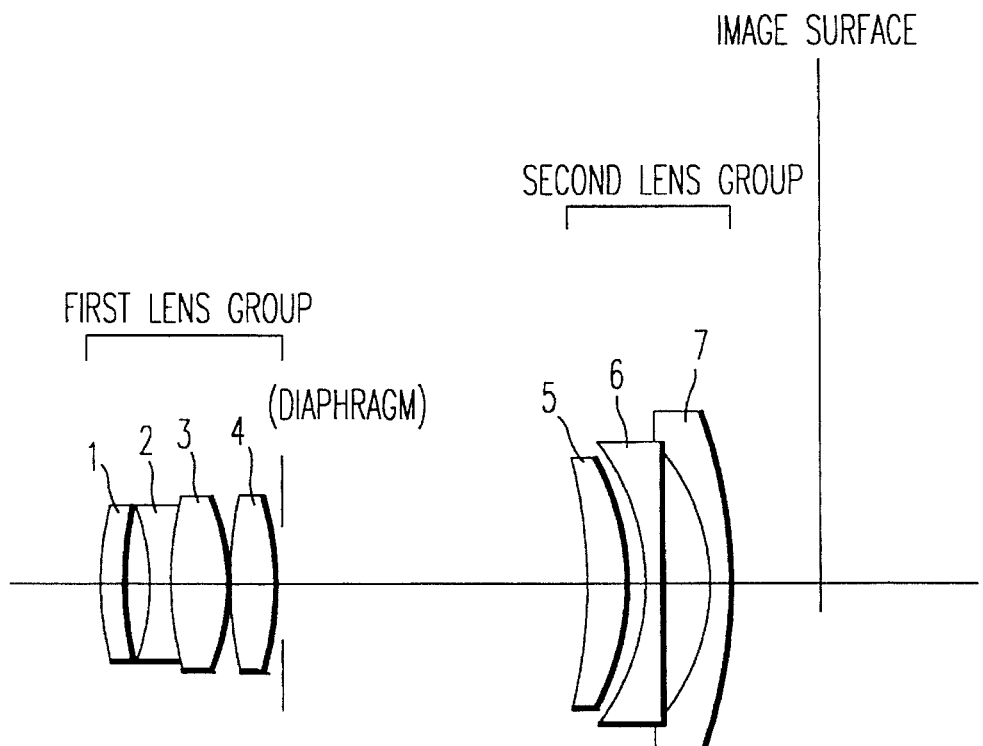
FIG. 3 shows the construction of the zoom lens of a third embodiment.

K = –2.13335, A = 8.41416E–6
B = 1.69615E–7, C = 2.17280E–9,
D = 1.09826E–12
parameter values of the conditions $f_1/f_T = 0.286$, $(d_8 + d_{9T})/f_T = 0.0294$,
$f_2/f_1 = -1.032$, $(r_{12} + r_{13})/(r_{12} - r_{13}) = -1.113$ FIG. 3 shows the construction of the zoom lens of the third embodiment.

Fourth embodiment f = 39.0–101.6, F/No = 4.6–9.2, ω = 28.4–12.0 (degrees)

| i | $r_i$ | $d_i$ | j | $n_j$ | $v_j$ |
|---|---|---|---|---|---|
| 1 | 18.210 | 2.12 | 1 | 1.56732 | 42.84 |
| 2 | 46.668 | 1.74 | | | |
| 3 | –16.094 | 1.50 | 2 | 1.83500 | 42.98 |
| 4 | 16.215 | 0.12 | | | |
| 5 | 16.720 | 4.45 | 3 | 1.58913 | 61.25 |
| 6 | –18.435 | 0.10 | | | |
| 7 | 81.333 | 4.47 | 4 | 1.58313 | 59.46 |
| 8 | –17.868 | 0.50 | | | |
| 9 | (diaphragm) | variable | | | |
| 10 | –55.016 | 2.84 | 5 | 1.70154 | 41.15 |
| 11 | –20.780 | 2.60 | | | |
| 12 | –19.080 | 1.50 | 6 | 1.74300 | 49.22 |
| 13 | –990.983 | 3.65 | | | |
| 14 | –16.991 | 1.50 | 7 | 1.51680 | 64.20 |
| 15 | –42.013 | | | | | variable amount

| f | 39.012 | 62.923 | 101.586 |
|---|---|---|---|
| $d_9$ | 16.44 | 7.84 | 2.50 |

Aspherical surface (sixth lens surface)

Figure 4:
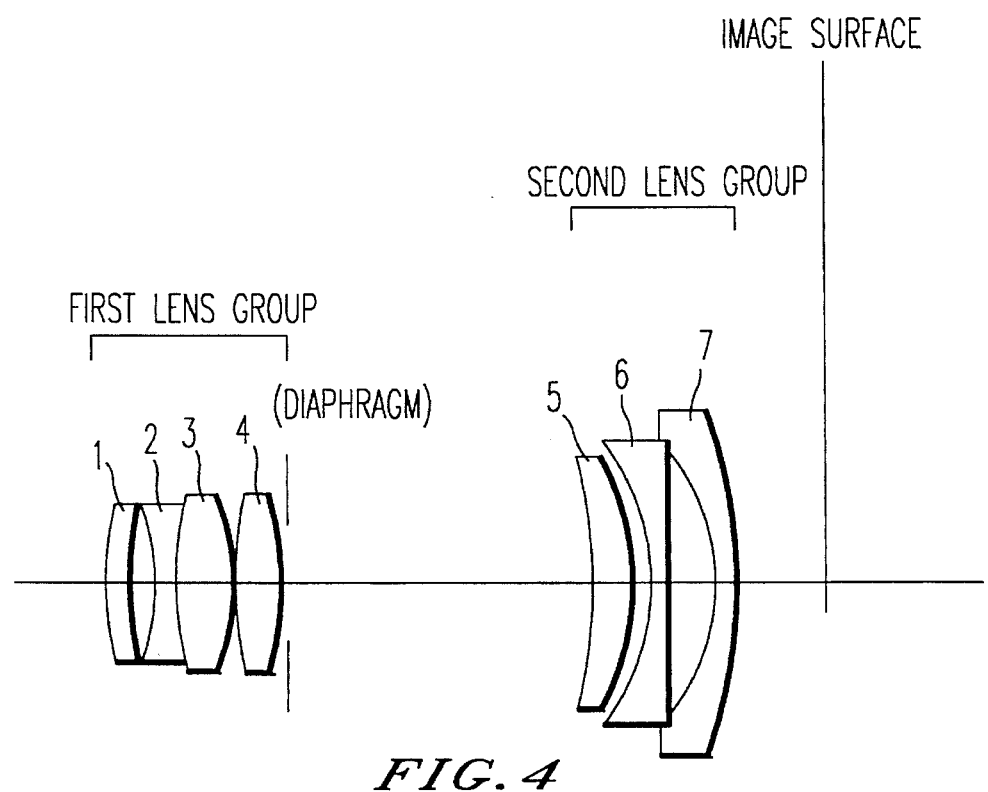
FIG. 4 shows the construction of the zoom lens of a fourth embodiment.

K = –0.17104, A = 6.18063E–6
B = 1.21530E–7, C = 3.50072E–9,
D = 3.87097E–11
parameter values of the conditions $f_1/f_T = 0.289$, $(d_8 + d_{9T})/f_T = 0.0295$,
$f_2/f_1 = -1.023$, $(r_{12} + r_{13})/(r_{12} - r_{13}) = -1.039$ FIG. 4 shows the construction of the zoom lens of the fourth embodiment.

Fifth embodiment f = 39.1–101.8, F/No = 4.6–9.1, ω = 28.3–12.0 (degrees)

| i | $r_i$ | $d_i$ | j | $n_j$ | $v_j$ |
|---|---|---|---|---|---|
| 1 | 15.404 | 2.06 | 1 | 1.60342 | 38.01 |
| 2 | 24.519 | 2.26 | | | |
| 3 | –16.526 | 1.50 | 2 | 1.88300 | 40.80 |
| 4 | 21.017 | 0.13 | | | |
| 5 | 19.014 | 4.84 | 3 | 1.58913 | 61.25 |
| 6 | –18.425 | 0.10 | | | |
| 7 | 49.279 | 3.34 | 4 | 1.58913 | 61.25 |
| 8 | –21.326 | 0.50 | | | |
| 9 | (diaphragm) | variable | | | |
| 10 | –42.342 | 2.83 | 5 | 1.70200 | 40.20 |
| 11 | –19.183 | 2.74 | | | |
| 12 | –17.728 | 1.50 | 6 | 1.77250 | 49.62 |
| 13 | –146.802 | 3.62 | | | |
| 14 | –16.287 | 1.50 | 7 | 1.48749 | 70.44 |
| 15 | –37.425 | | | | | variable amount

| f | 39.131 | 63.102 | 101.809 |
|---|---|---|---|
| $d_9$ | 16.47 | 7.85 | 2.50 |

Aspherical surface (seventh lens surface)

Figure 5:
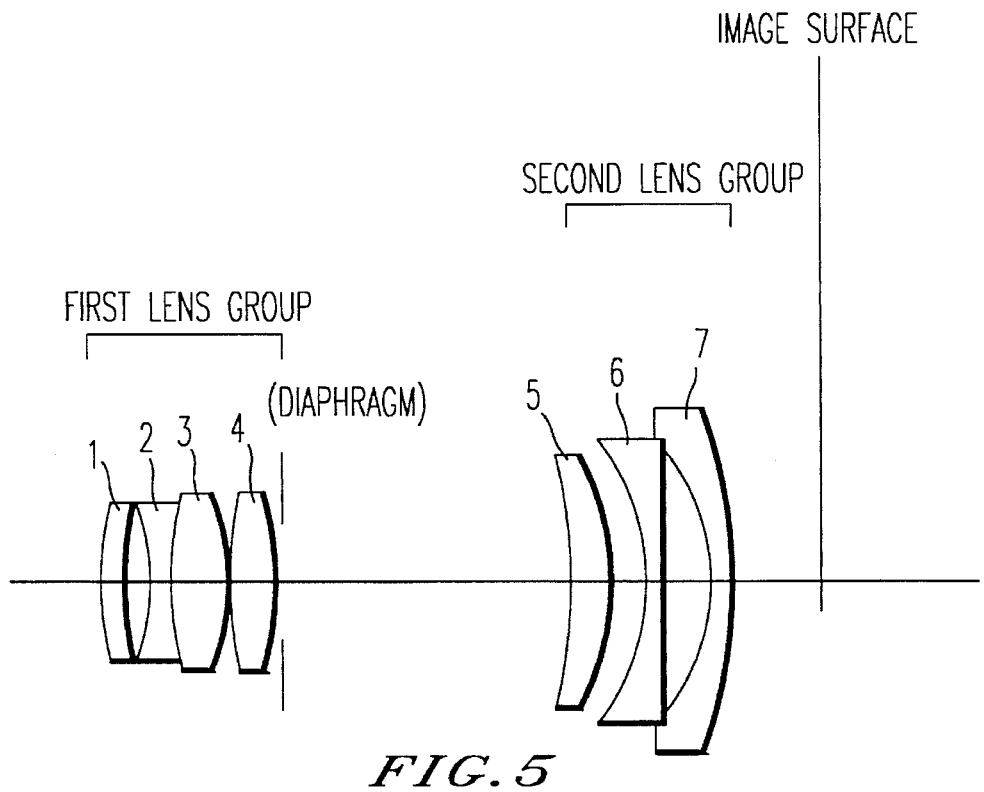
FIG. 5 shows the construction of the zoom lens of a fifth embodiment.

K = –11.99800, A = –1.42448E–5
B = –3.64309E–8, C = –3.68864E–9,
D = 1.53652E–11
parameter values of the conditions $f_1/f_T = 0.289$, $(d_8 + d_{9T})/f_T = 0.0295$,

Fifth embodiment $f_2/f_1 = -1.028$, $(r_{12} + r_{13})/(r_{12} - r_{13}) = -1.275$ FIG. 5 shows the construction of the zoom lens of the fifth embodiment.

Sixth embodiment $f = 39.2-101.9$, F/No = 4.6–9.2, $\omega$ = 28.3–12.0 (degrees)

| i | $r_i$ | $d_i$ | j | $n_j$ | $\nu_j$ |
|---|---|---|---|---|---|
| 1 | 17.867 | 2.11 | 1 | 1.56732 | 42.84 |
| 2 | 42.334 | 1.86 | | | |
| 3 | −16.014 | 1.50 | 2 | 1.83500 | 42.98 |
| 4 | 16.154 | 0.10 | | | |
| 5 | 15.971 | 4.48 | 3 | 1.58913 | 61.25 |
| 6 | −18.210 | 0.82 | | | |
| 7 | 71.346 | 3.20 | 4 | 1.58313 | 59.46 |
| 8 | −18.922 | 0.50 | | | |
| 9 | (diaphragm) | variable | | | |
| 10 | −54.159 | 2.83 | 5 | 1.70154 | 41.15 |
| 11 | −20.712 | 2.64 | | | |
| 12 | −18.964 | 1.50 | 6 | 1.74330 | 49.22 |
| 13 | −949.861 | 3.68 | | | |
| 14 | −16.853 | 1.80 | 7 | 1.51680 | 64.20 |
| 15 | −40.884 | | | | | variable amount

| f | 39.158 | 63.156 | 101.809 |
|---|---|---|---|
| $d_9$ | 16.37 | 7.81 | 2.50 |

Aspherical surface (sixth lens surface)

Figure 6:
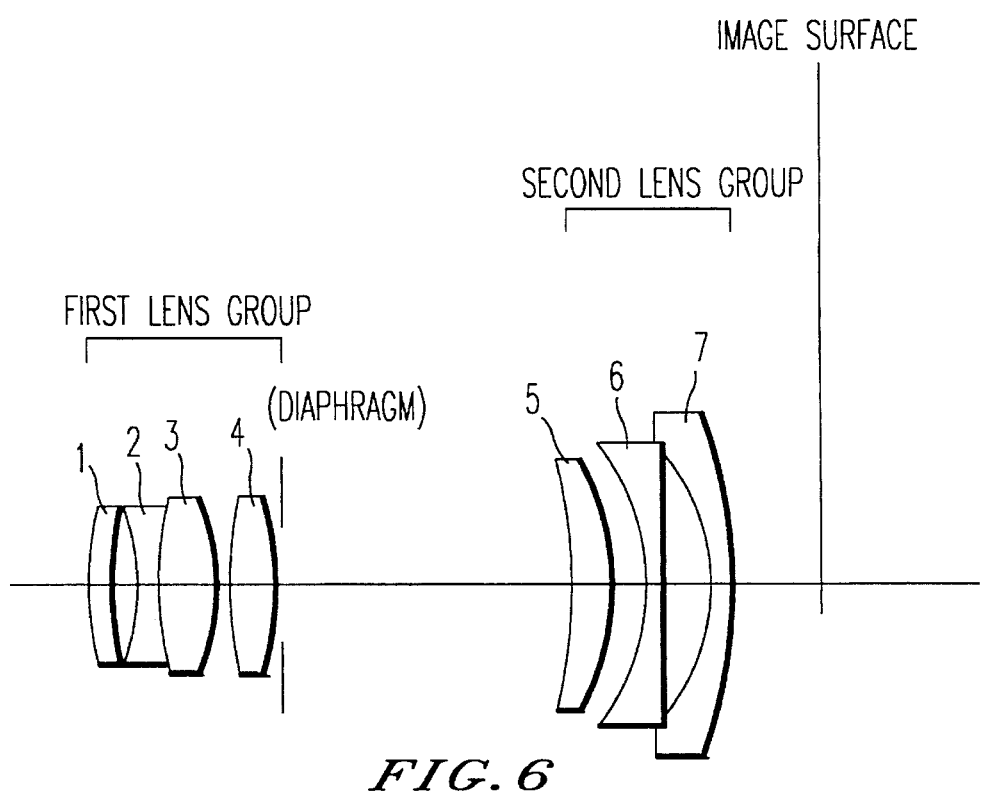
FIG. 6 shows the construction of the zoom lens of a sixth embodiment.

$K = -20.07710$, $A = -2.23797E-5$
$B = 3.20285E-7$, $C = -1.12701E-8$,
$D = 8.99475E-11$
parameter values of the conditions $f_1/f_T = 0.289$, $(d_8 + d_{9T})/f_T = 0.0294$,
$f_2/f_1 = -1.020$, $(r_{12} + r_{13})/(r_{12} - r_{13}) = -1.041$ FIG. 6 shows the construction of the zoom lens of the sixth embodiment.

Seventh embodiment $f = 39.2-101.9$, F/No = 4.6–9.2, $\omega$ = 28.3–12.0 (degrees)

| i | $r_i$ | $d_i$ | j | $n_j$ | $\nu_j$ |
|---|---|---|---|---|---|
| 1 | 16.679 | 2.02 | 1 | 1.54814 | 42.82 |
| 2 | 28.694 | 1.58 | | | |
| 3 | −15.302 | 1.50 | 2 | 1.88300 | 40.80 |
| 4 | 76.840 | 0.14 | | | |
| 5 | 93.549 | 4.43 | 3 | 1.51823 | 58.96 |
| 6 | −15.572 | 0.10 | | | |
| 7 | 32.101 | 3.64 | 4 | 1.48749 | 70.44 |
| 8 | −20.689 | 0.50 | | | |
| 9 | (diaphragm) | variable | | | |
| 10 | −34.410 | 2.95 | 5 | 1.67003 | 47.20 |
| 11 | −17.687 | 3.02 | | | |
| 12 | −15.921 | 1.50 | 6 | 1.69680 | 55.46 |
| 13 | −129.918 | 3.46 | | | |
| 14 | −17.492 | 1.80 | 7 | 1.48749 | 70.44 |
| 15 | −36.622 | | | | | variable amount

| f | 39.233 | 63.225 | 101.854 |
|---|---|---|---|
| $d_9$ | 16.79 | 7.97 | 2.50 |

Aspherical surface (eighth lens surface)

Figure 7:
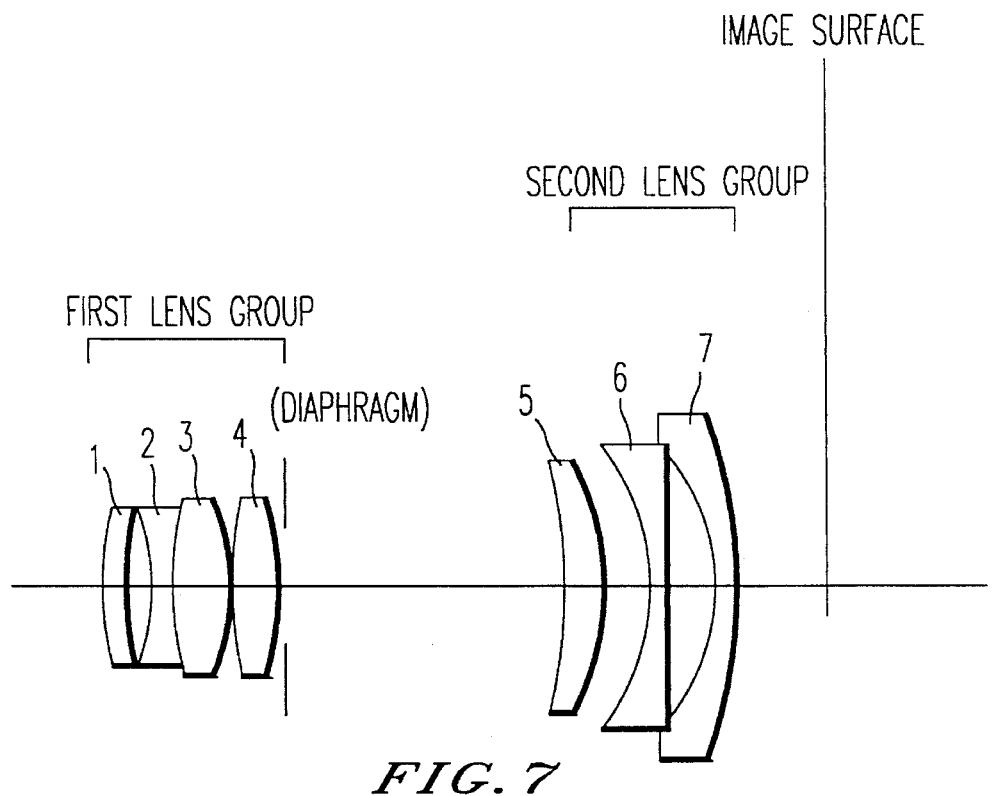
FIG. 7 shows the construction of the zoom lens of a seventh embodiment.

$K = -1.58925$, $A = -7.27682E-6$
$B = -4.56851E-8$, $C = -2.43385E-9$,
$D = -1.69026E-11$
parameter values of the conditions $f_1/f_T = 0.289$, $(d_8 + d_{9T})/f_T = 0.0295$,
$f_2/f_1 = -1.056$, $(r_{12} + r_{13})/(r_{12} - r_{13}) = -1.279$ FIG. 7 shows the construction of the zoom lens of the seventh embodiment.

Eight embodiment $f = 39.1-101.7$, F/No = 4.6–9.2, $\omega$ = 28.4–12.0 (degrees)

| i | $r_i$ | $d_i$ | j | $n_j$ | $\nu_j$ |
|---|---|---|---|---|---|
| 1 | 19.007 | 2.10 | 1 | 1.56732 | 42.84 |
| 2 | 49.557 | 1.76 | | | |
| 3 | −15.841 | 1.50 | 2 | 1.83500 | 42.98 |
| 4 | 16.644 | 0.10 | | | |
| 5 | 15.838 | 5.00 | 3 | 1.58913 | 61.25 |
| 6 | −17.255 | 0.60 | | | |
| 7 | 65.892 | 3.44 | 4 | 1.58313 | 59.46 |
| 8 | −21.700 | 0.50 | | | |
| 9 | (diaphragm) | variable | | | |
| 10 | −49.920 | 2.78 | 5 | 1.70154 | 41.15 |
| 11 | −20.647 | 2.97 | | | |
| 12 | −18.013 | 1.50 | 6 | 1.74330 | 49.22 |
| 13 | −432.626 | 3.25 | | | |
| 14 | −18.814 | 1.80 | 7 | 1.51680 | 64.20 |
| 15 | −44.515 | | | | | variable amount

| f | 39.107 | 63.176 | 101.658 |
|---|---|---|---|
| $d_9$ | 16.49 | 7.85 | 2.50 |

Aspherical surface (eighth lens surface)

Figure 8:
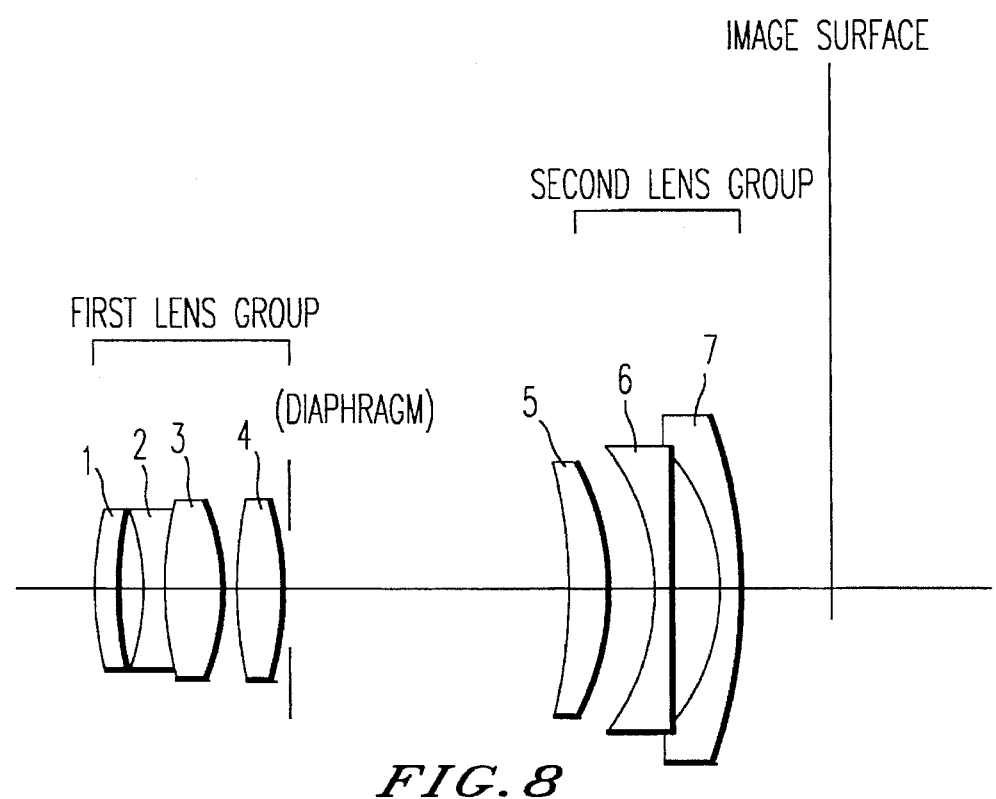
FIG. 8 shows the construction of the zoom lens of an eighth embodiment.

$K = -0.48075$, $A = 6.55255E-6$
$B = -7.08462E-8$, $C = 3.17325E-9$,
$D = 1.96026E-11$
parameter values of the conditions $f_1/f_T = 0.289$, $(d_8 + d_{9T})/f_T = 0.0295$,
$f_2/f_1 = -1.029$, $(r_{12} + r_{13})/(r_{12} - r_{13}) = -1.087$ FIG. 8 shows the construction of the zoom lens of the eighth embodiment.

Figure 9:
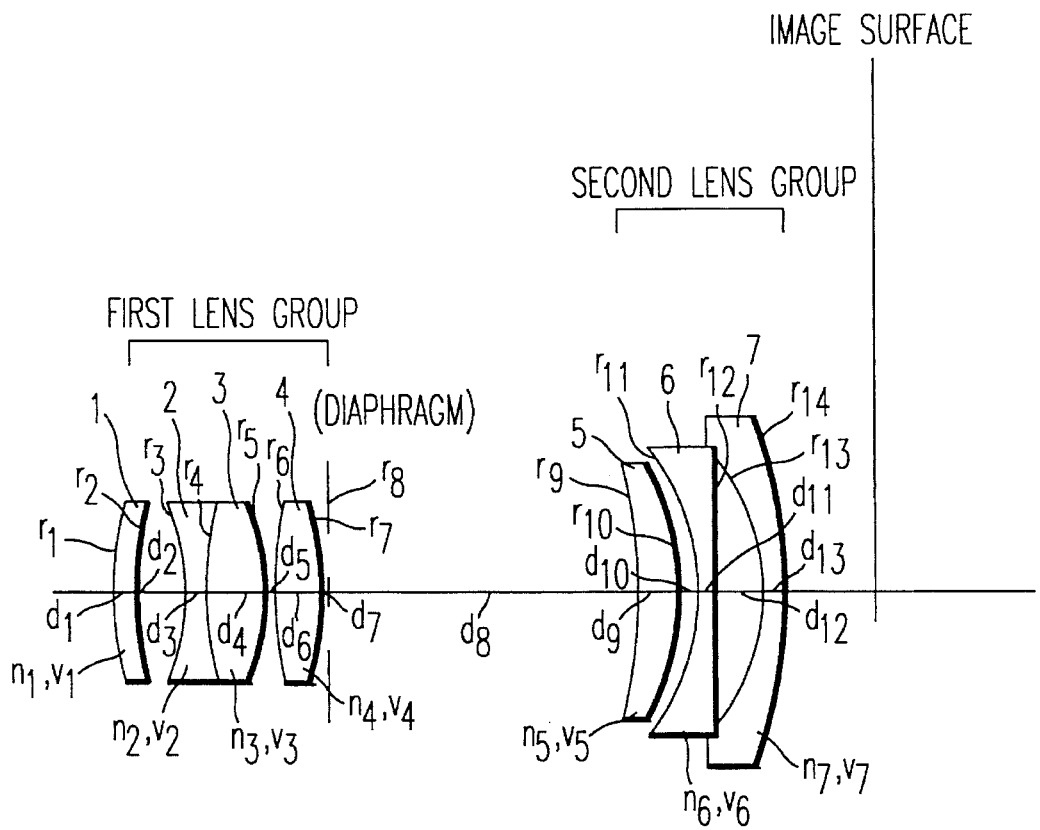
FIG. 9 shows the construction of the zoom lens of a ninth embodiment.

The ninth–sixteenth embodiments described below are the embodiments of the zoom lenses as described in claims 16–30. The numbering of $r_i$, $d_i$, $n_j$, j are as shown in FIG. 9.

Ninth embodiment $f = 39.2-102.0$, F/No = 4.5–9.0 $\omega$ = 28.4–12.0 (degrees)

| i | $r_i$ | $d_i$ | j | $n_j$ | $\nu_j$ |
|---|---|---|---|---|---|
| 1 | 19.559 | 2.06 | 1 | 1.72336 | 37.27 |
| 2 | 33.573 | 2.87 | | | |
| 3 | −15.330 | 1.50 | 2 | 1.88300 | 40.80 |
| 4 | 20.954 | 5.00 | 3 | 1.60978 | 55.95 |
| 5 | −14.669 | 0.84 | | | |
| 6 | 31.005 | 3.42 | 4 | 1.48749 | 70.44 |
| 7 | −25.927 | 0.50 | | | |
| 8 | (diaphragm) | variable | | | |
| 9 | −43.727 | 3.11 | 5 | 1.83821 | 35.31 |
| 10 | −18.463 | 1.93 | | | |
| 11 | −16.780 | 1.50 | 6 | 1.83500 | 43.00 |
| 12 | −113.762 | 3.58 | | | |
| 13 | −15.868 | 1.50 | 7 | 1.48749 | 70.44 |

Ninth embodiment

| 14 | −39.754 | | | | | variable amount

| f | 39.160 | 63.172 | 101.968 |
|---|--------|--------|---------|
| $d_9$ | 16.76 | 7.96 | 2.50 | parameter values of the conditions $f_1/f_T = 0.288$, $(d_7 + d_{8T})/f_T = 0.0294$,
$f_2/f_1 = -1.049$, $(r_{11} + r_{12})/(r_{11} - r_{12}) = -1.346$ FIG. 9 shows the construction of the zoom lens of the ninth embodiment.

Tenth embodiment $f = 39.1–101.8$, $F/No = 4.6–8.9$ $\omega = 28.4–12.0$ (degrees)

| i | $r_i$ | $d_i$ | j | $n_j$ | $v_j$ |
|---|-------|-------|---|-------|-------|
| 1 | 21.276 | 2.04 | 1 | 1.80610 | 40.73 |
| 2 | 40.701 | 2.57 | | | |
| 3 | −15.416 | 1.50 | 2 | 1.88300 | 40.80 |
| 4 | 22.883 | 5.00 | 3 | 1.56883 | 56.04 |
| 5 | −13.978 | 1.02 | | | |
| 6 | 33.098 | 3.37 | 4 | 1.48749 | 70.44 |
| 7 | −25.635 | 0.50 | | | |
| 8 | (diaphragm) | variable | | | |
| 9 | −59.982 | 3.27 | 5 | 1.83700 | 35.34 |
| 10 | −18.865 | 1.60 | | | |
| 11 | −17.230 | 1.50 | 6 | 1.83500 | 42.98 |
| 12 | −227.038 | 3.59 | | | |
| 13 | −16.063 | 1.50 | 7 | 1.48749 | 70.44 |
| 14 | −51.106 | | | | | variable amount

Figure 10:
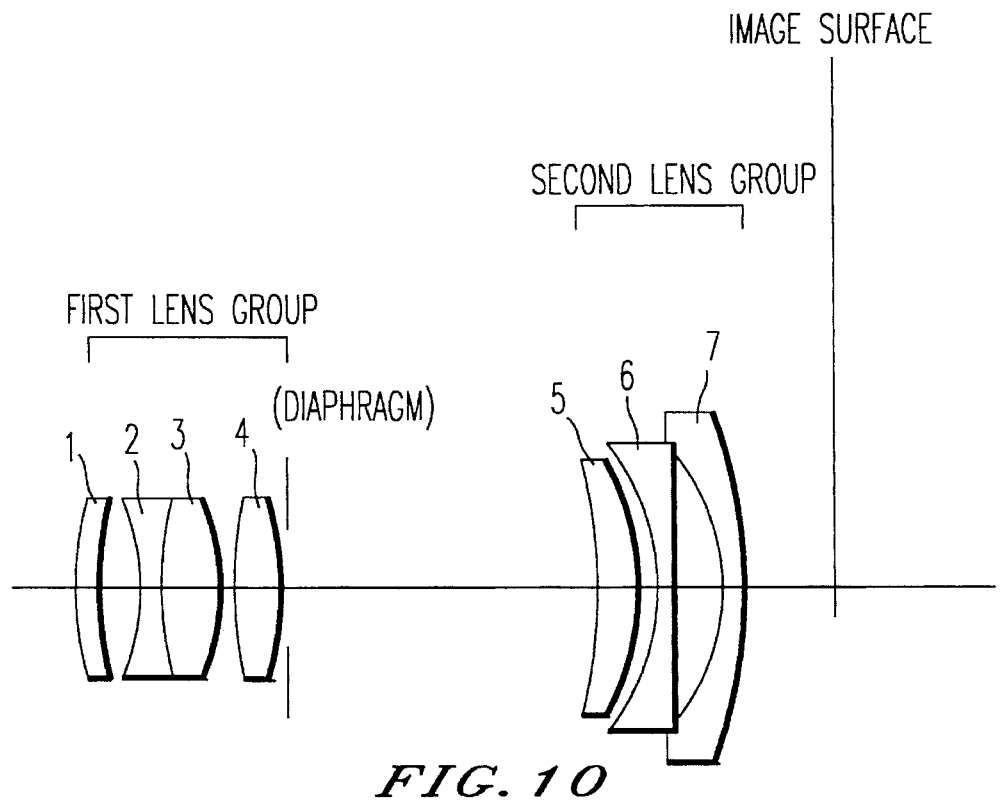
FIG. 10 shows the construction of the zoom lens of a tenth embodiment.

| f | 39.135 | 63.125 | 101.761 |
|---|--------|--------|---------|
| $d_9$ | 16.41 | 7.82 | 2.50 | parameter values of the conditions $f_1/f_T = 0.289$, $(d_7 + d_{8T})/f_T = 0.0295$,
$f_2/f_1 = -1.023$, $(r_{11} + r_{12})/(r_{11} - r_{12}) = -1.164$ FIG. 10 shows the construction of the zoom lens of the tenth embodiment.

Eleventh embodiment $f = 39.1–101.9$, $F/No = 4.6–9.2$ $\omega = 28.3–12.0$ (degrees)

| i | $r_i$ | $d_i$ | j | $n_j$ | $v_j$ |
|---|-------|-------|---|-------|-------|
| 1 | 18.447 | 2.00 | 1 | 1.62004 | 36.30 |
| 2 | 33.175 | 1.97 | | | |
| 3 | −17.030 | 1.50 | 2 | 1.88300 | 40.80 |
| 4 | 30.802 | 5.00 | 3 | 1.58913 | 61.25 |
| 5 | −21.081 | 0.10 | | | |
| 6 | 41.541 | 3.86 | 4 | 1.48749 | 70.44 |
| 7 | −16.225 | 0.50 | | | |
| 8 | (diaphragm) | variable | | | |
| 9 | −44.247 | 2.91 | 5 | 1.78590 | 43.93 |
| 10 | −19.618 | 2.30 | | | |
| 11 | −18.011 | 1.50 | 6 | 1.71300 | 53.94 |
| 12 | −348.067 | 3.82 | | | |
| 13 | −16.013 | 1.50 | 7 | 1.48749 | 70.44 |
| 14 | −44.083 | | | | | variable amount

| f | 39.142 | 63.148 | 101.933 |
|---|--------|--------|---------|
| $d_9$ | 16.63 | 7.91 | 2.50 |

Eleventh embodiment

Aspherical surface (fifth lens surface)

Figure 11:
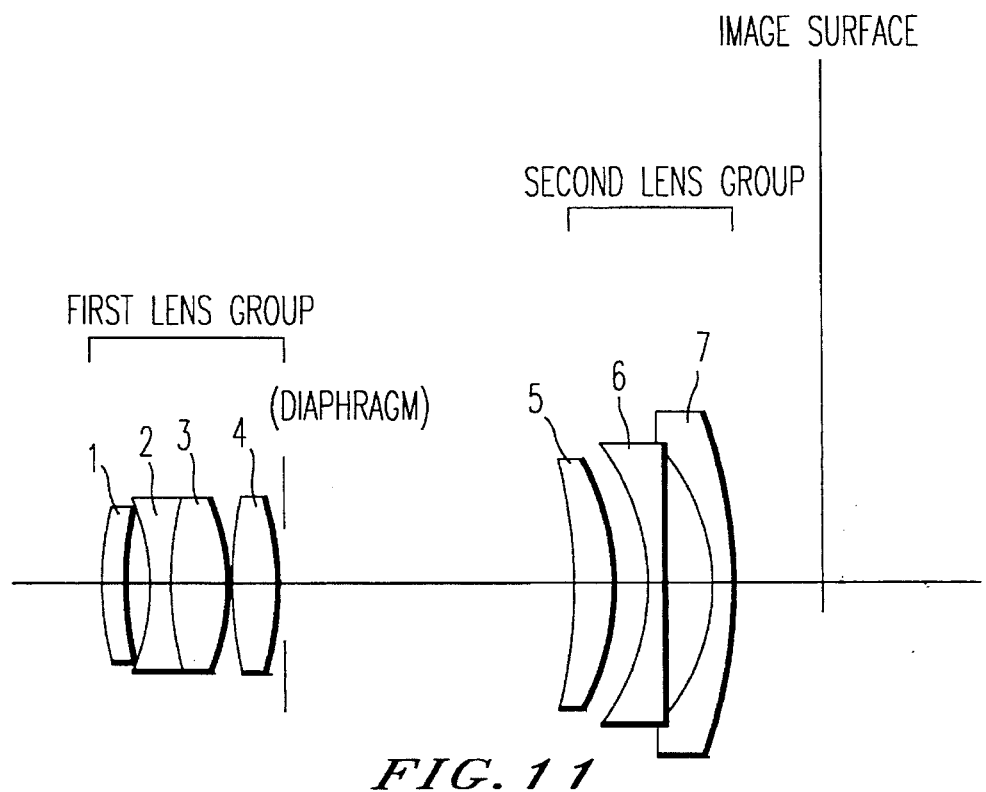
FIG. 11 shows the construction of the zoom lens of an eleventh embodiment.

$K = -2.05781$, $A = 7.50334E-6$
$B = 1.53114E-7$, $C = 1.82387E-9$,
$D = 4.51137E-11$ parameter values of the conditions $f_1/f_T = 0.288$, $(d_7 + d_{8T})/f_T = 0.0294$,
$f_2/f_1 = -1.039$, $(r_{11} + r_{12})/(r_{11} - r_{12}) = -1.109$ FIG. 11 shows the construction of the zoom lens of the eleventh embodiment.

Twelfth embodiment $f = 39.2–101.9$, $F/No = 4.6–9.2$ $\omega = 28.3–12.0$ (degrees)

| i | $r_i$ | $d_i$ | j | $n_j$ | $v_j$ |
|---|-------|-------|---|-------|-------|
| 1 | 16.174 | 2.10 | 1 | 1.56732 | 42.84 |
| 2 | 32.444 | 1.57 | | | |
| 3 | −16.985 | 1.50 | 2 | 1.83500 | 42.98 |
| 4 | 16.136 | 4.99 | 3 | 1.58913 | 61.25 |
| 5 | −19.904 | 0.41 | | | |
| 6 | 58.554 | 3.47 | 4 | 1.58313 | 59.46 |
| 7 | −19.144 | 0.50 | | | |
| 8 | (diaphragm) | variable | | | |
| 9 | −54.647 | 2.87 | 5 | 1.70154 | 41.15 |
| 10 | −20.356 | 2.52 | | | |
| 11 | −18.634 | 1.50 | 6 | 1.74330 | 49.22 |
| 12 | −465.225 | 3.59 | | | |
| 13 | −16.855 | 1.80 | 7 | 1.51680 | 64.20 |
| 14 | −44.083 | | | | | variable amount

| f | 39.164 | 63.161 | 101.891 |
|---|--------|--------|---------|
| $d_9$ | 16.37 | 7.81 | 2.50 |

Aspherical surface (fifth lens surface)

Figure 12:
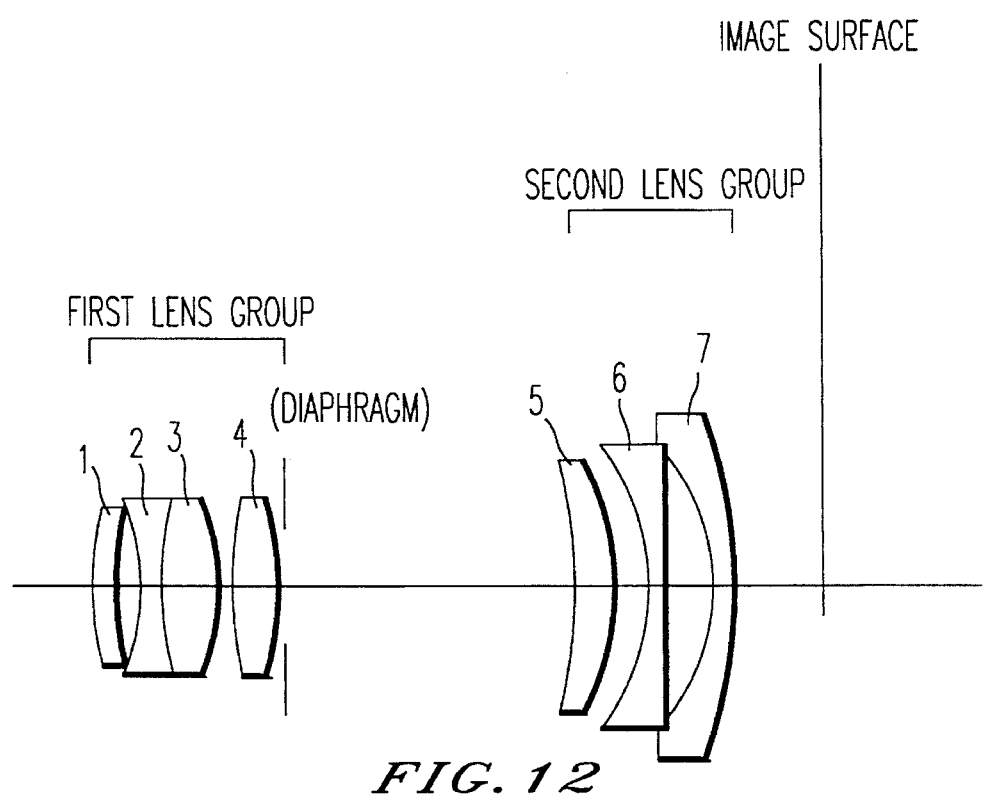
FIG. 12 shows the construction of the zoom lens of a twelfth embodiment.

$K = -0.25251$, $A = 7.80871E-6$
$B = -7.93646E-8$, $C = 2.08897E-9$,
$D = 2.16979E-11$ parameter values of the conditions $f_1/f_T = 0.289$, $(d_7 + d_{8T})/f_T = 0.0294$,
$f_2/f_1 = -1.020$, $(r_{11} + r_{12})/(r_{11} - r_{12}) = -1.083$ FIG. 12 shows the construction of the zoom lens of the twelfth embodiment.

Thirteenth embodiment $f = 39.1–101.7$, $F/No = 4.6–9.2$ $\omega = 28.4–12.0$ (degrees)

| i | $r_i$ | $d_i$ | j | $n_j$ | $v_j$ |
|---|-------|-------|---|-------|-------|
| 1 | 17.895 | 2.06 | 1 | 1.60342 | 38.01 |
| 2 | 36.725 | 2.06 | | | |
| 3 | −15.791 | 1.50 | 2 | 1.88300 | 40.80 |
| 4 | 21.788 | 5.00 | 3 | 1.58913 | 61.25 |
| 5 | −16.774 | 0.36 | | | |
| 6 | 51.723 | 3.38 | 4 | 1.58913 | 61.25 |
| 7 | −21.733 | 0.50 | | | |
| 8 | (diaphragm) | variable | | | |
| 9 | −59.436 | 2.86 | 5 | 1.70200 | 40.20 |
| 10 | −21.012 | 2.61 | | | |
| 11 | −18.787 | 1.50 | 6 | 1.77250 | 49.62 |
| 12 | −789.791 | 3.62 | | | |
| 13 | −17.054 | 1.80 | 7 | 1.48749 | 70.44 |
| 14 | −41.127 | | | | |

Thirteenth embodiment

| | variable amount | | |
|---|---|---|---|
| f | 39.133 | 63.112 | 101.742 |
| $d_9$ | 16.51 | 7.81 | 2.50 |

Aspherical surface (sixth lens surface)

Figure 13:
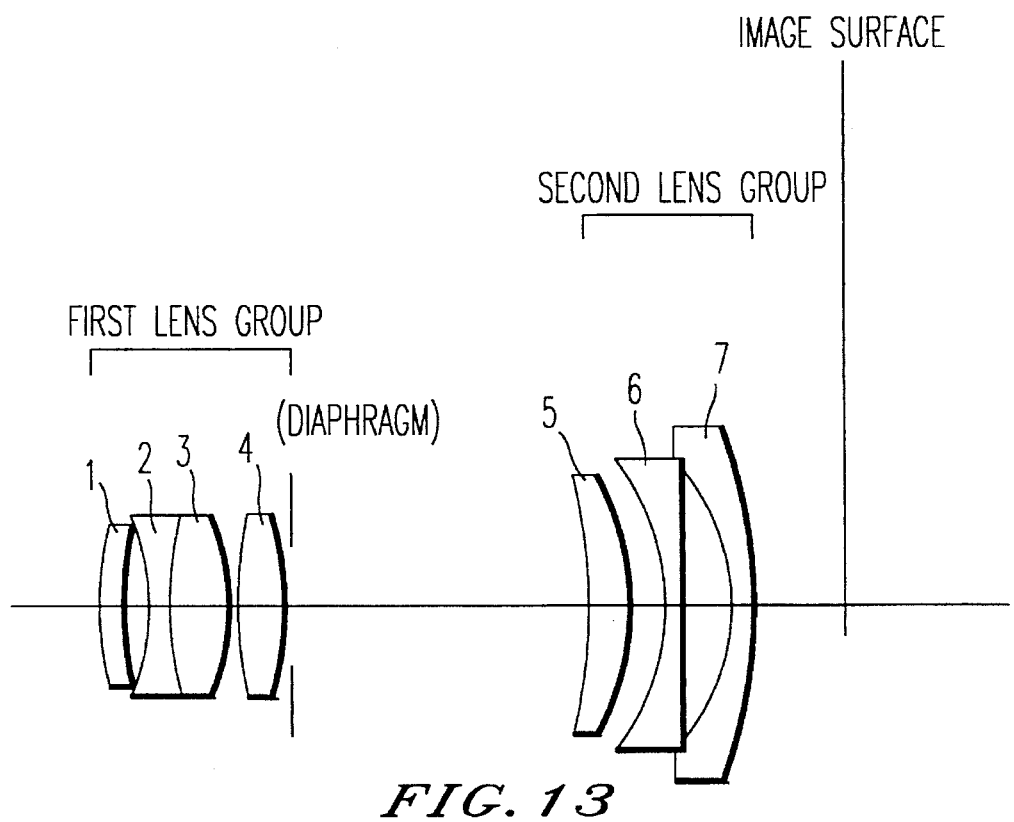
FIG. 13 shows the construction of the zoom lens of a thirteenth embodiment.

K = −1.85517, A = −5.32884E−6
B = 5.51716E−8, C = −6.57451E−10,
D = 4.62473E−12
parameter values of the conditions $f_1/f_T = 0.289$, $(d_7 + d_{8T})/f_T = 0.0295$,
$f_2/f_1 = -1.031$, $(r_{11} + r_{12})/(r_{11} - r_{12}) = -1.049$ FIG. 13 shows the construction of the zoom lens of the thirteenth embodiment.

Fourteenth embodiment f = 39.2–102.7, F/No = 4.6–9.2 ω = 28.3–12.0 (degrees)

| i | $r_i$ | $d_i$ | j | $n_j$ | $v_j$ |
|---|---|---|---|---|---|
| 1 | 16.779 | 2.11 | 1 | 1.56732 | 42.84 |
| 2 | 35.307 | 1.94 | | | |
| 3 | −16.278 | 1.50 | 2 | 1.83500 | 42.98 |
| 4 | 15.508 | 5.00 | 3 | 1.58913 | 61.25 |
| 5 | −18.152 | 0.35 | | | |
| 6 | 54.081 | 3.42 | 4 | 1.58313 | 59.46 |
| 7 | −20.291 | 0.50 | | | |
| 8 | (diaphragm) | variable | | | |
| 9 | −57.194 | 2.96 | 5 | 1.70154 | 41.15 |
| 10 | −19.941 | 2.28 | | | |
| 11 | −18.437 | 1.50 | 6 | 1.74330 | 49.22 |
| 12 | −481.700 | 3.65 | | | |
| 13 | −16.573 | 1.80 | 7 | 1.51680 | 64.20 |
| 14 | −44.162 | | | | |

| | variable amount | | |
|---|---|---|---|
| f | 39.164 | 63.198 | 101.013 |
| $d_9$ | 16.40 | 7.82 | 2.50 |

Aspherical surface (sixth lens surface)

Figure 14:
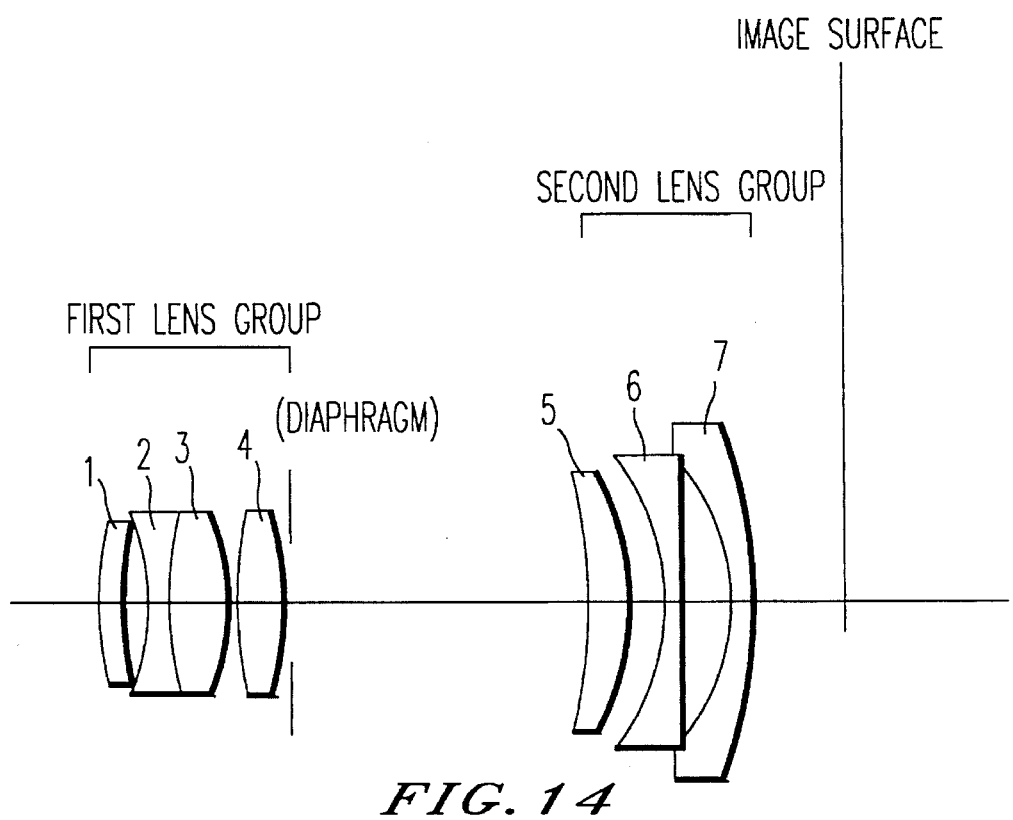
FIG. 14 shows the construction of the zoom lens of a fourteenth embodiment.

K = 19.38562, A = −1.96417E−5
B = 1.65643E−7, C = −5.12288E−9,
D = 4.99354E−11
parameter values of the conditions $f_1/f_T = 0.288$, $(d_7 + d_{8T})/f_T = 0.0294$,
$f_2/f_1 = -1.022$, $(r_{11} + r_{12})/(r_{11} - r_{12}) = -1.080$ FIG. 14 shows the construction of the zoom lens of the fourteenth embodiment.

Fifteenth embodiment f = 39.1–101.6, F/No = 4.6–9.2, ω = 28.4–12.0 (degrees)

| i | $r_i$ | $d_i$ | j | $n_j$ | $v_j$ |
|---|---|---|---|---|---|
| 1 | 16.157 | 2.04 | 1 | 1.60342 | 38.01 |
| 2 | 26.685 | 2.28 | | | |
| 3 | −16.390 | 1.50 | 2 | 1.88300 | 40.98 |
| 4 | 22.578 | 4.71 | 3 | 1.58913 | 61.25 |
| 5 | −20.297 | 0.10 | | | |
| 6 | 40.826 | 3.58 | 4 | 1.58913 | 61.25 |
| 7 | −19.274 | 0.50 | | | |
| 8 | (diaphragm) | variable | | | |
| 9 | −45.164 | 2.91 | 5 | 1.70200 | 40.20 |
| 10 | −19.117 | 2.55 | | | |
| 11 | −17.700 | 1.50 | 6 | 1.77250 | 49.62 |
| 12 | −162.689 | 3.62 | | | |
| 13 | −16.374 | 1.50 | 7 | 1.48749 | 70.44 |
| 14 | −38.481 | | | | |

| | variable amount | | |
|---|---|---|---|
| f | 39.097 | 63.043 | 101.568 |
| $d_9$ | 16.62 | 7.90 | 2.50 |

Aspherical surface (seventh lens surface)

Figure 15:
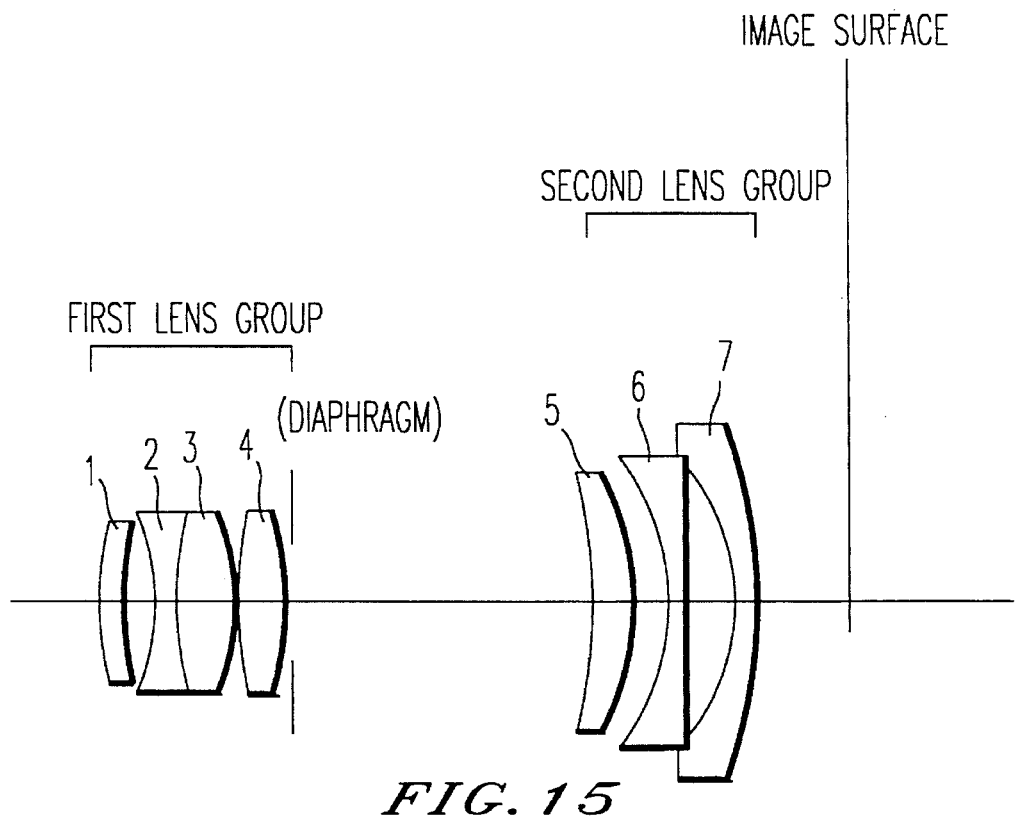
FIG. 15 shows the construction of the zoom lens of a fifteenth embodiment.

K = −1.37089, A = −3.30665E−6
B = −8.86343E−8, C = 2.87098E−9,
D = −2.56850E−11
parameter values of the conditions $f_1/f_T = 0.289$, $(d_7 + d_{8T})/f_T = 0.0295$,
$f_2/f_1 = -1.039$, $(r_{11} + r_{12})/(r_{11} - r_{12}) = -1.244$ FIG. 15 shows the construction of the zoom lens of the fifteenth embodiment.

Sixteenth embodiment f = 38.1–101.9, F/No = 4.5–9.2, ω = 28.3–12.0 (degrees)

| i | $r_i$ | $d_i$ | j | $n_j$ | $v_j$ |
|---|---|---|---|---|---|
| 1 | 15.751 | 2.11 | 1 | 1.56732 | 42.84 |
| 2 | 29.128 | 1.95 | | | |
| 3 | −17.232 | 1.50 | 2 | 1.83500 | 42.98 |
| 4 | 14.882 | 5.00 | 3 | 1.58913 | 61.25 |
| 5 | −21.840 | 0.30 | | | |
| 6 | 44.347 | 3.59 | 4 | 1.58313 | 59.46 |
| 7 | −18.788 | 0.50 | | | |
| 8 | (diaphragm) | variable | | | |
| 9 | −55.578 | 2.93 | 5 | 1.70154 | 41.15 |
| 10 | −20.010 | 2.37 | | | |
| 11 | −17.700 | 1.50 | 6 | 1.74330 | 49.22 |
| 12 | −550.387 | 3.78 | | | |
| 13 | −16.182 | 1.80 | 7 | 1.51680 | 64.20 |
| 14 | −40.245 | | | | |

| | variable amount | | |
|---|---|---|---|
| f | 39.140 | 63.159 | 101.907 |
| $d_9$ | 16.38 | 7.81 | 2.50 |

Aspherical surface (seventh lens surface)

Figure 16:
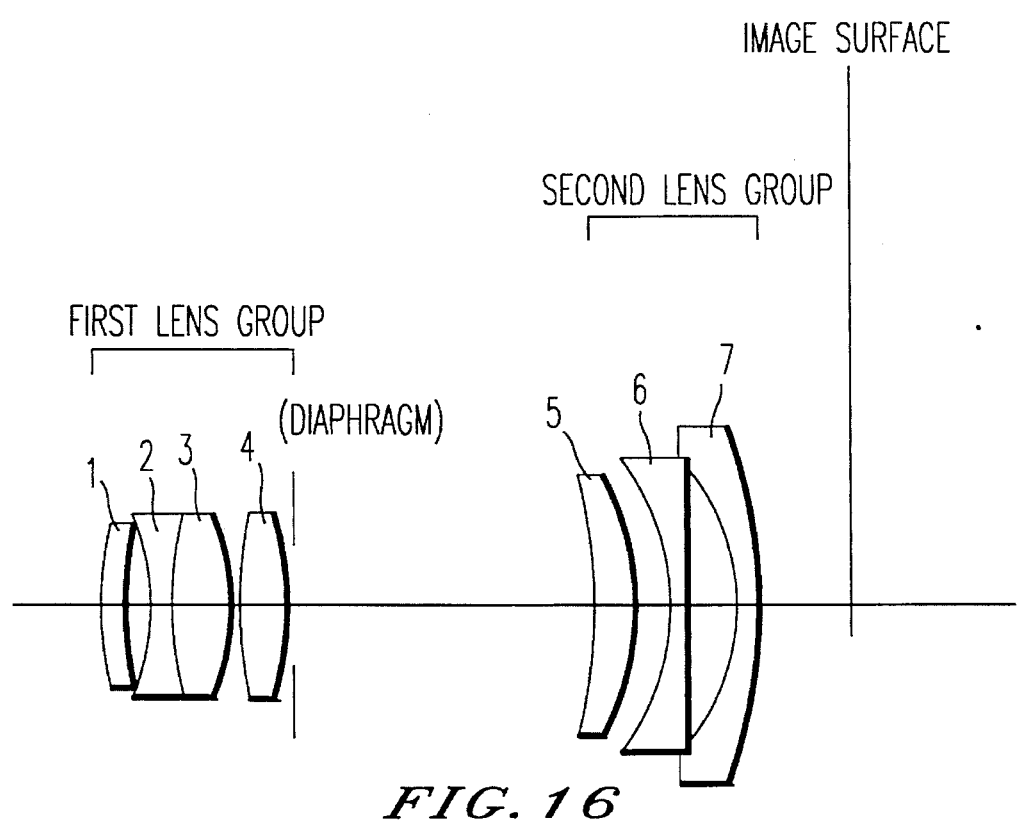
FIG. 16 shows the construction of the zoom lens of a sixteenth embodiment.

K = −0.39371, A = 4.67462E−6
B = −1.22051E−7, C = 2.49511E−9,
D = −2.99103E−11
parameter values of the conditions $f_1/f_T = 0.289$, $(d_7 + d_{8T})/f_T = 0.0294$,
$f_2/f_1 = -1.020$, $(r_{11} + r_{12})/(r_{11} - r_{12}) = -1.070$ FIG. 16 shows the construction of the zoom lens of the sixteenth embodiment.

Seventeenth embodiment f = 39.1–101.6, F/No = 4.6–9.2 ω = 28.4–12.0 (degrees)

| i | $r_i$ | $d_i$ | j | $n_j$ | $v_j$ |
|---|---|---|---|---|---|
| 1 | 17.434 | 1.93 | 1 | 1.62004 | 36.30 |
| 2 | 29.812 | 1.48 | | | |
| 3 | −16.482 | 1.50 | 2 | 1.88300 | 40.80 |
| 4 | 34.436 | 0.08 | | | |
| 5 | 33.546 | 4.55 | 3 | 1.58913 | 61.25 |
| 6 | −20.634 | 0.10 | | | |
| 7 | 48.596 | 3.69 | 4 | 1.48749 | 70.44 |

-continued

Seventeenth embodiment

| i | $r_i$ | $d_i$ | j | $n_j$ | $\nu_j$ |
|---|---|---|---|---|---|
| 8 | −15.531 | 0.50 | | | |
| 9 | (diaphragm) | variable | | | |
| 10 | −44.818 | 3.32 | 5 | 1.78590 | 43.93 |
| 11 | −20.513 | 2.96 | | | |
| 12 | −16.172 | 1.50 | 6 | 1.71300 | 53.94 |
| 13 | −236.177 | 3.22 | | | |
| 14 | −19.693 | 1.50 | 7 | 1.48749 | 70.44 |
| 15 | −49.421 | | | | | variable amount

| f | 39.111 | 63.071 | 101.625 |
|---|---|---|---|
| $d_9$ | 16.62 | 7.90 | 2.50 |

Aspherical surface (sixth lens surface)

K = −2.31778, A = 1.06903E−5
B = 6.20699E−8, C = 4.97440E−9,
D = −2.49701E−11
Aspherical surface (eleventh lens surface)

Figure 17:
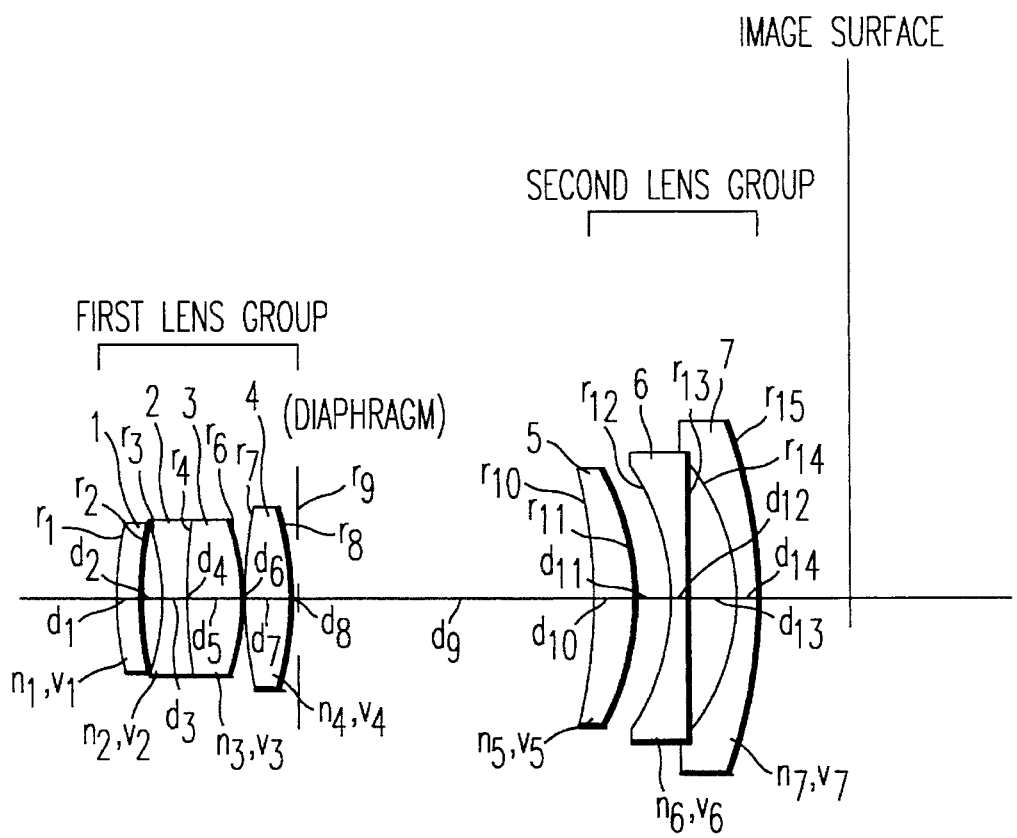
FIG. 17 shows the construction of the zoom lens of a seventeenth embodiment.

K = 0.10626, A = −4.09542E−6
B = 7.25357E−8, C = −1.11384E−9,
D = 4.30934E−12
parameter values of the conditions $f_1/f_T = 0.289$, $(d_8 + d_{9T})/f_T = 0.0295$,
$f_2/f_1 = -1.039$, $(r_{12} + r_{13})/(r_{12} - r_{13}) = -1.147$ FIG. 17 shows the construction of the zoom lens of the seventeenth embodiment.

Eighteenth embodiment f = 39.1–101.6, F/No = 4.6–9.2 ω = 28.3–12.0 (degrees)

| i | $r_i$ | $d_i$ | j | $n_j$ | $\nu_j$ |
|---|---|---|---|---|---|
| 1 | 16.906 | 1.89 | 1 | 1.56732 | 42.84 |
| 2 | 35.108 | 2.03 | | | |
| 3 | −16.417 | 1.50 | 2 | 1.83500 | 42.98 |
| 4 | 16.259 | 0.12 | | | |
| 5 | 16.783 | 4.15 | 3 | 1.58913 | 61.25 |
| 6 | −18.991 | 0.10 | | | |
| 7 | 66.604 | 4.72 | 4 | 1.58313 | 59.46 |
| 8 | −17.731 | 0.50 | | | |
| 9 | (diaphragm) | variable | | | |
| 10 | −61.845 | 2.99 | 5 | 1.70154 | 41.15 |
| 11 | −20.864 | 2.83 | | | |
| 12 | −15.682 | 1.50 | 6 | 1.74330 | 49.22 |
| 13 | −929.844 | 3.28 | | | |
| 14 | −21.191 | 1.80 | 7 | 1.51680 | 64.20 |
| 15 | −40.390 | | | | | variable amount

| f | 39.106 | 63.063 | 101.626 |
|---|---|---|---|
| $d_9$ | 16.54 | 7.87 | 2.50 |

Aspherical surface (sixth lens surface)

K = −0.31061, A = 1.00985E−5
B = −2.65368E−8, C = 7.22642E−9,
D = −6.36863E−11
Aspherical surface (eleventh lens surface)

Figure 18:
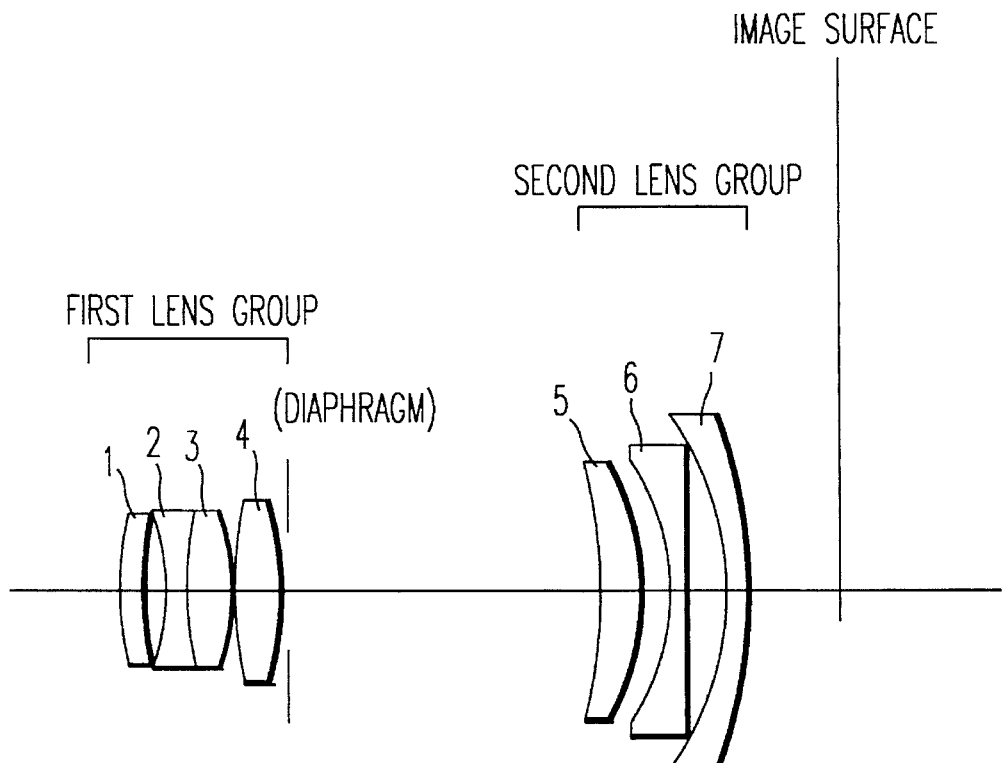
FIG. 18 shows the construction of the zoom lens of a eighteenth embodiment.

K = 0.29985, A = −6.08525E−6
B = 8.98227E−8, C = −1.07190E−9,
D = 2.45612E−12
parameter values of the conditions $f_1/f_T = 0.289$, $(d_8 + d_{9T})/f_T = 0.0295$,
$f_2/f_1 = -1.033$, $(r_{12} + r_{13})/(r_{12} - r_{13}) = -1.034$ FIG. 18 shows the construction of the zoom lens of the eighteenth embodiment.

Nineteenth embodiment f = 39.2–101.9, F/No = 4.6–9.1 ω = 28.3–12.0 (degrees)

| i | $r_i$ | $d_i$ | j | $n_j$ | $\nu_j$ |
|---|---|---|---|---|---|
| 1 | 15.333 | 2.06 | 1 | 1.60342 | 38.01 |
| 2 | 24.597 | 2.02 | | | |
| 3 | −16.525 | 1.50 | 2 | 1.88300 | 40.80 |
| 4 | 22.717 | 0.10 | | | |
| 5 | 19.380 | 4.14 | 3 | 1.58913 | 61.25 |
| 6 | −18.500 | 0.82 | | | |
| 7 | 57.442 | 3.26 | 4 | 1.58913 | 61.25 |
| 8 | −20.570 | 0.50 | | | |
| 9 | (diaphragm) | variable | | | |
| 10 | −48.111 | 2.86 | 5 | 1.70200 | 40.20 |
| 11 | −19.835 | 2.70 | | | |
| 12 | −17.614 | 1.50 | 6 | 1.77250 | 49.62 |
| 13 | −151.741 | 3.58 | | | |
| 14 | −16.179 | 1.50 | 7 | 1.48749 | 70.44 |
| 15 | −42.012 | | | | | variable amount

| f | 39.153 | 63.172 | 101.875 |
|---|---|---|---|
| $d_9$ | 15.94 | 7.64 | 2.50 |

Aspherical surface (seventh lens surface)

K = −22.07587, A = −2.05053E−5
B = −9.23154E−8, C = −4.30437E−9,
D = 2.06797E−11
Aspherical surface (eleventh lens surface)

Figure 19:
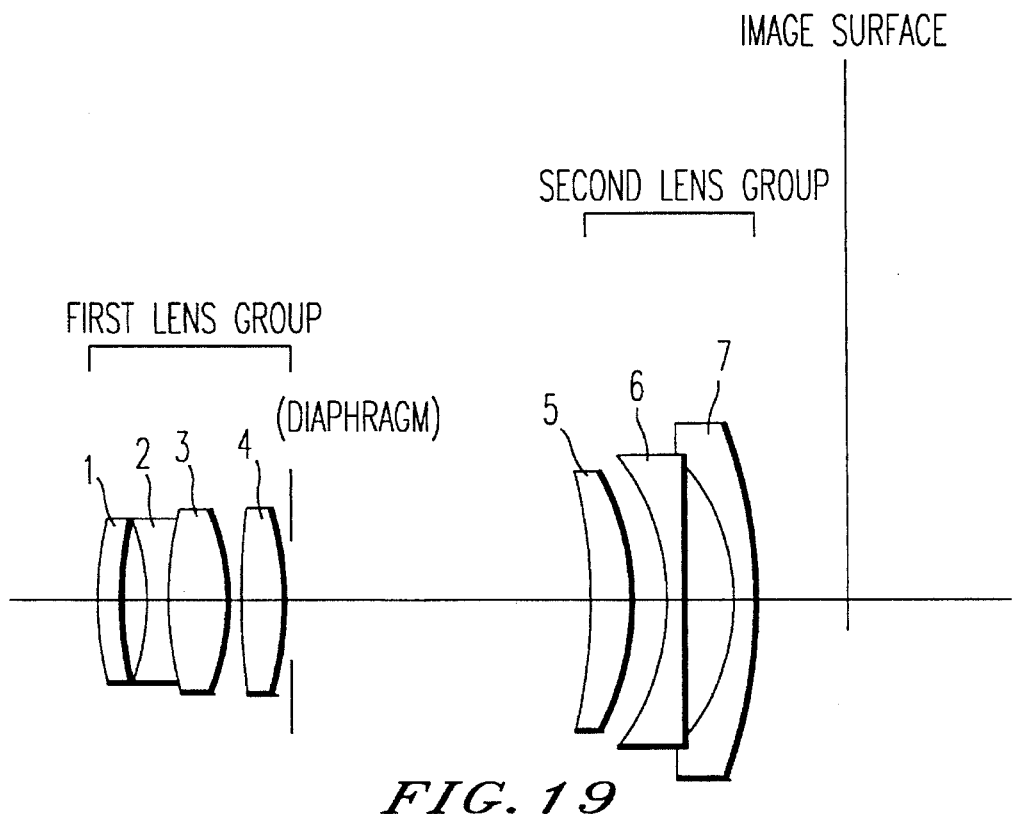
FIG. 19 shows the construction of the zoom lens of a nineteenth embodiment.

K = 0.05414, A = −1.07988E−6
B = −4.00107E−8, C = 1.80812E−10,
D = −1.73956E−12
parameter values of the conditions $f_1/f_T = 0.289$, $(d_8 + d_{9T})/f_T = 0.0294$,
$f_2/f_1 = -0.988$, $(r_{12} + r_{13})/(r_{12} - r_{13}) = -1.263$ FIG. 19 shows the construction of the zoom lens of the nineteenth embodiment.

Twentieth embodiment f = 39.1–101.8, F/No = 4.6–9.1 ω = 28.4–12.0 (degrees)

| i | $r_i$ | $d_i$ | j | $n_j$ | $\nu_j$ |
|---|---|---|---|---|---|
| 1 | 15.695 | 2.14 | 1 | 1.56732 | 42.84 |
| 2 | 31.512 | 1.62 | | | |
| 3 | −17.339 | 1.50 | 2 | 1.83500 | 42.98 |
| 4 | 15.750 | 0.10 | | | |
| 5 | 15.429 | 3.94 | 3 | 1.58913 | 61.25 |
| 6 | −19.859 | 1.47 | | | |
| 7 | 67.647 | 3.15 | 4 | 1.58313 | 59.46 |
| 8 | −18.708 | 0.50 | | | |
| 9 | (diaphragm) | variable | | | |
| 10 | −59.339 | 2.93 | 5 | 1.70154 | 41.15 |
| 11 | −20.945 | 2.98 | | | |
| 12 | −15.666 | 1.50 | 6 | 1.74330 | 49.22 |
| 13 | −278.538 | 3.00 | | | |
| 14 | −19.901 | 1.80 | 7 | 1.51680 | 64.20 |
| 15 | −44.145 | | | | | variable amount

| f | 39.136 | 63.133 | 101.782 |
|---|---|---|---|
| $d_9$ | 15.94 | 7.64 | 2.50 |

Aspherical surface (seventh lens surface)

K = 10.33254, A = −2.63190E−5
B = 1.97929E−7, C = −8.64119E−9,

-continued

Twentieth embodiment

D = 5.72528E–11
Aspherical surface (eleventh lens surface)

Figure 20:
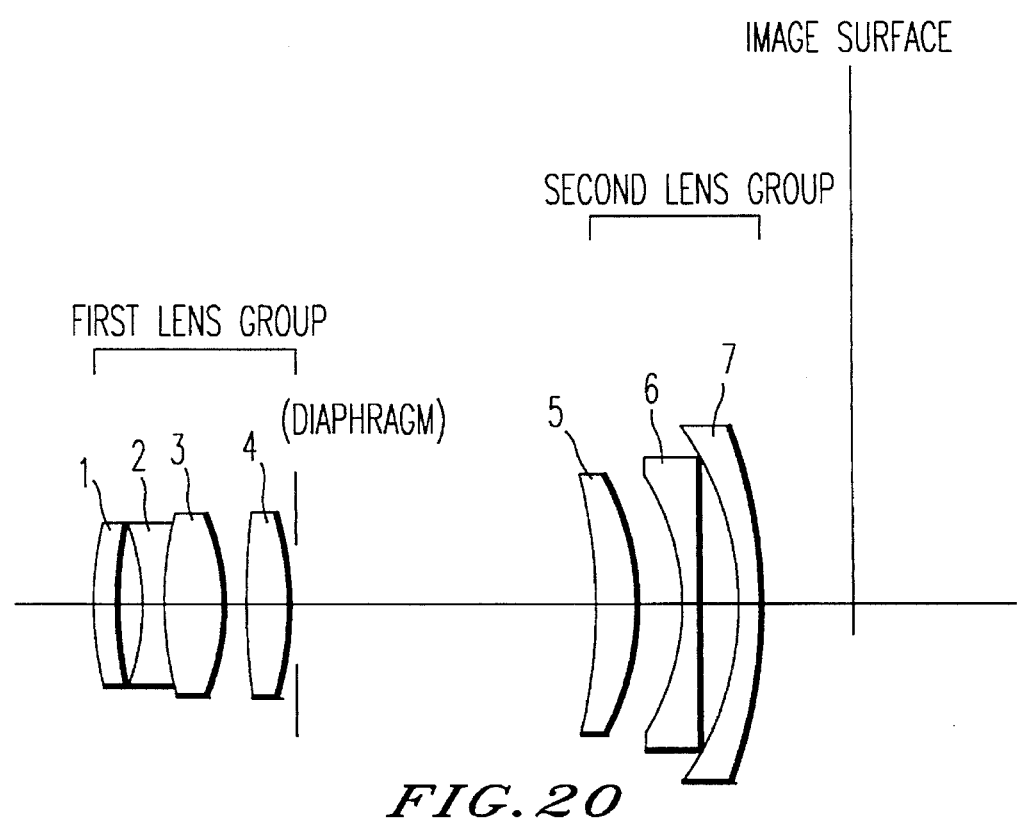
FIG. 20 shows the construction of the zoom lens of a twentieth embodiment.

K = 0.27444, A = –4.97409E–6
B = 1.14880E–8, C = –6.75621E–10,
D = 1.97041E–12
parameter values of the conditions $f_1/f_T = 0.289$, $(d_8 + d_{9T})/f_T = 0.0295$,
$f_2/f_1 = -0.989$, $(r_{12} + r_{13})/(r_{12} - r_{13}) = -1.119$ FIG. 20 shows the construction of the zoom lens of the twentieth embodiment.

Twenty-first embodiment f = 39.1–101.7, F/No = 4.6–9.1 ω = 28.4–12.0 (degrees)

| i | $r_i$ | $d_i$ | j | $n_j$ | $v_j$ |
|---|---|---|---|---|---|
| 1 | 19.107 | 2.10 | 1 | 1.58144 | 40.89 |
| 2 | 50.837 | 1.74 | | | |
| 3 | –16.414 | 1.50 | 2 | 1.88300 | 40.80 |
| 4 | 22.454 | 0.10 | | | |
| 5 | 19.663 | 5.00 | 3 | 1.58913 | 61.25 |
| 6 | –18.564 | 0.65 | | | |
| 7 | 66.295 | 3.24 | 4 | 1.58313 | 59.46 |
| 8 | –21.374 | 0.50 | | | |
| 9 | (diaphragm) | variable | | | |
| 10 | –109.479 | 3.21 | 5 | 1.70154 | 41.15 |
| 11 | –22.334 | 2.78 | | | |
| 12 | –14.298 | 1.50 | 6 | 1.74330 | 49.22 |
| 13 | –380.430 | 3.33 | | | |
| 14 | –20.773 | 1.50 | 7 | 1.51680 | 64.20 |
| 15 | –31.327 | | | | | variable amount

| f | 39.129 | 63.089 | 101.690 |
|---|---|---|---|
| $d_9$ | 16.35 | 7.80 | 2.50 |

Aspherical surface (eighth lens surface)

K = –1.64377, A = 1.52879E–6
B = –6.91771E–8, C = 5.44751E–9,
D = –3.38869E–11
Aspherical surface (eleventh lens surface)

Figure 21:
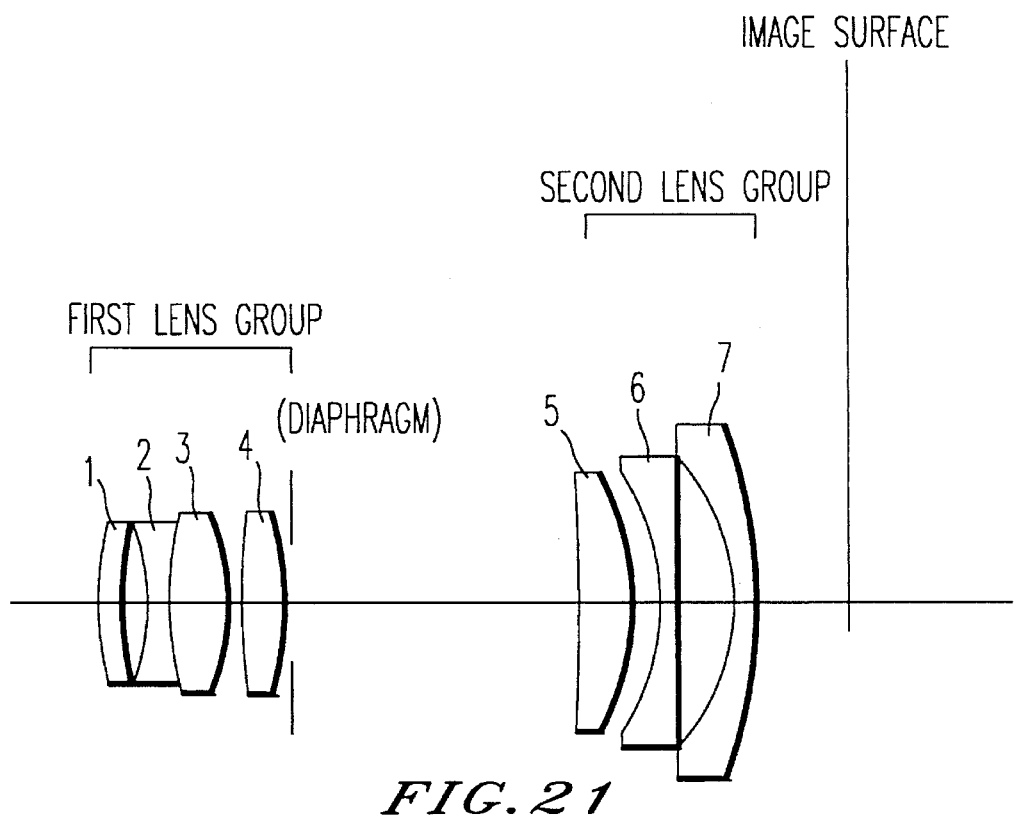
FIG. 21 shows the construction of the zoom lens of a twenty-first embodiment.

K = 0.58382, A = –1.36765E–5
B = 1.40541E–8, C = –1.31303E–9,
D = 4.95622E–12
parameter values of the conditions $f_1/f_T = 0.289$, $(d_8 + d_{9T})/f_T = 0.0295$,
$f_2/f_1 = -1.019$, $(r_{12} + r_{13})/(r_{12} - r_{13}) = -0.928$ FIG. 21 shows the construction of the zoom lens of the twenty-first embodiment.

Twenty-second embodiment f = 39.2 – 102.7, F/No = 4.6 – 9.1
ω = 28.4 – 12.0 (degrees)

| i | $r_i$ | $d_i$ | j | $n_j$ | $v_j$ |
|---|---|---|---|---|---|
| 1 | 17.492 | 2.12 | 1 | 1.56732 | 42.84 |
| 2 | 41.791 | 1.53 | | | |
| 3 | –15.702 | 1.50 | 2 | 1.83500 | 42.98 |
| 4 | 17.199 | 0.10 | | | |
| 5 | 15.851 | 4.57 | 3 | 1.58913 | 61.25 |
| 6 | –16.093 | 0.73 | | | |
| 7 | 67.454 | 3.69 | 4 | 1.58313 | 59.46 |
| 8 | –23.919 | 0.50 | | | |
| 9 | (diaphragm) | variable | | | |
| 10 | –66.431 | 3.02 | 5 | 1.70154 | 41.15 |
| 11 | –21.513 | 3.04 | | | |
| 12 | –14.600 | 1.50 | 6 | 1.74330 | 49.22 |
| 13 | –412.592 | 2.74 | | | |
| 14 | –22.662 | 1.80 | 7 | 1.48749 | 70.44 |
| 15 | –43.322 | | | | | variable amount

| f | 39.157 | 63.199 | 101.993 |
|---|---|---|---|
| $d_9$ | 16.12 | 7.71 | 2.50 |

Aspherical surface (eighth lens surface)

K = –0.74890, A = 1.00234E-5
B = 1.08585E-8, C = 1.88892E-9,
D = 7.66249E-11
Aspherical surface (eleventh lens surface)

Figure 22:
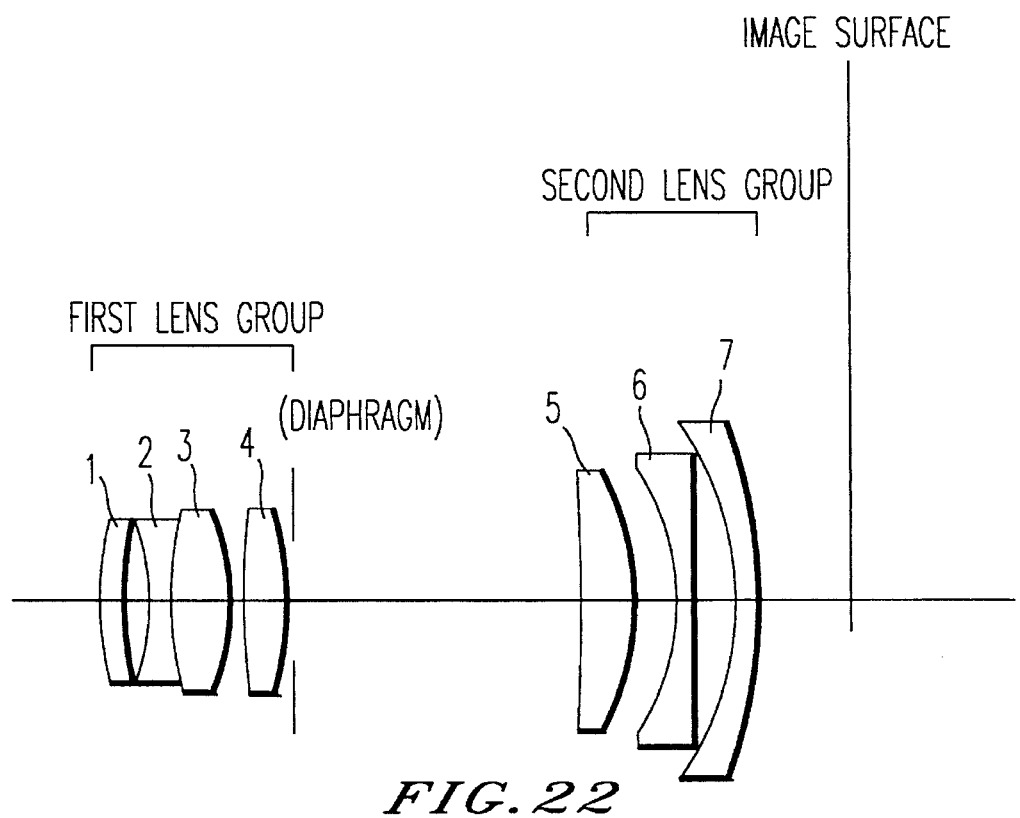
FIG. 22 shows the construction of the zoom lens of a twenty-second embodiment.

K = 0.46689, A = –8.07997E-6
B = –2.81752E-8, C = –3.12182E-10,
D = –9.78419E-13
parameter values of the conditions $f_1/f_T = 0.288$, $(d_8 + d_{9T})/f_T = 0.0294$,
$f_2/f_1 = -1.002$, $(r_{12} + r_{13})/(r_{12} - r_{13}) = -1.073$ FIG. 22 shows the construction of the zoom lens of the twenty-second embodiment.

Twenty-third embodiment f = 39.2 – 102.0, F/No = 4.6 – 9.1
ω = 28.2 – 11.9 (degrees)

| i | $r_i$ | $d_i$ | j | $n_j$ | $v_j$ |
|---|---|---|---|---|---|
| 1 | 17.871 | 1.94 | 1 | 1.58144 | 40.89 |
| 2 | 46.710 | 2.12 | | | |
| 3 | –16.292 | 1.50 | 2 | 1.88300 | 40.80 |
| 4 | 20.761 | 0.10 | | | |
| 5 | 19.169 | 3.82 | 3 | 1.58913 | 61.25 |
| 6 | –21.502 | 0.46 | | | |
| 7 | 64.521 | 3.46 | 4 | 1.58313 | 59.46 |
| 8 | –17.070 | 0.50 | | | |
| 9 | (diaphragm) | variable | | | |
| 10 | –182.110 | 3.40 | 5 | 1.70154 | 41.15 |
| 11 | –20.394 | 1.56 | | | |
| 12 | –17.163 | 1.50 | 6 | 1.74330 | 49.22 |
| 13 | 845.824 | 4.20 | | | |
| 14 | –16.032 | 1.80 | 7 | 1.51068 | 64.20 |
| 15 | –62.870 | | | | | variable amount

| f | 39.161 | 63.195 | 102.027 |
|---|---|---|---|
| $d_9$ | 15.51 | 7.48 | 2.50 |

Aspherical surface (eighth lens surface)

K = –1.32790, A = –3.19583E-6
B = –6.80721E-8, C = 4.78853E-9,
D = –5.41071E-11
Aspherical surface (tenth lens surface)

K = –138.07521, A = 1.33881E-5
B = 2.41135E-7, C = –1.01457E-9,
D = –5.46551E-11
Aspherical surface (eleventh lens surface)

Figure 23:
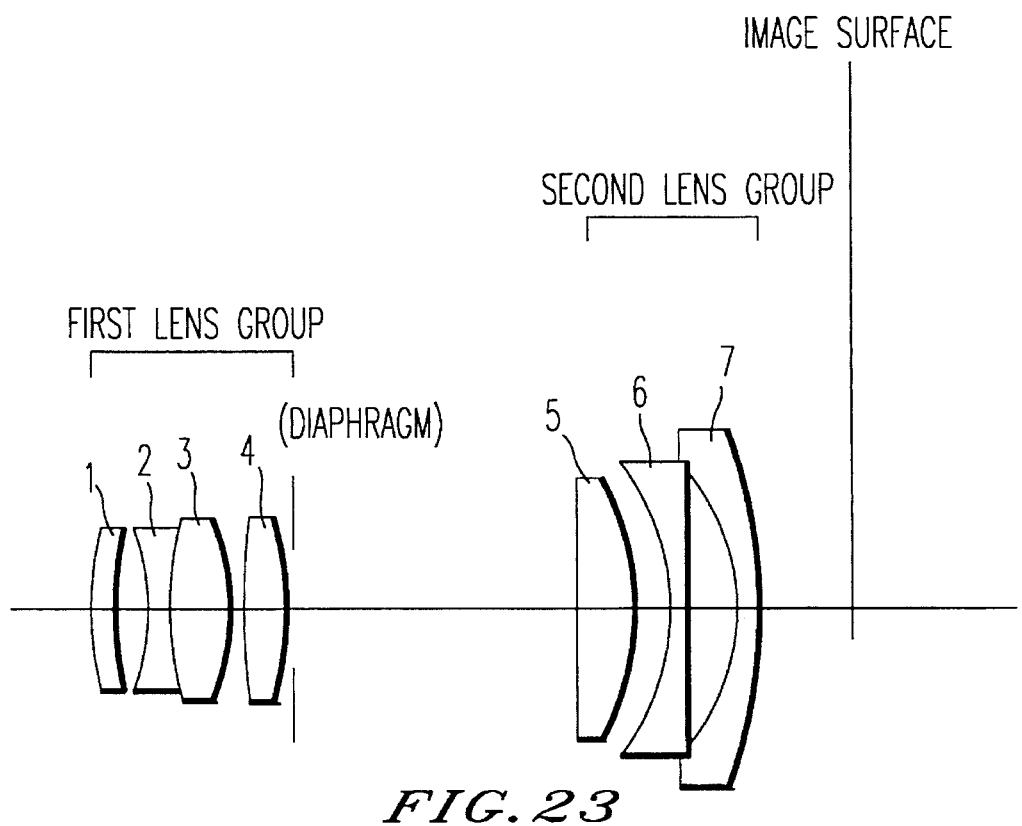
FIG. 23 shows the construction of the zoom lens of a twenty-third embodiment.

K = –0.28454, A = 3.90236E-6
B = 1.78823E-7, C = 8.07859E-10,
D = –6.49043E-11
parameter values of the conditions $f_1/f_T = 0.288$, $(d_8 + d_{9T})/f_T = 0.0294$,
$f_2/f_1 = -0.957$, $(r_{12} + r_{13})/(r_{12} - r_{13}) = -0.960$ FIG. 23 shows the construction of the zoom lens of the twenty-third embodiment.

Twenty-fourth embodiment $f = 39.1 - 101.8$, F/No = 4.6 – 9.2
$\omega = 28.5 - 12.0$ (degrees)

| i | $r_i$ | $d_i$ | j | $n_j$ | $v_j$ |
|---|---|---|---|---|---|
| 1 | 17.467 | 2.24 | 1 | 1.56732 | 42.84 |
| 2 | 58.122 | 1.27 | | | |
| 3 | –17.648 | 1.50 | 2 | 1.83500 | 42.98 |
| 4 | 15.043 | 0.10 | | | |
| 5 | 14.122 | 4.08 | 3 | 1.58913 | 61.25 |
| 6 | –19.856 | 1.62 | | | |
| 7 | 100.200 | 2.94 | 4 | 1.58313 | 59.46 |
| 8 | –19.697 | 0.50 | | | |
| 9 | (diaphragm) | variable | | | |
| 10 | –110.330 | 3.12 | 5 | 1.70200 | 40.20 |
| 11 | –23.730 | 2.92 | | | |
| 12 | –13.632 | 1.50 | 6 | 1.74330 | 49.22 |
| 13 | –342.932 | 2.43 | | | |
| 14 | –25.042 | 1.80 | 7 | 1.48749 | 70.44 |
| 15 | –49.937 | | | | |
| | variable amount | | | | |

| f | 39.132 | 63.104 | 101.772 |
|---|---|---|---|
| $d_9$ | 15.64 | 7.53 | 2.50 |

Aspherical surface (eighth lens surface)

K = –0.68447, A = 8.48262E-6
B = 1.45104E-8, C = 1.88716E-9.1
D = 8.30577E-11
Aspherical surface (tenth lens surface)

K = –80.53784, A = 1.51047E-5
B = 2.25699E-7, C = –1.88068E-9,
D = 2.59669E-12
Aspherical surface (eleventh lens surface)

Figure 24:
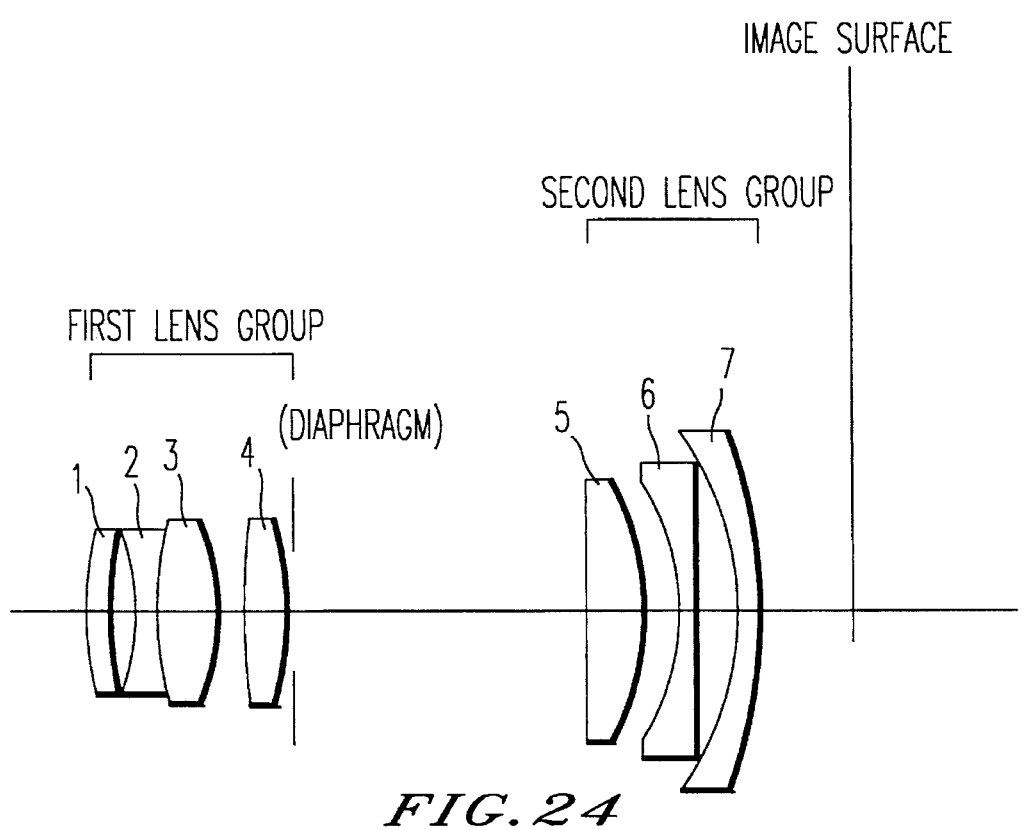
FIG. 24 shows the construction of the zoom lens of a twenty-fourth embodiment.

K = –0.06054, A = –1.61761E-6
B = 7.18922E-8, C = –1.01346E-9,
D = –7.81925E-12
parameter values of the conditions $f_1/f_T = 0.289$, $(d_8 + d_{9T})/f_T = 0.0295$,
$f_2/f_1 = -0.966$, $(r_{12} + r_{13})/(r_{12} - r_{13}) = -1.083$ FIG. 24 shows the construction of the zoom lens of the twenty-fourth embodiment.

The twenty-fifth–thirty-second embodiments described below are the embodiments of the zoom lenses as described in claims 47–62. The numbering of $r_i$, $d_i$, $n_j$ and $j$ is the same as that of FIG. 9.

Twenty-fifth embodiment $f = 39.1 - 101.8$, F/No = 4.6 – 9.0
$\omega = 28.3 - 12.0$ (degrees)

| i | $r_i$ | $d_i$ | j | $n_j$ | $v_j$ |
|---|---|---|---|---|---|
| 1 | 16.996 | 1.85 | 1 | 1.62004 | 36.30 |
| 2 | 32.610 | 1.75 | | | |
| 3 | –18.461 | 1.50 | 2 | 1.88300 | 40.80 |
| 4 | 24.818 | 4.20 | 3 | 1.58913 | 61.25 |
| 5 | –22.203 | 0.92 | | | |
| 6 | 53.254 | 3.78 | 4 | 1.48749 | 70.44 |
| 7 | –15.164 | 0.50 | | | |
| 8 | (diaphragm) | variable | | | |
| 9 | –70.883 | 3.03 | 5 | 1.78590 | 43.93 |
| 10 | –20.945 | 2.29 | | | |
| 11 | –15.738 | 1.50 | 6 | 1.71300 | 53.94 |
| 12 | 756.482 | 3.76 | | | |
| 13 | –18.130 | 1.80 | 7 | 1.48749 | 70.44 |
| 14 | –50.979 | | | | |

-continued

Twenty-fifth embodiment variable amount

| f | 39.134 | 63.089 | 101.783 |
|---|---|---|---|
| $d_9$ | 15.89 | 7.63 | 2.50 |

Aspherical surface (fifth lens surface)

K = –2.54784, A = 1.53201E-5
B = 6.92263E-8, C = 6.35961E-9,
D = –4.02990.E-11
Aspherical surface (tenth lens surface)

Figure 25:
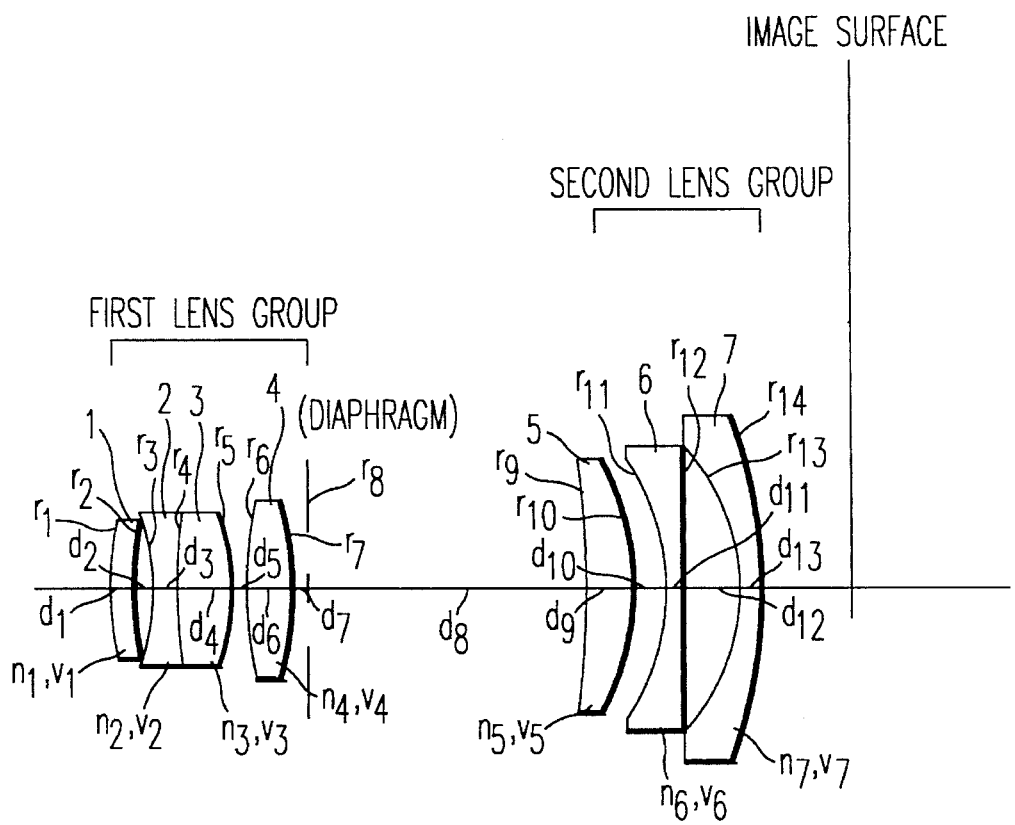
FIG. 25 shows the construction of the zoom lens of a twenty-fifth embodiment.

K = 0.27493, A = –5.23876E-6
B = 1.82076E-8, C = –8.14736E-10,
D = 3.28204E-12
parameter values of the conditions $f_1/f_T = 0.289$, $(d_7 + d_{8T})/f_T = 0.0295$,
$f_2/f_1 = -0.985$, $(r_{11} + r_{12})/(r_{11} - r_{12}) = -0.959$ FIG. 25 shows the construction of the zoom lens of the twenty-fifth embodiment.

Twenty-sixth embodiment $f = 39.1 - 101.8$, F/No = 4.6 – 8.9
$\omega = 28.4 - 12.0$ (degrees)

| i | $r_i$ | $d_i$ | j | $n_j$ | $v_j$ |
|---|---|---|---|---|---|
| 1 | 14.953 | 2.17 | 1 | 1.56732 | 42.84 |
| 2 | 29.138 | 1.82 | | | |
| 3 | –17.728 | 1.50 | 2 | 1.83500 | 42.98 |
| 4 | 14.462 | 4.18 | 3 | 1.58913 | 61.25 |
| 5 | –21.904 | 0.70 | | | |
| 6 | 57.954 | 3.50 | 4 | 1.58313 | 59.46 |
| 7 | –17.410 | 0.50 | | | |
| 8 | (diaphragm) | variable | | | |
| 9 | –83.199 | 3.36 | 5 | 1.70154 | 41.15 |
| 10 | –19.983 | 2.46 | | | |
| 11 | –13.845 | 1.50 | 6 | 1.74330 | 49.22 |
| 12 | –426.128 | 2.94 | | | |
| 13 | –21.051 | 1.80 | 7 | 1.51680 | 64.20 |
| 14 | –42.895 | | | | |
| | variable amount | | | | |

| f | 39.135 | 63.140 | 101.834 |
|---|---|---|---|
| $d_9$ | 15.99 | 7.66 | 2.50 |

Aspherical surface (fifth lens surface)

K = –0.45927, A = 1.15156E-5
B = –6.42690E-8, C = 2.95151E-9,
D = –1.90111.E-11
Aspherical surface (tenth lens surface)

Figure 26:
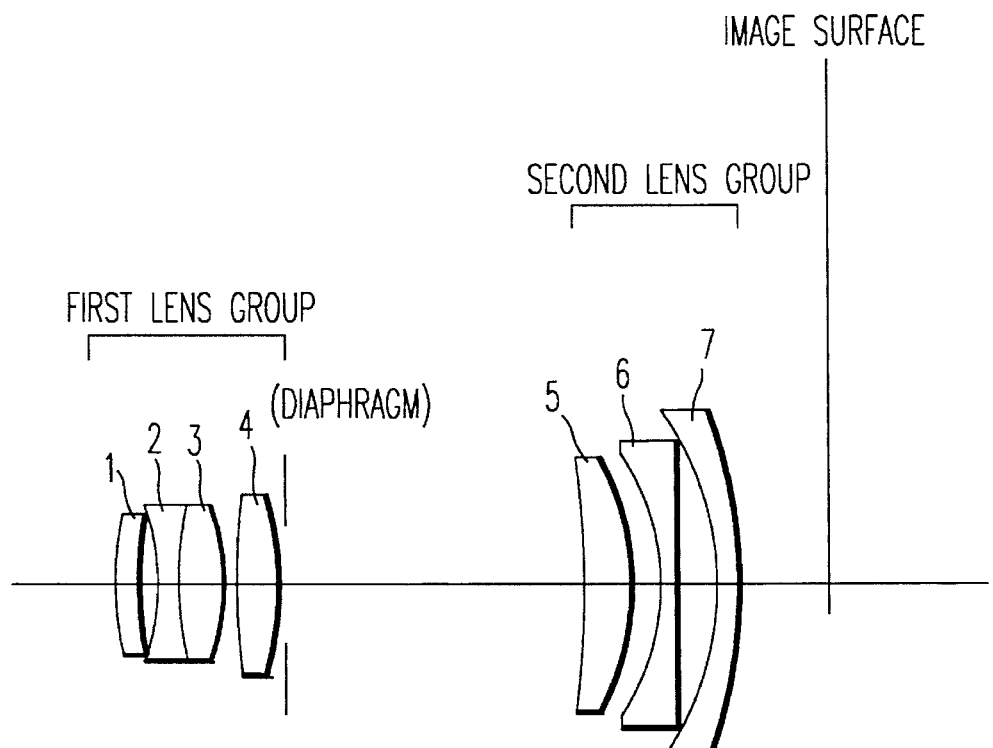
FIG. 26 shows the construction of the zoom lens of a twenty-sixth embodiment.

K = 0.52940, A = –9.19464E-6
B = –4.02511E-8, C = –7.62756E-10,
D = 2.37350E-12
parameter values of the conditions $f_1/f_T = 0.289$, $(d_7 + d_{8T})/f_T = 0.0295$,
$f_2/f_1 = -0.992$, $(r_{11} + r_{12})/(r_{11} - r_{12}) = -1.067$ FIG. 26 shows the construction of the zoom lens of the twenty-sixth embodiment.

Twenty-seventh embodiment $f = 39.1 - 101.9$, F/No = 4.6 – 9.0
$\omega = 28.4 - 12.0$ (degrees)

| i | $r_i$ | $d_i$ | j | $n_j$ | $v_j$ |
|---|---|---|---|---|---|
| 1 | 13.481 | 2.05 | 1 | 1.60342 | 38.01 |
| 2 | 20.084 | 1.97 | | | |
| 3 | –16.014 | 1.50 | 2 | 1.88300 | 40.80 |

Twenty-seventh embodiment -continued

| | | | | | |
|---|---|---|---|---|---|
| 4 | 21.455 | 3.86 | 3 | 1.58913 | 61.25 |
| 5 | −18.712 | 0.10 | | | |
| 6 | 46.331 | 3.73 | 4 | 1.58319 | 61.25 |
| 7 | −18.139 | 0.50 | | | |
| 8 | (diaphragm) | variable | | | |
| 9 | −93.424 | 3.41 | 5 | 1.70200 | 40.20 |
| 10 | −19.861 | 2.30 | | | |
| 11 | −14.289 | 1.50 | 6 | 1.77250 | 49.62 |
| 12 | −392.408 | 3.18 | | | |
| 13 | −19.337 | 1.80 | 7 | 1.48749 | 70.44 |
| 14 | −40.376 | | | | |
| | variable amount | | | | |

| f | 39.130 | 63.136 | 101.915 |
|---|---|---|---|
| $d_9$ | 16.11 | 7.71 | 2.50 |

Aspherical surface (sixth lens surface)

$K = -8.12342$, $A = -1.53469E-5$
$B = -5.12555E-8$, $C = -3.74477E-10$,
$D = -3.24038.E-12$
Aspherical surface (tenth lens surface)

Figure 27:
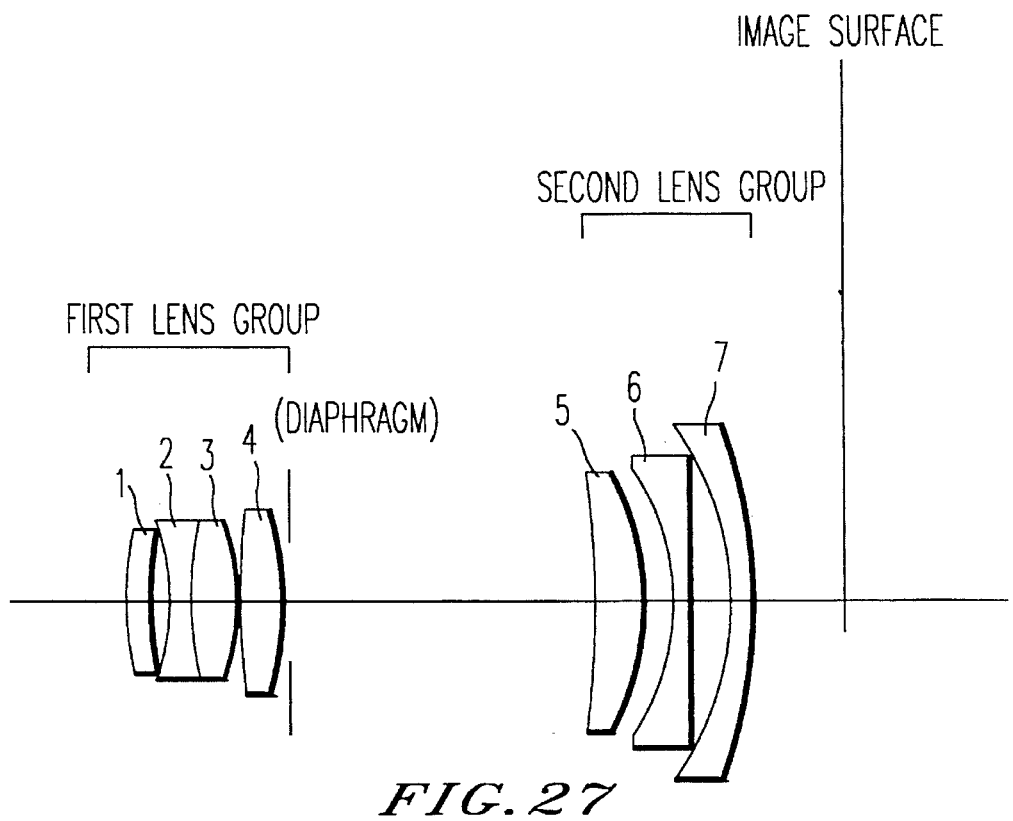
FIG. 27 shows the construction of the zoom lens of a twenty-seventh embodiment.

$K = 0.40866$, $A = -7.12913E-6$
$B = -1.57131E-7$, $C = 1.36470E-9$,
$D = -9.31870E-12$
parameter values of the conditions $f_1/f_T = 0.288$, $(d_7 + d_{8T})/f_T = 0.0294$,
$f_2/f_1 = -1.001$, $(r_{11} + r_{12})/(r_{11} - r_{12}) = -1.076$ FIG. 27 shows the construction of the zoom lens of the twenty-seventh embodiment.

Twenty-eighth embodiment $f = 39.1 - 101.8$, $F/No = 4.6 - 8.9$
$\omega = 28.4 - 12.0$ (degrees)

| i | $r_i$ | $d_i$ | j | $n_j$ | $v_j$ |
|---|---|---|---|---|---|
| 1 | 13.612 | 2.18 | 1 | 1.56732 | 42.84 |
| 2 | 23.137 | 1.98 | | | |
| 3 | −17.968 | 1.50 | 2 | 1.83500 | 42.98 |
| 4 | 13.650 | 4.75 | 3 | 1.58913 | 61.25 |
| 5 | −22.258 | 0.21 | | | |
| 6 | 43.816 | 3.50 | 4 | 1.58319 | 59.46 |
| 7 | −18.685 | 0.50 | | | |
| 8 | (diaphragm) | variable | | | |
| 9 | −82.390 | 3.40 | 5 | 1.70154 | 41.15 |
| 10 | −19.288 | 2.28 | | | |
| 11 | −14.044 | 1.50 | 6 | 1.74330 | 49.22 |
| 12 | −353.570 | 3.15 | | | |
| 13 | −19.282 | 1.80 | 7 | 1.51680 | 64.20 |
| 14 | −42.958 | | | | |
| | variable amount | | | | |

| f | 39.137 | 63.158 | 101.838 |
|---|---|---|---|
| $d_9$ | 15.92 | 7.63 | 2.50 |

Aspherical surface (sixth lens surface)

$K = 11.23828$, $A = -2.90313E-5$
$B = -2.38701E-8$, $C = -6.58938E-10$,
$D = -1.01875.E-12$
Aspherical surface (tenth lens surface)

Figure 28:
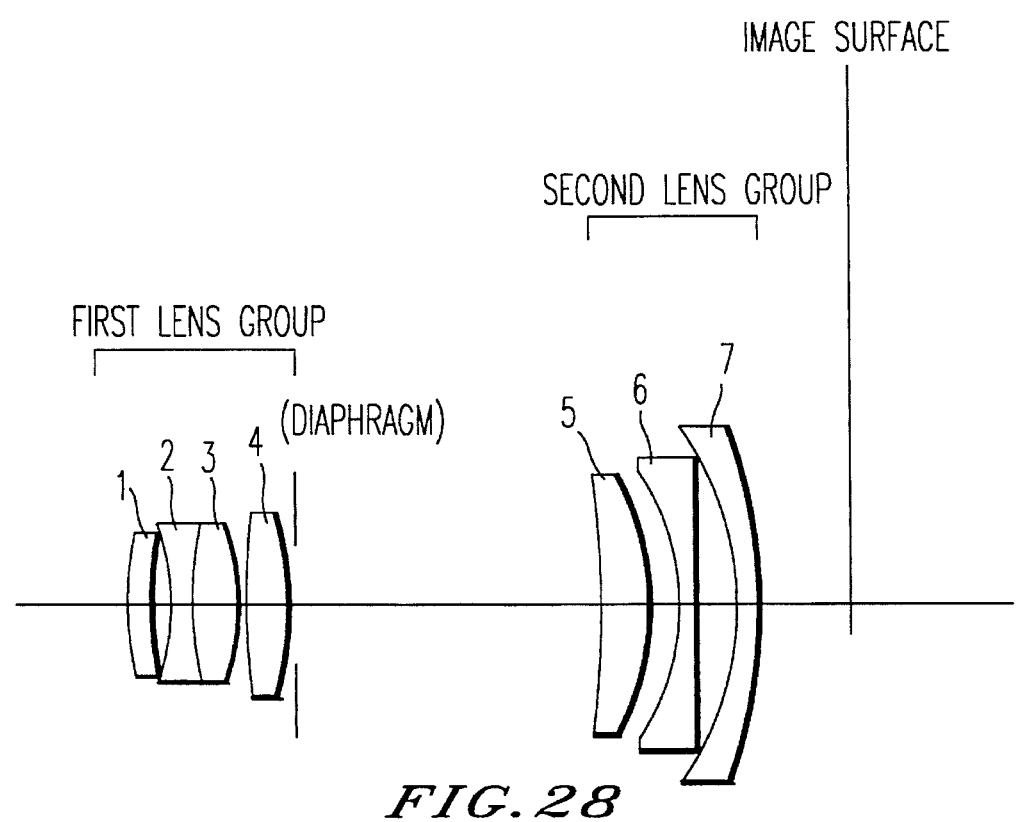
FIG. 28 shows the construction of the zoom lens of a twenty-eighth embodiment.

$K = 0.39653$, $A = -6.06292E-6$
$B = -1.33434E-7$, $C = 9.64736E-10$,
$D = -6.83045E-12$
parameter values of the conditions $f_1/f_T = 0.289$, $(d_7 + d_{8T})/f_T = 0.0295$,
$f_2/f_1 = -0.987$, $(r_{11} + r_{12})/(r_{11} - r_{12}) = -1.083$ FIG. 28 shows the construction of the zoom lens of the twenty-eighth embodiment.

Twenty-ninth embodiment $f = 39.1 - 101.7$, $F/No = 4.6 - 8.9$
$\omega = 28.4 - 12.0$ (degrees)

| i | $r_i$ | $d_i$ | j | $n_j$ | $v_j$ |
|---|---|---|---|---|---|
| 1 | 16.267 | 2.16 | 1 | 1.58144 | 40.89 |
| 2 | 36.470 | 1.78 | | | |
| 3 | −17.389 | 1.50 | 2 | 1.88300 | 40.80 |
| 4 | 20.571 | 4.84 | 3 | 1.58913 | 61.25 |
| 5 | −20.112 | 0.68 | | | |
| 6 | 57.801 | 3.37 | 4 | 1.58313 | 59.46 |
| 7 | −19.086 | 0.50 | | | |
| 8 | (diaphragm) | variable | | | |
| 9 | −92.285 | 3.40 | 5 | 1.70154 | 41.15 |
| 10 | −19.919 | 2.35 | | | |
| 11 | −14.060 | 1.50 | 6 | 1.74330 | 49.22 |
| 12 | −706.221 | 3.14 | | | |
| 13 | −19.981 | 1.80 | 7 | 1.51680 | 64.20 |
| 14 | −42.252 | | | | |
| | variable amount | | | | |

| f | 39.125 | 63.107 | 101.720 |
|---|---|---|---|
| $d_9$ | 15.94 | 7.64 | 2.50 |

Aspherical surface (seventh lens surface)

$K = -1.11658$, $A = -4.73081E-6$
$B = -1.08732E-7$, $C = 4.41677E-9$,
$D = -4.33579.E-11$
Aspherical surface (tenth lens surface)

Figure 29:
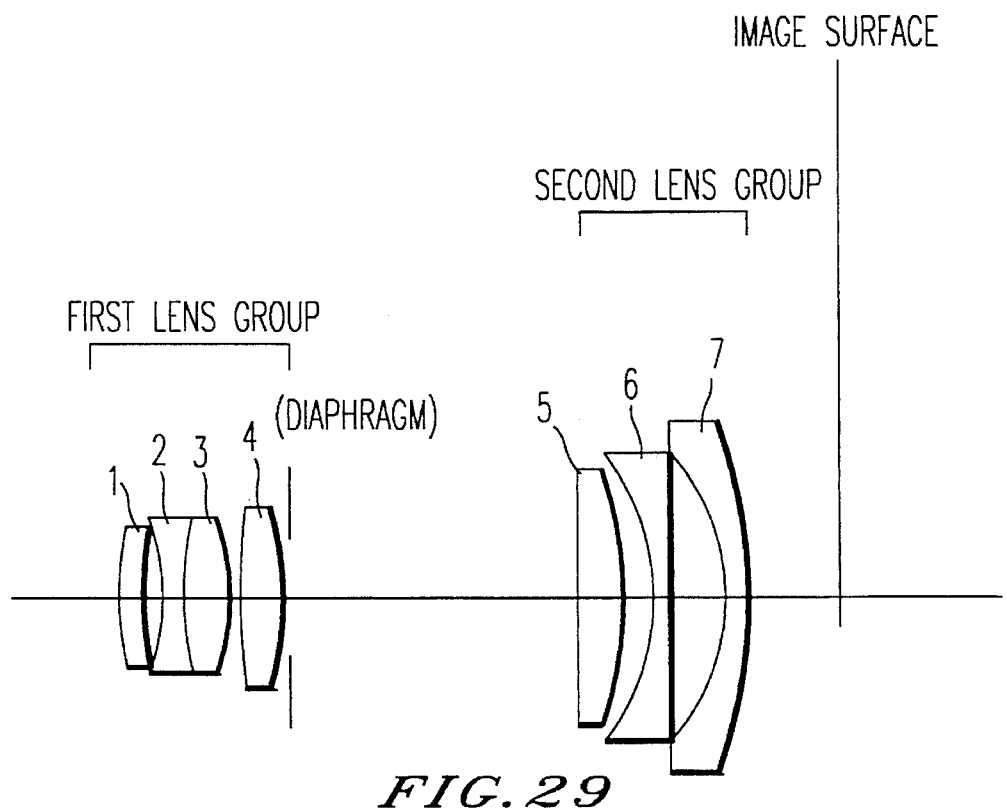
FIG. 29 shows the construction of the zoom lens of a twenty-ninth embodiment.

$K = 0.39514$, $A = -9.82100E-6$
$B = -5.42638E-7$, $C = -9.14917E-10$,
$D = 4.48008E-12$
parameter values of the conditions $f_1/f_T = 0.289$, $(d_7 + d_{8T})/f_T = 0.0295$,
$f_2/f_1 = -0.989$, $(r_{11} + r_{12})/(r_{11} - r_{12}) = -1.041$ FIG. 29 shows the construction of the zoom lens of the twenty-ninth embodiment.

Thirtieth embodiment $f = 39.1 - 101.9$, $F/No = 4.6 - 8.9$
$\omega = 28.4 - 12.0$ (degrees)

| i | $r_i$ | $d_i$ | j | $n_j$ | $v_j$ |
|---|---|---|---|---|---|
| 1 | 15.368 | 2.16 | 1 | 1.56732 | 42.84 |
| 2 | 30.650 | 1.94 | | | |
| 3 | −16.770 | 1.50 | 2 | 1.83500 | 42.98 |
| 4 | 14.901 | 4.19 | 3 | 1.58913 | 61.25 |
| 5 | −20.709 | 0.57 | | | |
| 6 | 59.096 | 3.50 | 4 | 1.58313 | 59.46 |
| 7 | −17.851 | 0.50 | | | |
| 8 | (diaphragm) | variable | | | |
| 9 | −103.576 | 3.41 | 5 | 1.70154 | 41.15 |
| 10 | −20.387 | 2.40 | | | |
| 11 | −13.836 | 1.50 | 6 | 1.74330 | 49.22 |
| 12 | −3240.648 | 3.06 | | | |
| 13 | −20.932 | 1.80 | 7 | 1.48749 | 70.44 |
| 14 | −43.398 | | | | |
| | variable amount | | | | |

| f | 39.121 | 63.122 | 101.889 |
|---|---|---|---|
| $d_9$ | 15.98 | 7.66 | 2.50 |

Aspherical surface (seventh lens surface)

$K = -0.23581$, $A = 6.59087E-6$
$B = -1.33076E-7$, $C = 3.42072E-9$,
$D = -3.50817E-11$
Aspherical surface (tenth lens surface)

$K = 0.60073$, $A = -1.02256E-5$

Thirtieth embodiment

Figure 30:
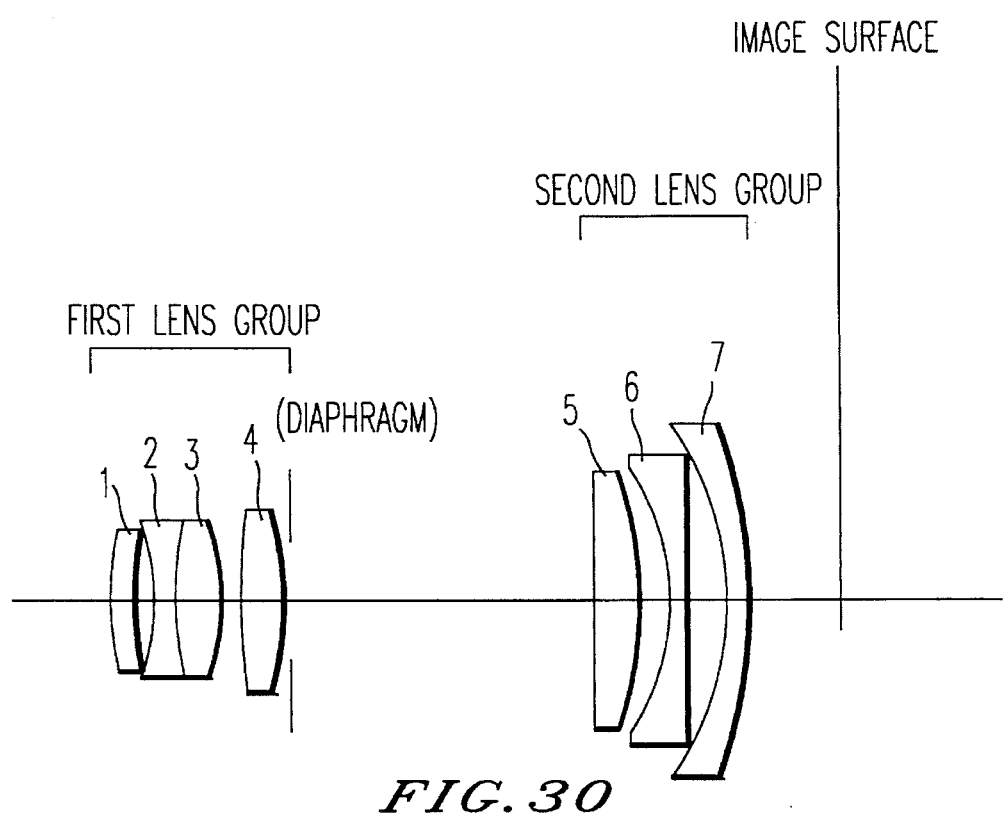
FIG. 30 shows the construction of the zoom lens of a thirtieth embodiment.

B = −4.96667E-8, C = −7.41601E-10,
D = 2.58173E-12
parameter values of the conditions $f_1/f_T = 0.289$, $(d_7 + d_{8T})/f_T = 0.0294$,
$f_2/f_1 = -0.991$, $(r_{11} + r_{12})/(r_{11} - r_{12}) = -1.009$ FIG. 30 shows the construction of the zoom lens of the thirtieth embodiment.

Thirty-first embodiment f = 39.2 − 102.0, F/No = 4.6 − 8.9
ω = 28.4 − 12.0 (degrees)

| i | $r_i$ | $d_i$ | j | $n_j$ | $v_j$ |
|---|---|---|---|---|---|
| 1 | 16.525 | 2.09 | 1 | 1.58144 | 40.89 |
| 2 | 33.908 | 1.83 | | | |
| 3 | −15.646 | 1.50 | 2 | 1.88300 | 40.80 |
| 4 | 20.854 | 3.19 | 3 | 1.58913 | 61.25 |
| 5 | −19.888 | 0.70 | | | |
| 6 | 57.010 | 3.53 | 4 | 1.58313 | 59.46 |
| 7 | −16.737 | 0.50 | | | |
| 8 | (diaphragm) | variable | | | |
| 9 | −195.265 | 3.48 | 5 | 1.70154 | 41.15 |
| 10 | −20.371 | 1.58 | | | |
| 11 | −16.226 | 1.50 | 6 | 1.74330 | 49.22 |
| 12 | 39.303 | 3.98 | | | |
| 13 | −15.753 | 1.80 | 7 | 1.51680 | 64.20 |
| 14 | −44.861 | | | | |
| variable amount | | | | | |

| f | 39.166 | 63.209 | 101.964 |
|---|---|---|---|
| $d_9$ | 15.68 | 7.54 | 2.50 |

Aspherical surface (seventh lens surface)

K = −1.22940, A = −5.48964E-6
B = −1.09334E-7, C = 3.40401E-9,
D = −4.76263E-11
Aspherical surface (ninth lens surface)

K = −321.63790, A = 1.55055E-5
B = 2.07266E-7, C = −8.23575E-10,
D = −2.01648E-11
Aspherical surface (tenth lens surface)

Figure 31:
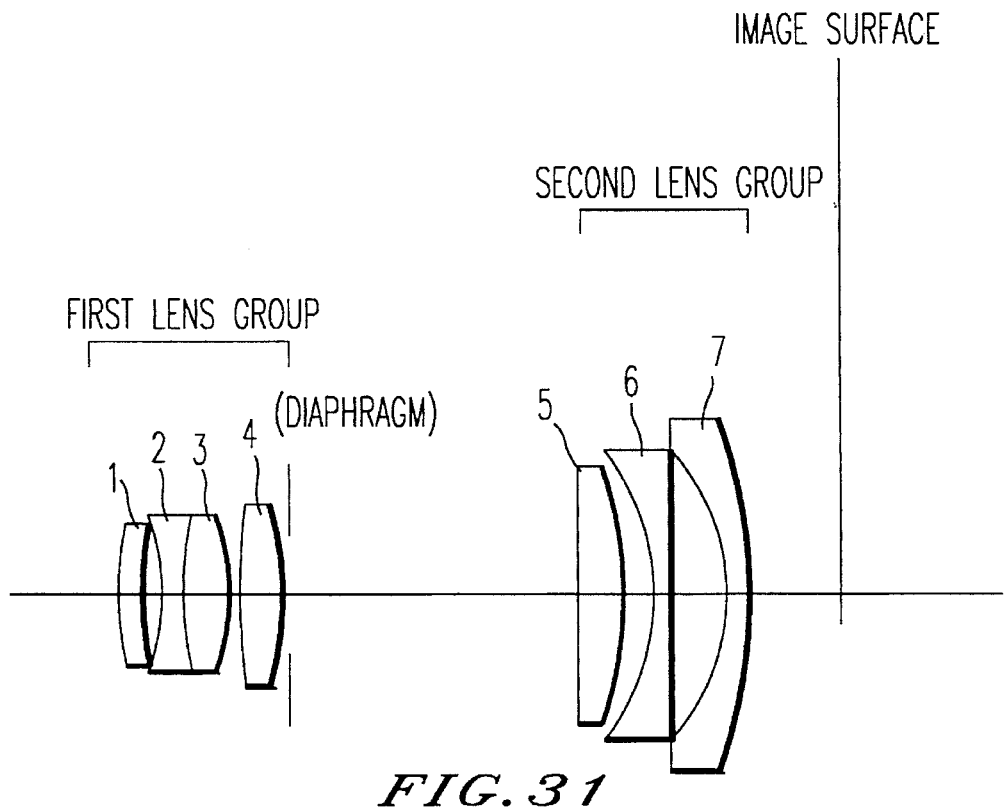
FIG. 31 shows the construction of the zoom lens of a thirty-first embodiment.

K = −0.29321, A = 4.36102E-6
B = 8.76323E-8, C = 5.04052E-10,
D = −2.95139E-11
parameter values of the conditions $f_1/f_T = 0.288$, $(d_7 + d_{8T})/f_T = 0.0294$,
$f_2/f_1 = -0.969$, $(r_{11} + r_{12})/(r_{11} - r_{12}) = -0.950$ FIG. 31 shows the construction of the zoom lens of the thirty-first embodiment.

Thirty-second embodiment f = 39.1 − 101.9, F/No = 4.6 − 8.9
ω = 28.4 − 12.0 (degrees)

| i | $r_i$ | $d_i$ | j | $n_j$ | $v_j$ |
|---|---|---|---|---|---|
| 1 | 15.487 | 2.18 | 1 | 1.56732 | 42.84 |
| 2 | 34.102 | 1.43 | | | |
| 3 | −17.955 | 1.50 | 2 | 1.83500 | 42.98 |
| 4 | 15.669 | 3.58 | 3 | 1.58913 | 61.25 |
| 5 | −21.711 | 1.45 | | | |
| 6 | 59.650 | 3.37 | 4 | 1.58313 | 59.46 |
| 7 | −18.281 | 0.50 | | | |
| 8 | (diaphragm) | variable | | | |
| 9 | −129.200 | 3.33 | 5 | 1.70200 | 40.20 |
| 10 | −22.505 | 2.64 | | | |
| 11 | −13.068 | 1.50 | 6 | 1.74330 | 49.22 |
| 12 | −430.928 | 2.50 | | | |
| 13 | −24.780 | 1.80 | 7 | 1.48749 | 70.44 |
| 14 | −48.116 | | | | |
| variable amount | | | | | |

| f | 39.144 | 63.142 | 101.899 |
|---|---|---|---|
| $d_9$ | 15.69 | 7.55 | 2.50 |

Aspherical surface (seventh lens surface)

K = −0.43880, A = 4.76022E-6
B = −1.64739E-7, C = 4.38222E-9,
D = −5.48323E-11
Aspherical surface (ninth lens surface)

K = −62.65354, A = 1.52319E-5
B = 1.76511E-7, C = −1.40022E-9,
D = 1.54275E-11
Aspherical surface (tenth lens surface)

Figure 32:
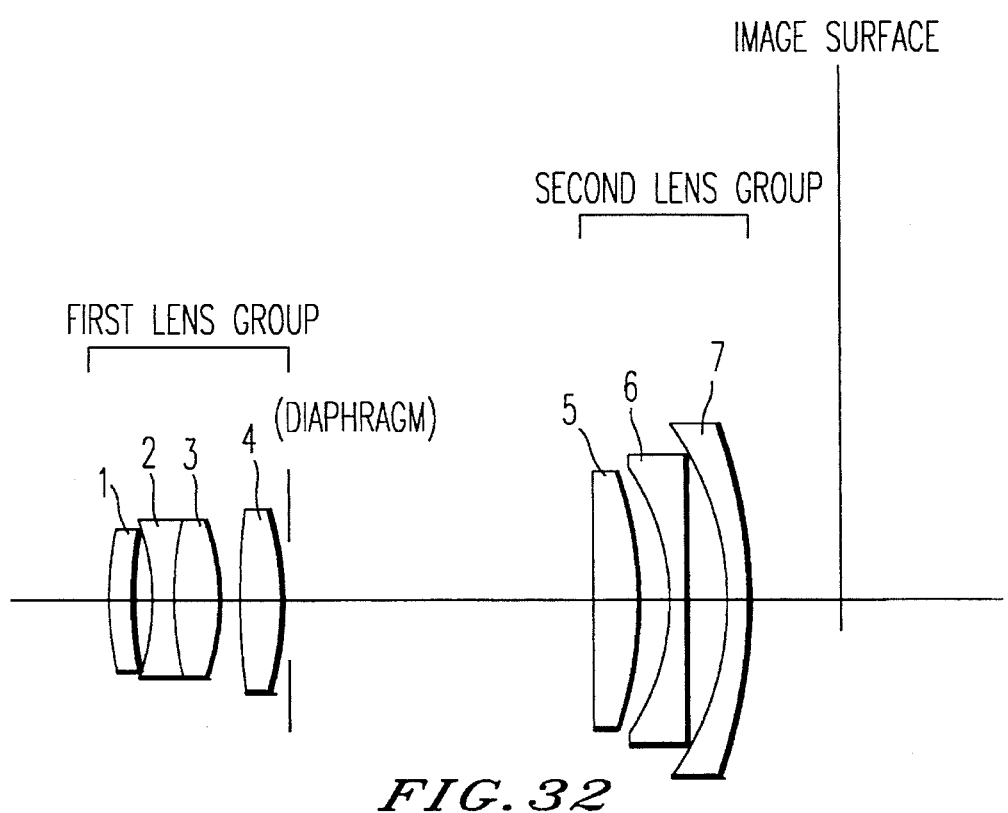
FIG. 32 shows the construction of the zoom lens of a thirty-second embodiment.

K = 0.27526, A = −5.56274E-6
B = 7.50615E-8, C = −2.48742E-9,
D = 1.65569E-11
parameter values of the conditions $f_1/f_T = 0.289$, $(d_7 + d_{8T})/f_T = 0.0294$,
$f_2/f_1 = -0.970$, $(r_{11} + r_{12})/(r_{11} - r_{12}) = -1.063$ FIG. 32 shows the construction of the zoom lens of the thirty-second embodiment.

FIGS. 33a–35a explain aberrations which occur in the first embodiment. FIGS. 33a–c relate to a lens arrangement characterized by the shortest focal length; FIGS. 34a–c relate to a lens arrangement characterized by the intermediate focal length; FIGS. 35a–c relate to a lens arrangement characterized by the longest focal length.

FIGS. 36a–38c explain aberrations which occur in the second embodiment. FIGS. 36a–c relate to a lens arrangement characterized by the shortest focal length; FIGS. 37a–c relate to a lens arrangement characterized by the intermediate focal length; FIGS. 38a–c relate to a lens arrangement characterized by the longest focal length.

Figures 41A, 41B, 41C:
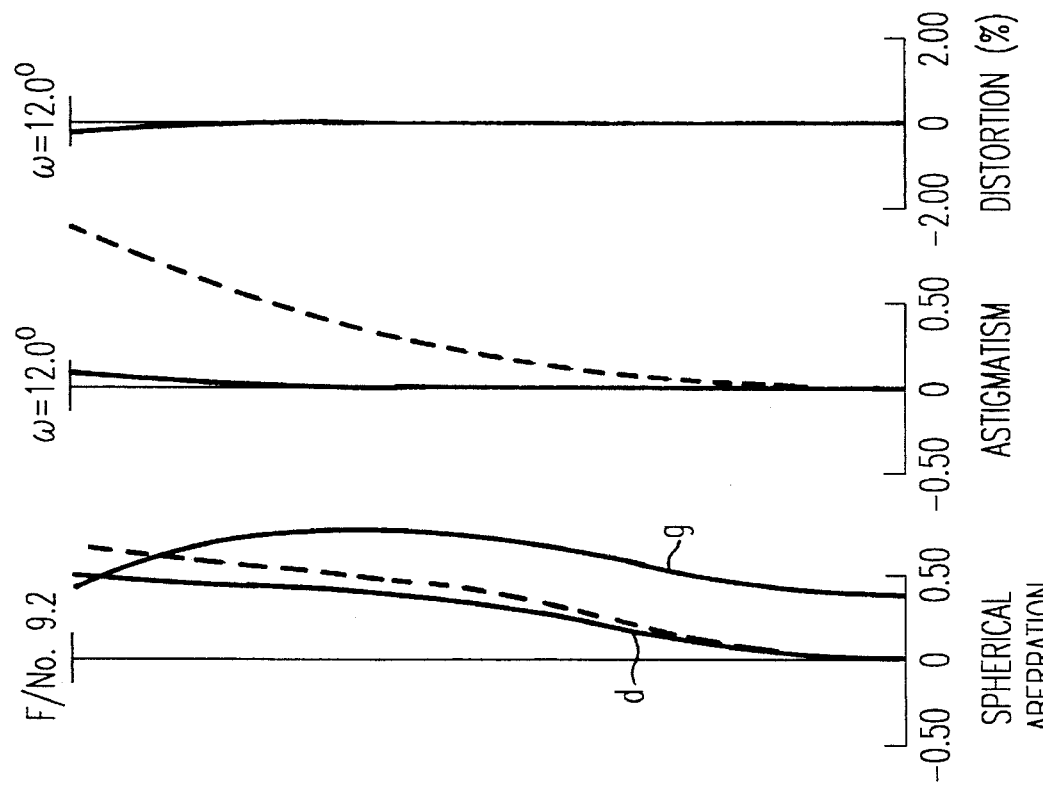
FIGS. 41a–c explain aberrations which occur when the zoom lens of the third embodiment is in a lens arrangement characterized by the longest focal length.

FIGS. 39a–41c explain aberrations which occur in the third embodiment. FIGS. 39a–c relate to a lens arrangement characterized by the shortest focal length; FIGS. 40a–c relate to a lens arrangement characterized by the intermediate focal length; FIGS. 41a–c relate to a lens arrangement characterized by the longest focal length.

Figures 42A, 42B, 42C:
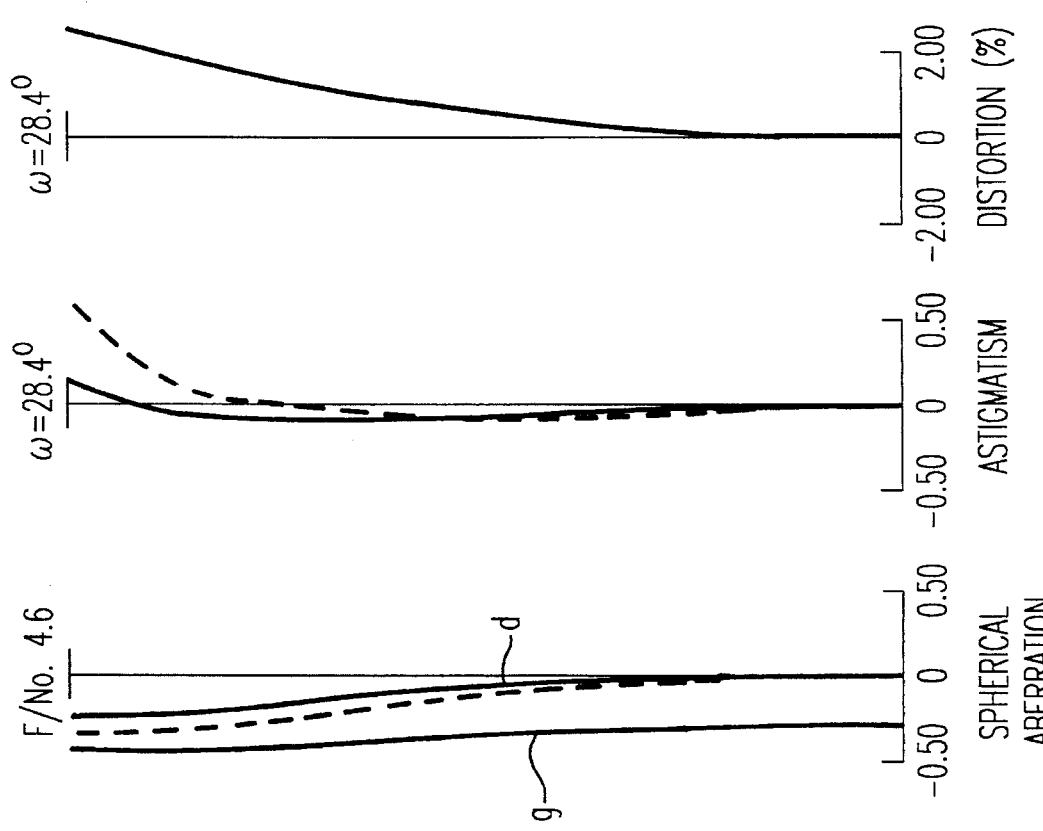
FIGS. 42a–c explain aberrations which occur when the zoom lens of the fourth embodiment is in a lens arrangement characterized by the shortest focal length.

FIGS. 42a–44c explain aberrations which occur in the fourth embodiment. FIGS. 42a–c relate to a lens arrangement characterized by the shortest focal length; FIGS. 43a–c relate to a lens arrangement characterized by the intermediate focal length; FIGS. 44a–c relate to a lens arrangement characterized by the longest focal length.

FIGS. 45a–47c explain aberrations which occur in the fifth embodiment. FIGS. 45a–c relate to a lens arrangement characterized by the shortest focal length; FIGS. 46a–c relate to a lens arrangement characterized by the intermediate focal length; FIGS. 47a–c relate to a lens arrangement characterized by the longest focal length.

FIGS. 48a–50c explain aberrations which occur in the sixth embodiment. FIGS. 48a–c relate to a lens arrangement characterized by the shortest focal length; FIG. 49 relates to a lens arrangement characterized by the intermediate focal length; FIGS. 50a–c relate to a lens arrangement characterized by the longest focal length.

FIGS. 51a–53c explain aberrations which occur in the seventh embodiment. FIGS. 51a–c relate to a lens arrangement characterized by the shortest focal length; FIGS. 52a–c relate to a lens arrangement characterized by the intermediate focal length; FIGS. 53a–c relate to a lens arrangement characterized by the longest focal length.

FIGS. 54a–56c explain aberrations which occur in the eighth embodiment. FIGS. 54a–c relate to a lens arrangement characterized by the shortest focal length; FIGS. 55a–c relate to a lens arrangement characterized by the intermediate focal length; FIGS. 56a–c relate to a lens arrangement characterized by the longest focal length.

FIGS. 57a–59c explain aberrations which occur in the ninth embodiment. FIGS. 57a–c relate to a lens arrangement characterized by the shortest focal length; FIGS. 58a–c relate to a lens arrangement characterized by the intermediate focal length; FIGS. 59a–c relate to a lens arrangement characterized by the longest focal length.

FIGS. 60a–62c explain aberrations which occur in the tenth embodiment. FIGS. 60a–c relate to a lens arrangement characterized by the shortest focal length; FIGS. 61a–c relate to a lens arrangement characterized by the intermediate focal length; FIGS. 62a–c relate to a lens arrangement characterized by the longest focal length.

FIGS. 63a–65c explain aberrations which occur in the eleventh embodiment. FIGS. 63a–c relate to a lens arrangement characterized by the shortest focal length; FIGS. 64a–c relate to a lens arrangement characterized by the intermediate focal length; FIGS. 65a–c relate to a lens arrangement characterized by the longest focal length.

FIGS. 66a–68c explain aberrations which occur in the twelfth embodiment. FIGS. 66a–c relate to a lens arrangement characterized by the shortest focal length; FIGS. 67a–c relate to a lens arrangement characterized by the intermediate focal length; FIGS. 68a–c relate to a lens arrangement characterized by the longest focal length.

Figures 71A, 71B, 71C:
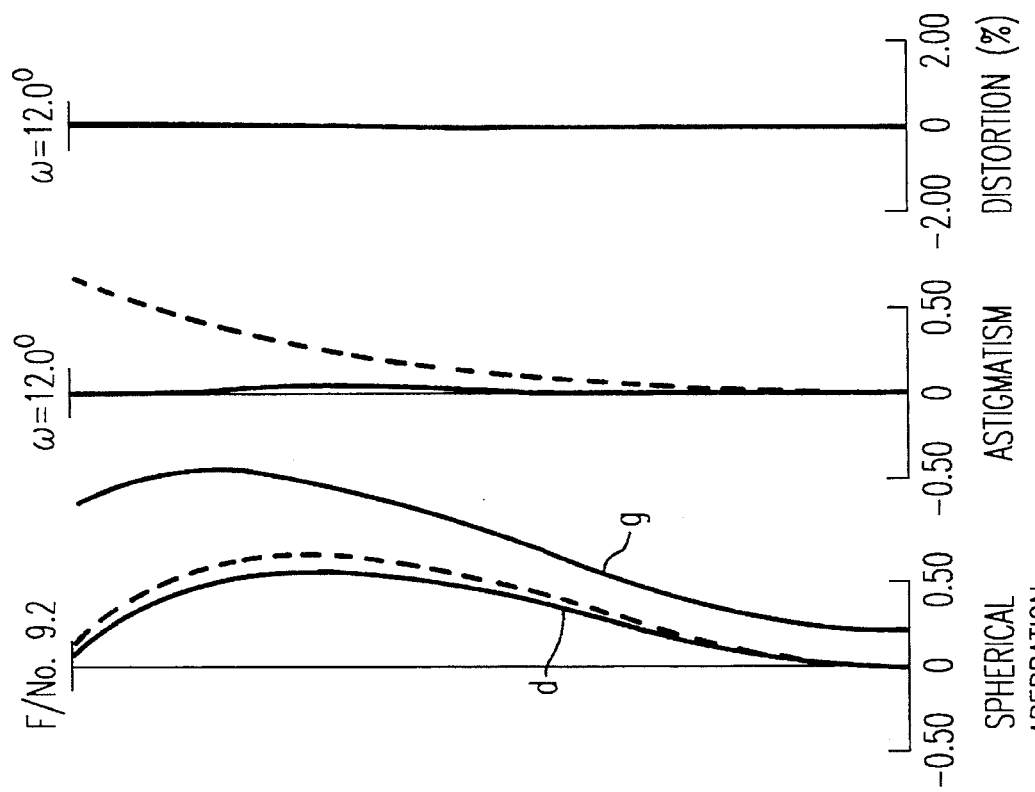
FIGS. 71a–c explain aberrations which occur when the zoom lens of the thirteenth embodiment is in a lens arrangement characterized by the longest focal length.

FIGS. 69a–71c explain aberrations which occur in the thirteenth embodiment. FIGS. 69a–c relate to a lens arrangement characterized by the shortest focal length; FIGS. 70a–c relate to a lens arrangement characterized by the intermediate focal length; FIGS. 71a–c relate to a lens arrangement characterized by the longest focal length.

Figures 72A, 72B, 72C:
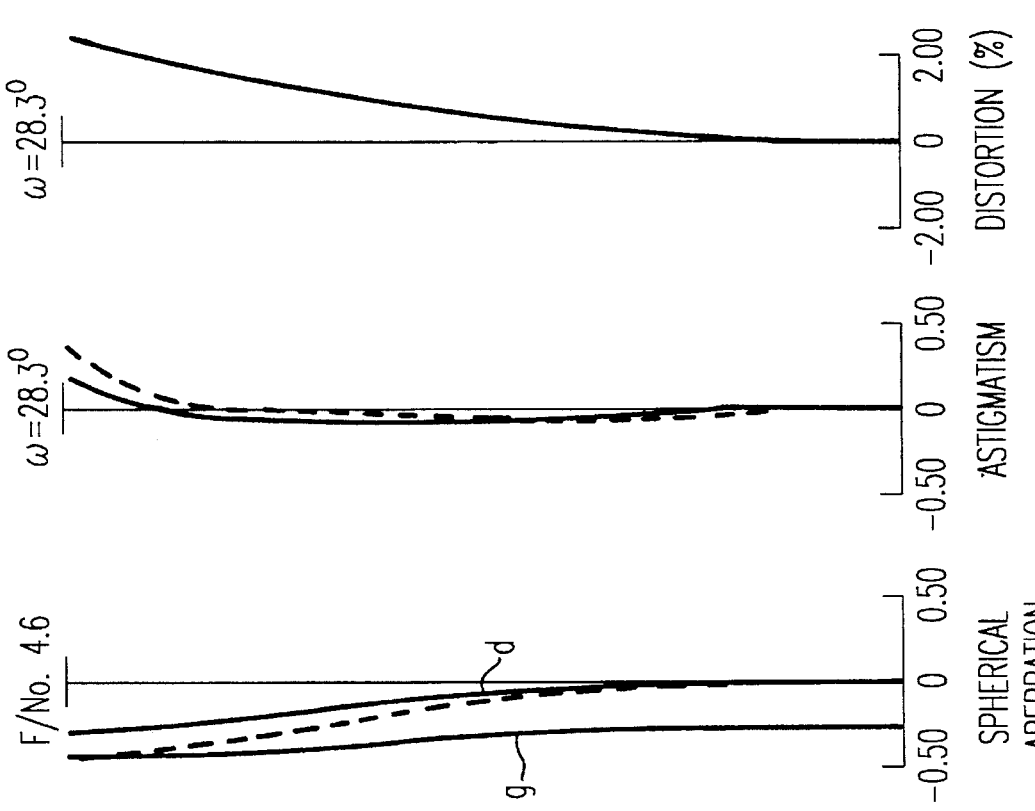
FIGS. 72a–c explain aberrations which occur when the zoom lens of the fourteenth embodiment is in a lens arrangement characterized by the shortest focal length.

FIGS. 72a–74c explain aberrations which occur in the fourteenth embodiment. FIGS. 72a–c relate to a lens arrangement characterized by the shortest focal length; FIGS. 73a–c relate to a lens arrangement characterized by the intermediate focal length; FIGS. 74a–c relate to a lens arrangement characterized by the longest focal length.

FIGS. 75a–77c explain aberrations which occur in the fifteenth embodiment. FIGS. 75a–c relate to a lens arrangement characterized by the shortest focal length; FIGS. 76a–c relate to a lens arrangement characterized by the intermediate focal length; FIGS. 77a–c relate to a lens arrangement characterized by the longest focal length.

FIGS. 78a–80c explain aberrations which occur in the sixteenth embodiment. FIGS. 78a–c relate to a lens arrangement characterized by the shortest focal length; FIGS. 79a–c relate to a lens arrangement characterized by the intermediate focal length; FIGS. 80a–c relate to a lens arrangement characterized by the longest focal length.

Figure 81A:
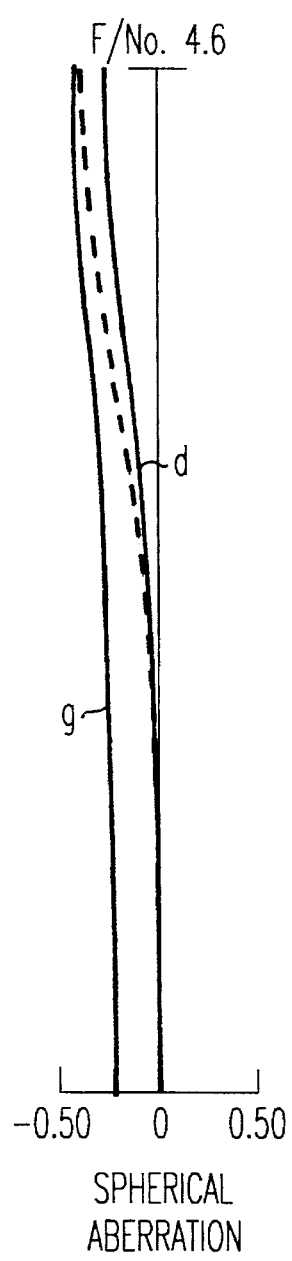
FIGS. 81a–c explain aberrations which occur when the zoom lens of the seventeenth embodiment is in a lens arrangement characterized by the shortest focal length.
Figure 81B:
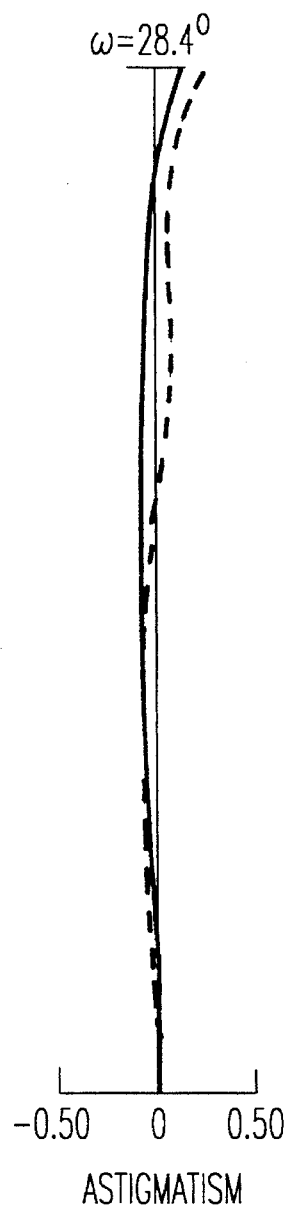
Figure 81C:
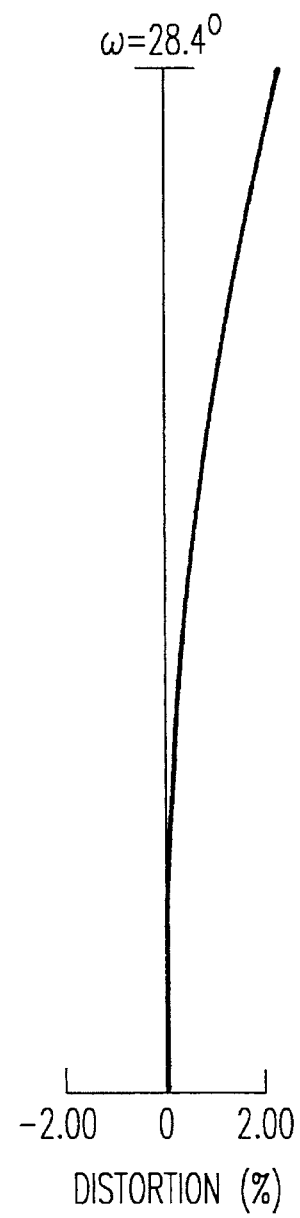
Figure 82A:
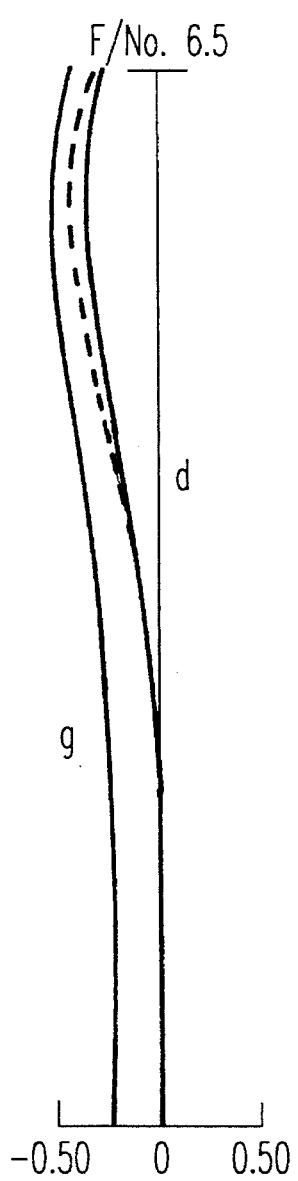
FIGS. 82a–c explain aberrations which occur when the zoom lens of the seventeenth embodiment is in a lens arrangement characterized by the intermediate focal length.
Figure 82B:
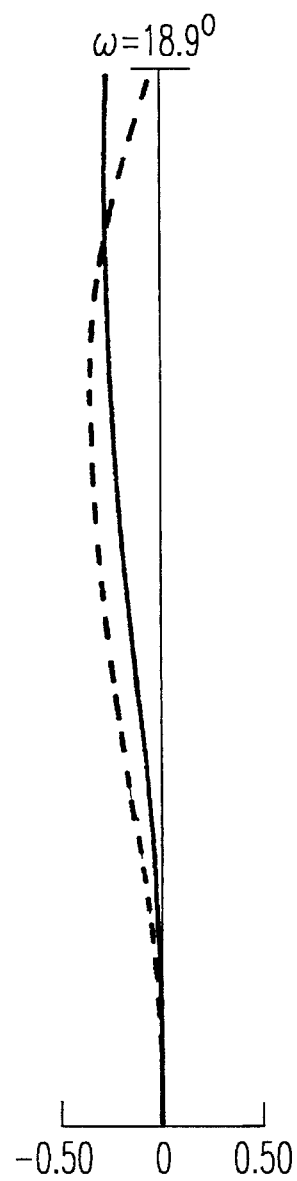
Figure 82C:
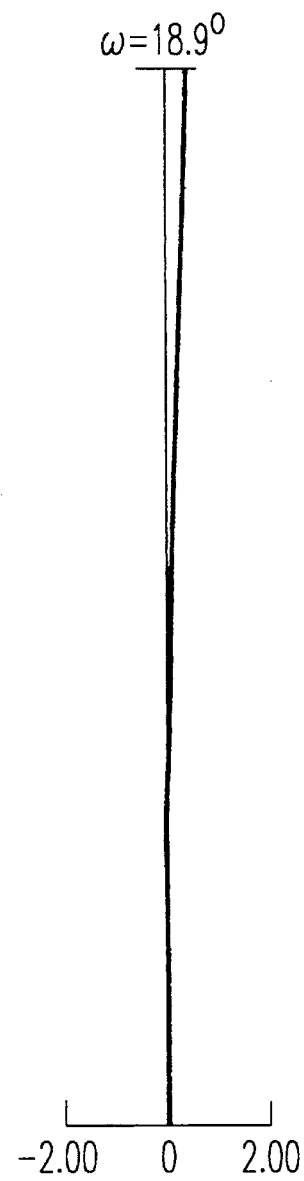
Figure 83A:
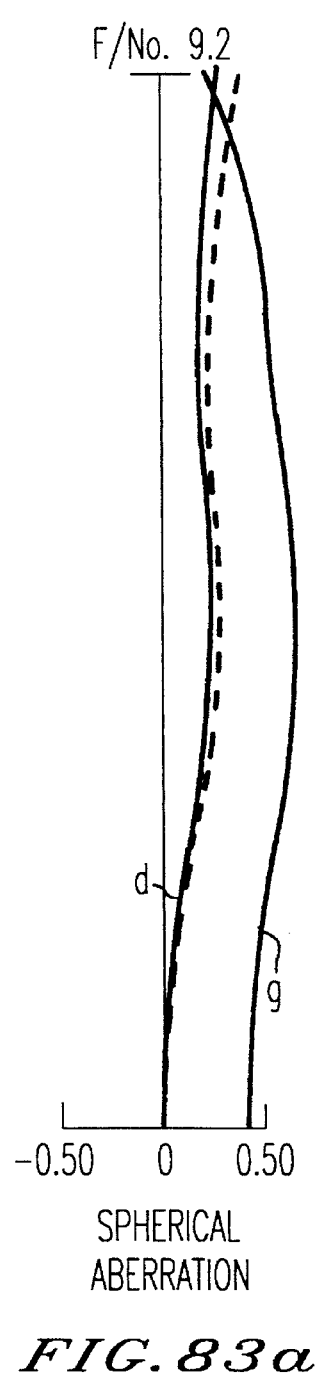
FIGS. 83a–c explain aberrations which occur when the zoom lens of the seventeenth embodiment is in a lens arrangement characterized by the longest focal length.
Figure 83B:
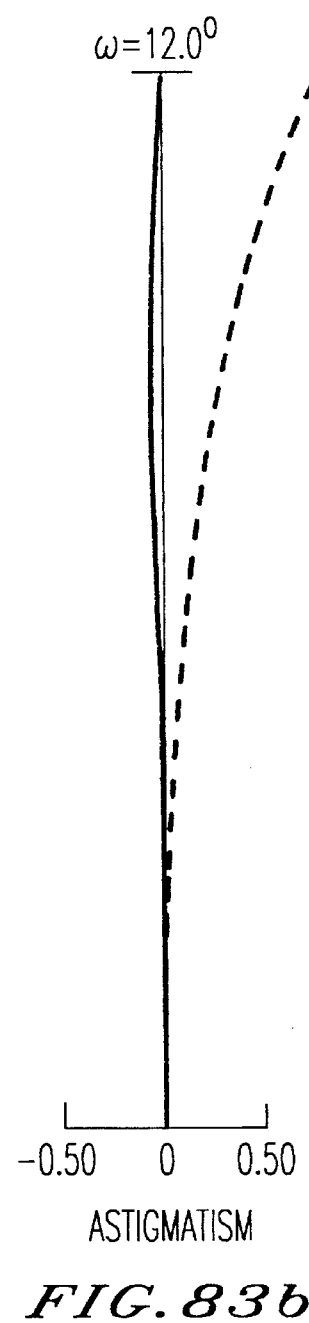
Figure 83C:
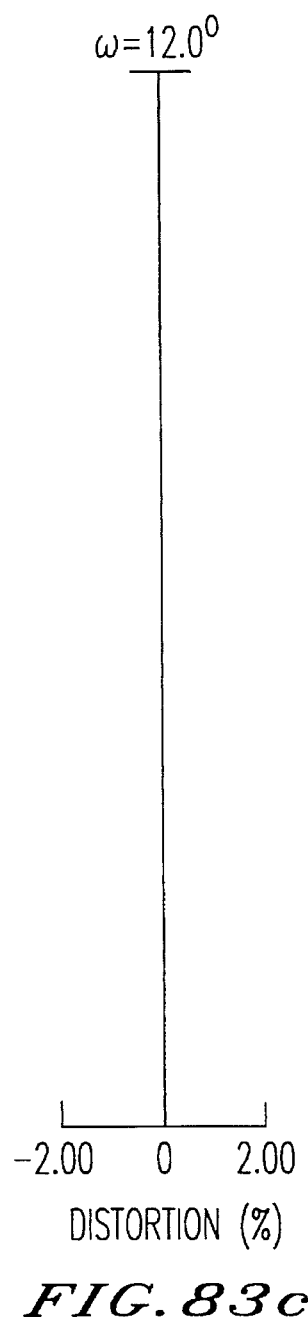

FIGS. 81a–83c explain aberrations which occur in the seventeenth embodiment. FIGS. 81a–c relate to a lens arrangement characterized by the shortest focal length; FIGS. 82a–c relate to a lens arrangement characterized by the intermediate focal length; FIGS. 83a–c relate to a lens arrangement characterized by the longest focal length.

Figure 84A:
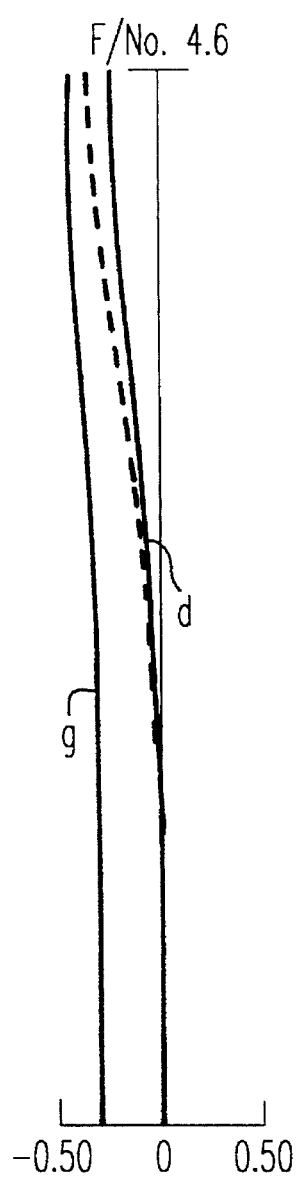
FIGS. 84a–c explain aberrations which occur when the zoom lens of the eighteenth embodiment is in a lens arrangement characterized by the shortest focal length.
Figure 84B:
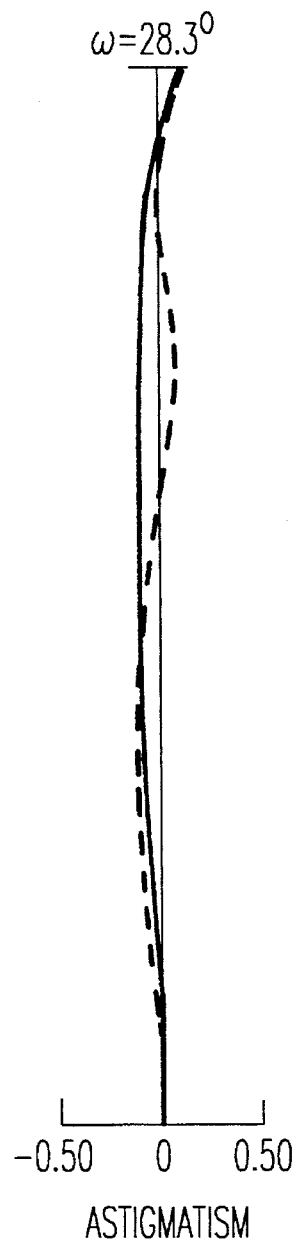
Figure 84C:
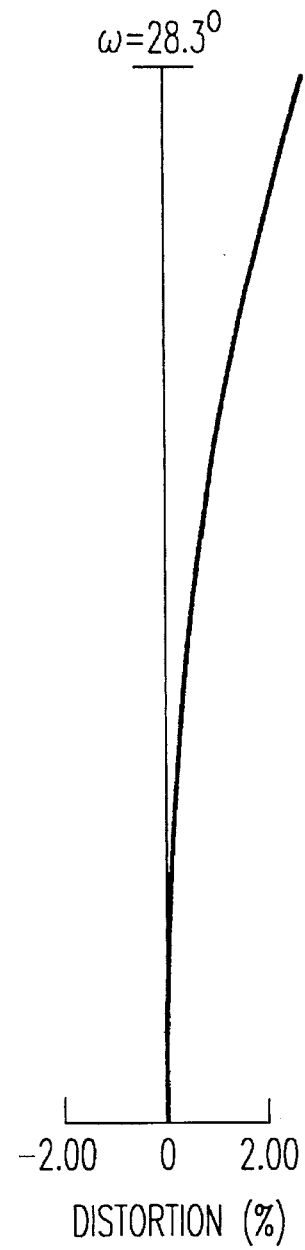
Figure 85A:
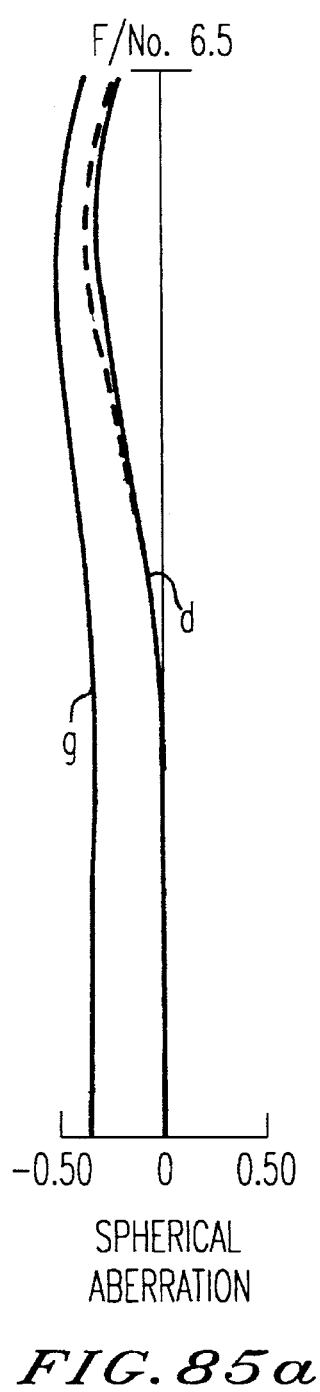
FIGS. 85a–c explain aberrations which occur when the zoom lens of the eighteenth embodiment is in a lens arrangement characterized by the intermediate focal length.
Figure 85B:
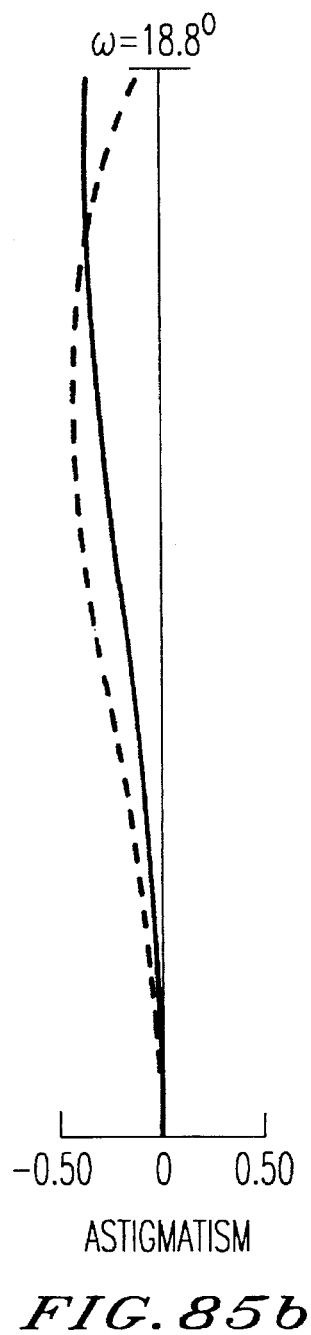
Figure 85C:
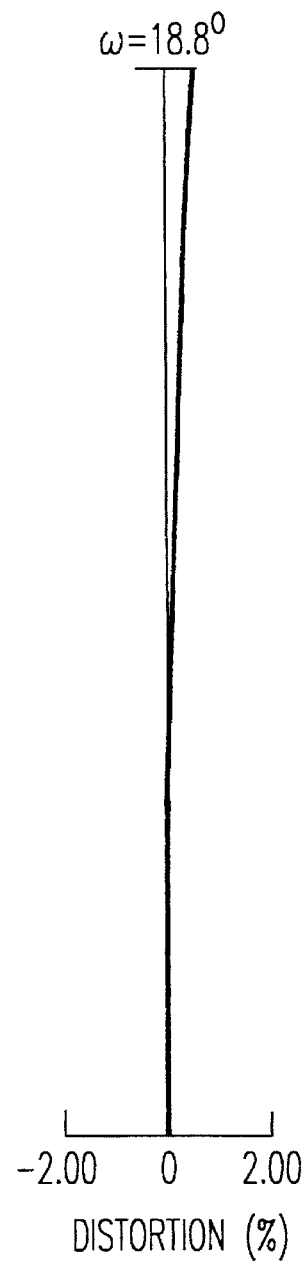
Figure 86A:
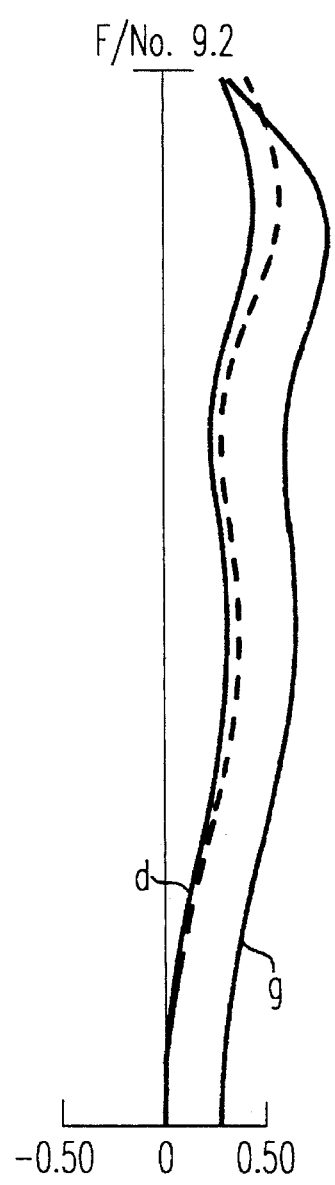
FIGS. 86a–c explain aberrations which occur when the zoom lens of the eighteenth embodiment is in a lens arrangement characterized by the longest focal length.
Figure 86B:
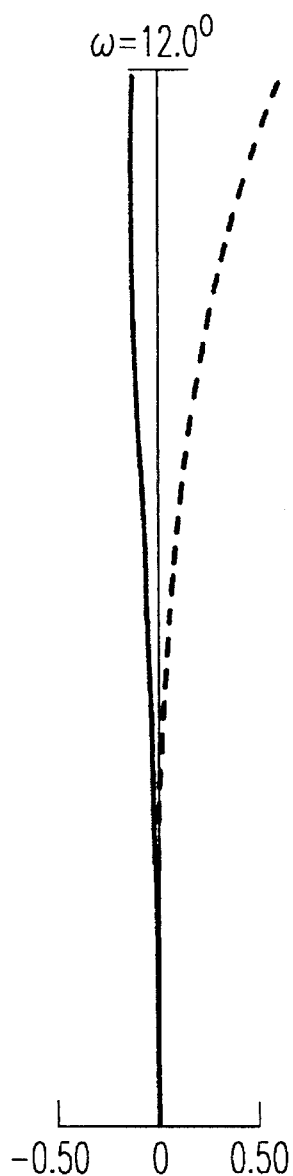
Figure 86C:
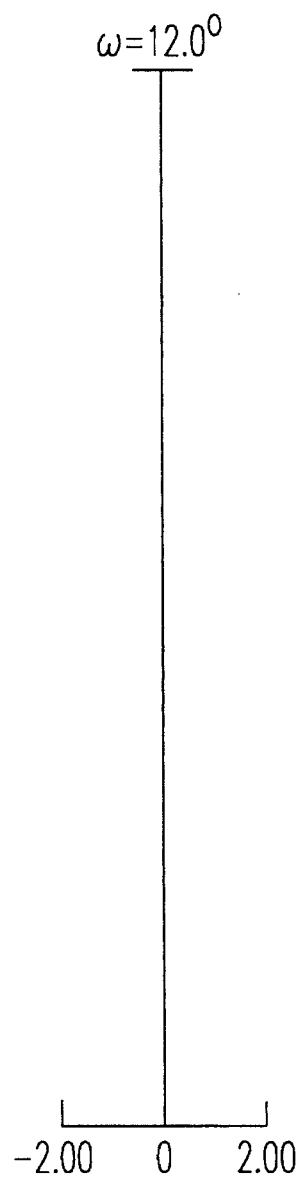

FIGS. 84a–86c explain aberrations which occur in the eighteenth embodiment. FIGS. 84a–c relate to a lens arrangement characterized by the shortest focal length; FIGS. 85a–c relate to a lens arrangement characterized by the intermediate focal length; FIGS. 86a–c relates to a lens arrangement characterized by the longest focal length.

Figure 87A:
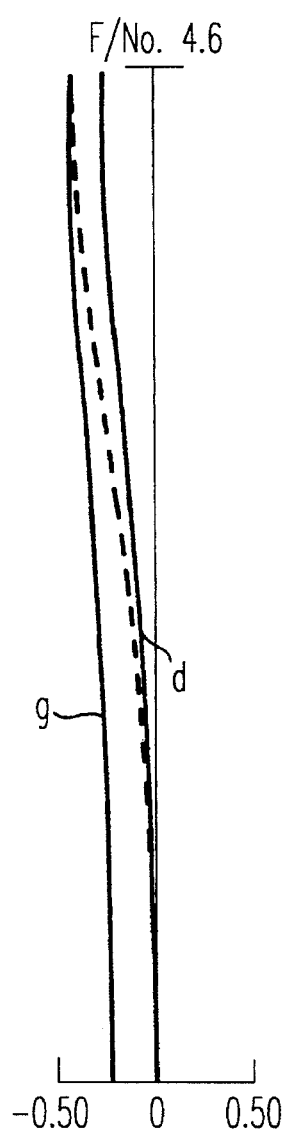
FIGS. 87a–c explain aberrations which occur when the zoom lens of the nineteenth embodiment is in a lens arrangement characterized by the shortest focal length.
Figure 87B:
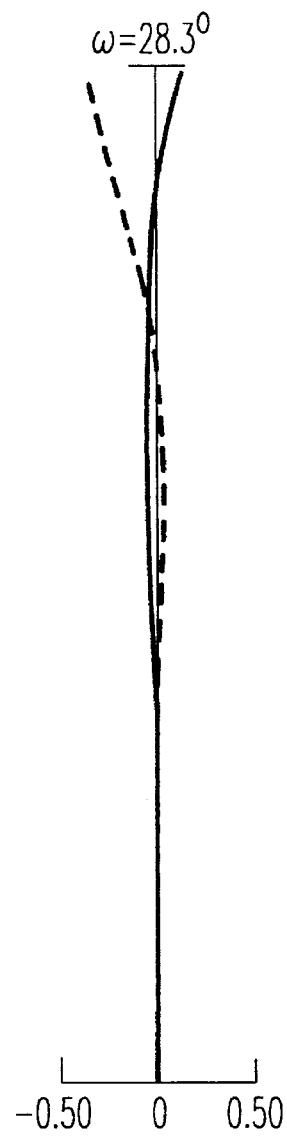
Figure 87C:
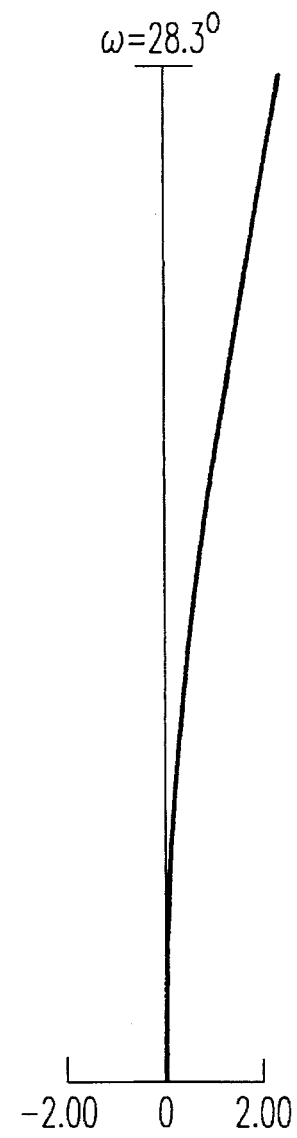
Figure 88A:
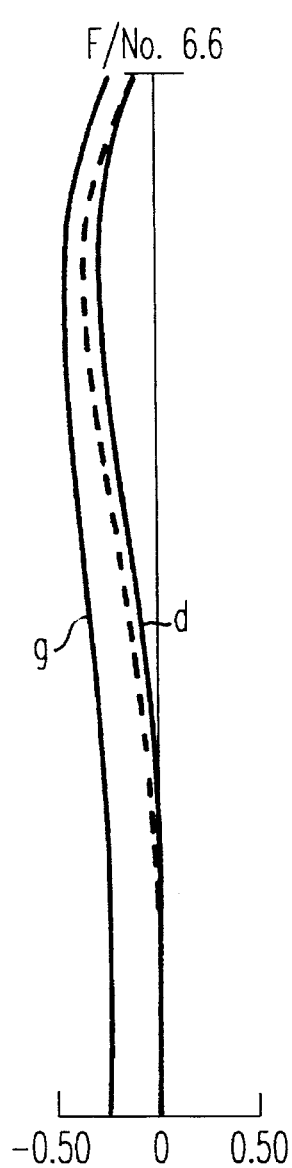
FIGS. 88a–c explain aberrations which occur when the zoom lens of the nineteenth embodiment is in a lens arrangement characterized by the intermediate focal length.
Figure 88B:
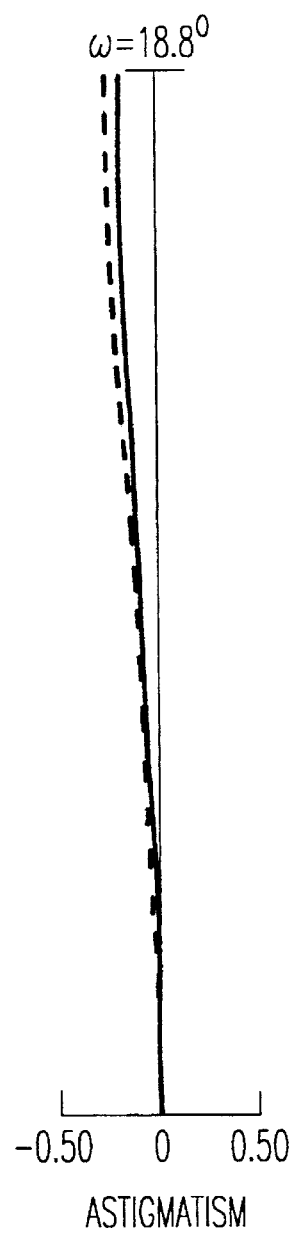
Figure 88C:
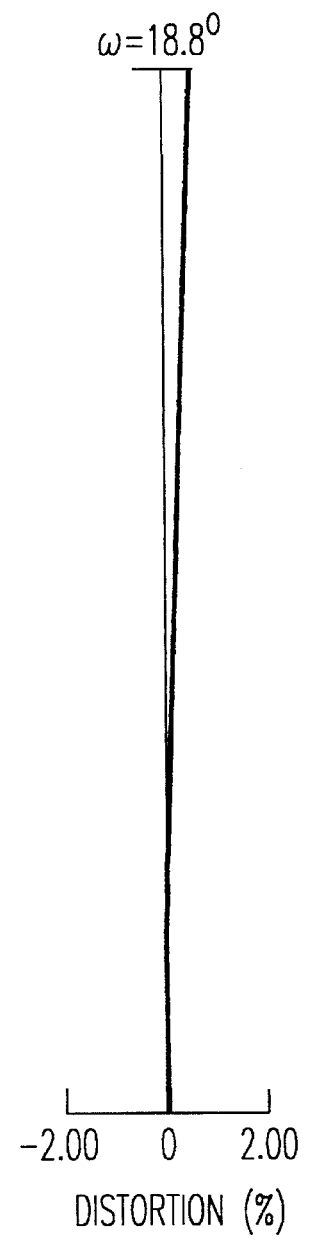
Figure 89A:
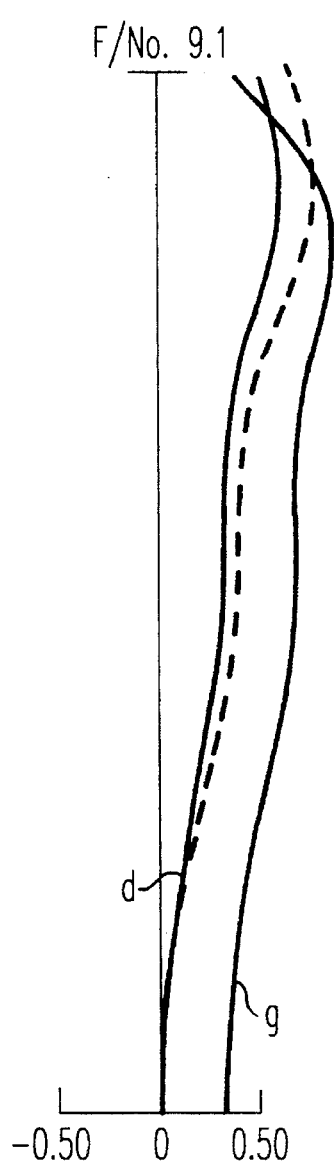
FIGS. 89a–c explain aberrations which occur when the zoom lens of the nineteenth embodiment is in a lens arrangement characterized by the longest focal length.
Figure 89B:
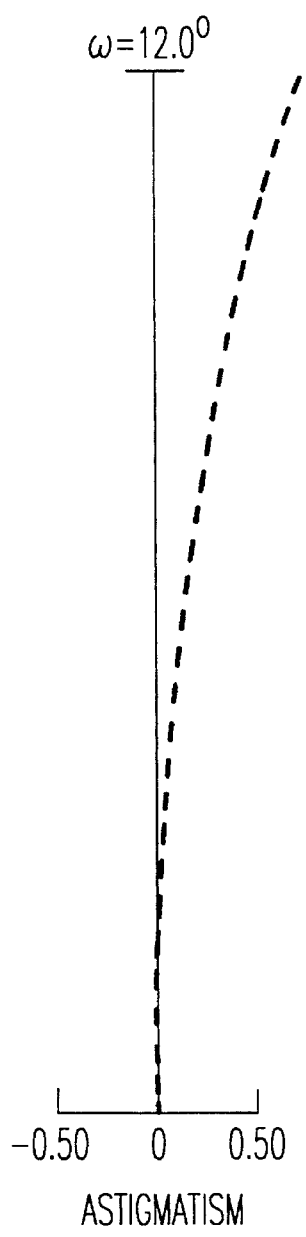
Figure 89C:
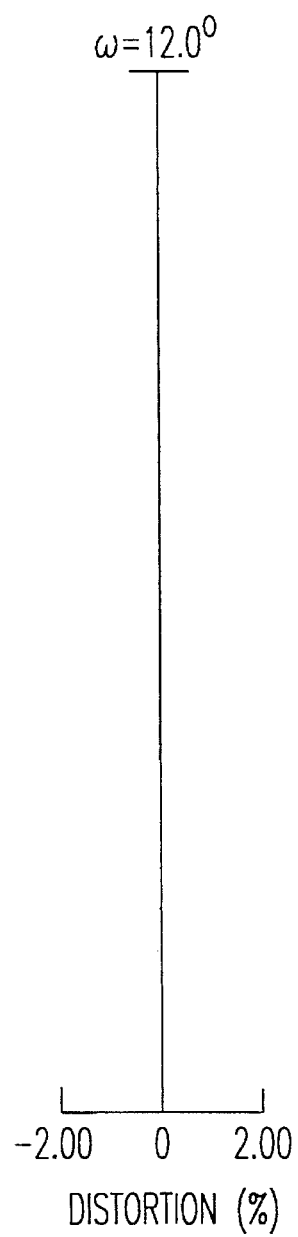

FIGS. 87a–89c explain aberrations which occur in the nineteenth embodiment. FIGS. 87a–c relate to a lens arrangement characterized by the shortest focal length; FIGS. 88a–c relate to a lens arrangement characterized by the intermediate focal length; FIGS. 89a–c relate to a lens arrangement characterized by the longest focal length.

Figure 90A:
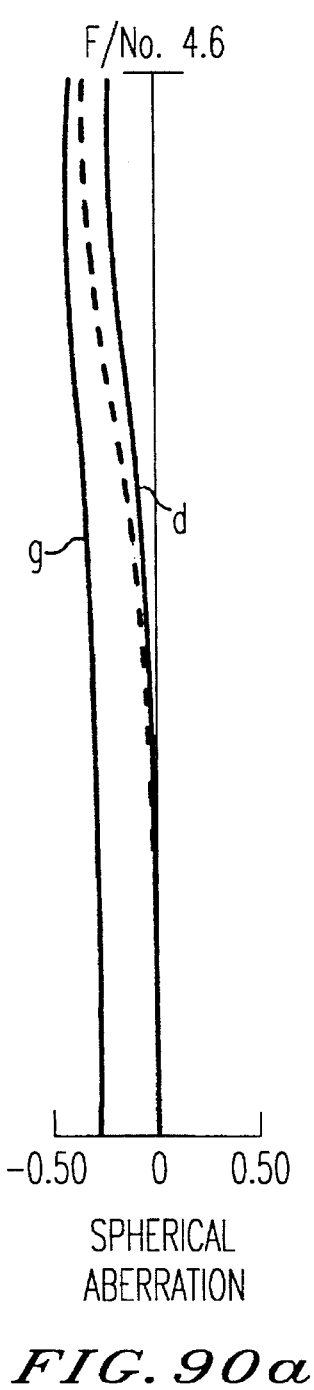
FIGS. 90a–c explain aberrations which occur when the zoom lens of the twentieth embodiment is in a lens arrangement characterized by the shortest focal length.
Figure 90B:
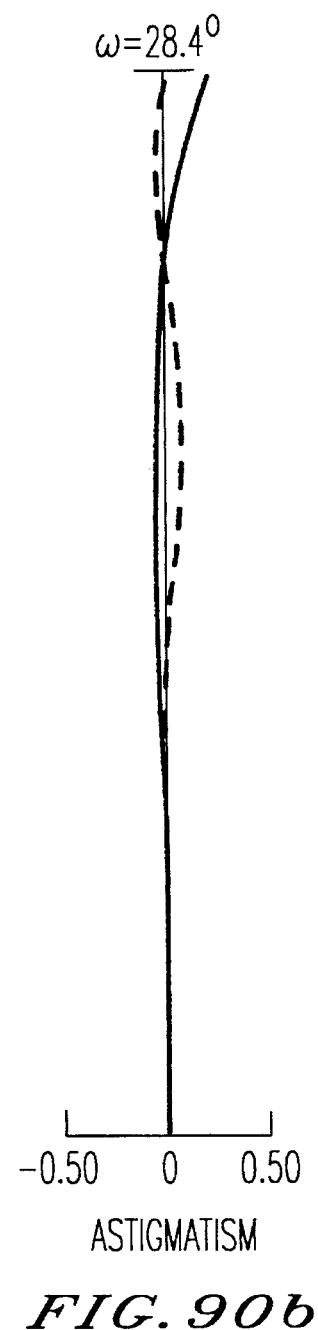
Figure 90C:
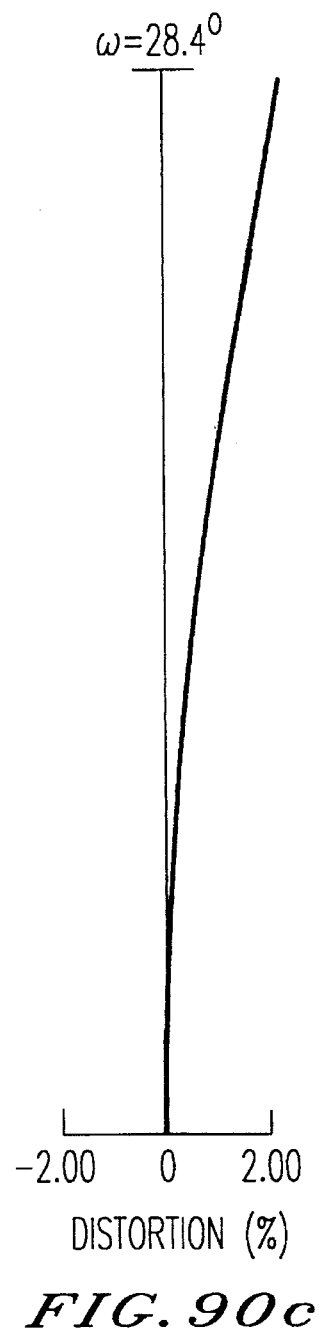
Figure 91A:
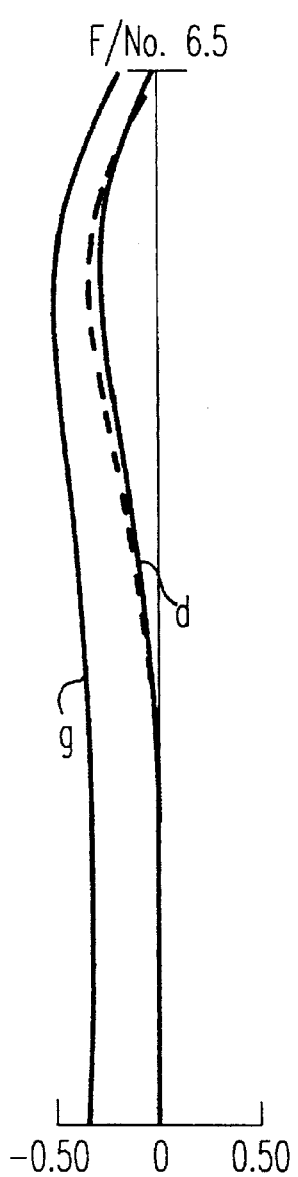
FIGS. 91a–c explain aberrations which occur when the zoom lens of the twentieth embodiment is in a lens arrangement characterized by the intermediate focal length.
Figure 91B:
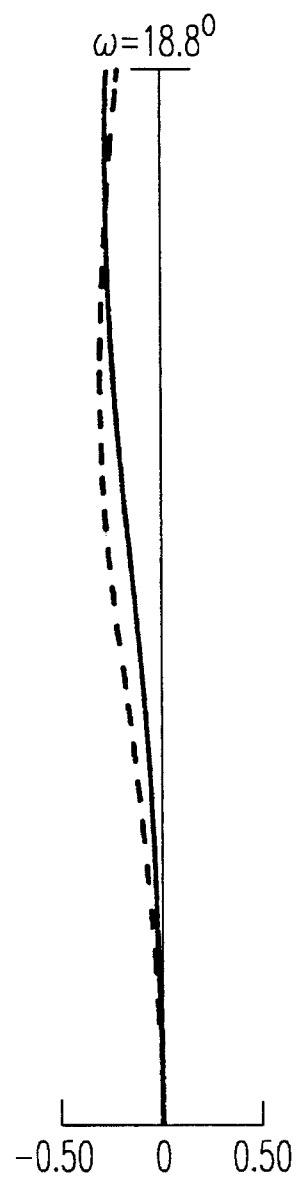
Figure 91C:
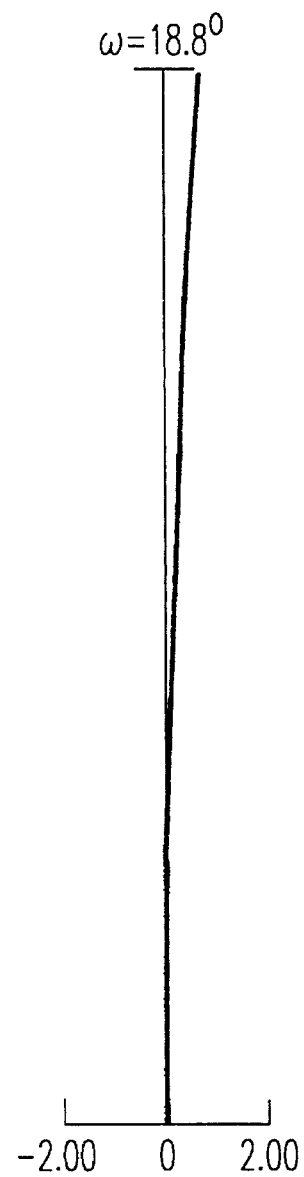
Figure 92A:
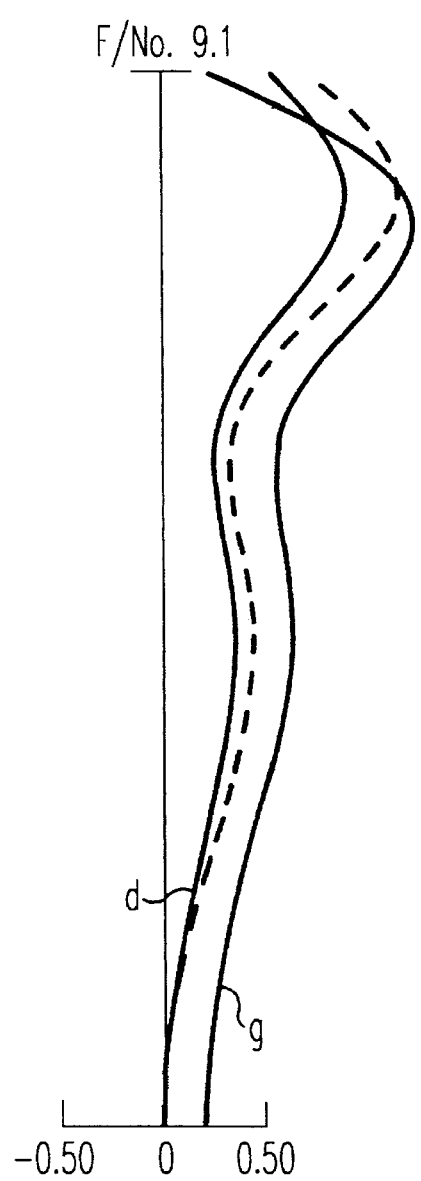
FIGS. 92a–c explain aberrations which occur when the zoom lens of the twentieth embodiment is in a lens arrangement characterized by the longest focal length.
Figure 92B:
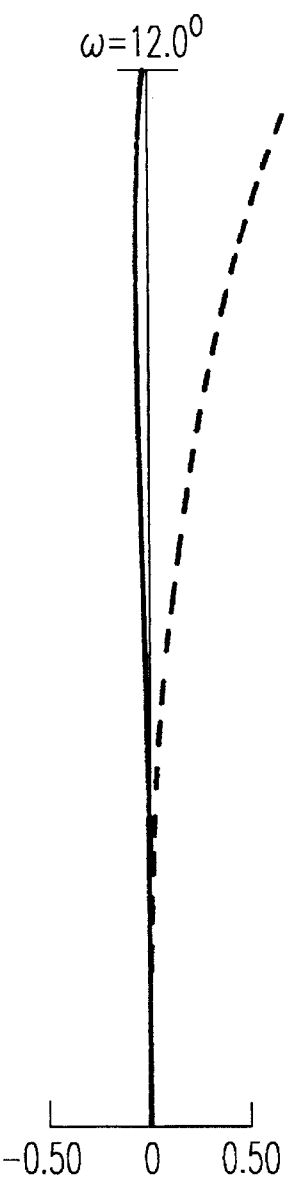
Figure 92C:
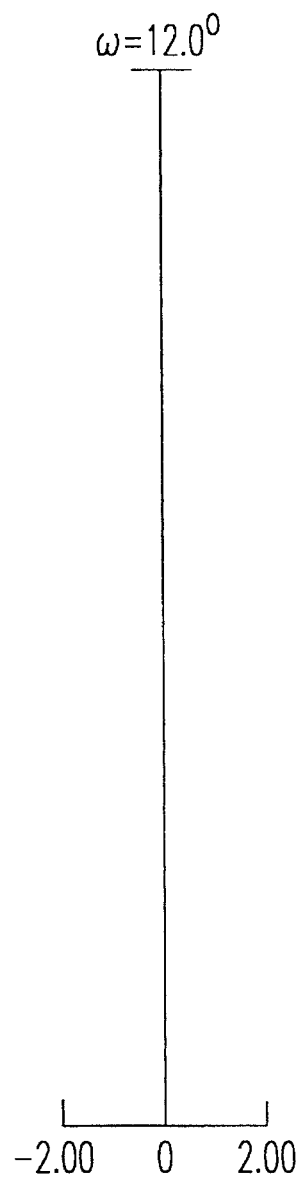

FIGS. 90a–92c explain aberrations which occur in the twentieth embodiment. FIGS. 90a–c relate to a lens arrangement characterized by the shortest focal length; FIGS. 91a–c relate to a lens arrangement characterized by the intermediate focal length; FIGS. 92a–c relate to a lens arrangement characterized by the longest focal length.

Figure 93A:
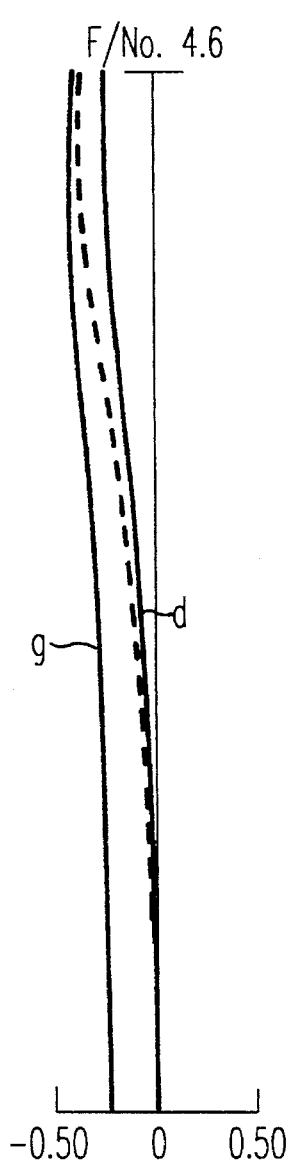
FIGS. 93a–c explain aberrations which occur when the zoom lens of the twenty-first embodiment is in a lens arrangement characterized by the shortest focal length.
Figure 93B:
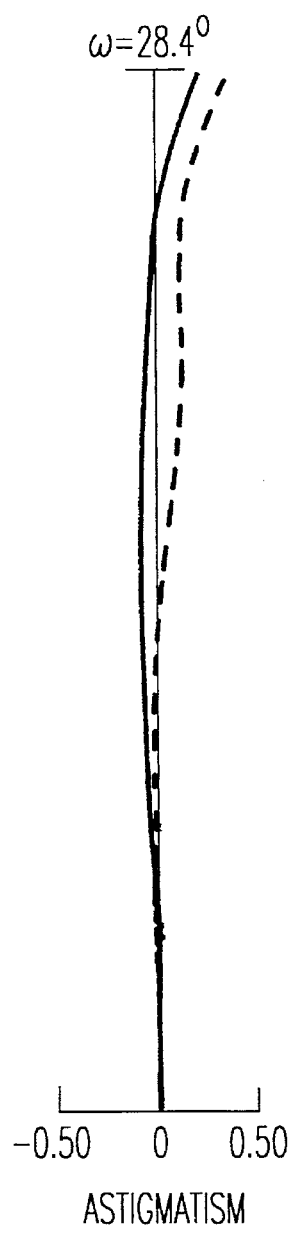
Figure 93C:
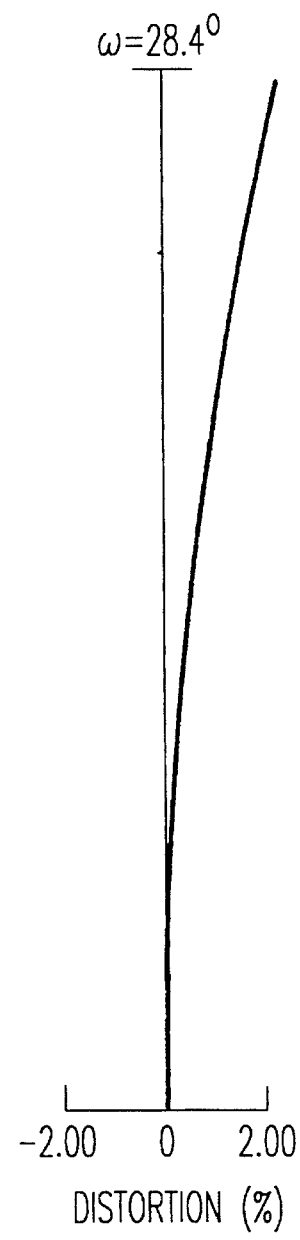
Figure 94A:
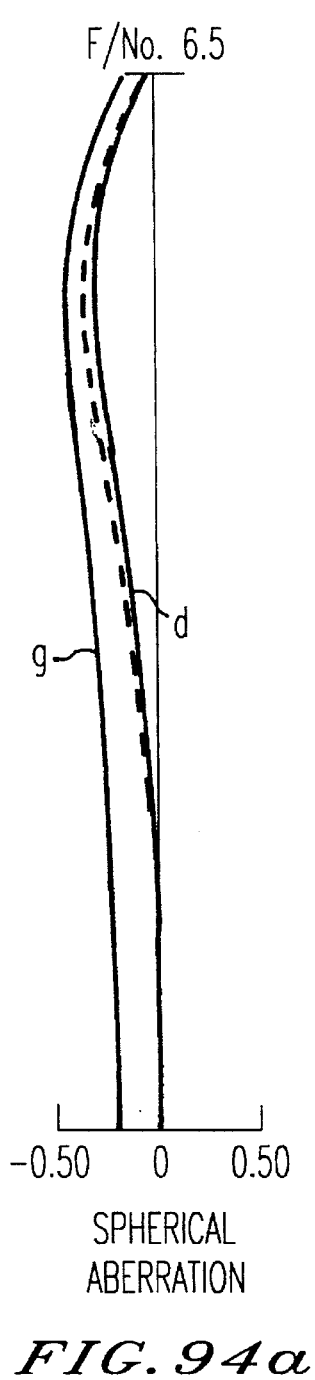
FIGS. 94a–c explain aberrations which occur when the zoom lens of the twenty-first embodiment is in a lens arrangement characterized by the intermediate focal length.
Figure 94B:
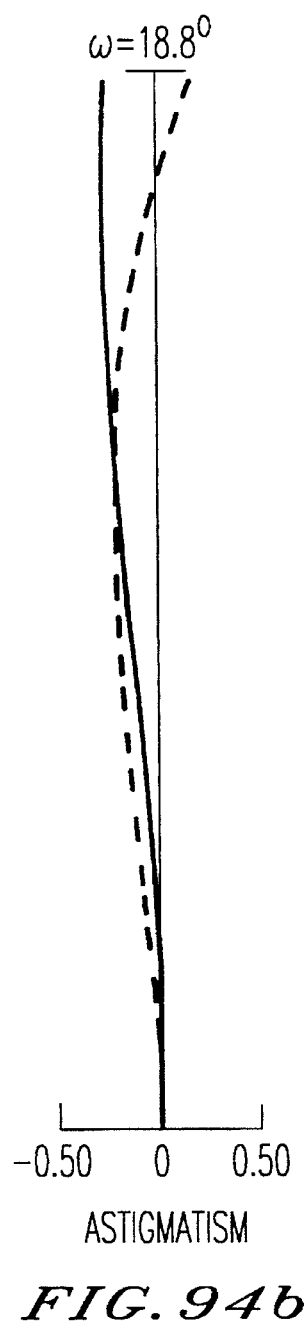
Figure 94C:
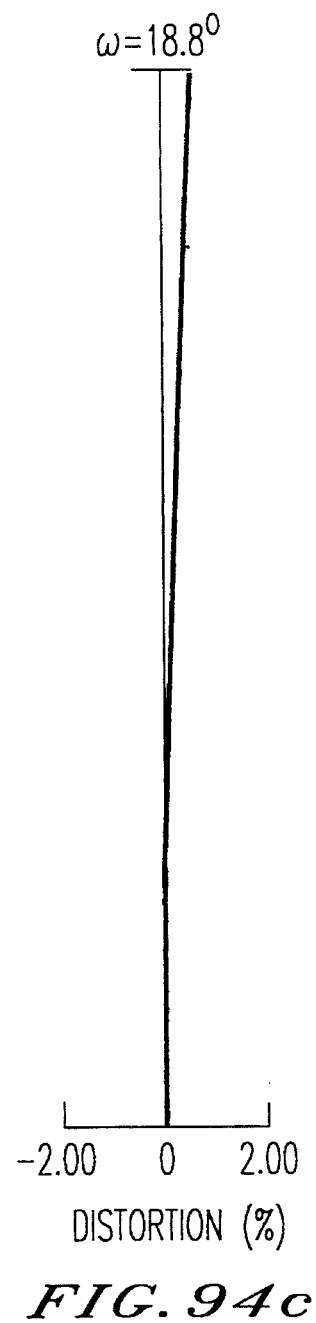
Figure 95A:
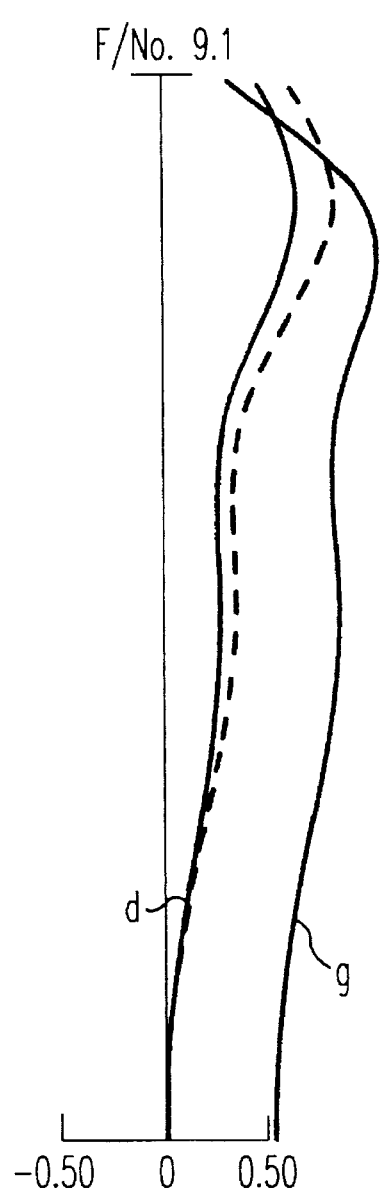
FIGS. 95a–c explain aberrations which occur when the zoom lens of the twenty-first embodiment is in a lens arrangement characterized by the longest focal length.
Figure 95B:
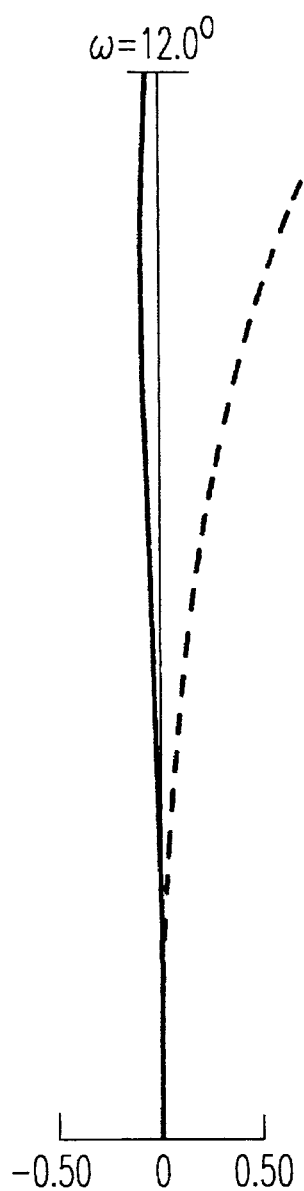
Figure 95C:
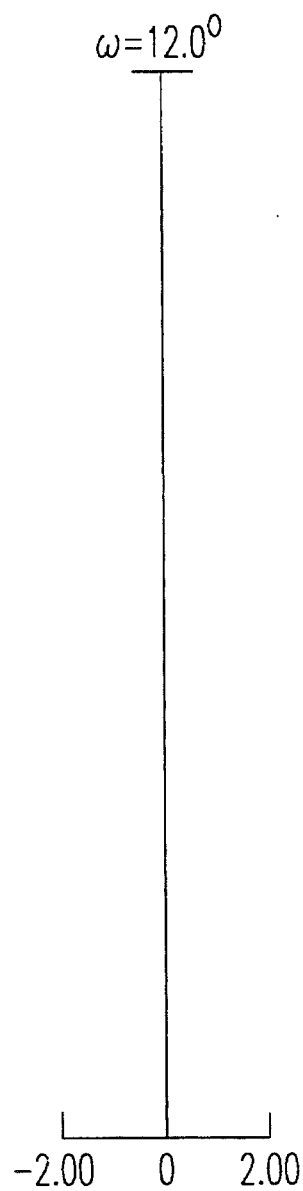
Figure 97A:
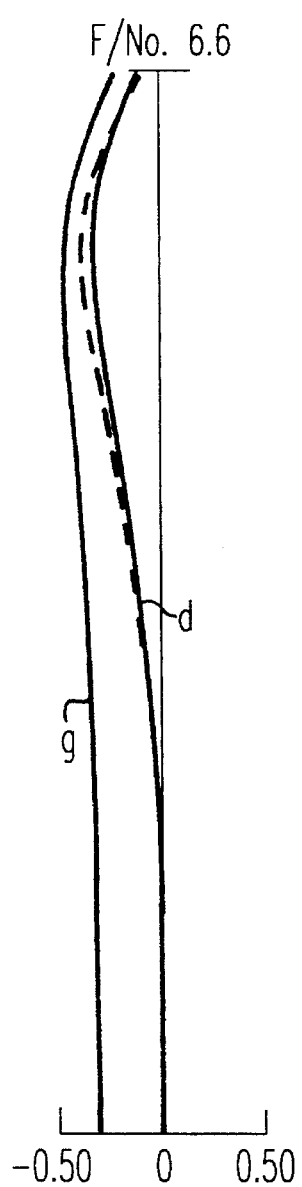
FIGS. 97a–c explain aberrations which occur when the zoom lens of the twenty-second embodiment is in a lens arrangement characterized by the intermediate focal length.
Figure 97B:
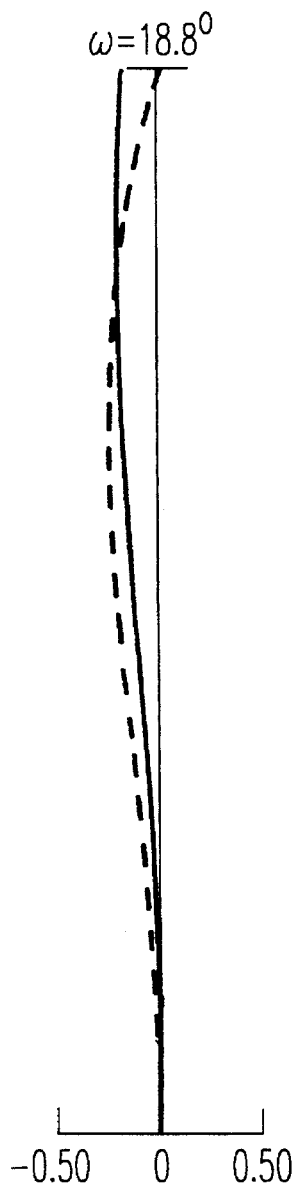
Figure 97C:
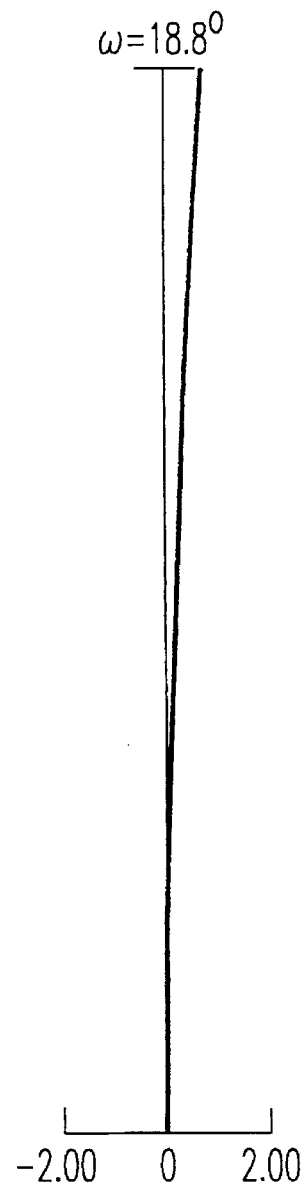

FIGS. 93a–95c explain aberrations which occur in the twenty-first embodiment. FIGS. 93a–c relate to a lens arrangement characterized by the shortest focal length; FIGS. 94a–c relate to a lens arrangement characterized by the intermediate focal length; FIGS. 95a–c relate to a lens arrangement characterized by the longest focal length.

Figures 98A, 98B, 98C:
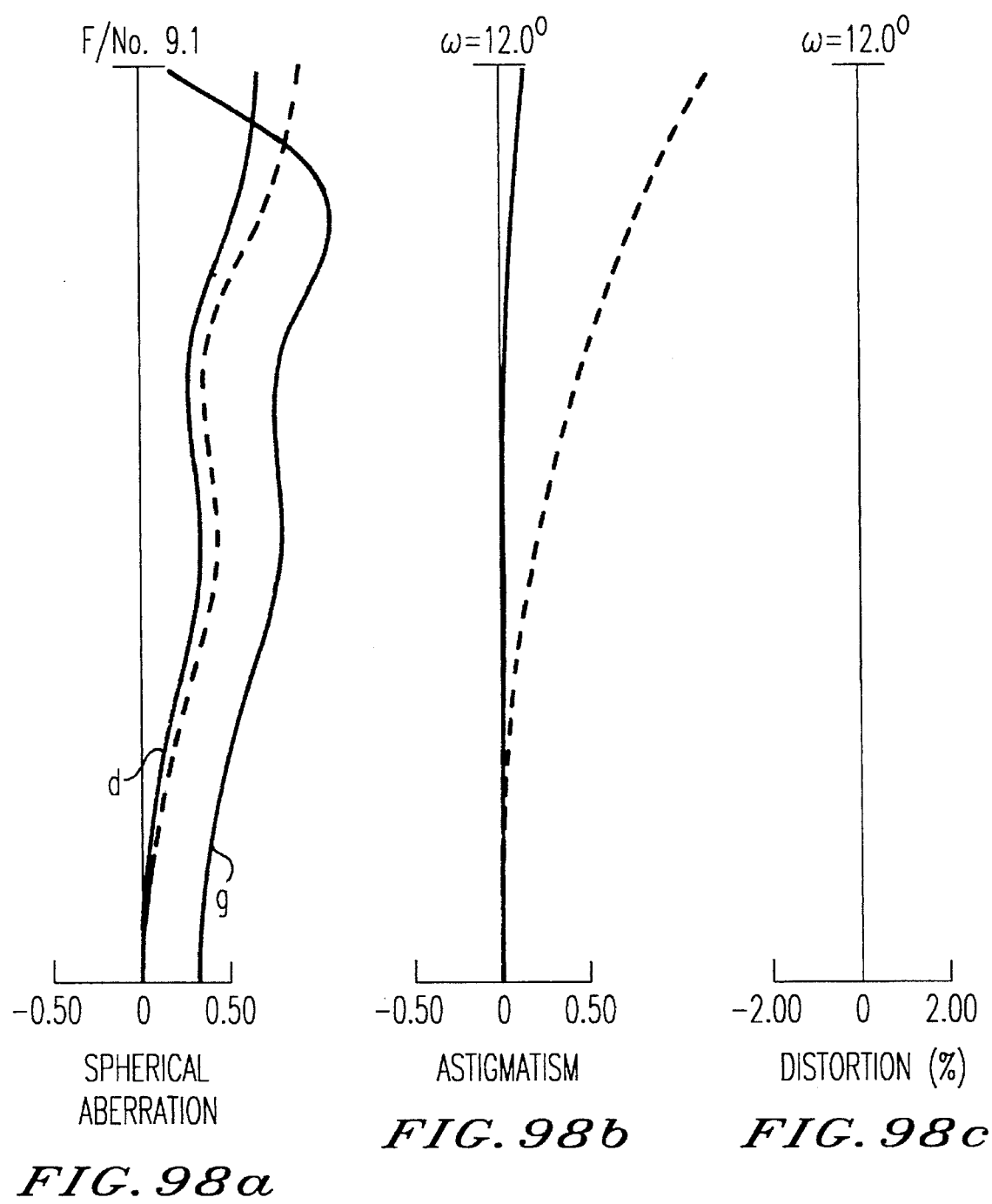
FIGS. 98a–c explain aberrations which occur when the zoom lens of the twenty-second embodiment is in a lens arrangement characterized by the longest focal length.

FIGS. 96a–98c explain aberrations which occur in the twenty-second embodiment. FIGS. 96a–c relate to a lens arrangement characterized by the shortest focal length; FIGS. 97a–c relate to a lens arrangement characterized by the intermediate focal length; FIGS. 98a–c relate to a lens arrangement characterized by the longest focal length.

Figure 99A:
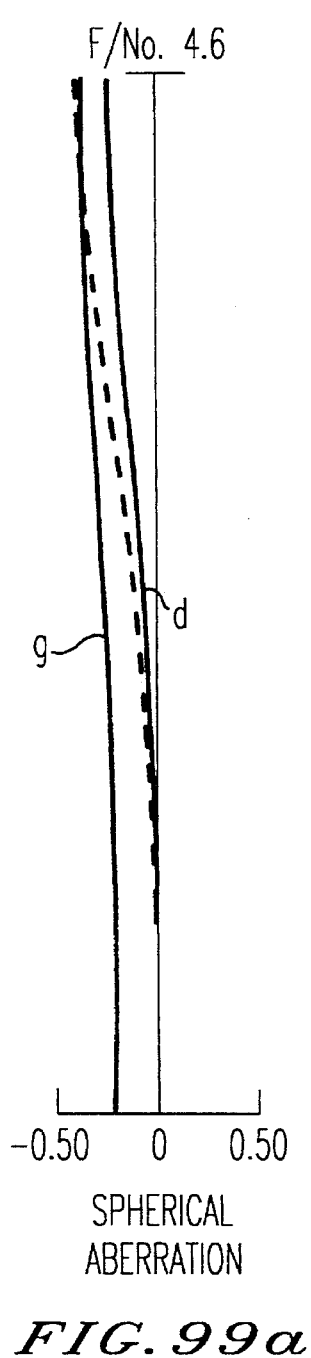
FIGS. 99a–c explain aberrations which occur when the zoom lens of the twenty-third embodiment is in a lens arrangement characterized by the shortest focal length.
Figure 99B:
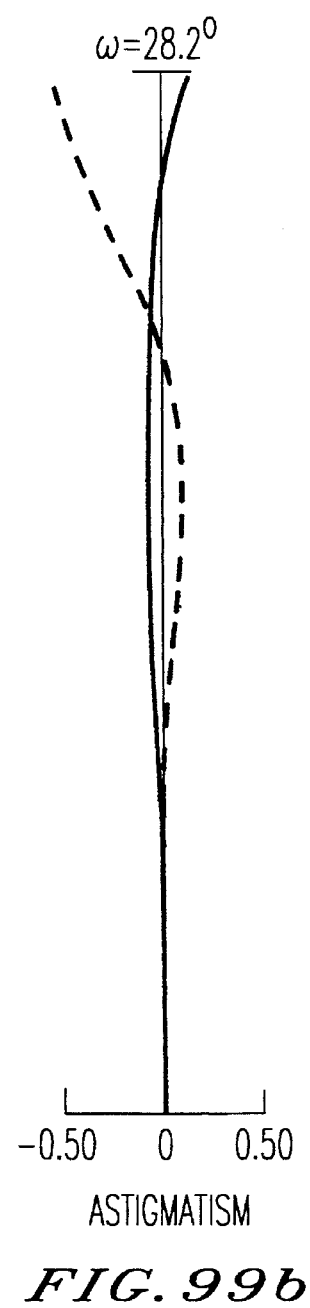
Figure 99C:
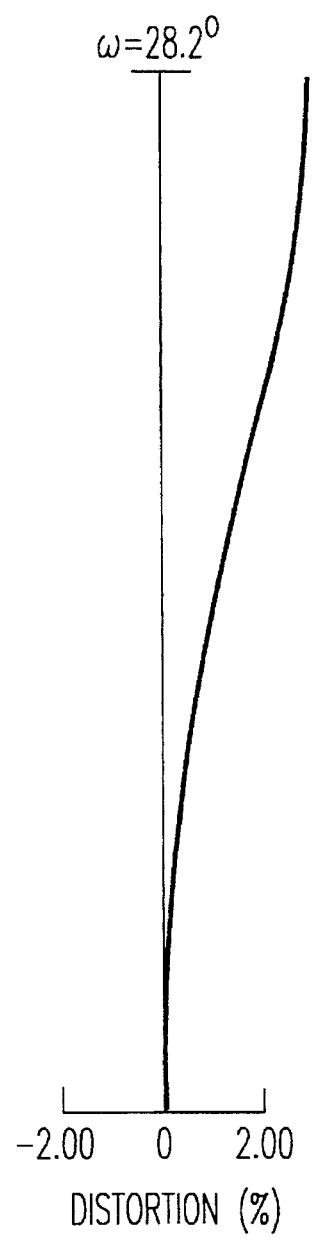
Figure 100A:
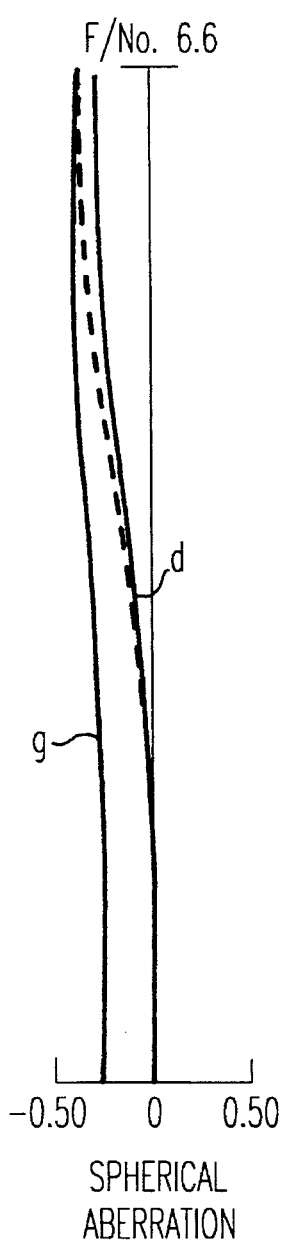
FIGS. 100a–c explain aberrations which occur when the zoom lens of the twenty-third embodiment is in a lens arrangement characterized by the intermediate focal length.
Figure 100B:
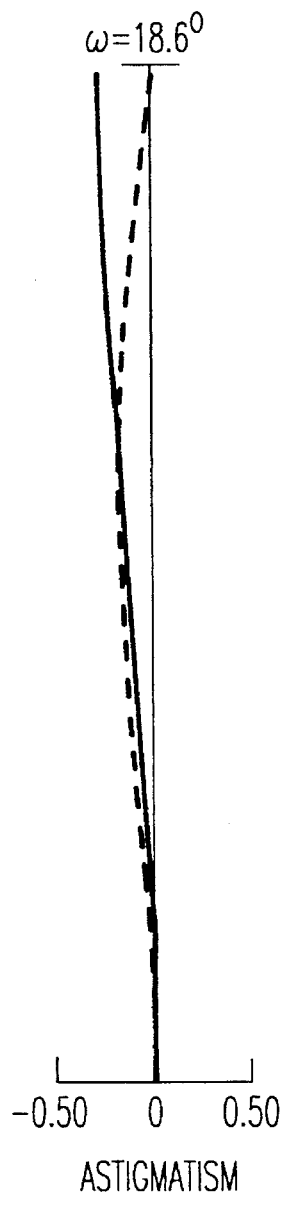
Figure 100C:
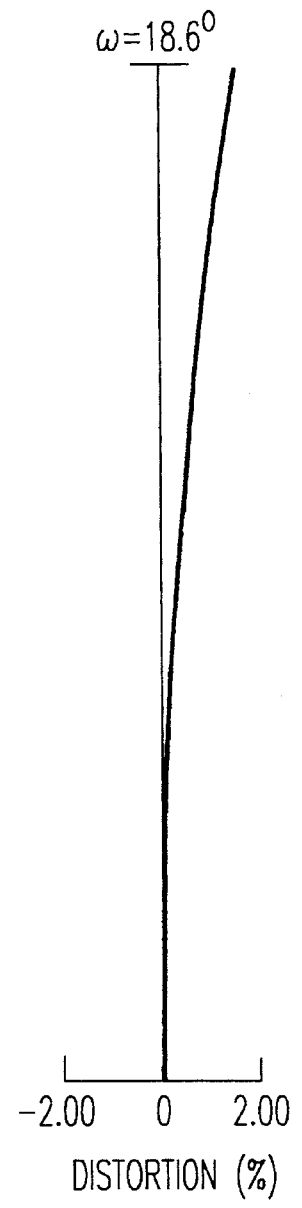

FIGS. 99a–101c explain aberrations which occur in the twenty-third embodiment. FIGS. 99a–c relate to a lens arrangement characterized by the shortest focal length; FIGS. 100a–c relate to a lens arrangement characterized by the intermediate focal length; FIGS. 101a–c relate to a lens arrangement characterized by the longest focal length.

Figure 102A:
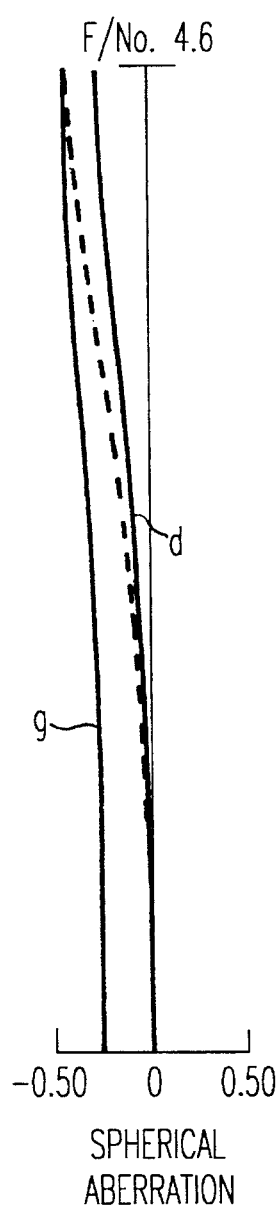
FIGS. 102a–c explain aberrations which occur when the zoom lens of the twenty-fourth embodiment is in a lens arrangement characterized by the shortest focal length.
Figure 102B:
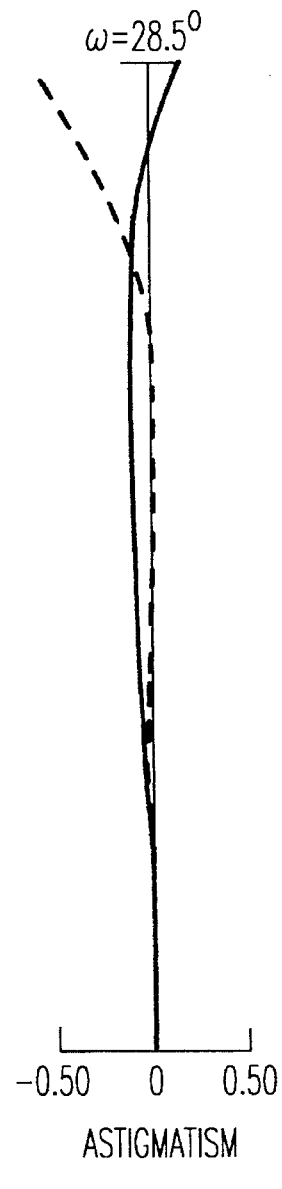
Figure 102C:
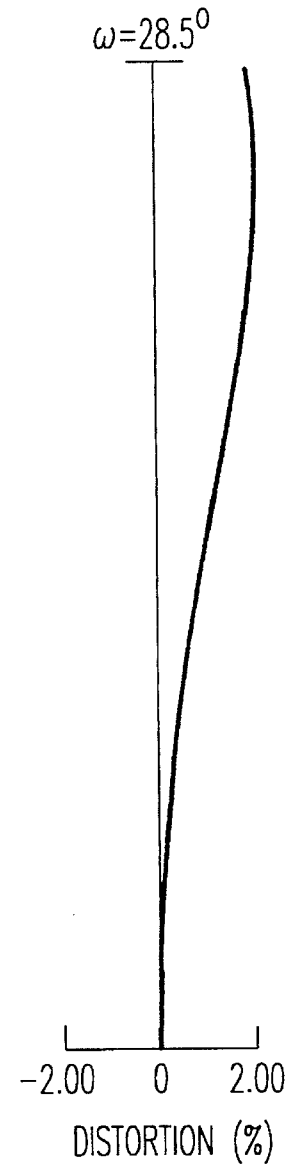
Figure 103A:
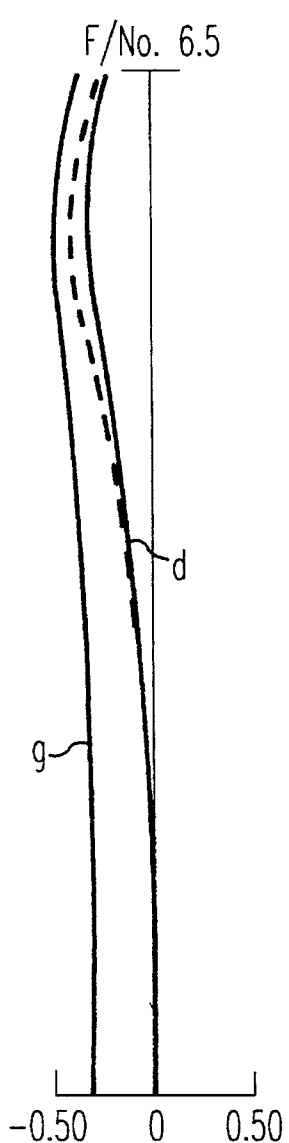
FIGS. 103a–c explain aberrations which occur when the zoom lens of the twenty-fourth embodiment is in a lens arrangement characterized by the intermediate focal length.
Figure 103B:
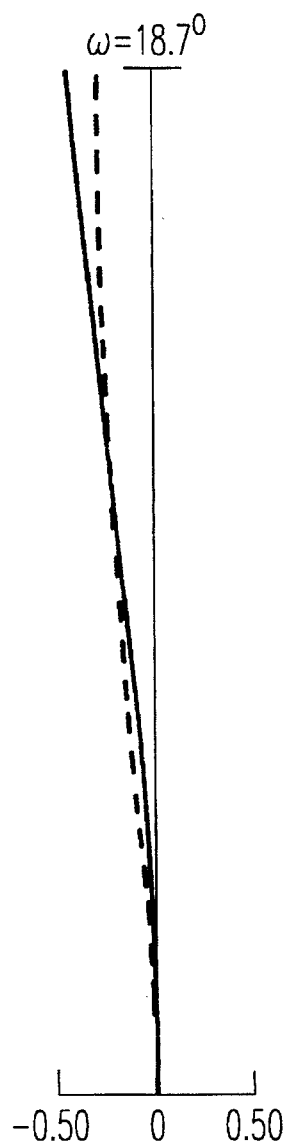
Figure 103C:
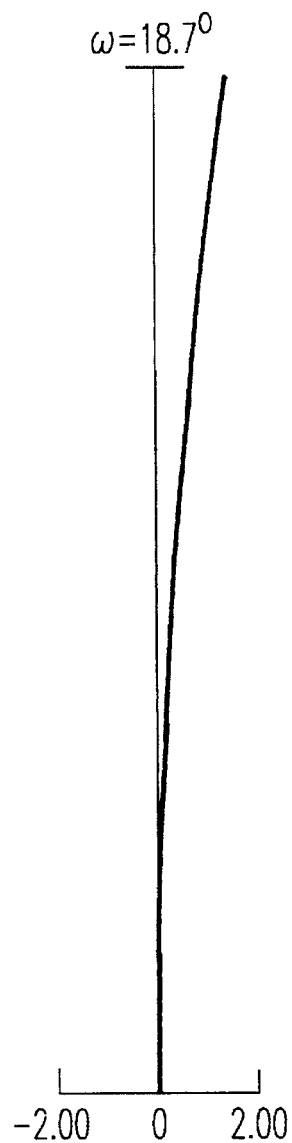
Figure 104A:
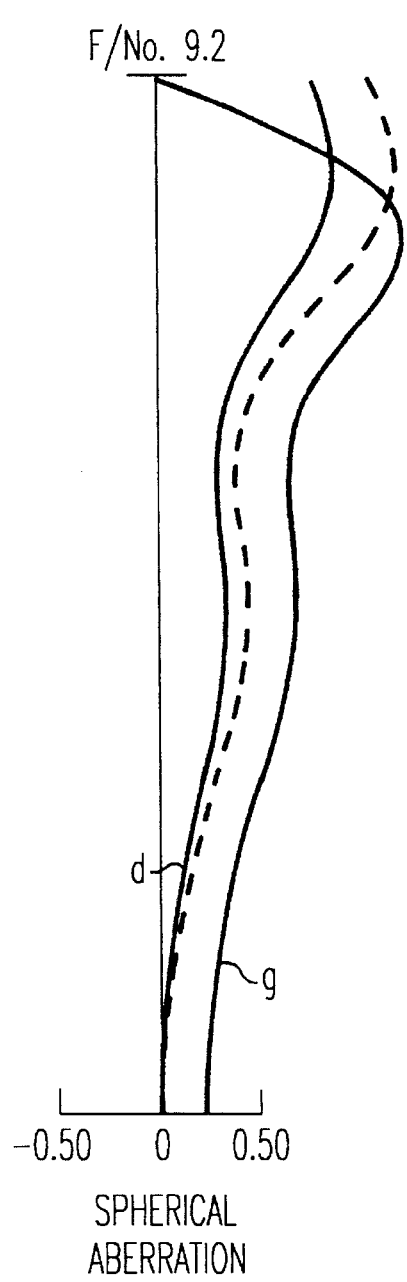
FIGS. 104a–c explain aberrations which occur when the zoom lens of the twenty-fourth embodiment is in a lens arrangement characterized by the longest focal length.
Figure 104B:
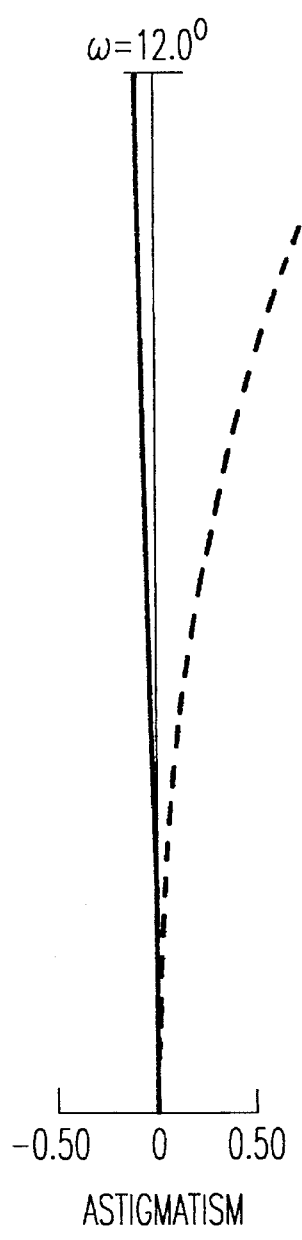
Figure 104C:
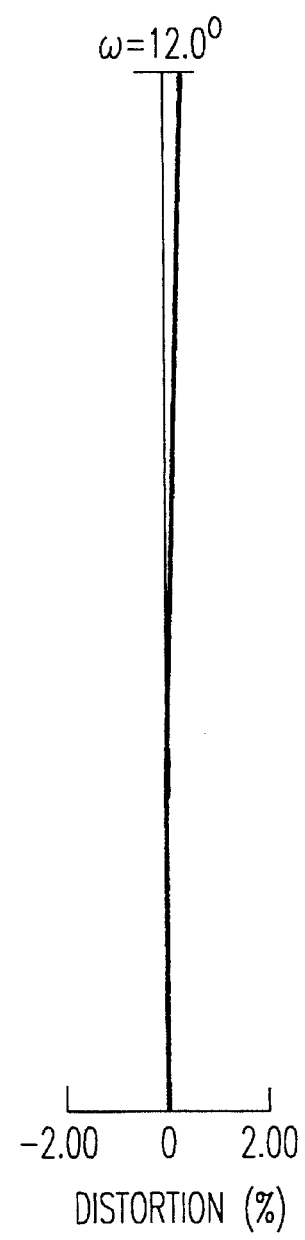
Figures 118A, 118B, 118C:
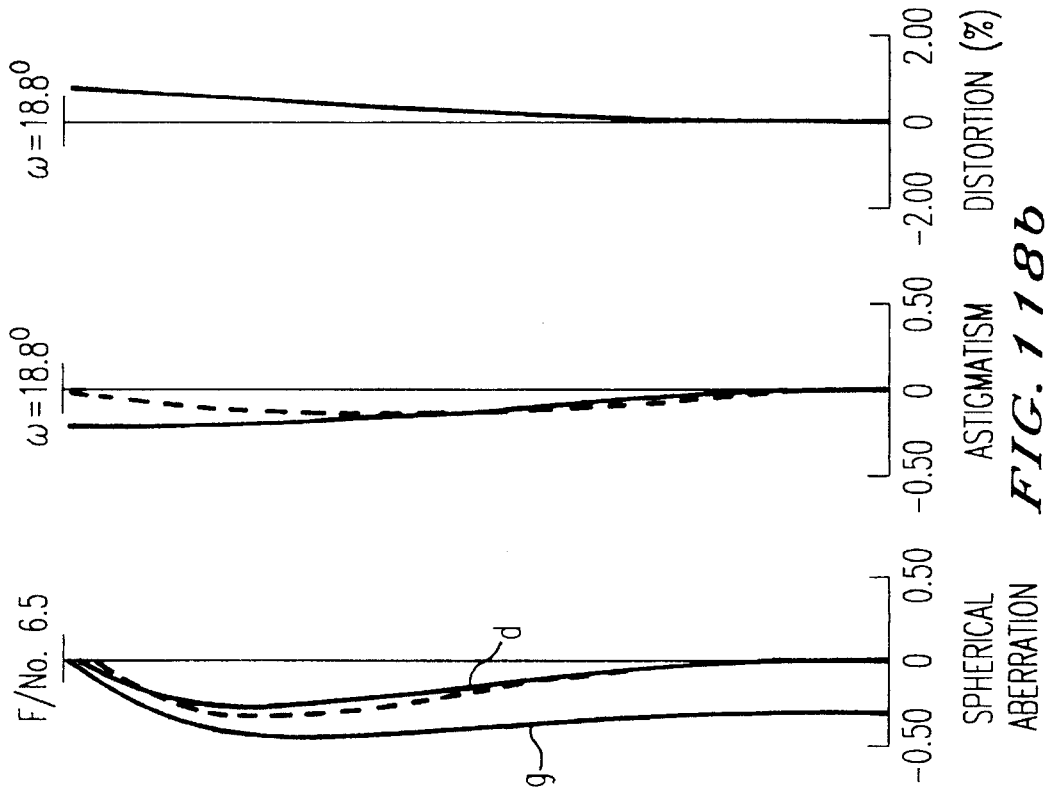
FIGS. 118a–c explain aberrations which occur when the zoom lens of the twenty-ninth embodiment is in a lens arrangement characterized by the intermediate focal length.

FIGS. 102a–104c explain aberrations which occur in the twenty-fourth embodiment. FIGS. 102a–c relate to a lens arrangement characterized by the shortest focal length; FIGS. 103a–c relate to a lens arrangement characterized by the intermediate focal length; FIGS. 104a–c relate to a lens arrangement characterized by the longest focal length.

FIGS. 105a–107c explain aberrations which occur in the twenty-fifth embodiment. FIGS. 105a–c relate to a lens arrangement characterized by the shortest focal length; FIGS. 106a–c relate to a lens arrangement characterized by the intermediate focal length; FIGS. 107a–c relate to a lens arrangement characterized by the longest focal length.

FIGS. 108a–110c explain aberrations which occur in the twenty-sixth embodiment. FIGS. 108a–c relate to a lens arrangement characterized by the shortest focal length; FIGS. 109a–c relate to a lens arrangement characterized by the intermediate focal length; FIGS. 110a–c relates to a lens arrangement characterized by the longest focal length.

FIGS. 111a–113c explain aberrations which occur in the twenty-seventh embodiment. FIGS. 111a–c relate to a lens arrangement characterized by the shortest focal length; FIGS. 112a–c relate to a lens arrangement characterized by the intermediate focal length; FIGS. 113a–c relate to a lens arrangement characterized by the longest focal length.

FIGS. 114a–116c explain aberrations which occur in the twenty-eighth embodiment. FIGS. 114a–c relate to a lens arrangement characterized by the shortest focal length; FIGS. 115a–c relate to a lens arrangement characterized by the intermediate focal length; FIGS. 116a–c relate to a lens arrangement characterized by the longest focal length.

Figures 117A, 117B, 117C:
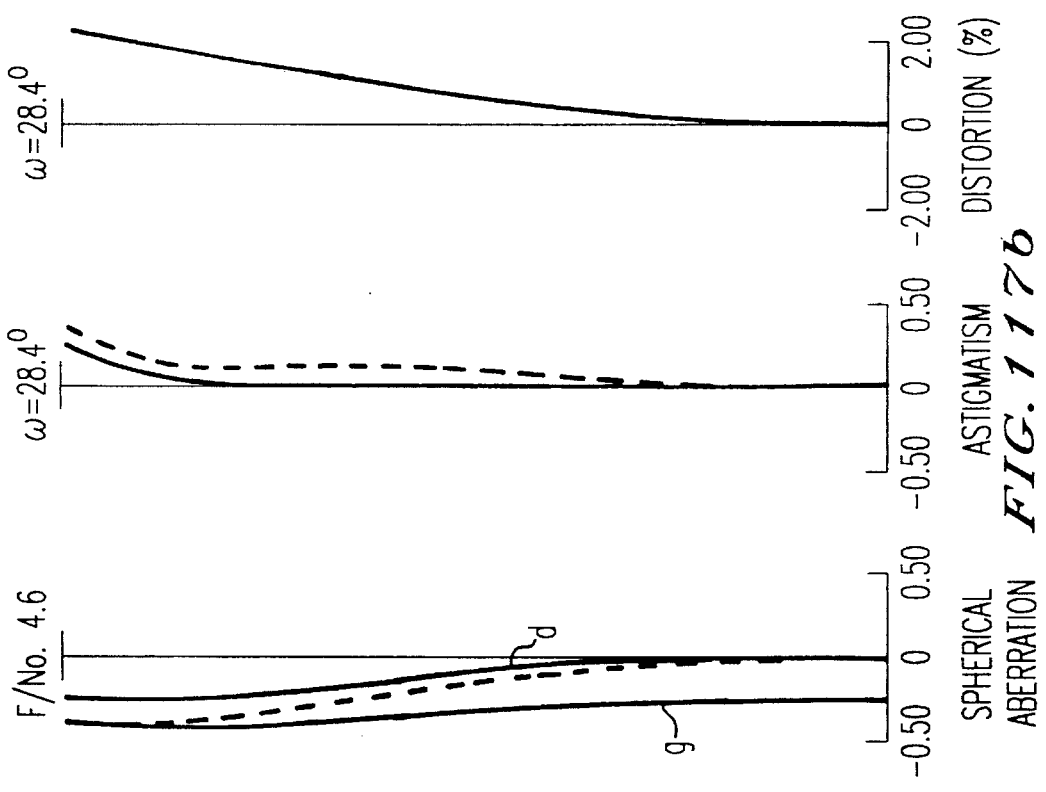
FIGS. 117a–c explain aberrations which occur when the zoom lens of the twenty-ninth embodiment is in a lens arrangement characterized by the shortest focal length.

FIGS. 117a–119c explain aberrations which occur in the twenty-ninth embodiment. FIGS. 117a–c relate to a lens arrangement characterized by the shortest focal length; FIGS. 118a–c relate to a lens arrangement characterized by the intermediate focal length; FIGS. 119a–c relate to a lens arrangement characterized by the longest focal length.

FIGS. 120*a*–122*c* explain aberrations which occur in the thirtieth embodiment. FIGS. 120*a*–*c* relate to a lens arrangement characterized by the shortest focal length; FIGS. 121*a*–*c* relate to a lens arrangement characterized by the intermediate focal length; FIGS. 122*a*–*c* relate to a lens arrangement characterized by the longest focal length.

FIGS. 123*a*–125*c* explain aberrations which occur in the thirty-first embodiment. FIGS. 123*a*–*c* relates to a lens arrangement characterized by the shortest focal length; FIGS. 124*a*–*c* relate to a lens arrangement characterized by the intermediate focal length; FIGS. 125*a*–*c* relate to a lens arrangement characterized by the longest focal length.

FIGS. 126*a*–128*c* explain aberrations which occur in the thirty-second embodiment. FIGS. 126*a*–*c* relate to a lens arrangement characterized by the shortest focal length; FIGS. 127*a*–*c* relate to a lens arrangement characterized by the intermediate focal length; FIGS. 128*a*–*c* relate to a lens arrangement characterized by the longest focal length.

In illustrations explaining spherical aberrations, d and g denotes spherical aberrations (broken lines indicates the sine condition) of the d line and the g line, respectively. In illustrations explaining astigmatism, solid lines indicate the sagittal image surface, and broken lines indicate the meridional image surface.

It will be noted that the aberrations are excellently corrected in any of the lens arrangements characterized by the shortest focus, the intermediate focus and the longest focus, thereby realizing a good performance of the zoom lens.

As has been described, the present invention provides novel zoom lenses. The compactness of the zoom lenses of the present invention constructed as described above is noteworthy in that, in spite of a simple construction including seven lenses divided into two groups, these zoom lenses include a wide field angle of about 30 degrees, and in that a variable power ratio of greater than 2.5 is achieved. Since an aspherical surface is employed in the zoom lenses as claimed in claims 4–62, the total length can be reduced and the zoom lenses can be made compact while retaining the excellent performance.

The present invention is not limited to the above described embodiments, and the variations and modifications may be made without departing from the scope of the present invention.

What is claimed is:

1. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $$0.27 < f_1/f_T < 0.31 \quad (1)$$

$$(d_8+d_{9T})/f_T < 0.035 \quad (2)$$

$$-1.1 < f_2/f_1 < -0.9 \quad (3).$$

2. The zoom lens as claimed in claim 1, wherein, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9.$$

3. The zoom lens as claimed in claim 1 or claim 2, wherein, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2 > 1.75 \quad (5)$$

$$v_4 > 55.0 \quad (6)$$

$$v_7 > 60.0 \quad (7).$$

4. The zoom lens as claimed in claim 1, wherein the third lens has an aspherical surface facing the image.

5. The zoom lens as claimed in claim 4, wherein, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \quad (4).$$

6. The zoom lens as claimed in claim 4 or claim 5, wherein, providing that an X-axis is drawn, toward the image, from an origin at the intersection of the third lens surface facing the image and an optical axis, the X-coordinate being larger toward the image, that a height measured perpendicularly from the optical axis is H, that the reciprocal of the radius of curvature along the optical axis is $C_6$ ($=1/r_6$), and that the X-coordinate of the surface facing the image is $X_6(H)$, $X_6(H)$ and $C_6$ satisfy the following condition, $$X_6(H) > C_6H^2/(1+\sqrt{(1-C_6^2H^2)}\ ). \quad (8)$$

7. The zoom lens as claimed in claim 4 or claim 5, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \quad (5)$$

$$v_4 > 55.0 \quad (6)$$

$$v_7 > 60.0 \quad (7).$$

8. The zoom lens as claimed in claim 1, wherein the fourth lens has an aspherical surface facing the object.

9. The zoom lens as claimed in claim 8, wherein, providing that the sixth lens has the radius $r_{12}$ of curvature at the surface facing the object and the radius $r_{13}$ of curvature at the surface facing the image, the following condition is satisfied, $$-1.4<(r_{12}+r_{13})/(r_{12}-r_{13})<-0.9 \quad (4).$$

10. The zoom lens as claimed in claim 8 or claim 9, wherein, providing that an X-axis is drawn, toward the image, from an origin at the intersection of the fourth lens surface facing the object and an optical axis, the X-coordinate being larger toward the image, that a height measured perpendicularly from the optical axis is H, that the reciprocal of the radius of curvature along the optical axis is $C_7$ (=$1/r_7$), and that the X-coordinate of the surface facing the image is $X_7(H)$, $X_7(H)$ and $C_7$ satisfy the following condition, $$X_7(H) > C_7H^2/(1 + \sqrt{(1-C_7^2H^2)}\ ). \quad (9)$$

11. The zoom lens as claimed in claim 8 or claim 9, wherein, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2>1.75 \quad (5)$$

$$v_4>55.0 \quad (6)$$

$$v_7>60.0 \quad (7).$$

12. The zoom lens as claimed in claim 1, wherein the fourth lens has an aspherical surface facing the image.

13. The zoom lens as claimed in claim 12, wherein, providing that the sixth lens has the radius $r_{12}$ of curvature at the surface facing the object and the radius $r_{13}$ of curvature at the surface facing the image, the following condition is satisfied, $$-1.4<(r_{12}+r_{13})/(r_{12}-r_{13})<-0.9 \quad (4).$$

14. The zoom lens as claimed in claim 12 or claim 13, wherein, providing that an X-axis is drawn, toward the image, from an origin at the intersection of the fourth lens surface facing the image and an optical axis, the X-coordinate being larger toward the image, that a height measured perpendicularly from the optical axis is H, that the reciprocal of the radius of curvature along the optical axis is $C_8$ (=$1/r_8$), and that the X-coordinate of the surface facing the image is $X_8(H)$, $X_8(H)$ and $C_8$ satisfy the following condition, $$X_8(H) > C_8H^2/(1 + \sqrt{(1-C_8^2H^2)}\ ). \quad (10)$$

15. The zoom lens as claimed in claim 12 or claim 13, wherein, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2>1.75 \quad (5)$$

$$v_4>55.0 \quad (6)$$

$$v_7>60.0 \quad (7).$$

16. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a cemented lens formed by cementing a second lens embodied by a biconcave lens with a third lens embodied by a biconvex lens, and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_7+d_{8T}$, the following conditions are satisfied, $$0.27<f_1/f_T<0.31 \quad (1)$$

$$(d_7+d_{8T})/f_T<0.035 \quad (2)$$

$$-1.1<f_2/f_1<-0.9 \quad (3).$$

17. The zoom lens as claimed in claim 16, wherein, providing that the sixth lens has the radius $r_{11}$ of curvature at the surface facing the object and the radius $r_{12}$ of curvature at the surface facing the image, the following condition is satisfied, $$-1.4<(r_{11}+r_{12})/(r_{11}-r_{12})<-0.9 \quad (4').$$

18. The zoom lens as claimed in claim 16 or claim 17, wherein, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2>1.75 \quad (5)$$

$$v_4>55.0 \quad (6)$$

$$v_7>60.0 \quad (7).$$

19. The zoom lens as claimed in claim 16, wherein the third lens has an aspherical surface facing the image.

20. The zoom lens as claimed in claim 19, wherein, providing that the sixth lens has the radius $r_{11}$ of curvature at the surface facing the object and the radius $r_{12}$ of curvature at the surface facing the image, the following condition is satisfied, $$-1.4<(r_{11}+r_{12})/(r_{11}-r_{12})<-0.9 \quad (4').$$

21. The zoom lens as claimed in claim 19 or claim 20, wherein, providing that an X-axis is drawn, toward the image, from an original at the intersection of the third lens surface facing the image and an optical axis, the X-coordinate being larger toward the image, that a height measured perpendicularly from the optical axis is H, that the reciprocal of the radius of curvature along the optical axis is $C_5$ ($=1/r_5$), and that the X-coordinate of the surface facing the image is $X_5(H)$, $X_5(H)$ and $C_5$ satisfy the following condition, $$X_5(H) > C_5H^2/(1 + \sqrt{(1-C_5^2H^2)}\ ). \tag{8'}$$

22. The zoom lens as claimed in claim 19 or claim 20, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \tag{5}$$

$$v_4 > 55.0 \tag{6}$$

$$v_7 > 60.0 \tag{7}$$

23. The zoom lens as claimed in claim 16, wherein the fourth lens has an aspherical surface facing the object.

24. The zoom lens as claimed in claim 23, wherein, providing that the sixth lens has the radius $r_{11}$ of curvature at the surface facing the object and the radius $r_{12}$ of curvature at the surface facing the image, the following condition is satisfied, $$-1.4 < (r_{11}+r_{12})/(r_{11}-r_{12}) < -0.9 \tag{4'}$$

25. The zoom lens as claimed in claim 23 or claim 24, wherein, providing that an X-axis is drawn, toward the image, from an origin at the intersection of the fourth lens surface facing the object and an optical axis, the X-coordinate being larger toward the image, that a height measured perpendicularly from the optical axis is H, that the reciprocal of the radius of curvature along the optical axis is $C_6$ ($=1/r_6$), and that the X-coordinate of the surface facing the image is $X_6(H)$, $X_6(H)$ and $C_6$ satisfy the following condition, $$X_6(H) > C_6H^2/(1 + \sqrt{(1-C_6^2H^2)}\ ). \tag{9'}$$

26. The zoom lens as claimed in claim 23 or claim 24, wherein, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2 > 1.75 \tag{5}$$

$$v_4 > 55.0 \tag{6}$$

$$v_7 > 60.0 \tag{7}$$

27. The zoom lens as claimed in claim 16, wherein the fourth lens has an aspherical surface facing the image.

28. The zoom lens as claimed in claim 27, wherein, providing that the sixth lens has the radius $r_{11}$ of curvature at the surface facing the object and the radius $r_{12}$ of curvature at the surface facing the image, the following condition is satisfied, $$-1.4 < (r_{11}+r_{12})/(r_{11}-r_{12}) < -0.9 \tag{4}$$

29. The zoom lens as claimed in claim 27 or claim 28, wherein, providing that an X-axis is drawn, toward the image, from an origin at the intersection of the fourth lens surface facing the image and an optical axis, the X-coordinate being larger toward the image, that a height measured perpendicularly from the optical axis is H, that the reciprocal of the radius of curvature along the optical axis is $C_7$ ($=1/r_7$), and that the X-coordinate of the surface facing the image is $X_7(H)$, $X_7(H)$ and $C_7$ satisfy the following condition, $$X_7(H) > C_7H^2/(1 + \sqrt{(1-C_7^2H^2)}\ ). \tag{10'}$$

30. The zoom lens as claimed in claim 27 or claim 28, wherein, providing that the refractive index of the substance forming the second lens is $n_2$, that the Abbe number of the substance forming the fourth lens is $v_4$, and that the Abbe number of the seventh lens is $v_7$, the following conditions are satisfied, $$n_2 > 1.75 \tag{5}$$

$$v_4 > 55.0 \tag{6}$$

$$v7 > 60.0 \tag{7}$$

31. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the third and fifth lenses have aspherical surfaces facing the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $$0.27 < f_1/f_T < 0.31 \tag{1}$$

$$(d_8+d_{9T})/f_T < 0.035 \tag{2}$$

$$-1.1 < f_2/f_1 < -0.9 \tag{3}$$

32. The zoom lens as claimed in claim 31, wherein, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \qquad (4).$$

33. The zoom lens as claimed in claim 31 or claim 32, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r where r is the radius of curvature along the optical axis), $X_6(H)$ and $C_6$ of the third lens surface facing the image, and $X_{11}(H)$ and $C_{11}$ of the fifth lens surface facing the image satisfy the following conditions, $$X_6(H) > C_6H^2/(1 + \sqrt{(1 - C_6^2H^2)}\;) \qquad (8)$$

$$X_6(H) < C_6H^2/(1 + \sqrt{(1 - C_6^2H^2)}\;) \qquad (11)$$

34. The zoom lens as claimed in claim 31 or claim 32, wherein, providing that the refractive index of the substance forming the second lens is $n_2$, that the Abbe number of the substance forming the fourth lens is $\nu_4$, and that the Abbe number of the substance forming the seventh lens is $\nu_7$, the following conditions are satisfied, $$n_2 > 1.75 \qquad (5)$$

$$\nu_4 > 55.0 \qquad (6)$$

$$\nu_7 > 60.0 \qquad (7).$$

35. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side,.

the fourth lens has an aspherical surface facing the object, the fifth lens has an aspherical surface facing the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $$0.27 < f_1/f_T < 0.31 \qquad (1)$$

$$(d_8+d_{9T})/f_T < 0.035 \qquad (2)$$

$$-1.1 < f_2/f_1 < -0.9 \qquad (3).$$

36. The zoom lens as claimed in claim 35, wherein, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \qquad (4).$$

37. The zoom lens as claimed in claim 35 or claim 36, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r), $X_7(H)$ and $C_7$ of the fourth lens surface facing the object, and $X_{11}(H)$ and $C_{11}$ of the fifth lens surface facing the image satisfy the following conditions, $$X_7(H) > C_7H^2/(1 + \sqrt{(1 - C_7^2H^2)}\;) \qquad (9)$$

$$X_{11}(H) < C_{11}H^2/(1 + \sqrt{(1 - C_{11}^2H^2)}\;) \qquad (11)$$

38. The zoom lens as claimed in claim 35 or claim 36, wherein, providing that the refractive index of the substance forming the second lens is $n_2$, that the Abbe number of the substance forming the fourth lens is $\nu_4$, and that the Abbe number of the substance forming the seventh lens is $\nu_7$, the following conditions are satisfied, $$n_2 > 1.75 \qquad (5)$$

$$\nu_4 > 55.0 \qquad (6)$$

$$\nu_7 > 60.0 \qquad (7).$$

39. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the fourth and fifth lenses have aspherical surfaces facing the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $$0.27 < f_1/f_T < 0.31 \tag{1}$$

$$(d_8+d_{9T})/f_T < 0.035 \tag{2}$$

$$-1.1 < f_2/f_1 < -0.9 \tag{3}$$

40. The zoom lens as claimed in claim 39, wherein, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \tag{4}$$

41. The zoom lens as claimed in claim 39 or claim 40, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r), $X_8(H)$ and $C_8$ of the fourth lens surface facing the image, and $X_{11}(H)$ and $C_{11}$ of the fifth lens surface facing the image satisfy the following conditions, $$X_8(H) > C_8 H^2/(1 + \sqrt{(1 - C_8^2 H^2)}\ ) \tag{10}$$

$$X_{11}(H) < C_{11} H^2/(1 + \sqrt{(1 - C_{11}^2 H^2)}\ ) \tag{11}$$

42. The zoom lens as claimed in claim 39 or claim 40, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \tag{5}$$

$$v_4 > 55.0 \tag{6}$$

$$v_7 > 60.0 \tag{7}$$

43. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a second lens embodied by a biconcave lens, a third lens embodied by a biconvex lens and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the fourth lens has an aspherical surface facing the image, the fifth lens has aspherical surfaces facing the object and the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_8+d_{9T}$, the following conditions are satisfied, $$0.27 < f_1/f_T < 0.31 \tag{1}$$

$$(d_8+d_{9T})/f_T < 0.035 \tag{2}$$

$$-1.1 < f_2/f_1 < -0.9 \tag{3}$$

44. The zoom lens as claimed in claim 43, wherein, providing that the sixth lens has the radius $r_{12}$ of curvature at the surface facing the object and the radius $r_{13}$ of curvature at the surface facing the image, the following condition is satisfied, $$-1.4 < (r_{12}+r_{13})/(r_{12}-r_{13}) < -0.9 \tag{4}$$

45. The zoom lens as claimed in claim 43 or claim 44, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r), $X_8(H)$ and $C_8$ of the fourth lens surface facing the image, $X_{10}(H)$ and $C_{10}$ of the fifth lens surface facing the object, and $X_{11}(H)$ and $C_{11}$ of the fifth lens surface facing the image satisfy the following conditions, $$X_8(H) > C_8 H^2/(1 + \sqrt{(1 - C_8^2 H^2)}\ ) \tag{10}$$

$$X_{11}(H) - X_{10}(H) < [C_{11} H^2/(1 + \sqrt{(1 - C_{11}^2 H^2)}\ ) - (C_{10} H^2/1 + \sqrt{(1 - C_{10}^2 H^2)}\ )] \tag{12}$$

46. The zoom lens as claimed in claim 43 or claim 44, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \tag{5}$$

$$v_4 > 55.0 \tag{6}$$

$$v_7 > 60.0 \tag{7}$$

47. A zoom lens which has a first lens group having a positive focal length disposed at the front (toward an object)

and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a cemented lens formed by cementing a second lens embodied by a biconcave lens with a third lens embodied by a biconvex lens, and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the third lens has an aspherical surface facing the image, the fifth lens has an aspherical surface facing the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_7+d_{8T}$, the following conditions are satisfied, $$0.27 < f_1/f_T < 0.31 \quad (1)$$

$$(d_7+d_{8T})/f_T < 0.035 \quad (2')$$

$$-1.1 < f_2/f_1 < -0.9 \quad (3).$$

48. The zoom lens as claimed in claim 47, wherein, providing that the sixth lens has the radius $r_{11}$ of curvature at the surface facing the object and the radius $r_{12}$ of curvature at the surface facing the image, the following condition is satisfied, $$-1.4 < (r_{11}+r_{12})/(r_{11}-r_{12}) < -0.9 \quad (4').$$

49. The zoom lens as claimed in claim 47 or claim 48, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r where r is the radius of curvature along the optical axis), $X_5(H)$ and $C_5$ of the third lens surface facing the image, $X_{10}(H)$ and $C_{10}$ of the fifth lens surface facing the image satisfy the following conditions, $$X_5(H) > C_5 H^2/(1 + \sqrt{(1-C_5^2 H^2)} \;) \quad (8')$$

$$X_{10}(H) < C_{10} H^2/(1 + \sqrt{(1-C_{10}^2 H^2)} \;) \quad (11')$$

50. The zoom lens as claimed in claim 47 or claim 48, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \quad (5)$$

$$v_4 > 55.0 \quad (6)$$

$$v_7 > 60.0 \quad (7).$$

51. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a cemented lens formed by cementing a second lens embodied by a biconcave lens with a third lens embodied by a biconvex lens, and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the fourth lens has an aspherical surface facing the object, the fifth lens has an aspherical surface facing the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_7+d_{8T}$, the following conditions are satisfied, $$0.27 < f_1/f_T < 0.31 \quad (1)$$

$$(d_7+d_{8T})/f_T < 0.035 \quad (2)$$

$$-1.1 < f_2/f_1 < -0.9 \quad (3).$$

52. The zoom lens as claimed in claim 51, wherein, providing that the sixth lens has the radius $r_{11}$ of curvature at the surface facing the object and the radius $r_{12}$ of curvature at the surface facing the image, the following condition is satisfied, $$-1.4 < (r_{11}+r_{12})/(r_{11}-r_{12}) < -0.9 \quad (4').$$

53. The zoom lens as claimed in claim 51 or claim 52, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r), $X_6(H)$ and $C_6$ of the fourth lens surface facing the object, $X_{10}(H)$ and $C_{10}$ of the fifth lens surface facing the image satisfy the following conditions, $$X_6(H) > C_6H^2/(1 + \sqrt{(1-C_6^2H^2)}) \quad (9')$$

$$X_{10}(H) < C_{10}H^2/(1 + \sqrt{(1-C_{10}^2H^2)}) \quad (11')$$

54. The zoom lens as claimed in claim 51 or claim 52, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \quad (5)$$

$$v_4 > 55.0 \quad (6)$$

$$v_7 > 60.0 \quad (7).$$

55. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a cemented lens formed by cementing a second lens embodied by a biconcave lens with a third lens embodied by a biconvex lens, and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the fourth lens has an aspherical surface facing the image, the fifth lens has an aspherical surface facing the image, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_7 + d_{8T}$, the following conditions are satisfied, $$0.27 < f_1/f_T < 0.31 \quad (1)$$

$$(d_7 + d_{8T})/f_T < 0.035 \quad (2)$$

$$-1.1 < f_2/f_1 < -0.9 \quad (3).$$

56. The zoom lens as claimed in claim 55, wherein, providing that the sixth lens has the radius $r_{11}$ of curvature at the surface facing the object and the radius $r_{12}$ of curvature at the surface facing the image, the following condition is satisfied, $$-1.4 < (r_{11} + r_{12})/(r_{11} - r_{12}) < -0.9 \quad (4').$$

57. The zoom lens as claimed in claim 55 or claim 56, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r), $X_7(H)$ and $C_7$ of the fourth lens surface facing the image, $X_{10}(H)$ and $C_{10}$ of the fifth lens surface facing the image satisfy the following conditions, $$X_7(H) > C_7H^2/(1 + \sqrt{(1-C_7^2H^2)}) \quad (10')$$

$$X_{10}(H) < C_{10}H^2/(1 + \sqrt{(1-C_{10}^2H^2)}) \quad (11')$$

58. The zoom lens as claimed in claim 55 or claim 56, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \quad (5)$$

$$v_4 > 55.0 \quad (6)$$

$$v_7 > 60.0 \quad (7).$$

59. A zoom lens which has a first lens group having a positive focal length disposed at the front (toward an object) and has a second lens group having a negative focal length disposed at the back (toward an image), and in which a variable power is obtained by changing the distance between the first lens group and the second lens group, wherein the first lens group comprises a first lens embodied by a positive meniscus lens whose convex surface faces the object, a cemented lens formed by cementing a second lens embodied by a biconcave lens with a third lens embodied by a biconvex lens, and a fourth lens embodied by a biconvex lens, the lenses being arranged in the stated order when viewed from the object side, the second lens group comprises a fifth lens embodied by a positive meniscus lens whose convex surface faces the image, a sixth lens embodied by a negative lens and a seventh lens embodied by a negative meniscus lens whose convex surface faces the image, the lenses being arranged in the stated order when viewed from the object side, the fourth lens has an aspherical surface facing the image, the fifth lens has aspherical surfaces facing the image and the object, and providing, when the first and second lens groups are in an arrangement characterized by the longest focal length, that the focal length of the whole system is $f_T$, that the focal length of the first lens group is $f_1$, that the focal length of the second lens group is $f_2$, and that the distance between the first lens group and the second lens group is $d_7 + d_{8T}S$, the following conditions are satisfied, $$0.27 < f_1/f_T < 0.31 \quad (1)$$

$$(d_7 + d_{8T})/f_T < 0.035 \quad (2')$$

$$-1.1 < f_2/f_1 < -0.9 \quad (3).$$

60. The zoom lens as claimed in claim 59, wherein, providing that the sixth lens has the radius $r_{11}$ of curvature at the surface facing the object and the radius $r_{12}$ of curvature at the surface facing the image, the following condition is satisfied, $$-1.4 < (r_{11}+r_{12})/(r_{11}-r_{12}) < -0.9 \quad (4').$$

61. The zoom lens as claimed in claim 59 or claim 60, wherein, providing that an X-axis is drawn, toward the image, from an origin at the intersection of the aspherical lens surface and an optical axis, the X-coordinate being larger toward the image, that a height measured perpendicularly from the optical axis is H, that the X-coordinate of the aspherical surface is X(H), and that the curvature, of the aspherical lens surface, along the optical axis is C (=1/r), $X_7(H)$ and $C_7$ of the fourth lens surface facing the image, $X_9(H)$ and $C_9$ of the fifth lens surface facing the object, and $X_{10}(H)$ and $C_{10}$ of the fifth lens surface facing the image satisfy the following conditions, $$X_7(H) > C_7 H^2/(1 + \sqrt{(1 - C_7^2 H^2)}) \quad (10')$$

$$X_{10}(H) - X_9(H) < [C_{10}H^2/(1 + \sqrt{(1 - C_{10}^2 H^2)}) - (C_9 H^2/1 + \sqrt{(1 - C_9^2 H^2)})] \quad (12')$$

62. The zoom lens as claimed in claim 59 or claim 60, wherein, providing that the refractive index of the substance forming the second lens is $n_2$, that the Abbe number of the substance forming the fourth lens is $v_4$, and that the Abbe number of the substance forming the seventh lens is $v_7$, the following conditions are satisfied, $$n_2 > 1.75 \quad (5)$$

$$v_4 > 55.0 \quad (6)$$

$$v_7 > 60.0 \quad (7).$$

* * * * *